(12) United States Patent
Krull et al.

(10) Patent No.: US 12,406,084 B1
(45) Date of Patent: Sep. 2, 2025

(54) PROVIDING ACCESS TO COMPOSITE AI-GENERATED DATA

(71) Applicant: ALPHA DEAL LLC, Old Greenwich, CT (US)

(72) Inventors: Brandon Krull, Santa Ana, CA (US); Syed M. Amir Husain, Georgetown, TX (US); Steven Lau, Westport, CT (US); Thiam Hui Lee, New York, NY (US); Aldo Marini MacOuzet, Alameda, CA (US)

(73) Assignee: ALPHA DEAL LLC, Old Greenwich, CT (US)

( * ) Notice: Subject to any disclaimer, the term of this patent is extended or adjusted under 35 U.S.C. 154(b) by 0 days.

(21) Appl. No.: 18/962,991

(22) Filed: Nov. 27, 2024

(51) Int. Cl.
G06F 21/62 (2013.01)
G06F 9/54 (2006.01)

(52) U.S. Cl.
CPC .......... *G06F 21/6227* (2013.01); *G06F 9/547* (2013.01)

(58) Field of Classification Search
CPC ...... G06F 21/6227; G06F 9/547; G06F 21/62; G06F 9/54
See application file for complete search history.

(56) References Cited

U.S. PATENT DOCUMENTS

| | | |
|---|---|---|
| 4,903,201 A | 2/1990 | Wagner |
| 5,497,317 A | 3/1996 | Hawkins et al. |
| 5,873,071 A | 2/1999 | Ferstenberg et al. |
| 6,594,643 B1 | 7/2003 | Freeny, Jr. |
| 7,165,045 B1 | 1/2007 | Kim-E |
| 7,792,819 B2 | 9/2010 | Barsness et al. |
| 7,827,170 B1 * | 11/2010 | Horling ............ G06F 16/93 707/722 |
| 8,165,955 B2 | 4/2012 | Agarwal et al. |
| 8,171,032 B2 | 5/2012 | Herz |
| 8,607,335 B1 | 12/2013 | Liu et al. |
| 8,676,904 B2 | 3/2014 | Lindahl |
| 8,713,068 B2 | 4/2014 | Seet et al. |
| 9,164,926 B2 | 10/2015 | Wang |
| 9,307,884 B1 | 4/2016 | Coleman et al. |
| 9,318,108 B2 | 4/2016 | Gruber et al. |
| 9,460,458 B1 | 10/2016 | Dillard |
| 9,646,161 B2 | 5/2017 | Estehghari et al. |
| 9,705,859 B2 | 7/2017 | Campagna |
| 9,804,820 B2 | 10/2017 | Quast et al. |
| 10,057,736 B2 | 8/2018 | Gruber et al. |
| 10,176,167 B2 | 1/2019 | Evermann |

(Continued)

FOREIGN PATENT DOCUMENTS

| | | |
|---|---|---|
| CN | 112379919 A | 2/2021 |
| EP | 3642835 A4 | 4/2020 |

(Continued)

*Primary Examiner* — Jayesh M Jhaveri

(57) ABSTRACT

Methods, apparatuses, system, devices, and computer program products for providing access to composite AI-generated data is disclosed that includes a controller of an API server, receiving from a user system, an API call that specifies a request to perform a data operation on an entity database; interpreting the API call to identify the data operation and parameters related to the scoring data; executing the data operation on the entity database according to the specified parameters; generating a response to the API call; and transmitting the response to the user system.

20 Claims, 73 Drawing Sheets

(56) References Cited

U.S. PATENT DOCUMENTS

| | | | |
|---|---|---|---|
| 10,534,623 B2 | 1/2020 | Harper et al. | |
| 10,715,564 B2 | 7/2020 | Mohamad Abdul et al. | |
| 10,827,008 B2 | 11/2020 | Pogrebinsky et al. | |
| 10,853,510 B2 | 12/2020 | Bonnet et al. | |
| 10,901,787 B2 | 1/2021 | Kaul et al. | |
| 10,908,970 B1 | 2/2021 | Arivazhagan et al. | |
| 10,929,392 B1 | 2/2021 | Cheng | |
| 10,999,335 B2 | 5/2021 | Phillips et al. | |
| 11,120,174 B1 | 9/2021 | Ciarlini et al. | |
| 11,146,574 B2 | 10/2021 | Muddu et al. | |
| 11,232,383 B1 * | 1/2022 | Burns, Sr. | G06Q 10/0637 |
| 11,301,273 B2 | 4/2022 | Bar-On et al. | |
| 11,334,626 B1 | 5/2022 | Ogrinz et al. | |
| 11,354,733 B2 | 6/2022 | Kurian et al. | |
| 11,368,441 B2 | 6/2022 | Benavides et al. | |
| 11,443,380 B2 | 9/2022 | Cummings | |
| 11,449,812 B2 | 9/2022 | Jain et al. | |
| 11,461,339 B2 | 10/2022 | Vangala et al. | |
| 11,461,723 B2 | 10/2022 | Balan | |
| 11,488,064 B2 | 11/2022 | Bulut et al. | |
| 11,544,135 B2 | 1/2023 | Mestres et al. | |
| 11,568,342 B1 | 1/2023 | Fremlin et al. | |
| 11,568,480 B2 | 1/2023 | Bjonerud et al. | |
| 11,611,653 B1 | 3/2023 | Porter et al. | |
| 11,645,580 B2 | 5/2023 | Mitra et al. | |
| 11,669,796 B2 | 6/2023 | Grant et al. | |
| 11,669,914 B2 | 6/2023 | Cella | |
| 11,714,698 B1 | 8/2023 | Curtis et al. | |
| 11,720,686 B1 | 8/2023 | Cross et al. | |
| 11,727,318 B2 | 8/2023 | Covell et al. | |
| 11,769,577 B1 | 9/2023 | Dods et al. | |
| 11,782,997 B2 | 10/2023 | Marsh et al. | |
| 11,836,582 B2 | 12/2023 | Dhingra | |
| 11,876,858 B1 | 1/2024 | Nair et al. | |
| 11,893,267 B2 | 2/2024 | Kavali et al. | |
| 11,954,112 B2 | 4/2024 | Siebel et al. | |
| 12,033,006 B1 | 7/2024 | Nair et al. | |
| 12,050,592 B1 | 7/2024 | Starratt et al. | |
| 12,061,596 B1 | 8/2024 | Starratt et al. | |
| 12,088,673 B1 | 9/2024 | Starratt et al. | |
| 12,093,819 B2 | 9/2024 | Makhija et al. | |
| 12,100,048 B1 | 9/2024 | Arnott | |
| 12,100,393 B1 | 9/2024 | Smith et al. | |
| 12,106,026 B2 | 10/2024 | Gutierrez et al. | |
| 12,111,744 B1 | 10/2024 | Nair et al. | |
| 12,124,592 B1 | 10/2024 | O'Hern et al. | |
| 12,126,623 B1 * | 10/2024 | Gupta | H04L 63/102 |
| 2002/0111896 A1 | 8/2002 | Ben-Levy et al. | |
| 2002/0128958 A1 | 9/2002 | Slone | |
| 2003/0033239 A1 | 2/2003 | Gilbert et al. | |
| 2003/0231647 A1 | 12/2003 | Petrovykh | |
| 2005/0216766 A1 | 9/2005 | Cornpropst et al. | |
| 2006/0010053 A1 | 1/2006 | Farrow | |
| 2007/0033123 A1 | 2/2007 | Navin | |
| 2007/0244848 A1 | 10/2007 | Chu | |
| 2008/0120240 A1 | 5/2008 | Ginter et al. | |
| 2012/0191716 A1 * | 7/2012 | Omoigui | H10F 39/1825 707/E17.069 |
| 2012/0296845 A1 | 11/2012 | Andrews et al. | |
| 2012/0310700 A1 | 12/2012 | Kurtz et al. | |
| 2013/0085910 A1 | 4/2013 | Chew | |
| 2013/0253976 A1 | 9/2013 | Shukla et al. | |
| 2014/0074629 A1 | 3/2014 | Rathod | |
| 2015/0324454 A1 | 11/2015 | Roberts et al. | |
| 2017/0193392 A1 | 7/2017 | Liu et al. | |
| 2017/0279754 A1 | 9/2017 | Fitzsimons | |
| 2017/0301015 A1 | 10/2017 | Tunnell | |
| 2017/0329837 A1 | 11/2017 | Barrett et al. | |
| 2018/0075554 A1 | 3/2018 | Clark | |
| 2018/0176318 A1 | 6/2018 | Rathod | |
| 2019/0005431 A1 | 1/2019 | Boyacigiller et al. | |
| 2019/0081967 A1 | 3/2019 | Balabine | |
| 2019/0122153 A1 | 4/2019 | Meharwade et al. | |
| 2019/0171950 A1 | 6/2019 | Srivastava | |
| 2019/0213686 A1 | 7/2019 | Mclaughlin et al. | |
| 2019/0327330 A1 | 10/2019 | Natarajan et al. | |
| 2019/0354544 A1 | 11/2019 | Hertz et al. | |
| 2020/0073953 A1 | 3/2020 | Kulkarni | |
| 2020/0117758 A1 | 4/2020 | Lu et al. | |
| 2020/0167779 A1 | 5/2020 | Carver et al. | |
| 2020/0184558 A1 | 6/2020 | Crumb et al. | |
| 2020/0310888 A1 | 10/2020 | Gopalan et al. | |
| 2021/0019339 A1 | 1/2021 | Ghulati et al. | |
| 2021/0027234 A1 | 1/2021 | Jadallah et al. | |
| 2021/0049600 A1 | 2/2021 | Spector et al. | |
| 2021/0089375 A1 | 3/2021 | Ghafourifar et al. | |
| 2021/0125148 A1 | 4/2021 | Kulkarni et al. | |
| 2021/0133657 A1 | 5/2021 | Li et al. | |
| 2021/0182265 A1 | 6/2021 | Park | |
| 2021/0191957 A1 * | 6/2021 | Swamy | G06N 20/00 |
| 2021/0209109 A1 | 7/2021 | Zhang et al. | |
| 2021/0264520 A1 | 8/2021 | Cummings | |
| 2021/0272040 A1 | 9/2021 | Johnson et al. | |
| 2021/0295427 A1 | 9/2021 | Shiu et al. | |
| 2021/0342723 A1 | 11/2021 | Rao | |
| 2021/0342847 A1 | 11/2021 | Shachar et al. | |
| 2021/0374143 A1 * | 12/2021 | Neill | G06F 16/24568 |
| 2021/0390457 A1 | 12/2021 | Romanowsky et al. | |
| 2021/0406933 A1 | 12/2021 | Carmody et al. | |
| 2021/0406956 A1 | 12/2021 | Ono | |
| 2022/0058735 A1 | 2/2022 | Chuzhoy | |
| 2022/0092515 A1 | 3/2022 | Kasabach et al. | |
| 2022/0165104 A1 | 5/2022 | Gardiner et al. | |
| 2022/0182363 A1 | 6/2022 | Bharti et al. | |
| 2022/0237520 A1 | 7/2022 | Wang et al. | |
| 2022/0292081 A1 | 9/2022 | Gold | |
| 2022/0292543 A1 * | 9/2022 | Henderson | G06Q 30/0252 |
| 2022/0309475 A1 | 9/2022 | Kurniawan et al. | |
| 2022/0405679 A1 | 12/2022 | Balan | |
| 2023/0014392 A1 | 1/2023 | Asharov et al. | |
| 2023/0076559 A1 | 3/2023 | Sankarapu et al. | |
| 2023/0090695 A1 | 3/2023 | Kelkar et al. | |
| 2023/0095905 A1 | 3/2023 | Gu et al. | |
| 2023/0103753 A1 | 4/2023 | Luo et al. | |
| 2023/0116345 A1 | 4/2023 | Chirochangu et al. | |
| 2023/0134796 A1 | 5/2023 | Bhatnagar et al. | |
| 2023/0153304 A1 | 5/2023 | Dong et al. | |
| 2023/0162831 A1 | 5/2023 | Subramanian | |
| 2023/0224275 A1 | 7/2023 | Zink et al. | |
| 2023/0229412 A1 | 7/2023 | Paravatha et al. | |
| 2023/0245651 A1 | 8/2023 | Wang | |
| 2023/0377043 A1 | 11/2023 | Werr et al. | |
| 2024/0046318 A1 | 2/2024 | Muriqi | |
| 2024/0070236 A1 | 2/2024 | Cella | |
| 2024/0070487 A1 | 2/2024 | Merrill et al. | |
| 2024/0121074 A1 | 4/2024 | Adir et al. | |
| 2024/0126624 A1 * | 4/2024 | Ghergu | G06F 9/547 |
| 2024/0160953 A1 | 5/2024 | Manda et al. | |
| 2024/0179020 A1 | 5/2024 | Green | |
| 2024/0193516 A1 | 6/2024 | Moorthy et al. | |
| 2024/0241752 A1 | 7/2024 | Crabtree et al. | |
| 2024/0257023 A1 | 8/2024 | Aggarwal et al. | |
| 2024/0272886 A1 * | 8/2024 | Choudhury | G06F 9/54 |
| 2024/0331042 A1 | 10/2024 | Burrowes et al. | |
| 2024/0346288 A1 | 10/2024 | Novikov et al. | |
| 2024/0386015 A1 | 11/2024 | Crabtree et al. | |
| 2025/0165884 A1 * | 5/2025 | Millwr | G06F 18/24 |

FOREIGN PATENT DOCUMENTS

| | | |
|---|---|---|
| EP | 4304130 A1 | 1/2024 |
| EP | 4375912 A1 | 5/2024 |
| WO | 2014197335 A1 | 12/2014 |
| WO | 2019027992 A1 | 2/2019 |
| WO | 2019217323 A1 | 11/2019 |
| WO | 2022103683 A1 | 5/2022 |
| WO | 2022112842 A1 | 6/2022 |
| WO | 2024142031 A1 | 7/2024 |

* cited by examiner

Controller 4701

Receive From A User System, An API Call That Specifies A Request To Perform A Data Operation On An Entity Database, The Entity Database Comprising Composite AI-Generated Data, Wherein The Composite AI-Generated Data Includes Entity Profiles And Scoring Data For The Plurality Of Entity Profiles, The Scoring Data Generated By An Entity Analysis System Based On Attributes, Metrics, And AI-Derived Evaluations 4702

⬇

Interpret The API Call To Identify The Data Operation And Parameters Related To The Scoring Data, Wherein The Data Operation Includes At Least One Of Searching, Sorting, Retrieving, Updating, Or Aggregating The Composite AI-Generated Data Based On The Parameters Specified Within The API Call 4704

⬇

Execute The Data Operation On The Entity Database According To The Specified Parameters, Wherein The Data Operation Retrieves Or Modifies The Composite AI-Generated Data In Accordance With The Request 4706

⬇

Generate A Response To The API Call, Wherein The Response Includes At Least One Of: Transformed Or Filtered Representation Of The AI-Generated Data, A Structured Aggregation Of The Scoring Data With Metadata Describing Its Evaluation Context, Or A Summary Of Results Of The Data Operation Performed On The AI-Generated Data 4708

⬇

Transmit The Response To The User System 4710

⬇

Utilize Monitoring Tools To Track At Least One Of API Usage Patterns, Response Times, And Or Error Rates Related To Usage Of The API Server By User Systems 5402

⬇

Proactively Adjust System Capacity To Maintain Consistent Performance Under Varying Usage Conditions 5404

FIG. 54

Controller 6401

Receive From A User, Investor-Specified Risk Parameters And Portfolio Criteria For A Portfolio 6402

Retrieve From An Entity Database, Composite AI-Generated Data That Includes A Plurality Of Entity Profiles And Scoring Data Generated By The Integrated Entity Analysis System For The Plurality Of Entity Profiles 6404

Based On Scoring Preferences Of The User, Utilize The Scoring Data To Select From The Plurality Of Entity Profiles, A First Set Of Entity Profiles Corresponding To Candidate Assets That Satisfy The Investor-Specified Risk Parameters And The Portfolio Criteria 6406

For Each Asset Associated With An Entity Profile In The First Set Of Entity Profiles, Determining Based On The Investor-Specified Risk Parameters And The Portfolio Criteria, An Asset Allocation For The Portfolio 6408

Utilize Linear Programming, Genetic Algorithms, Or Machine Learning Models, To Analyze The Entity Profiles And Construct An Optimized Portfolio In Accordance With The Investor-Specified Risk Parameters And The Portfolio Criteria 6502

Continuously Update Financial Parameters For Each Asset In The Optimized Portfolio Based On Real-Time Market Data, Including Changes In Asset Prices, Market Volatility, And Sector Performance 6602

Dynamically Adjust The Asset Allocations In The Optimized Portfolio In Response To Updated Financial Parameters 6702

Transmit Instructions To One Or More Trade Fulfillment Backends To Perform One Or More Trades In Accordance With The Determined Asset Allocations 6410

FIG. 67

PROVIDING ACCESS TO COMPOSITE AI-GENERATED DATA

BACKGROUND

Entity analysis has traditionally relied on manual extraction and processing of data from a range of sources, such as structured databases and unstructured documents. These methods often demand substantial human effort and are prone to errors and inconsistencies due to the subjective nature of manual processing. Additionally, traditional entity analysis approaches frequently fall short in scalability and efficiency, especially when handling vast amounts of data from varied sources. While efforts have been made to introduce automation through rule-based systems or algorithmic models, these methods often struggle to manage the complexity of high-dimensional data, thereby limiting their ability to produce accurate and meaningful insights. Moreover, many current systems lack the capacity for continuous learning and adaptation, leading to static and potentially obsolete data outputs.

SUMMARY

Methods, apparatuses, system, devices, and computer program products of providing access to composite AI-generated data. In one embodiment, a controller of an API server receives from a user system an API call that specifies a request to perform a data operation on an entity database. In this embodiment, the entity database comprises composite AI-generated data that includes entity profiles and scoring data for the plurality of entity profiles. The scoring data is generated by an entity analysis system based on attributes, metrics, and AI-derived evaluations. The controller also interprets the API call to identify the data operation and parameters related to the scoring data. The data operation includes at least one of searching, sorting, retrieving, updating, or aggregating the composite AI-generated data based on the parameters specified within the API call. The controller also executes the data operation on the entity database according to the specified parameters. The data operation retrieves or modifies the composite AI-generated data in accordance with the request. In addition, the controller generates a response to the API call, wherein the response includes at least one of: transformed or filtered representation of the AI-generated data, a structured aggregation of the scoring data with metadata describing its evaluation context, or a summary of results of the data operation performed on the AI-generated data. In this embodiment, the controller also transmits the response to the user system.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 54 sets forth a flowchart of another example method of providing access to composite AI-generated data in accordance with at least one embodiment of the present disclosure.

FIG. 67 sets forth a flowchart of another example method of automating asset trading based on composite AI-generated data in accordance with at least one embodiment of the present disclosure.

DETAILED DESCRIPTION

Figure 1:
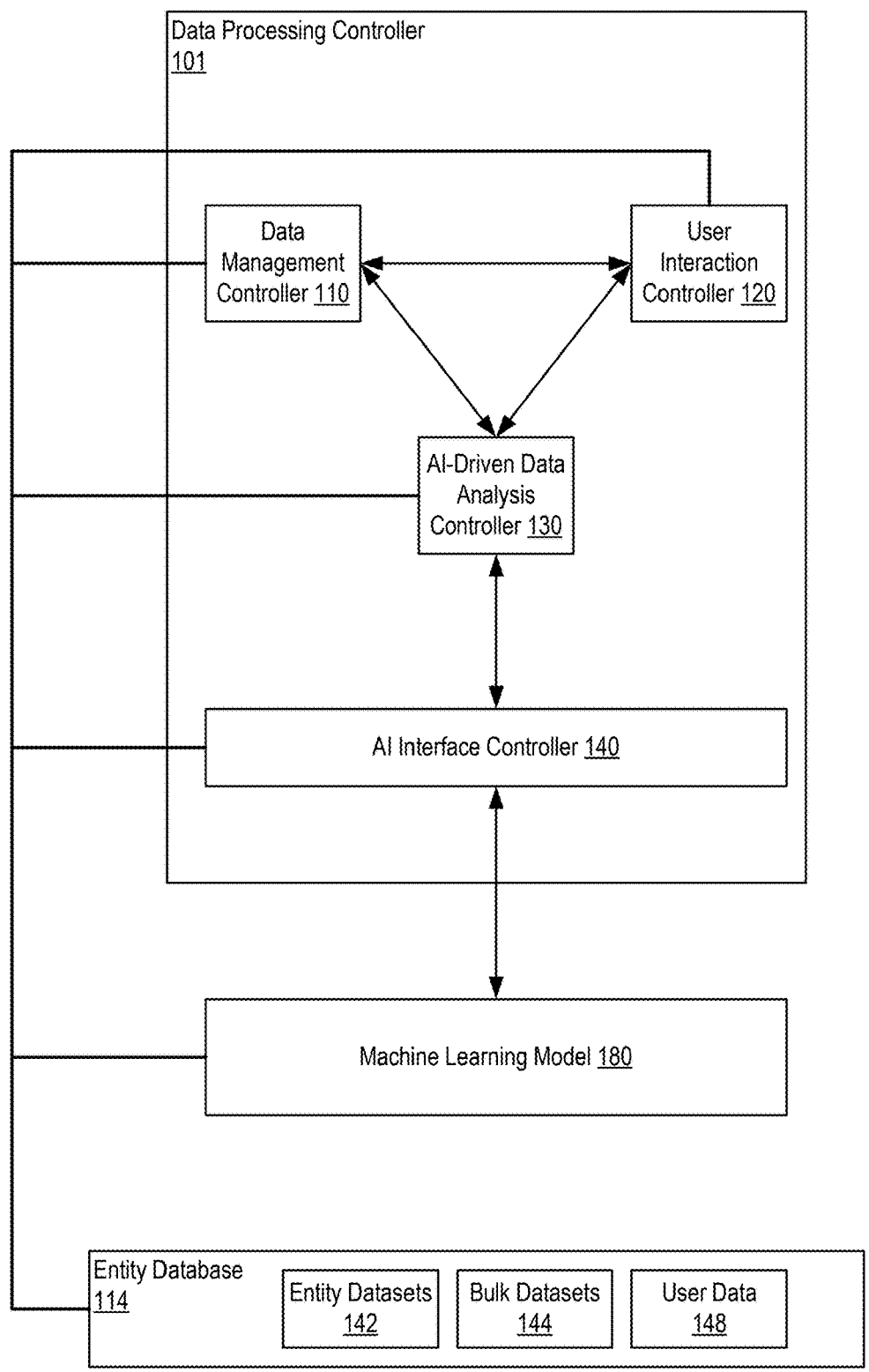
FIG. 1 sets forth a block diagram of an example integrated entity analysis system for integrated entity analysis using an AI model in accordance with at least one embodiment of the present disclosure.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Data driven analysis of abstract entities such as companies, assets, deals, etc. requires an analysis of many different entity characteristics from a multitude of data sources, and correlation of various characteristics to generate accurate predictions or assessments of those entities. This has typically involved manually compiling and integrating various structure and unstructured data. Conventional systems are constrained by the lack of comprehensive and up-to-date entity databases, hindering the ability of mathematical models to generate accurate insights and limiting the accuracy and effectiveness of subsequent analyses. The algorithmic mathematical models that are conventionally employed to generate data-driven assessments are constrained by linearity or simpler functional relationships and struggle with datasets involving high dimensional data. Moreover, computing systems that perform data driven analysis of abstract entities based on algorithmic models consume significant amounts of power and expend significant amounts of heat in solving complex mathematical equations requiring multivariable analysis. Heat generation, in turn, requires energy to cool the processors.

Integrated data analysis using an AI model in accordance with the present disclosure integrates user-provided data with structured and unstructured data from external sources to create a comprehensive dataset upon which analyses are based. The AI model provides pattern recognition and cross correlation of data to generate assessments and insights that provide a holistic real-time evaluation of the entity based on structured and unstructured data, thus improving the results of ratings for the entity that are generated by the integrated data analysis system. By utilizing and augmenting an AI model to facilitate data aggregation and transformation and to generate predictions and analytics based on the aggregated data, integrated data analysis using an AI model in accordance with the present disclosure reduces the processing complexities and thus reduces the amount of energy consumed and heat generated to perform these analyses, thus making the computing system more efficient.

For further explanation, FIG. 1 sets forth an integrated entity analysis system 100 for integrated entity analysis using an AI model in accordance with at least one embodiment of the present disclosure. The integrated entity analysis system 100 includes one or more entity databases 114 that stores one or more entity datasets 142 and one or more bulk datasets 144. Each entity dataset 142 includes entity profiles that identify various properties of an entity. In some examples, each entity profile is a database record, such as a table or other data structure that includes one or more fields. These fields correspond to properties of the entity, as will be explained in greater detail below. A particular entity dataset 142 may be associated with a particular user or account, such that the entity profiles in that entity dataset 142 belong to the user or account.

Examples of different categories entities include a 'company' entity, which may be a public or private corporation, partnership, and so on; an 'individual' entity, meaning a person; a 'fund' entity, such as an investment fund; an 'asset' entity, meaning tangible and nontangible assets such as financial assets, real property assets, intellectual property assets, and so on; and a 'deal' entity. Each entity can be associated with a particular set of properties, which can correspond to a particular template for describing the entity. These categories may correspond to an entity type. Different entity types may have different sets of properties.

For example, properties of a 'company' entity can include company name, industry (e.g., industry or sector in which the company operates, such as technology, agribusiness, pharma, etc.), market share those industries/sectors location, type of ownership (e.g., family-owned, private equity, or venture-capital-backed, etc.), investors (individuals or entities that own a stake in the company), team (e.g., names of corporate officers, founders, board of directors, etc.), financial data (e.g., quarterly data for revenue, profits, losses, debts, assets, valuation, etc.), employee count, growth stage, profit distribution policy, funding source (e.g., bank loans, private investment, venture capital, etc.), associated deals, intellectual property, products, market share for those products, risk level, ranking or score, and other types of information that will be apparent from the present disclosure or appreciated by those of skill in the art. The properties of a company entity can correspond to fields in an entity profile for a company (e.g., a 'company' entity type). In some examples, system 100 includes a particular structured template for the properties of an entity having an entity type of 'company.' It will be appreciated that the type 'company' may also have subtypes (e.g., private company, partnership, etc.). In some examples, there may be a particular structured template for such a subtype, which may include additional fields.

Properties of an 'individual' entity can include name, age, affiliated entities (e.g., companies, funds, ventures with which the individual is affiliated or has been affiliated in the past), type of affiliation (e.g., employee, founder, investor), positions held (e.g., positions held in the affiliated entities, such as president, board member, etc., either currently or in the past), endorsements (e.g., as a celebrity), deals, ranking or score, and other types of information that will be apparent from the present disclosure or appreciated by those of skill in the art. The properties of an 'individual' entity can correspond to fields in an entity profile for an individual (e.g., an 'individual' entity type). In some examples, system 100 includes a particular structured template for the properties of an entity having an entity type of 'individual.' It will be appreciated that the type 'individual' may also have subtypes (e.g., founder, investors, CEO, etc.). In some examples, there may be a particular structured template for such a subtype, which may include additional fields.

Properties of a 'fund' entity can include the name of the fund, the type of fund (e.g., mutual fund, hedge fund, private equity, or venture capital), inception date, fund manager (e.g., the name of the primary manager or management team for the fund, fund size (e.g., the total value or assets under management), currency (the primary currency in which the fund is managed), risk level (e.g., the assessed level of risk, such as low, medium, or high), investment strategy (e.g., description of the investment strategy, such as growth, income, balanced, or sector-specific), minimum investment, management fee, the benchmark index, annual return, dividend policy, liquidity, geographic focus, sector focus, environmental or social governance policies, ranking or score, and other types of information that will be apparent from the present disclosure or appreciated by those of skill in the art. The properties of a fund entity can correspond to fields in an entity profile for a fund (e.g., a 'fund' entity type). In some examples, system 100 includes a particular structured template for the properties of an entity having an entity type of 'fund.' It will be appreciated that the type 'fund' may also have subtypes. In some examples, there may be a particular structured template for such a subtype, which may include additional fields.

Properties of an 'asset' entity can include the value of the asset, the type of asset (e.g., stock, real property, intellectual property, etc.), the location of the assets (e.g., a real property or tangible asset), ownership (e.g., the entity or entities that control the asset), risk, and other types of information that will be apparent from the present disclosure or appreciated by those of skill in the art. The properties of an 'asset' entity can correspond to fields in an entity profile for an asset (e.g., an 'asset' entity type). In some examples, system 100 includes a particular structured template for the properties of an entity having an entity type of 'asset.' It will be appreciated that the type 'asset may also have subtypes. In some examples, there may be a particular structured template for such a subtype, which may include additional fields.

A 'deal' entity embodies a transactional relationship between two or more entities, such as an investment in or purchase of an asset, an agreement between entities, an investment in one entity by another entity, and so on. . . . For example, it can involve the agreement between parties (e.g., an investor/family office and another business, fund, or individual) to allocate capital into a venture or asset in exchange for potential financial returns. A deal can outline the terms and conditions under which the investment is made, including the structure, expected returns, risks, timeline, and legal agreements. Deals can take the form of equity deals, debt deals, real estate deals, and co-investment deals. Categories of deals could include direct investments (e.g., private equity investments in private companies; venture capital in early-stage startups; real estate; infrastructure); public market investments; alternative investments (e.g., hedge funds; public debut, commodities; art & collectables); real assets (e.g., agriculture, energy); funds (e.g., private equity funds; venture capital funds; hedge funds); structured products (e.g., convertible debt; derivatives); digital assets (e.g., digital tokens, coins, etc.) and real estate investment trusts (REITs). Properties of a 'deal' entity can include deal type, category, risk, potential returns, alignment with the investor's financial goals, investment horizon, and so on.

In some examples, entity database 114 includes one or more bulk datasets 144. Bulk datasets 144 may include a larger amount of data than the entity datasets and can be used to source data for the entity profiles in the entity dataset 142. Bulk datasets 144 can take a variety of forms. For example, some bulk datasets 144 may include data in the form of extensible markup language (XML) data, JavaScript object notation (JSON) data, comma separated value (CSV) data, and so on, while other bulk datasets 144 may include relational database data structures or other sophisticated structures. Bulk datasets 144 can be free or open-source datasets or commercial datasets that are purchased or accessed for a fee. In some examples, bulk datasets 144 are loaded into the entity database 114 by a system administrator. In some cases, loading the bulk dataset 144 may include performing an extract, transform, and load operation by the system 100.

Storage utilized by the entity database 114 may be local-attached storage drives (e.g., hard disks or solid-state drives), network storage (e.g., storage connected to system 100 via network interface such as storage area network (SAN)), and/or cloud-based storage that is proved by a cloud platform. The information in each database is retrievable by a query implemented in a query language (e.g., Structured Query Language SQL) through a database application programming interface (API). Examples of the entity database 114 can include relational databases, object-oriented databases, hierarchical databases, federated databases, time-series databases, and so on. In a particular example, the entity database is a Postgres database, although other database platforms can be used.

The integrated entity analysis system 100 of FIG. 1 also includes a machine learning model. The machine learning model 180 is an artificial intelligence model configured to analyze entity profile, time series data, unstructured data, and so on, and generate ratings or insights based on those data. In various implementations, the machine learning model 180 can be a convolutional neural network, a recurrent neural network, or a transformer model. In various examples, the machine learning model 180 can be a large language model (LLM) or a domain-specific language model. In some implementations, the machine learning model 180 may be trained on entity datasets that are similar to or the same as the entity datasets in entity database 114.

The integrated entity analysis system 100 of FIG. 1 also includes a data processing controller 101 that maintains information in the entity database 114 and generates ratings and insights as to various entities in the entity database 114. The data processing controller 101 of FIG. 1 includes a data management controller 110 that, assisted by the machine learning model 180, aggregates structured and unstructured data related to an entity, transforms raw data to an entity profile based on a structured template, monitors data sources for updates to the profile, and generates new datasets and reports based on the entity profile. The data management controller 110 relies on various sources for structured and unstructured data, including social media platforms, deal documents, public and private external databases, public records, web sites, and other relevant sources, as will be explained in more detail below.

The data processing controller 101 of FIG. 1 also includes a user interaction controller 120 configured to extract information related to an entity from one or more unstructured documents received from a user. The user interaction controller 120 is configured to create or modify an entity profile based on the extracted information. In some implementations, the user interaction controller 120 is configured to receive information from investors via emails and attachments, parse received emails and attachments to extract key information, map extracted information to structured templates containing entity fields (e.g., valuation history, founder profiles, investor records, legal issues, financial data, intellectual property information, etc.), create and update profiles of entities (e.g., companies, investors, founders, or products) based on the structured templates, receive natural language queries via email or web-based mechanisms to retrieve and correlate information across multiple profiles, and enable teams of investors to share profiles and updates within a trusted group while maintaining data privacy across different groups, as will be explained in more detail below.

The data processing controller 101 of FIG. 1 also includes an AI-driven data analysis controller 130 configured to interact with machine learning models to generate assessments of entities based on their profile and other profiles in the entity database. In some implementations, the AI-driven data analysis controller 130 is configured to interact with the machine learning model 180 to generate one or more ratings for the entity in relation to one or more attributes based on an AI-driven analysis of the plurality of entity profiles in the entity database. For example, the AI-driven data analysis controller 130 can generate a comparative valuation analysis, a risk assessment, a score in relation to a particular attribute of an entity, and so on. The AI-driven data analysis controller 130 will be described in more detail below.

The data processing controller 101 of FIG. 1 also includes an AI interface controller 140 configured to interact with the machine learning model in response to calls from other components of the integrated entity analysis system 100. In some implementations, the AI interface controller 140 is configured to receive data from the data management controller 110, the user interaction controller 120, and the AI-driven data analysis controller 130, prompt the machine learning model based on that data, and interpret responses received from the machine learning model 180 for use by the requesting component. In some implementations, the AI interface controller 140 is configured to augment the machine learning model 180. For example, the AI interface controller 140 can configure the machine learning model for retrieval augmented generation. In some implementations, the AI interface controller 140 is configured to tune the machine learning model 180 to adjust activation weights, such as by tuning the machine learning model 180 based on historical user behavior or user preferences. The AI interface controller 140 will be described in more detail below.

The data management controller 110, user interaction controller 120, and AI-driven data analysis controller 130 interact with the machine learning model 180 through the AI interface controller 140, to provide integrated AI-driven entity research, analysis, and insights. For example, the user interaction controller 120 may receive new information about an entity or attribute and trigger the data management controller 110 to aggregate additional information about the entity or attribute. Similarly, the user interaction controller 120 may trigger the AI-driven data analysis controller 130 to generate new ratings or insights about the entity. Upon updating the entity database 114, the data management controller 110 may trigger the AI-driven data analysis controller 130 to update ratings or assessments based on newly acquired information, and so on.

Figure 2:
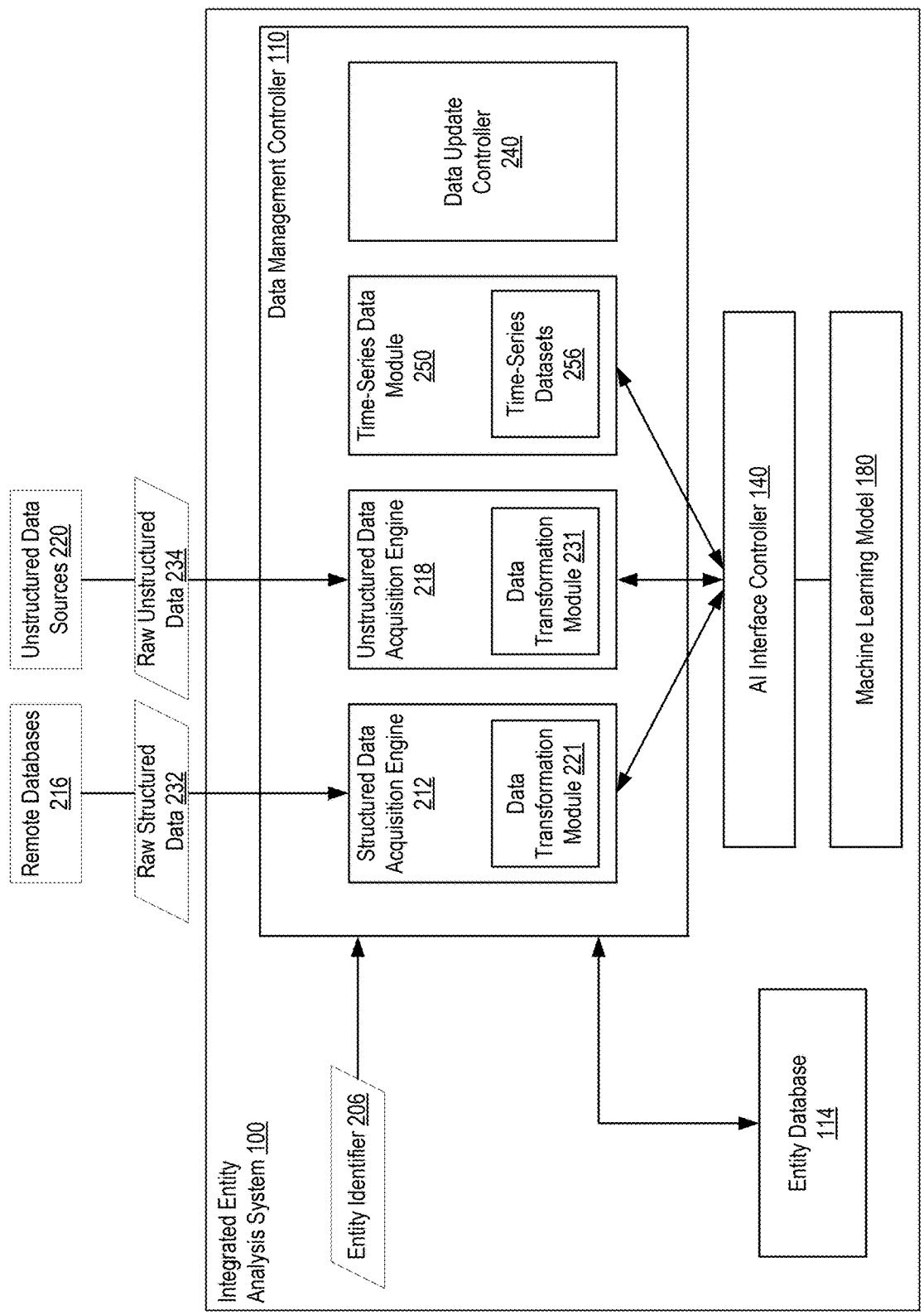
FIG. 2 sets forth a block diagram of an example data management controller for integrated entity analysis using an AI model in accordance with at least one embodiment of the present disclosure.

For further explanation, FIG. 2 sets forth an example implementation of a data management controller 110 for integrated entity analysis using an AI model in accordance with at least one embodiment of the present disclosure. The data management controller 110 is configured to receive entity identifier 206 that identifies an entity, such as an entity name or other identifier. In some cases, the entity database 114 may already include data related to the entity. For example, there may be an entity profile in the entity datasets 142, or there may be data related to the entity in the bulk datasets 144. In other cases, the entity database 114 may include no information for the entity. In both cases, receiving the entity identifier 206 triggers an acquisition of structured and unstructured data to either update an existing database record for the entity or generate a new database record for the entity. Thus, as the data processing controller 101 ingests a new entity identifier 206 through document submission or queries, the catalog of entity information in the entity databases 114 grows. In some examples, the data management controller 110 is also configured to receive an entity attribute, acquire structured and unstructured data relating to the entity attribute, and update one or more entity profiles based on the entity attribute.

The data management controller 110 includes a structured data acquisition engine 212. In some examples, in response to receiving the entity identifier, the structured data acquisition engine 212 retrieves structured data 232 related to the entity from the entity database 114. In some examples, structured data acquisition engine 212 retrieves structured data by generating one or more queries to the database API of the entity database 114. For example, the structured data acquisition engine 212 executes a query on the entity database 114 to retrieve records related to the entity. The results of the query are provided as raw structured data 232. For example, a query for a company may return data for the company, but also data of other entities that are related to the entity, such as data related to the president of the company.

A query for an individual may return data for the individual but also data related to companies with which the individual is associated. The structured data acquisition engine 212 can also use the results of one query to generate additional queries. For example, if a query result for an entity name returns a list of other entity names associated with the first entity, the structured data acquisition engine 212 can then generate additional queries based on the other entity names, thus aggregating data for various related entities. The structured data acquisition engine 212 executes queries against the bulk datasets 144 as well as the entity datasets 142.

In some examples, structured data acquisition engine 212 retrieves structured data by accessing one or more remote databases 216 of structured data. These remote databases 216 can be, for example, government databases, pay-for-access databases that include entity information, open-source databases, and so on. The remote databases 216 can provide an API (e.g., a web-based API) for direct querying of the database. In such examples, the structured data acquisition engine 212 can generate queries based on the entity identifier 206 in the same manner as discussed above. However, in these examples, the queries are submitted through the API of the remote database 216. The results of the queries of the remote databases are also provided as raw structured data 232.

In some implementations, structured data acquisition engine 212 generates queries for retrieving structured data using the machine learning model 180 through an AI interface controller 140. In some examples, the AI interface controller 140 generates prompts to the machine learning model based on information related to the entity. For example, the AI interface controller 140 may autogenerate a prompt based on the entity name, the entity type, the entity's sector or industry, or based on other properties of the entity as discussed above. In response to such a prompt, the machine learning model 180 generates structured database search queries that are optimized for retrieving data describing the entity. For example, if the entity is classified as a corporation, the machine learning model 180 may formulate one or more database queries specific to a corporation. In some implementations, the AI interface controller 140 generates a prompt to the machine learning model to identify particular data sources relevant to an entity. For example, for a particular entity, the machine learning model may return a list of databases that might include relevant information. The AI interface controller 140 is configured to parse the results returned by the machine learning model 180 to generate a query based on the results to a database API.

While the raw structured data 232 originates from structured data sources, that structure may be different from the structure used by the integrated entity analysis system 100. Typically, the queries will return more data for an entity than is used to generate an entity profile. Thus, in some examples, a data transformation module 221 transforms the raw structured data 232 aggregated by the structured data acquisition engine 212 to a structure used by an entity profile record according to a structured template. For example, the data transformation module 221 may filter and/or parse the raw structured data 232 to distill the information. The filtered and parsed raw structured data 232 can be used to populate fields for an entity profile based on the structured template. In some examples, different types of entities may have different profile templates. As such, the data transformation module 221 may select a structured template based on the entity type. The fields of a structure template may vary across the different entity types. Thus, the structured data acquisition engine 212 fits the raw structured data 232 to a particular template used for entity profile information and updates an entity profile record for the entity in the entity database 114.

As mentioned above, in some examples, entities are associated with particular types, such as corporation, partnership, person, fund, etc. Each of these types may be associated with a property structure that defines a set of properties that are commonly associated with an entity type. For example, 'geographic location' may be a property of an entity having a corporation entity type. As such, upon identifying an entity type, structured data acquisition engine 212 can generate queries based on these known properties. In some examples, the structured data acquisition engine 212 may simply query the database 114 to return all non-null property fields associated with a particular entity.

The data management controller 110 also includes an unstructured data acquisition engine 218. In some examples, the unstructured data acquisition engine 218 retrieves unstructured data 234 from remote unstructured data sources 220 (e.g., Internet data sources). Examples of unstructured data sources include web sites, data feeds, news feeds, social media platforms, deal documents, trend documents, review platforms, and the like. In some examples, the unstructured data acquisition engine 218 generates natural language queries to identify relevant unstructured sources. This can include, for example, using general purpose internet search engines, domain-specific or platform integrated search modules, and other techniques. In some examples, the unstructured data acquisition engine 218 identifies particular unstructured data sources 220 as relevant data sources based on a classification of the entity.

In some examples, web scraping is used to identify relevant unstructured information. Web scraping is the process of extracting data from websites by using software or scripts to automatically gather information from web pages. In some examples, web scraping involves sending a request to a website to retrieve the HTML content. The scraper then analyzes the structure of the HTML to locate the specific data needed, such as text, images, or tables. Once the relevant information is identified, it is extracted and saved in a structured format, like a CSV file, JSON, or a database table. As such, in some implementations, the unstructured data acquisition engine 218 deploys one or more web scrapers based on the entity identifier 206.

In some implementations, the unstructured data acquisition engine 218 utilizes a natural language processor to parse unstructured data. In these implementations, the natural language processor can remove stop words, stem the text, tokenize the text, and extract information from the tokenized text. In some examples, the natural language processor classifies portions of text as corresponding to, for example, a particular entity, a particular deal, a particular trend, and so on. The unstructured data acquisition engine 218 can then map the extracted data into a structured format. In some examples, the unstructured data acquisition engine 218 and/or the natural language processor utilizes sentiment analysis intelligence to classify the mention of the entity, deal, trend, etc. as a positive or negative mention. Sentiment classification can be used, particularly as time series data, to determine whether a particular entity, deal, or commercial relationship is considered to be favorable or unfavorable. Such sentiment information can be added as properties to an entity profile. In some implementations, the unstructured data acquisition engine 218 uses the machine learning model 180 for natural language processing and/or sentiment analysis. For example, the unstructured data acquisition engine 218 may use the AI interface controller 140 to autogenerate prompts to the machine learning model 180 to extract relevant information and/or sentiments from portions of the raw unstructured data 234.

In some implementations, unstructured data acquisition engine 218 generates queries for retrieving unstructured data using the machine learning model 180 through the AI interface controller 140. In some examples, the AI interface controller 140 generates prompts to the machine learning model based on information related to the entity. For example, the AI interface controller 140 may autogenerate a prompt based on the entity name, the entity type, the entity's sector or industry, or based on other properties of the entity as discussed above. In response to such a prompt, the machine learning model 180 generates natural language search strings that are optimized for retrieving data describing the entity. In some implementations, the AI interface controller 140 generates a prompt to the machine learning model 180 to identify particular data sources relevant to an entity. In some examples, for a particular entity, the machine learning model 180 may return a list of web sites, social media platforms, or other sources of unstructured data that might include relevant information. For example, if the entity is a company, financial news web sites may be identified as relevant data sources for sourcing financial information about the company; whereas, if the entity is a person, a professional profile social media platform may be identified as a relevant data source for sourcing career experience for the person. The AI interface controller 140 is configured to parse the results returned by the machine learning model 180 to identify natural language search strings that can be applied to the various APIs of unstructured data sources. In turn, the unstructured data acquisition engine 218 identifies search APIs of various data sources and uses the AI-augmented search strings and search APIs to retrieve unstructured data for the entity.

Once potentially relevant raw unstructured data 234 is obtained, the source data can be parsed, and relevant information can be extracted for conversion to a structured format. Thus, in some examples, a data transformation module 231 transforms the raw unstructured data 234 aggregated by the unstructured data acquisition engine 218 to a structure used by an entity profile record according to a structured template. For example, the data transformation module 221 may filter and/or parse the raw unstructured data 234 to distill the information. The filtered and parsed raw unstructured data 234 can be used to populate fields for an entity profile based on the structured template. In some examples, different types of entities may have different profile templates. As such, the data transformation module 231 may select a structured template based on the entity type. The fields of a structure template may vary across the different entity types. Thus, the unstructured data acquisition engine 218 fits the raw unstructured data 234 to a particular template used for entity profile information and creates or updates an entity profile record for the entity in the entity database 114.

As discussed above, the entity classification is utilized in various ways by the structured data acquisition engine 212 and the unstructured data acquisition engine 218. In some cases, the entity classification may be determined from a field in the entity databases 114 or remote databases 216, if there is already a record for that entity. However, in many cases, the entity classification will be determined dynamically. To that end, in some examples, structured data acquisition engine 212 utilizes, through the AI interface controller 140, the machine learning model 180 classify the entity. In some implementations, the AI interface controller 140 uses properties of the entity to generate a prompt to the machine learning model 180 to classify the entity. For example, the AI interface controller 140 may prompt the machine learning model 180 to classify the entity based on the entity profile. The machine learning model 180 can then generate a classification of the entity as corresponding to a particular type, potentially a subtype. For example, the machine learning model 180 may classify that an entity is a company and, from corporate records, financial disclosures, and/or press releases, etc., also classify the entity as a subtype such as a startup stage, growth stage, or maturity stage company.

The data management controller 110 also includes a data update controller 240. The data update controller 240 is configured to trigger the structured data acquisition engine 212 and unstructured data acquisition engine 218 to update information of the entity profiles in the entity profile dataset 142. In some examples, the data update controller 240 causes entity profiles in the entity profile dataset 142 to be updated periodically, e.g., according to an update schedule. In some examples, the data update controller 240 causes a particular entity profile to be updated in response to a trigger, such as a query directed to the entity from the user interaction controller 120 or new entity data received through the user interaction controller 120, as explained in more detail below. For some types of data, new data will be appended rather than being overwritten. For example, 4Q revenue data will not overwrite 3Q revenue data; rather, a new entry is added to the entity profile to reflect the 4Q revenue data. As such, the entity profile in the entity databases 114 accumulates time series information. Time series financial information can be used to develop valuations for entities, such as companies, based on financial data, market data, and other data aggregated by the data management controller 110 and stored in entity profiles of the entity databases 114.

In the example of FIG. 2, the data management controller 110 also includes a time series data module 250 that extracts time-series valuation information for the entity and comparable entities from secondary exchanges and unstructured data sources. For example, the time series valuation information includes numerical data and valuation trends. In some examples, the time series data module 250 generates time series datasets 256 by extracting time series information from the entity profiles in the entity databases 114. Time series information can be extracted for various characteristics, such as revenues, losses, profitability and margins, cash flow and capital injections, market share growth, funding valuations, research and development milestones, intellectual property expansion, product performance, and so on based on information in the entity profile data set 142 and other datasets in relation to the entity.

In some examples, the time series data module 250 generates time series valuation datasets. To assess company valuation, there are several factors that reflect financial growth, operational efficiency, and market confidence. One factor is steady revenue growth, showing that the business is expanding its customer base and increasing sales. Profitability, or at least improving profit margins, also points to rising valuation, as it signals the company is becoming more efficient and sustainable. Strong cash flow, especially from core operations, further strengthens this, indicating the business can fund its own growth without constantly relying on outside capital. A growing customer base and high customer retention rates are also positive signs, as they suggest the company is meeting market demand and building a loyal following. Companies that innovate, whether through new products or services, tend to see a boost in value, as innovation opens up new revenue streams and competitive advantages. When a company raises capital at higher valuations in funding rounds, it is a clear indicator that investors see the business as increasingly valuable.

Other important factors include market share growth, which shows that the company is outperforming competitors, and successful expansions into new markets or industries, which can drive significant future growth. Acquisitions, mergers, and strategic partnerships are often linked to rising valuation, as they demonstrate the company's increasing influence and attractiveness to other businesses. Additionally, companies that build strong intellectual property (IP) portfolios, attract and retain top talent, and receive positive media attention are typically viewed as more valuable. These factors, combined with operational improvements like cost reductions or efficiency gains, help boost profitability and overall market perception. In rapidly growing industries, companies often benefit from sector-wide momentum, further raising their valuation.

In some examples, the time series data module 250 extracts data for time series valuation datasets based on one or more of the above valuation factors from the data in the entity database 114. In some implementations, the time series data module 250 also extracts time series datasets reflecting market trends. For example, unstructured data describing market trends in the entity's sector can be interpolated into time series data for the entity.

In some examples, entity profiles include a valuation property indicating an estimated valuation and/or a projected valuation over time. In some examples, entity profiles include composite scoring based on particular attributes of the entity. Values for these fields of the entity profile may be generated by the data management module. However, processing multivariable models for evaluating entity attributes (e.g., scoring) and making predictions using those models (e.g., forecasting valuations) is computationally intensive using algorithmic techniques. This requires significant computational resources that can impair the performance of a system, cause excess heat generation, consume power, and generally reduce the efficiency of the system. To address this, the AI-driven data analysis controller 130 is configured to extrapolate data from the entity database 114 and generate predictive analysis and composite scoring for an entity, including tuning and optimizing the machine learning model 180 to enhance such predictive analyses and scoring by, for example, using the AI interface controller 140 to fine tune the machine learning model 180 and orchestrate retrieval-augmented generation on the machine learning model 180 using the entity database 114 and other available data sources.

Figure 3:
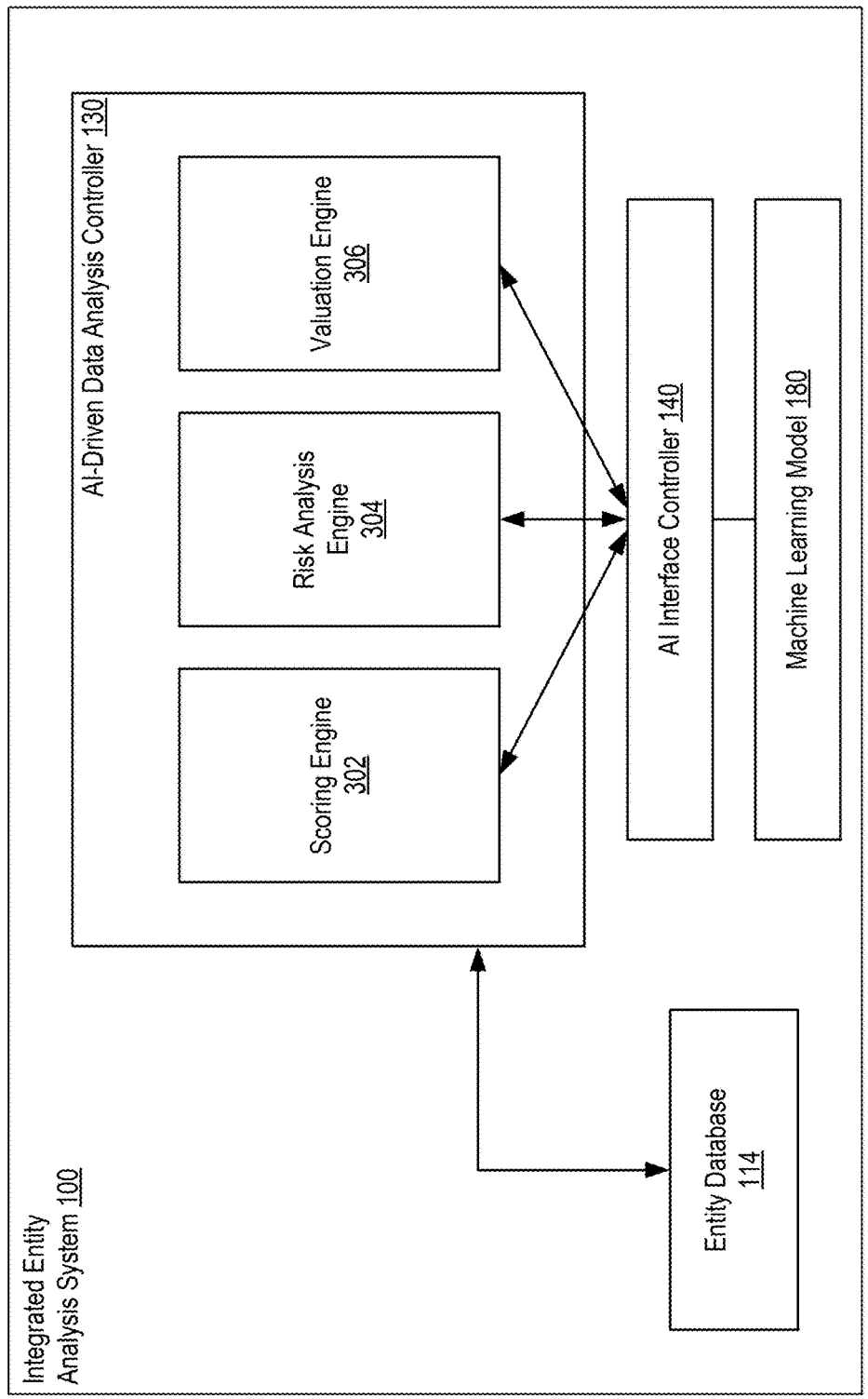
FIG. 3 sets forth a block diagram of an example AI-driven data analysis controller for integrated entity analysis using an AI model in accordance with at least one embodiment of the present disclosure.

For further explanation, FIG. 3 sets forth a block diagram of an example AI-driven data analysis controller 130 in accordance with at least one embodiment of the present disclosure. The example AI-driven data analysis controller 130 of FIG. 3 includes a valuation engine 306. In some implementations, the valuation engine 306 generates a valuation projection for an entity based on the time series datasets 256. In some examples, the valuation projection is made using one or more mathematical models and the time series valuation datasets. The valuation engine 306 can store the valuation projections in the entity database 114, e.g., by updating an entity profile with a valuation. In some examples, a valuation projection is based on other entities in the entity database 114. For example, where a startup company and a growth stage company have similar valuation trajectories and similar entity characteristics (e.g., similar technology areas, similar products, similar founders, etc.), the valuation trajectory of the growth stage company can be used to make a valuation projection for the startup company. In some examples, to make a valuation projection about an entity, the entity profile is compared to other entity profiles to identify a set of similar entities. For each entity in the set of similar entities, a time series valuation is extrapolated using one or more of the above-mentioned factors. The time series valuation of the entity is then compared to the time series valuation of other entities in the set of similar entities. The valuation engine 306 can then use this comparative data to make a projection on the valuation of the entity. For example, if entity A is similar to entity B, entity A may be predicted to experience a similar valuation expansion that was experienced by entity B at an earlier stage. Conversely, if entity B is in bankruptcy, entity A may be predicted to face a higher likelihood of bankruptcy.

In some examples, the valuation engine 306 utilizes the machine learning model 180 through the AI interface controller 140 to generate a valuation characterization for an entity. In some implementations, the AI interface controller 140 configures the machine learning model 180 to perform retrieval-augmented generation to optimize the output of the machine learning model 180. For example, the entity profile dataset 142 and time series datasets 256 may be the subject of the retrieval-augmented generation that is used to optimize the machine learning model 180. In some examples, the AI interface controller 140 formulates a prompt to the retrieval-augmented machine learning model to generate a valuation assessment (e.g., a valuation score) an entity in consideration of the profiles of other entities, their time series performance, and their valuations. In some examples, the AI interface controller 140 formulates a prompt to the retrieval-augmented machine learning model to generate a natural language description of the valuation data include any valuation history. This description can include AI-powered insights based on the valuation trend for the entity and other similar entities represented in the entity profile dataset 142.

In some examples, the valuation engine 306 uses the AI interface controller 140 to define an attribute for assigning or predicting a valuation. In these examples, the AI interface controller 140 generates and submits a prompt to the machine learning model 180 to assign or predict a valuation based on this feature or based on a particular dataset. For example, the valuation can be generated or predicted for a particular company based on that company's intellectual property assets, or based on a set of entity profiles that are related to the entity by a particular entity characteristic. In another example, the feature of the entity may be the entity classification. For example, useful projections for a startup company may be different from useful projections for a growth stage company.

The example AI-driven data analysis controller 130 of FIG. 3 also includes scoring engine 302 that is configured to generate a composite score for one or more entity attributes. Each attribute can be based on a selection of properties of an entity from the entity profiles, which are used to define the attribute. In some examples, the properties that are used to define that attribute may be static, such as a fixed set of properties that correspond to a particular entity type. In other examples, the properties that are used to define that attribute are dynamically generated, e.g., based on user input or machine learning model output. In the case of the former, as one particular example the attributes of a 'company' entity type can include team, finances, investors, product, and marketing. In turn, each of these attributes are based on a particular set of entity properties. For example, the finances attribute can be based on revenue, liquidity, debt, profit, funding, etc. As another example, the team attribute can be based on founders, corporate officers, board of directors, etc. As yet another example, a product attribute can be based on revenue, market share, etc. of a company's product. A marketing attribute can be based on particular marketing properties such as a measure of brand awareness, return on investment, customer acquisition cost, etc. An investor attribute can be based on the set of investors in an entity. To generate a score for the attribute, the corresponding properties of one entity are assessed across corresponding properties of other entities in the entity dataset 142. In evaluating the attribute, these various properties can be weighted differently in accordance with a composite analysis. The AI-driven data analysis controller 130 then quantifies the attribute by generating a composite score for the attribute.

In some implementations, to generate a score for an attribute, the scoring engine 302 utilizes the AI interface controller 140 to configure the machine learning model 180 to generate a score by, for example, formulating one or more prompts to the machine learning model 180 to generate a score for an attribute by listing the composite properties or field of an entity profile that are to be used to generate the score. In some implementations, the scoring engine 302 optimizes the machine learning model 180 to generate scores and rankings by orchestrating retrieval-augmented generation in the machine learning model 180, thus enhancing the output of the machine learning model 180 for scoring the attribute. For example, the scoring engine 302 can generate commands to link content of a particular entity dataset 142 or other datasets to the machine learning model 180. Based on that entity dataset 142, the machine learning model 180 can correlate various properties associated with a particular attribute across the corpus of entity profiles in the dataset to return a score for that attribute. In some examples, the scoring engine 302 configures the machine learning model 180 to identify a relative ranking of one entity among the other entities based on that particular attribute by, for example, formulating one or more prompts to the machine learning model 180. From this ranking, a score can be derived for that attribute. In some examples, the AI-driven data analysis controller 130 generates a composite score based on scoring of individual attributes. In determining a composite score for an entity, different attributes can be weighted differently to generate the overall score.

In some examples, the scoring engine 302 utilizes the AI interface controller 140 to fine tune the machine learning model 180. In some implementations the scoring engine 302 tunes the machine learning model 180 based on user feedback or user data indicating that a particular property, field, characteristic, or attribute that is more important than others. This fine tuning based on particular properties or characteristics changes the activation weights in the neural networks of the machine learning model 180, thus optimizing the output of the machine learning model 180 for a particular data analysis. Although a particular set of attributes for an entity or entity type is described above, it will be appreciated that the scoring engine 302 can receive or generate a custom attribute for which to generate a composite score.

The example AI-driven data analysis controller 130 of FIG. 3 also includes a risk analysis engine 304 that is configured to generate a risk assessment for an entity, such as a risk associated with investing in a company or fund, accepting a deal, etc. In some examples, the risk assessment is derived from data included in the entity profile dataset 142, such as risk indicator data in the profile of the entity under analysis as well as comparative analysis of the entity to risk factor indicators of other entities in the entity profile database. Risk factor indicators can be derived from particular fields in an entity profile.

For example, one risk factor is financial health, which may be derived from entity data such as valuation, debt-to-equity ratio, cash flow, profit margins, revenue growth, return on investment, down rounds, bankruptcies, etc. as well as scoring related to a financial attribute. This risk factor indicates the entity's ability to manage debt, generate profits, manage investments, and sustain operations, as well as the risk of bankruptcy or dissolution. Another risk factor is market or industry conditions, which may be derived from entity data such as market size, competition level, industry growth rate, sector performance, etc. This risk factor indicates external market dynamics that could impact demand, pricing power, and the entity's position within the industry. Another risk factor is the management team, which may be based on entity data fields such as founders, corporate officers, managers, and other related entities, as well as scoring related to a team attribute of the entity under analysis. This risk factor indicates leadership and good governance in making sound business decisions and ensuring transparency. Yet another risk factor is reputation and/or brand image, which may be based on product or brand metrics, public perception or sentiment, past controversies or legal disputes. This risk factor the resiliency of the entity and the ability to tolerate setbacks.

In some implementations, to generate a risk assessment for an entity, the risk analysis engine 304 utilizes the AI interface controller 140 to configures the machine learning model 180 to perform a risk analysis by, for example, formulating one or more prompts to the machine learning model 180 to perform a risk analysis based on data in the entity profile. In some implementations, the risk analysis engine 304 optimizes the machine learning model 180 to generate a risk assessment by orchestrating retrieval-augmented generation in the machine learning model 180, thus enhancing the output of the machine learning model 180 for assessing a risk associated with the entity. For example, the risk analysis engine 304 can generate commands to link content of a particular entity dataset 142 or other datasets to the machine learning model 180. Based on that entity dataset 142, the machine learning model 180 can correlate various properties associated with risk, as described above, across the corpus of entity profiles in the dataset to return a risk assessment for the entity.

In some examples, the risk analysis engine 304 utilizes the AI interface controller 140 to fine tune the machine learning model 180. In some implementations the risk analysis engine 304 fine tunes the machine learning model 180 based on historical user behavior, such as whether the user has invested or not invested in a particular company or fund that was presented to the user, or accepted or rejected a particular deal that was presented to the user, as well as a sentiment related to that decision such as whether the user identified that decision as positive or negative, which can be derived from the user datasets 148 indicating historical user behavior. This fine tuning based on particular on actual user behavior changes the activation weights in the neural networks of the machine learning model 180, thus optimizing the output of the machine learning model 180 for a particular risk analysis.

Figure 4:
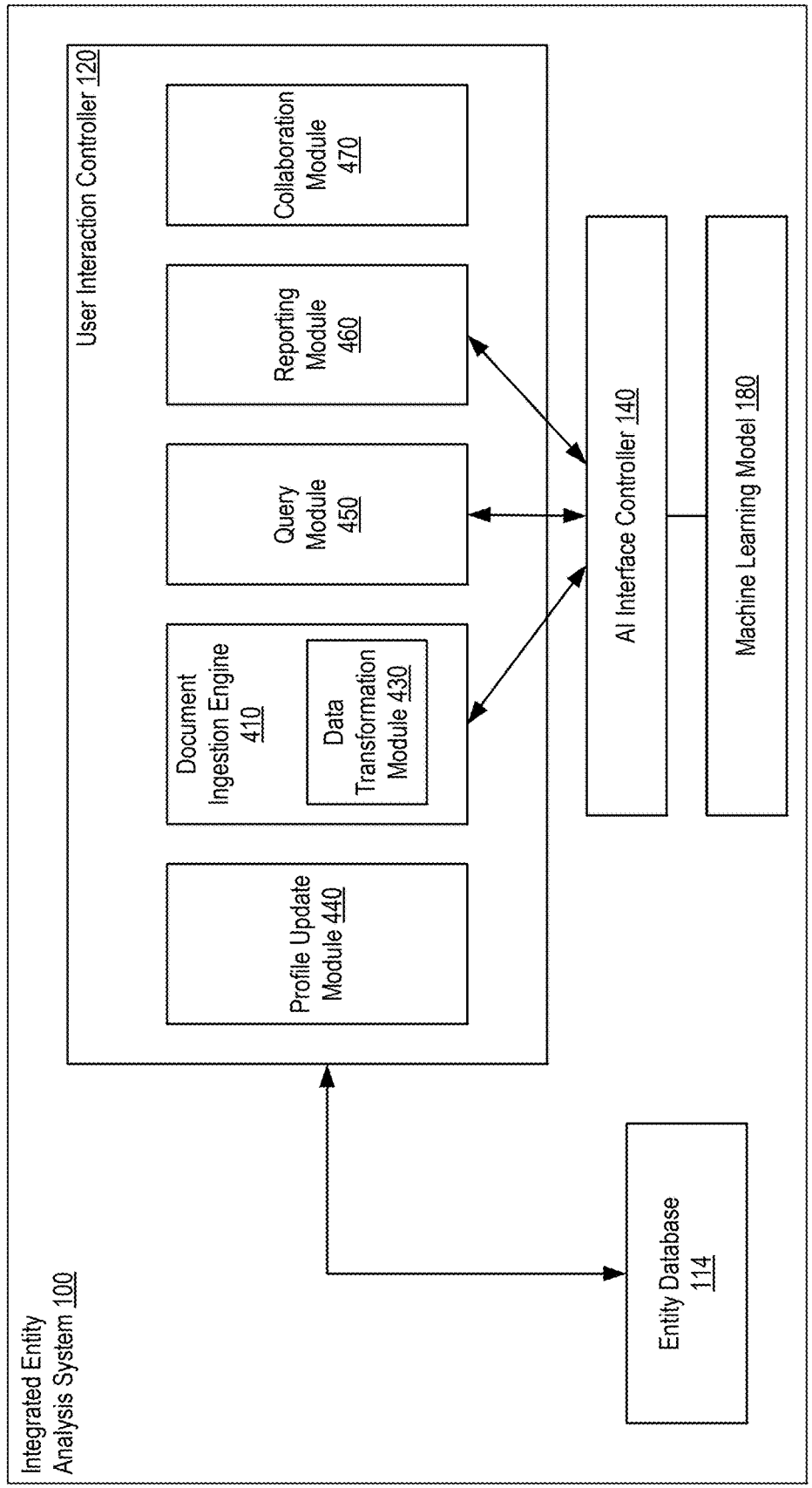
FIG. 4 sets forth a block diagram of an example user interaction controller for integrated entity analysis using an AI model in accordance with at least one embodiment of the present disclosure.

For further explanation, FIG. 4 sets forth a block diagram of an example implementation of the user interaction controller 120 of FIG. 1. In the example of FG. 4, the user interaction controller 120 includes document ingestion engine 410 configured to receive natural language or unstructured documents from a user. In some examples, the document ingestion engine 410 is a service adapted to receive an email from a user with a description of an entity, deal, and so forth. Additionally, or alternatively, the email can include one or more attached documents that include a description of an entity, a deal, and so forth. In such examples, the document ingestion interface extracts the attached documents from the email. In other examples, the document ingestion engine 410 provides a user interface or API that allows a user to upload documents to the integrated entity analysis system 100. In some examples, the document ingestion engine 410 also extracts a user identifier from the email, such as the sender of the email or a domain of the sender. The identifier can be used to link the user to a particular account, which can be associated with a particular entity dataset or historical user data. The received emails or document can be stored in the entity database 114 as entity data for further reference or use.

In some implementations, the document ingestion engine 410 is configured to extract information identifying or describing an entity from the email and/or documents. For example, the document ingestion engine can include a natural language processor that extracts information identifying or describing an entity. The extracted identifying information can include the name of a company, person, product, fund, asset, and so on. In some examples, the document ingestion engine 410 also extracts contextual information from the email and/or documents. For example, where the entity is a company, the email/documents can indicate an officer or founder of the company. The contextual information may also indicate other characteristics or conditions of the company, such as valuation data, investor records, legal issues, financial data, and intellectual property information. In some cases, the contextual information can indicate that the email/documents describe a funding round, a deal, an endorsement, and so on. In some examples, the document ingestion engine 410 is configured to extract information relating historical user behavior such as previous investments the user has made or previous deals the user has participated in, as well as investment opportunities and deals that the user has rejected. This data can be extracted from documents, such as email chains, executed agreements, and other historical information provided by the users to the document ingestion engine 410. This historical behavior user data can be stored in a user dataset 148 in the entity database 114.

In some implementations, the document ingestion engine 410 utilizes the AI interface controller 140 to configure the machine learning model 180 to extract properties of an entity by, for example, formulating one or more prompts to the machine learning model 180 extract information from the emails/documents. In some implementations, the document ingestion engine 410 utilizes the AI interface controller 140 to configure the machine learning model 180 to extract historical data by, for example, linking the machine learning model to the user-provided documents including documents that indicate historical user behavior.

The example of FIG. 4 also includes a data transformation module 430 that maps unstructured data extracted from the email/document to a structured template. For example, the data transformation module 430 identifies a structured template to use for an entity profile, and filters and parses the extracted information to identify information that can be used to populate fields for an entity profile based on the structured template. In some examples, a structured template includes a set of predefined fields for an entity. For example, there may be a specific structured template for each entity type. There may also be specific structured templates for entity subtypes. In such examples, the data transformation module 430 may use the entity classification or other extracted characteristics to identify an entity type and select the structured template corresponding to that type. The data transformation module utilizes the AI interface controller 140 to configure the machine learning model 180 to map extracted entity characteristics into appropriate fields of the structured template.

The example in FIG. 4 also includes a profile update module 440 configured to create or update an entity profile based on the data mapped into the structured template. In some examples, the profile update module 440 determines whether there is an existing record for the entity in the entity database 114. If there is already an existing profile for the entity, the profile is updated with data the extracted data based on the structured template, e.g., by loading data values mapped to fields of the structured template into corresponding fields of the database record and/or creating new fields in the entity profile (e.g., using a database query language) to hold data from the structured template. If a profile for the entity does not exist in the entity database 114, the profile update module 440 creates a profile (e.g., a record in a table) for the entity and loads data values mapped to the structured template into the profile. In some implementations, the structure of the entity profile may correspond to the structure of the structed template. In such an example, data mapped to one field is loaded into the corresponding field of the entity profile. The new or updated record is saved in the entity database 114. In some implementations, once the entity profile is created or updated, the user interaction controller 120 triggers the data management controller 110 to retrieve additional or updated data related to the entity. For example, the user interaction controller 120 may submit the entity name as an input to the data management controller 110 by, for example, a call to the API of the data management controller 110.

The example of FIG. 4 also includes a query module 450 configured to receive natural language queries, for example, through email or a web-based API. In some implementations, the query module 450 services a graphical user interface presented to the user by the user interaction controller 120. In some examples, the query module 450 utilizes a natural language processor to identify one or more entity names and, in some cases, one or more attributes, metrics, or other information to use when answering the query. The query module 450 responds to such queries based on information in the entity database 114. For example, in response to a query for an entity, the query module 450 may return the entity profile, valuation predictions for the entity, deals associated with the entity, products associated with the entity, and so on. In some implementations, the query module 450 correlates information across multiple profiles. For example, a query for a particular entity may return profile information for the entity and related entities (e.g., related by partnerships, deals, founder, personnel, etc.) or similar entities (e.g., similar by sector, size, growth stage, valuation, etc.).

In some implementations, once an entity or attribute is identified from the query, the user interaction controller 120 triggers the data management controller 110 to retrieve additional or updated data related to the entity or attribute. For example, the user interaction controller 120 may submit the entity name or the attribute as an input to the data management controller 110 by, for example, a call to the API of the data management controller 110. In some implementation, once an entity or attribute is identified from the query, the user interaction controller 120 triggers the AI-driven data analysis controller 130 to generate a new or updated rating for an entity, such as a new or updated score (e.g., an overall score for an entity or a score in relation to a particular attribute), valuation analysis, or risk assessment. This updated rating received from the AI-driven data analysis controller 130 may be returned as part of a query result to the user.

In some implementations, the query module 450 utilizes the AI interface controller 140 to configure the machine learning model 180 to return results for the query by, for example, formulating one or more prompts to the machine learning model 180. In some implementations, the query module 450 optimizes the machine learning model 180 to generate results for a query by orchestrating retrieval-augmented generation in the machine learning model 180, thus enhancing the output of the machine learning model 180 answering the query. For example, if a query asks to rate a valuation of the entity based on a list of other entities, the query module 450 may utilize the AI interface controller 140 to augment the machine learning model response based on a dataset that includes only entity profiles of entities on that list. In some examples, the query module 450 utilizes the AI interface controller 140 to configure the machine learning model 180 to generate natural language insights regarding the entity by, for example, engineering one or more prompts to the machine learning model 180.

The example of FIG. 4 also includes a reporting module 460 configured to generate reports based on entity profiles and AI-driven insights. In some implementations, the reporting modules extracts entity profile data from entity profiles, including ratings identified in those profiles. In these implementations, the reporting module 460 utilizes the AI interface controller 140 to configure the machine learning model 180 to generate a natural language description of the entity as well as natural language AI-driven insights based on data in the entity profiles, such as ratings including valuation analyses, risk assessments, and/or scores for that entity. In some examples, the reporting module 460 stores the natural language description of the entity and the AI-driven insights as a report document that can be stored in the entity database 114 or output to a user interface.

The example of FIG. 4 also includes a collaboration module 470 configured to enable different users to share entity profiles and information from their own entity databases within a trusted group while maintaining data privacy across different groups. In some implementations, the collaboration module 470 receives a request from the first user to share data with a second user. For example, the shared data may be an entity profile. In response, the collaboration module 470 creates a link in the second user's account to data (e.g., an entity profile or report) in the first user's account and the second user's account, so that data can be accessed by the second user.

To illustrate an example workflow, consider an example where the user interaction controller 120 receives an email from a user indicating a company for a potential investment. The email includes an annual report from the company. The user interaction controller 120 extracts the company name and financial information from the email and annual report and generates an entity profile for the company that is stored in the entity dataset 142 of the entity database. The user interaction controller 120 calls the data management controller 110 to aggregate data about the company by passing the entity name through an API. The data management controller 110 queries local structured data sources (e.g., bulk datasets 144) to acquire any information that may already be present in the entity database. The data management controller 110 also queries any remote structured data sources for information for structure data related to the entity. The data management controller 110 transforms the retrieved data into a structure that is used to update the entity profile. The data management controller 110 also retrieves unstructured data from unstructured data sources, for example, through natural language search strings using search engines and search APIs, as wells as through the use of web scraping. For example, the data management controller 110 may retrieve unstructured data from the company's web site, social media platforms, press releases, news articles, and so on. The data management controller 110 transforms the retrieved unstructured data into a structure that is used to update the entity profile. The data management controller 110 may use the machine learning model 180 to identify data sources and architect search queries and natural language search strings.

Once the data management controller 110 has aggregated the data, including the extracted information from the user and the structured and unstructured data retrieved from external sources, for the entity profile, the AI-driven data analysis controller 130 generates one or more ratings for the company based on the entity profile for the company and other entity profiles through AI-driven analysis of those profiles. For example, the ratings can include a valuation analysis, a risk assessment, and/or one or more scores for the company based on a particular attribute. The valuation analysis can include, for example, a comparative valuation analysis or benchmarking in the form of a natural language report, a score, a ranking, or other types of ratings. . . . The risk assessment can include, for example, a relative risk rating (e.g., low, medium, high) and/or a probability rating, such as the probability of bankruptcy or a down round. The score can be an overall quality score and/or a composite score for multiple attributes such as a score for the team behind the company, the company's product(s), the company's financial attributes, the company's marketing metrics, and/or the company's backing investors. The ratings can be updated each time new data is added to the entity profile. These ratings can be added to the entity profile for the company and used for future reporting or analysis. To configure the machine learning model 180 to provide the AI analysis, the machine learning model is augmented through various techniques including configuring the machine learning model for retrieval-augmented generation using the entity profiles in the entity dataset.

The user interaction controller 120 can prepare a report based on the results of the data aggregation by the data management controller 110 and the ratings generated by the AI-driven data analysis controller 130 and present the report or make it accessible to the user. The user interaction controller 120 can also receive a query about the company and prepare a report or provide a query result based on the data in the entity profile. The user interaction controller 120 can receive a query about multiple companies and provide AI-driven insights as to the correlations between them. The user interaction controller 120 can also receive a query about the company and a particular attribute, and trigger the AI-driven data analysis controller 130 to provide a score based on that particular attribute. To collaborate with other investors, the user can then share that entity profile and/or report with other users.

Figure 5:
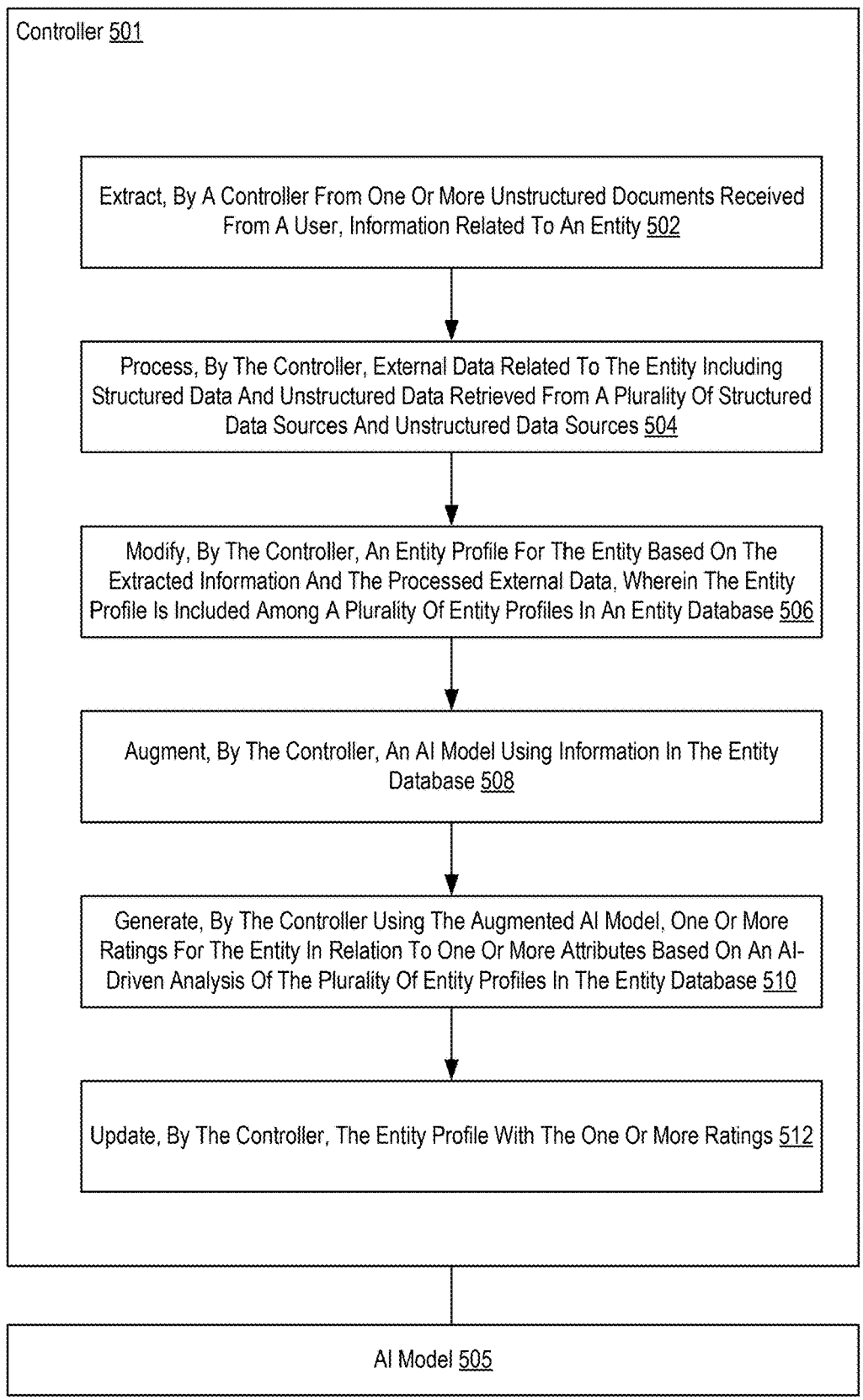
FIG. 5 sets forth a flowchart of an example method of integrated entity analysis using an AI model in accordance with the present disclosure.

For further explanation, FIG. 5 sets forth a flow chart of an example method for integrated entity analysis using an AI model in accordance with at least one embodiment of the present disclosure. The example method of FIG. 5 can be implemented in a data analysis system such as the integrated entity analysis system 100 described with reference to any of FIGS. 1-4. The example method of FIG. 5 includes extracting 502, by a controller 501 from one or more unstructured documents received from a user, information related to an entity. The controller 501 for the method of FIG. 5 can be realized by a variety of implementations; however, in a particular implementation the controller 501 is the data processing controller 101 of FIG. 1. The controller 501 is configured to communicate with and configure an AI model 505 (e.g., the machine learning model 180 described above). In some examples, the controller 501 extracts 502 information related to an entity from one or more unstructured documents received from a user by receiving an email from the user at a user interface (e.g., the user interaction controller 120 described above). The email may or may not include one or more attachments. Thus, to extract 502 information related to the entity, the controller 501 parses the email and, if present, any attachments to the email. For example, an attachment may be a prospectus, presentation, press release, report (e.g., annual or earnings report), another email, and so on. Parsing the email and any attachments can be carried out by a natural language processor. In some examples, the controller 501 configures the AI model 505 to extract the information from the email and any attachments. These documents can be stored in a database (e.g., entity database 114 described above) for further reference or use.

The extracted information can include identifying information such as the name of a company, person, product, fund, asset, and so on. In the case where the entity is a company, the controller 501 can extract characteristics of the company from the documents, such as founders, corporate officers, products, industry or sector, market share, valuations, funding data, and so on. In the case where the entity is a person, the controller 501 can extract from the documents information such as titles, positions, affiliated companies or other entities, endorsements, and so on. In the case of a fund, the controller 501 can extract from the documents information such as managers, investments, return on investments, and so on. In the case of a fund, the controller 501 can extract from the documents information such as parties to the deal, terms of the deal, assets traded, licensed, or rented by the deal, and so on. The controller 501 extracts the information using natural language parsing and contextual analysis. In some implementations, the controller 501 is configured to label the extracted information as properties of the entity based on contextual analysis (e.g., 'founder' for a person or 'pharmaceutical' for a company or 'venture capital' for a deal, etc.).

Using the extracted information, the controller 501 is configured to generate or update an entity profile. In some examples, the controller 501 transforms the extracted information into data that conforms to a structured template for an entity profile. This can include utilizing decision logic to determine a field of a template into which a particular item of extracted information fits. To make the data transformation, in some examples the controller 501 utilizes the machine learning model.

The method of FIG. 5 also includes processing 504, by the controller 501, external data related to the entity including structured data and unstructured data retrieved from a plurality of structured data sources and unstructured data sources. In some examples, the controller 501 retrieves structured and unstructured data as discussed above. For example, the controller 501 uses structured database queries, database APIs, natural language search strings, and other data retrieval mechanisms to aggregate data about the entity from databases and web-based content such as web sites, social media platforms, press releases, news articles, and so on. The controller 501 may employ web-scraping to retrieve the unstructured data. In some examples, the controller 501 processes 504 external data related to the entity by applying natural language processing as well as context and sentiment analysis, including parsing, classifying, and labeling elements of data, in order to synthesize properties of the entity. Using these properties, the controller 501 is configured to generate or update an entity profile. In some examples, the controller 501 transforms the synthesized properties into data that conforms to the structured template for an entity profile. This can include utilizing decision logic to fit the properties into appropriate fields of the structured template.

The method of FIG. 5 also includes modifying 506, by the controller 501, an entity profile for the entity based on the extracted information and the processed external data, wherein the entity profile is included among a plurality of entity profiles in an entity database. The controller 501 modifies 506 the entity profile by creating or updating the entity profile to include the structured data derived from the extracted information and the structured data derived from processed structured and unstructured data. The entity profile can be, for example, a table or a collection of tables in a relational database. Fields in the table(s) may correspond to data fields used to label data from the extracted information and the processed external data. The structure for the entity profile can be specific to a type or category of the entity.

The method of FIG. 5 also includes augmenting 508, by the controller 501, an AI model 505 using information in the entity database. In some examples, the controller 501 augments 508 the AI model 505 by configuring the AI model 505 for retrieval-augmented generation. For example, the controller 501 can configure the AI model 505 for retrieval-augmented generation by linking the AI model 505 to the dataset of entity profiles to provide a context for results generated by the AI model. In one example, entity profiles are converted to vector embeddings. An attribute definition is also converted to a vector embedding. For example, the controller 501 may generate an attribute definition of a financials attribute as based on revenue, profit, debt, etc. A similarity search can be performed to identify portions of entity profile data that are relevant to the attribute based on the vector embedded data and the vector embedded attribute definition. The relevant profile data is then supplied as a context to the AI model for rating the entity based on the attribute. In another example, a user query is converted to a vector embedding. A similarity search is performed to identify portions of entity profile data that are relevant to the query based on the vector embedded entity profile data and the vector embedded query. The relevant profile data is then supplied as a context to the AI model for responding to the query. In some examples, the controller 501 augments 508 the AI model with contextual priming. For example, the controller 501 can generate a prompt to assign the AI model 505 a specific role, persona, or expertise upon which it bases its responses.

The method of FIG. 5 also includes generating 510, by the controller 501 using the augmented AI model 505, one or more ratings for the entity in relation to one or more attributes based on an AI-driven analysis of the plurality of entity profiles in the entity database. In some examples, the controller 501 generates 510 the one or more ratings for the entity by constructing one or more prompts for the AI model 505. For example, for a particular attribute, the controller 501 may map the attribute to a predefined prompt for the attribute. In another example, the controller 501 may construct a prompt by compiling relevant properties of the entity, such as entity type, to provide a more tailored prompt to the AI model. The controller 501 submits the prompt to the AI model 505 via an API to provide a qualitative rating, score, ranking, or prediction for the entity based on the attribute. For example, the AI model 505 may predict a 25% chance of bankruptcy in 5 years, or a valuation of $10 million, or a score of '8' on financial health. The controller 501 utilizes the result of the AI model to determine a rating for the entity. For example, the controller 501 may provide a series of prompts and synthesize a rating based on an aggregate of the responses. The rating can be, for example, a comparative valuation analysis, a risk assessment, a score in relation to a particular attribute, or an overall quality score.

The method of FIG. 5 also includes updating 512, by the controller 501, the entity profile with the one or more ratings. In some examples, the controller 501 updates 512 the entity profile to include the rating in an entity profile field for that rating. For example, an entity profile may have a field corresponding to a comparative valuation rating, a risk assessment, a score in relation to a particular attribute, or an overall quality score.

Figure 6:
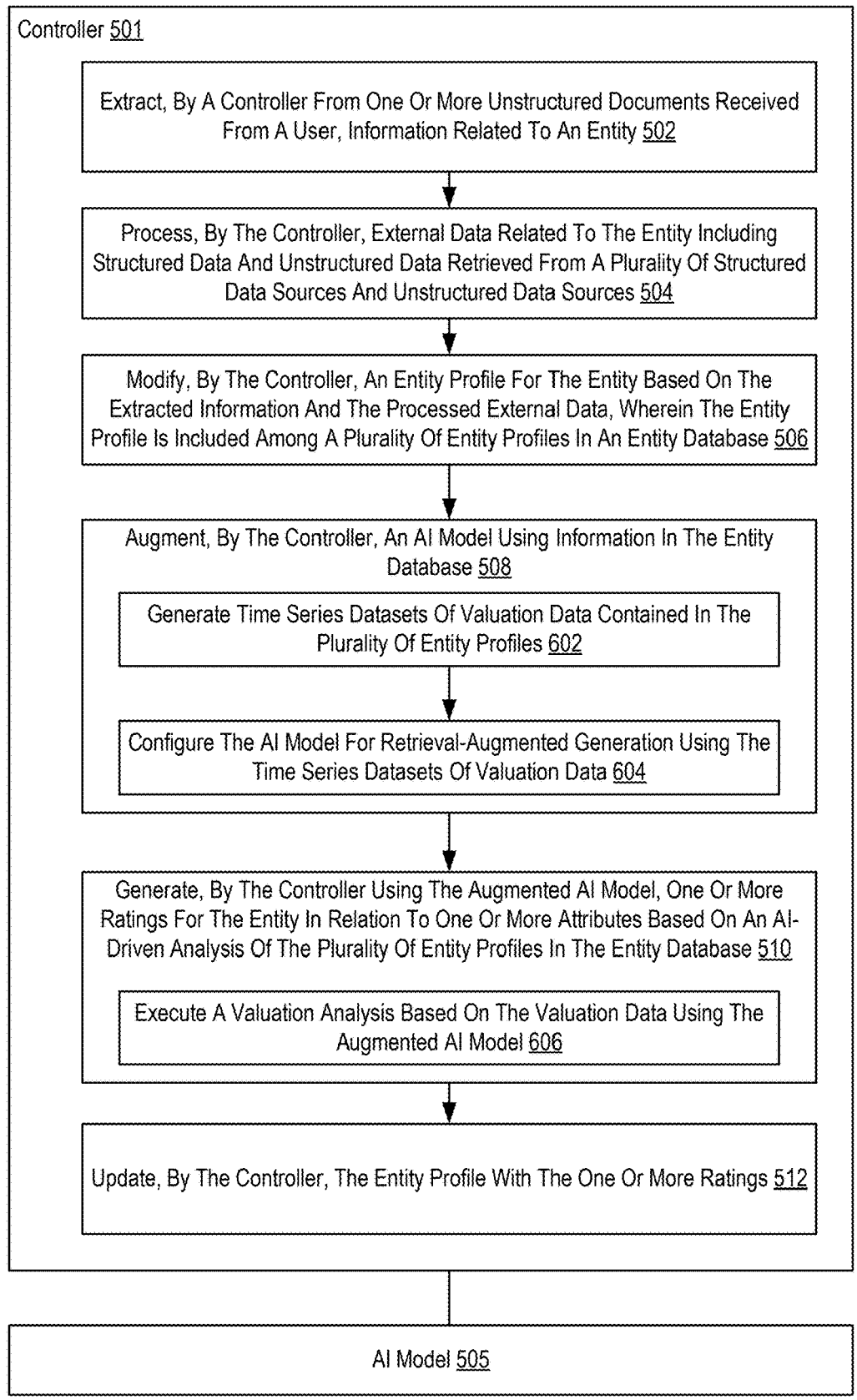
FIG. 6 sets forth a flowchart of another example method of integrated entity analysis using an AI model in accordance with the present disclosure.

For further explanation, FIG. 6 sets forth another example method of integrated entity analysis using an AI model in accordance with embodiment of the present disclosure. The method of FIG. 6 extends the method of FIG. 5 in that augmenting 508, by the controller 501, an AI model 505 using information in the entity database includes generating 602 time series datasets of valuation data contained in the plurality of entity profiles by extracting time series information from the entity profile in the entity databases. In some examples, the controller 501 extracts time series valuation data including various valuation properties, such as revenues, losses, profitability, market share growth, funding valuations, and so on. For example, a time series dataset may include a revenue for each quarter over a period of years. The controller 501 can extract the dataset by querying the entity database and aggregating the results of the queries in a data structure such as a spreadsheet. The controller 501 can then store the dataset in the entity database.

In the example of FIG. 6 augmenting 508, by the controller 501, an AI model 505 using information in the entity database also includes configuring 604 the AI model 505 for retrieval-augmented generation using the time series datasets of valuation data. In some examples, the controller 501 configures 604 the AI model 505 for retrieval-augmented by linking the AI model 505 to the time series datasets of valuation data for multiple entities in the entity database. For example, the controller 501 can configure the AI model 50 by inputting these time series datasets of valuation data as a context for generating responses to prompts to the AI model 505. Techniques for configuring the AI model 505 for retrieval-based generation are described above.

In the example of FIG. 6, generating 510, by the controller 501 using the augmented AI model 505, one or more ratings for the entity in relation to one or more attributes based on an AI-driven analysis of the plurality of entity profiles in the entity database includes executing 606 the valuation analysis based on the valuation data using the augmented AI model 505. The valuation analysis can include, for example, a natural language valuation analysis based on a cross-correlation of valuation data for the entity with valuation data of other entities and other benchmarking. For example, the valuation analysis can provide a descriptive comparison of the valuation of the entity with those of similar entities. The valuation analysis can also include a score, ranking, other qualitative metric for the valuation of the entity based on its valuation data in relation to valuations of other entities. In some implementations, the controller 501 executes 606 the valuation analysis by constructing one or more prompts to the AI model 505. For example, the controller 501 may map a predefined prompt for a comparative valuation analysis. In another example, the controller 501 may construct a prompt by determining a set of properties (e.g., revenue, profitability, etc.) that the AI model 505 should use to generate a comparative valuation analysis. The AI model 505 generates a comparative valuation analysis using the time series valuation datasets and provides the result to the controller 501.

Figure 7:
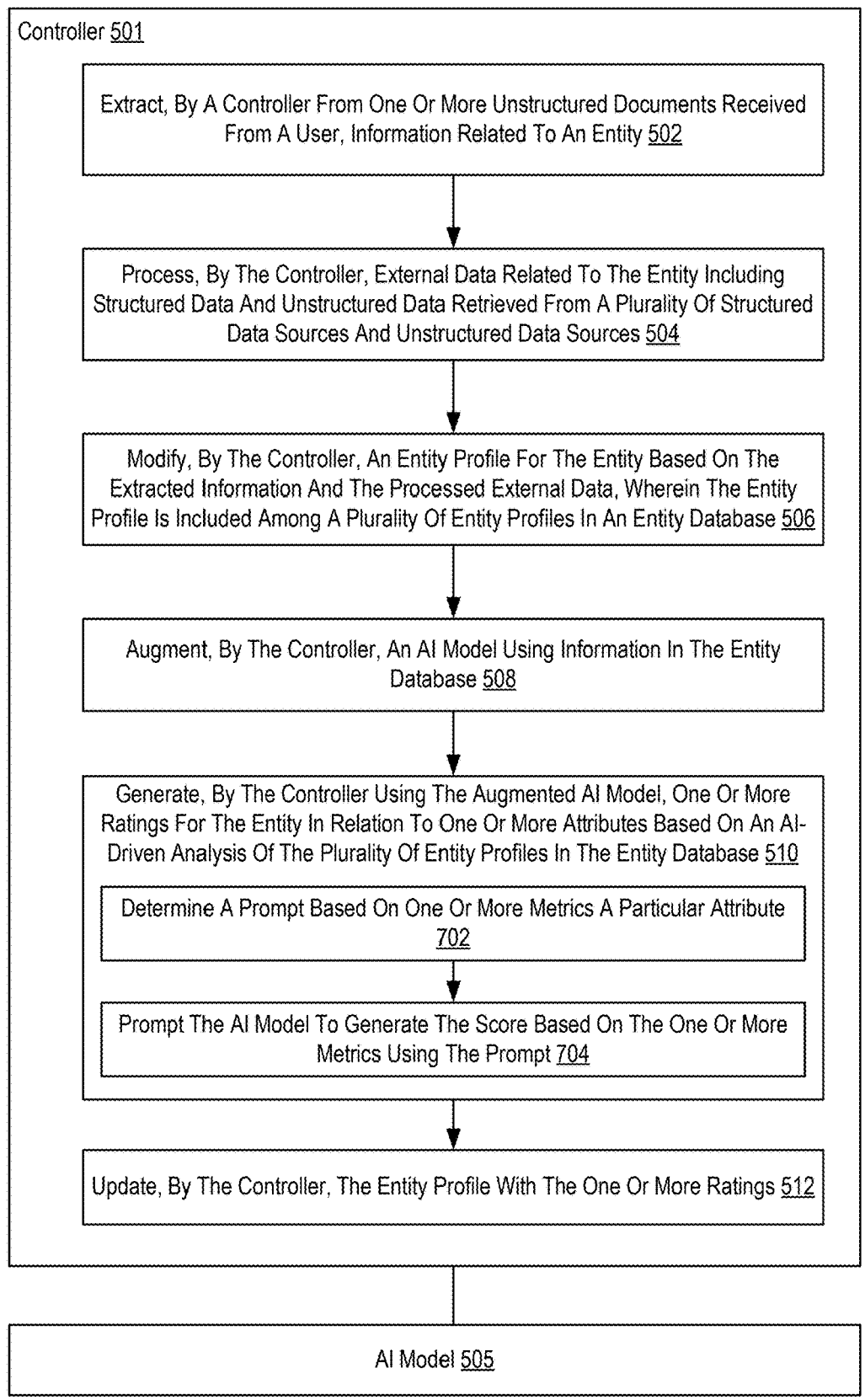
FIG. 7 sets forth a flowchart of another example method of integrated entity analysis using an AI model in accordance with the present disclosure.

For further explanation, FIG. 7 sets forth another example method for integrated entity analysis using an AI model in accordance with at least one embodiment of the present disclosure. The method of FIG. 7 extends the method of FIG. 5 in that generating 510, by the controller 501 using the augmented AI model 505, one or more ratings for the entity in relation to one or more attributes based on an AI-driven analysis of the plurality of entity profiles in the entity database includes determining 702 a prompt based on one or more metrics a particular attribute. In some implementations, the controller 501 determines 702 the prompt by mapping the attribute to a set of metrics. For example, the set of metrics for a particular attribute can be predefined. The set of metrics may vary according to the type of entity being evaluated. In a particular example, a 'financials' attribute is based on a set of metrics that includes revenue, profitability, debt, funding, and other metrics relevant to the financial health of a company. In this example, the controller 501 constructs a prompt based on these metrics. The metrics can correspond to particular fields of an entity profile. In other examples, the controller 501 dynamically generates a set of metrics to use for an attribute. In some implementations, the AI model 505 assists in identifying metrics for an attribute.

In the example of FIG. 7, generating 510, by the controller 501 using the augmented AI model 505, one or more ratings for the entity in relation to one or more attributes based on an AI-driven analysis of the plurality of entity profiles in the entity database also includes prompting 704 the AI model 505 to evaluate the entity based on the one or more metrics using the prompt. In some examples, the controller 501 prompts 704 the AI model 505 by instructing the AI model 505 to generate a score for the attribute based the metrics.

Figure 8:
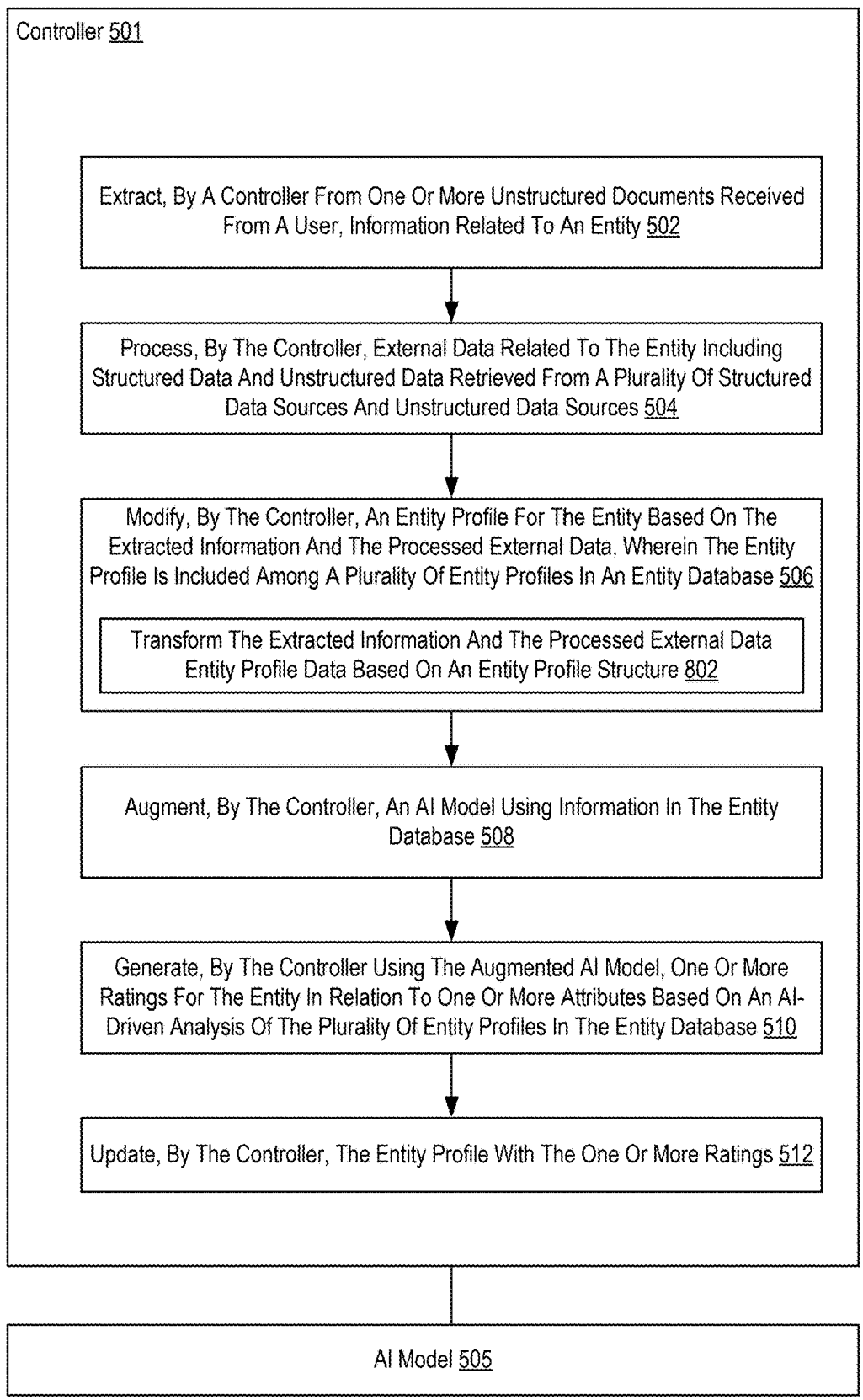
FIG. 8 sets forth a flowchart of another example method of integrated entity analysis using an AI model in accordance with the present disclosure.

For further explanation, FIG. 8 sets forth another example of integrated entity analysis using an AI model in accordance with at least one embodiment of the present disclosure. The example method of FIG. 8 extends the method of FIG. 5 in that modifying 506, by the controller 501, an entity profile for the entity based on the extracted information and the processed external data, wherein the entity profile is included among a plurality of entity profiles in an entity database includes transforming 802 the extracted information and the processed external data entity profile data based on an entity profile structure. In some examples, the controller 501 transforms 802 the extracted information and the processed external data by filtering and parsing the extracted information and the processed external data to label data in accordance with fields of a structured template that defines an entity profile structure. The labeled data can be used to populate fields for the entity profile based on the structured template. In some examples, different types of entities may have different profile templates. As such, the controller 501 may select a structured template based on the entity type. The fields of a structured template may vary across the different entity types. In some examples, the controller 501 utilizes the AI model 505 to classify the external data and processed external data in accordance with the fields of the structured template, where the data classifications correspond to the fields. The returned classified data is then used to populate the fields of the entity profile.

Figure 9:
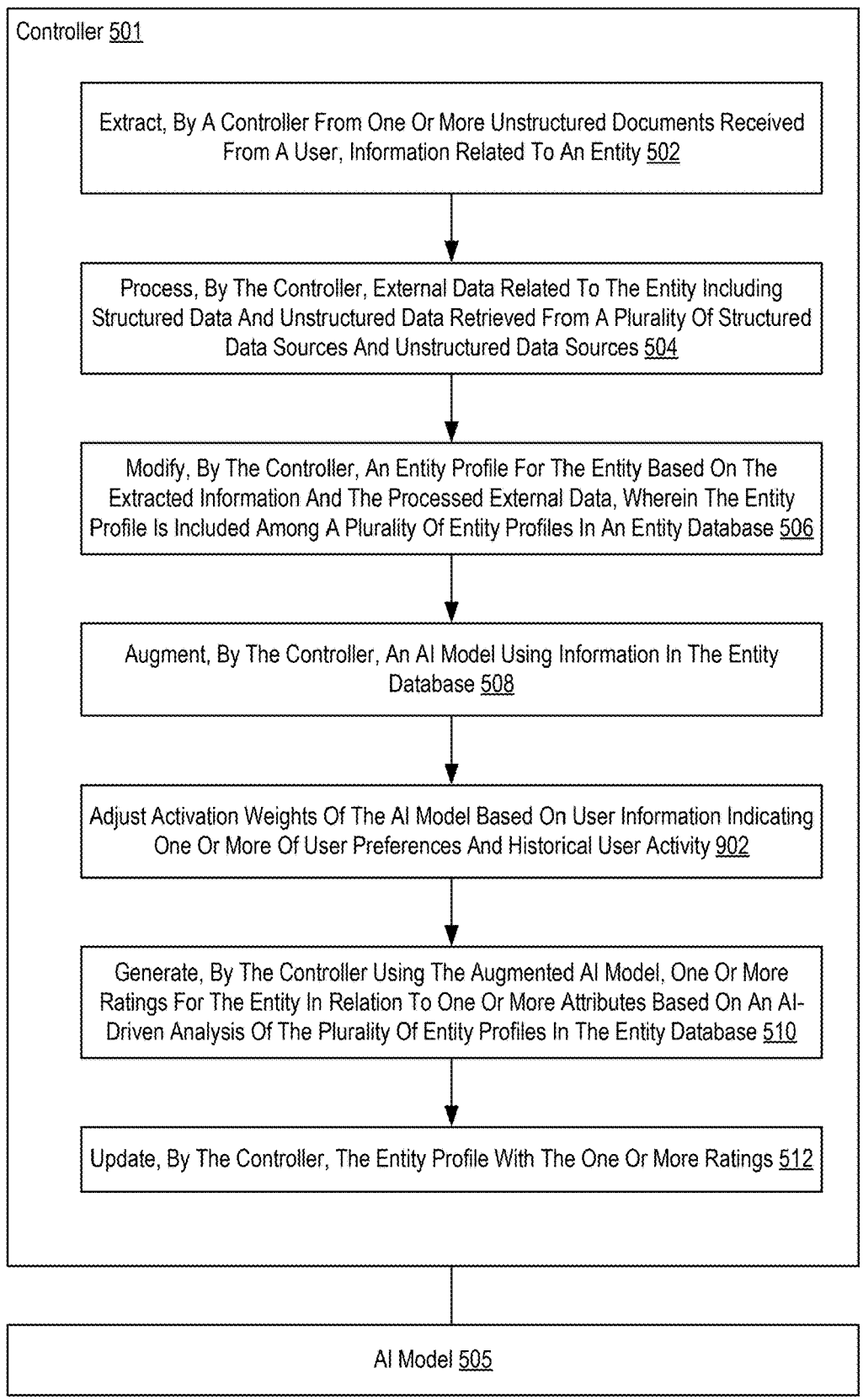
FIG. 9 sets forth a flowchart of another example method of integrated entity analysis using an AI model in accordance with the present disclosure.

For further explanation, FIG. 9 sets forth another example of integrated entity analysis using an AI model in accordance with at least one embodiment of the present disclosure. The example method of FIG. 9 extends the method of FIG. 5 in that the method of FIG. 9 includes adjusting 902 activation weights of the AI model 505 based on user information indicating one or more of user preferences and historical user activity. In some examples, the controller 501 adjusts 902 the activation weights of the AI model 505 by tuning the model based on historical user behavior. In some examples, the historical user behavior is based on a dataset that indicates proposals that the user has accepted or rejected. The proposals can be, for example, investment opportunities, deals, and so on. Tuning the AI model 505 can include inputting data indicating the proposals as well as an indication as to whether the user accepted or rejected the proposal. For example, the data indicating the proposal can include a summary of the proposal, entities involved in the proposal, and so on. The activation weights of the AI model are changed based on the data indicating the user behavior.

In some implementations, the controller 501 utilizes the AI model 505 to identify proposals and sentiments related to those proposals. For example, a dataset of historical user emails can be linked to the AI model 505 and the AI model 505 identifies any proposals indicated by the emails, as well as whether the user accepted or rejected the proposal. In some examples, the controller 501 controls the AI model 505 to generate a summary of the proposal. These summaries and indications of whether the user accepted or rejected the proposal are fed back to the AI model 505 to adjust the activation weights of the AI model based on the user behavior.

In some examples, the behavior of a hypothetical user can be used to tune the AI model 505. For example, a dataset of user behavior for a hypothetical user can include a number of investment events including who made the investment, a macro context for investment, terms of the investment, and/or a micro context for the investment.

In some implementations, tuning the AI model 505 includes inputting a set of user preferences. For example, a user may provide preferences to the controller 501, such as preferences for particular types of investments, particular industries or sectors, entities associated with green or sustainability initiatives, and so on. In these implementations, the controller 501 tunes the AI model 505 by inputting these preferences to the AI model 505, which changes the activation weights of the AI model. In some implementations, the controller 501 tunes the AI model based on contextual priming to assign a specific role, persona, or expertise upon which the AI model 505 bases its responses.

In view of the foregoing, it will be appreciated that integrated entity analysis using an AI model in accordance with the present disclosure provides a number of improvements to the technical field of data driven analysis and the computing systems that perform data driven analysis. Data driven analysis of abstract entities such as companies, assets, deals, etc. requires an analysis of many different entity characteristics from a multitude of data sources, and correlation of various characteristics to generate accurate predictions or assessments of those entities. This has typically involved manually compiling and integrating various structure and unstructured data. Conventional systems are constrained by the lack of comprehensive and up-to-date entity databases, hindering the ability of mathematical models to generate accurate insights and limiting the accuracy and effectiveness of subsequent analyses. Integrated data analysis using an AI model in accordance with the present disclosure integrates data user-provided data with structured and unstructured data from external sources to create a comprehensive dataset upon which analyses are based. The AI model provides pattern recognition and cross correlation of data to generate assessments and insights that provide a holistic real-time evaluation of the entity, thus improving the results of ratings for the entity that are generated by the integrated data analysis system.

Moreover, computing systems that perform data driven analysis of abstract entities based on algorithmic models consume significant amounts of power and expend significant amounts of heat in solving complex mathematical equations requiring multivariable analysis. Heat generation, in turn, requires energy to cool the processors. By utilizing and augmenting an AI model to facilitate data aggregation and transformation and to generate predictions and analytics based on the aggregated data, integrated data analysis using an AI model in accordance with the present disclosure reduces the processing complexities and thus reduces the amount of energy consumed and heat generated to perform these analyses, thus making the computing system more efficient.

Figure 10:
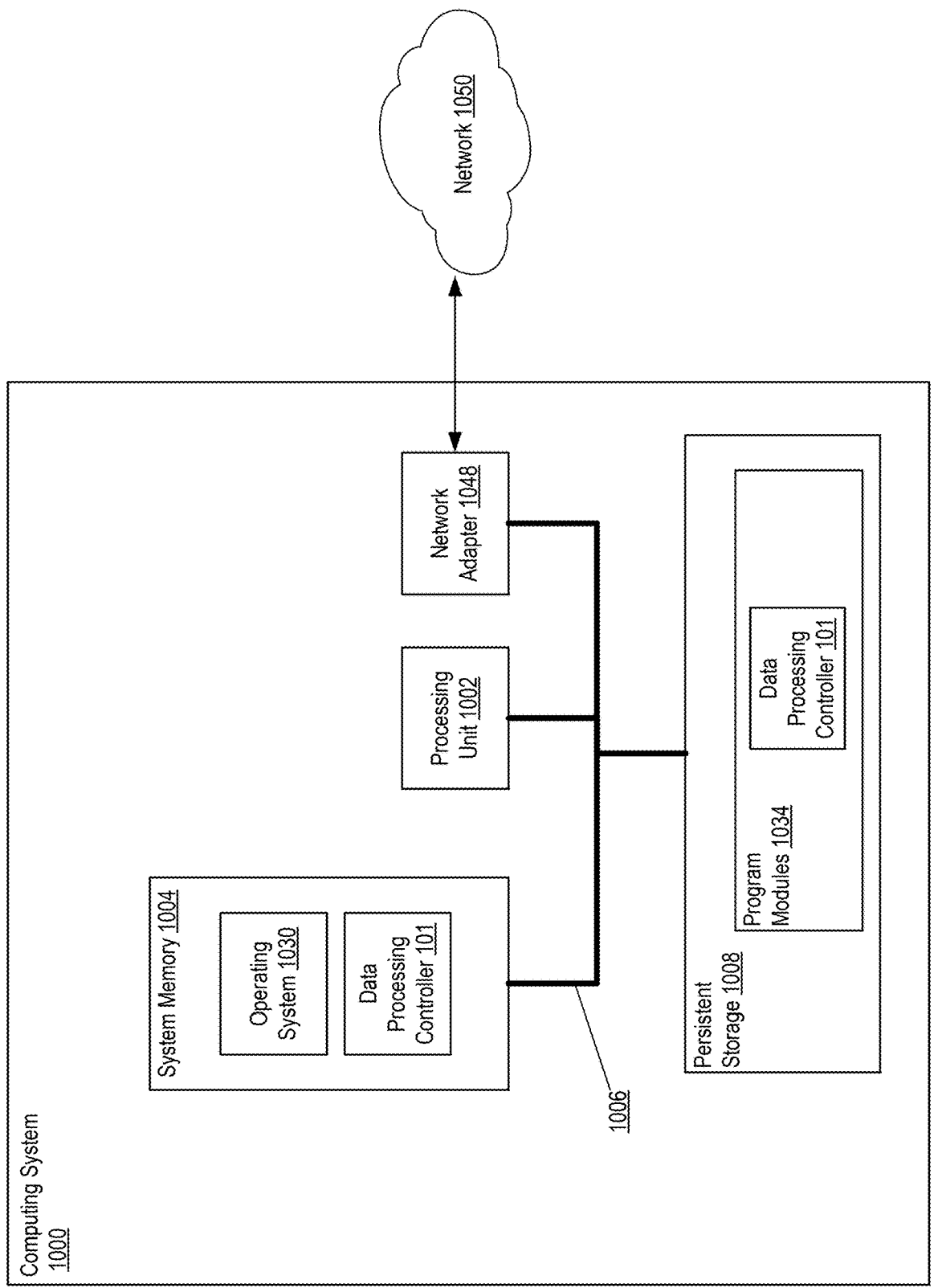
FIG. 10 is an example computing environment.

FIG. 10 sets forth an example computing environment suitable for integrated entity analysis using an AI model in accordance with the present disclosure. As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes random access memory (RAM).

Computer 1000 also has persistent storage 1008 in the form of, for example, a magnetic disk or a solid-state drive connected to bus 1006 by bus interface. The persistent storage 1008 their associated computer-readable storage media provide nonvolatile storage of computer-readable instructions, data structures, program modules and other data for the computer. Although a magnetic disk and solid-state driver are described, other types of computer-readable storage media can be used to store data.

An operating system 1030 and number of program modules 1034 may be stored in persistent storage 1008. Application program modules 1034 may include, for example, computer program logic for implementing a data processing controller 101 as described above, as well as any flowchart as described herein. Program modules 1034 may be loaded into system memory 1004 for execution by processing unit 1002.

Computer 1000 is connected to a network 1050 (e.g., the Internet) through a network interface or adapter 1048 other means for establishing communications over the network. For example, network 1050 may be used for communication with machine learning models, remote databases, unstructured data sources, etc.

Figure 11:
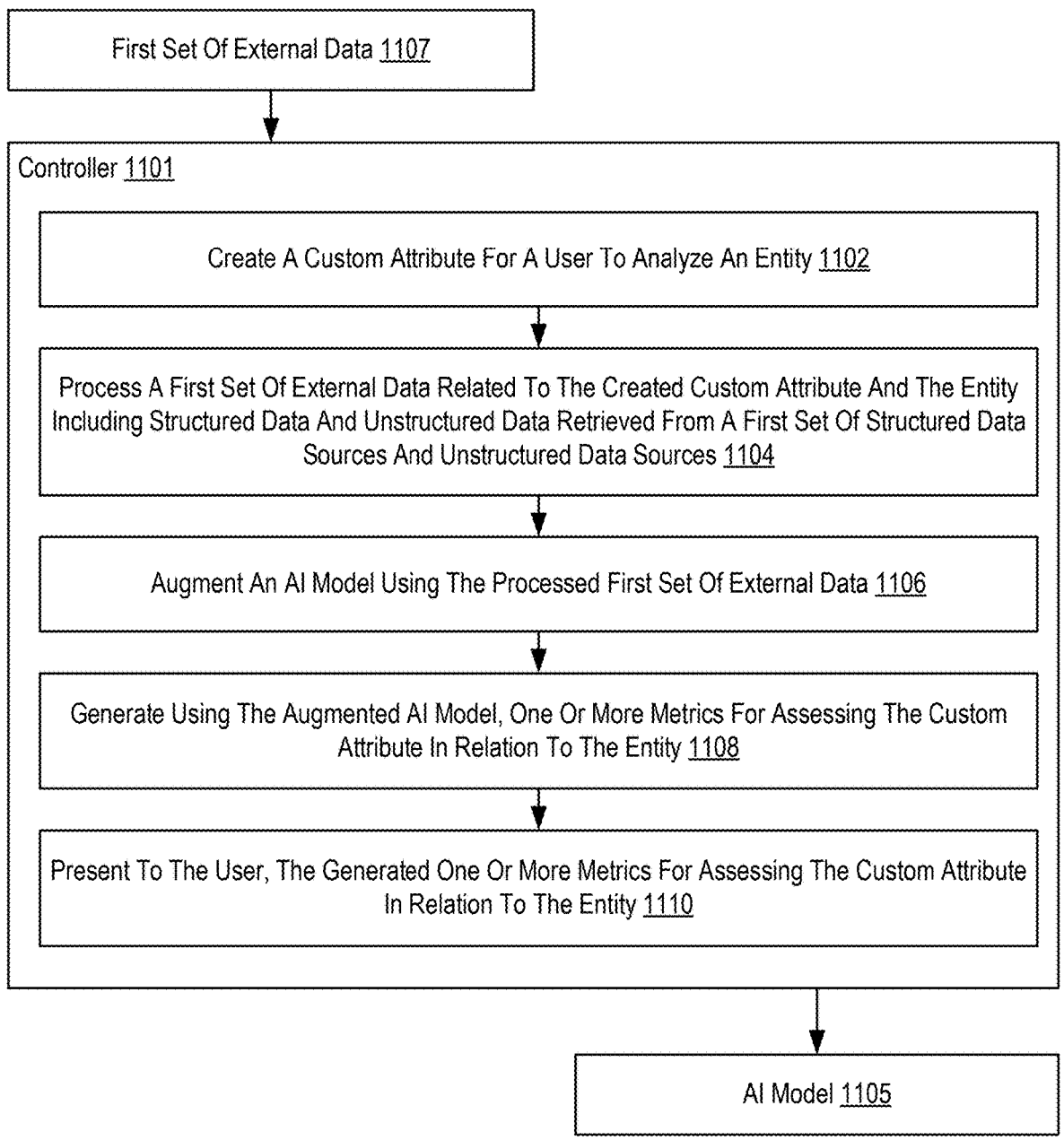
FIG. 11 sets forth a flowchart of an example method of customized integrated entity analysis using an AI model in accordance with the present disclosure.

For further explanation, FIG. 11 sets forth a flow chart of an example method for customized integrated entity analysis using an AI model in accordance with at least one embodiment of the present disclosure. This method starts with step 1102, where a controller 1100 creates a custom attribute for a user to analyze an entity. An attribute here refers to a factor, quality, characteristic, or feature representing distinct data points to assess the entity's strengths, weaknesses, opportunities, and risks. Each attribute pinpoints a specific area or influence on the entity's performance and reputation. Controllers may provide predefined attributes tailored to an entity type; for instance, a "startup" profile might include attributes like financials, team, product, intellectual property, and investors. However, users may want to analyze the entity using a custom attribute not included in this predefined set. For example, a user could add "celebrity endorsement" as a relevant attribute. The controller then allows the user to define this custom attribute, which it incorporates into the entity's analysis and scoring. The controller can create a custom attribute by prompting the user via a graphical interface or by inferring the user's interest and generating a custom attribute accordingly, as described further in FIGS. 12 and 13.

The method of FIG. 11 also includes processing 1104, by the controller 1100, a first set of external data related to the created custom attribute and the entity including structured data and unstructured data retrieved from a first set of structured data sources and unstructured data sources. In some examples, the controller 1101 retrieves structured and unstructured data as discussed above. For example, the controller 1101 uses structured database queries, database APIs, natural language search strings, and other data retrieval mechanisms to aggregate data about the entity and the created custom attribute from databases and web-based content such as web sites, social media platforms, press releases, news articles, and so on. The controller 1101 may employ web-scraping to retrieve the unstructured data. In some examples, the controller 1101 processes 1104 the first set of external data related to the entity and the custom attribute by applying natural language processing as well as context and sentiment analysis, including parsing, classifying, and labeling elements of data, in order to synthesize properties of the entity. Using these properties, the controller 1101 is configured to generate or update an entity profile. In some examples, the controller 1101 transforms the synthesized properties into data that conforms to the structured template for an entity profile. This can include utilizing decision logic to fit the properties into appropriate fields of the structured template. This synthesized data may lead to mutual relevance—where data retrieval about the entity informs more accurate data on the custom attribute and vice versa.

The method of FIG. 11 also includes augmenting 1106, by the controller, an AI model using the processed first set of external data. In some examples, the controller 1101 augments 1106 the AI model 1105 by configuring the AI model 1105 for retrieval-augmented generation. For example, the controller 1101 can configure the AI model 1105 for retrieval-augmented generation by linking the AI model 1105 to the dataset of entity profiles to provide a context for results generated by the AI model. In one example, entity profiles are converted to vector embeddings. An attribute definition is also converted to a vector embedding. For example, the controller 1101 may generate an attribute definition of a financials attribute as based on revenue, profit, debt, etc. A similarity search can be performed to identify portions of entity profile data that are relevant to the attribute based on the vector embedded data and the vector embedded attribute definition. The relevant profile data is then supplied as a context to the AI model for rating the entity based on the attribute. In another example, a user query is converted to a vector embedding. A similarity search is performed to identify portions of entity profile data that are relevant to the query based on the vector embedded entity profile data and the vector embedded query. The relevant profile data is then supplied as a context to the AI model for responding to the query. Additionally, user queries may be embedded and matched to relevant profile data, refining responses based on precise context. The controller may also prime the AI model with specific roles, personas, or expertise to improve response relevance.

The method of FIG. 11 also includes generating 1108, by the controller 1101 using the augmented AI model, one or more metrics for assessing the custom attribute in relation to the entity. For predefined attributes, a standard set of metrics (e.g., revenue, profitability, debt for a financials attribute) is available; however, custom attributes require the generation of new metrics. Here, the controller constructs prompts for the AI model 1105, requesting optimal metrics based on the entity's context. For example, relevant entity properties can be compiled into a tailored prompt that the AI model processes via an API call to recommend metrics suited to the custom attribute. The controller defines the custom attribute's parameters by associating it with relevant data points and metrics that can quantitatively or qualitatively describe it. For example, a custom attribute like "environmental sustainability" could include metrics such as "carbon emissions," "energy efficiency," or "waste reduction." The controller can pull from existing data sources or set up queries to retrieve information that aligns with these metrics, thereby populating the custom attribute with relevant data for the entity in question.

In some cases, the controller may also infer and structure the custom attribute dynamically, using machine learning algorithms to suggest or refine attribute parameters based on the entity type and context. For instance, the system might analyze similar entities or industry standards to ensure that the custom attribute reflects best practices and relevant metrics, enhancing the attribute's analytical depth. This process allows the controller to incorporate the custom attribute seamlessly into the entity's profile and enables the AI model to use it for targeted analysis, ensuring that the evaluation is closely aligned with the user's specific interests and insights.

The method of FIG. 11 also includes presenting 1110 to the user, by the controller, the generated one or more metrics for assessing the custom attribute in relation to the entity. Presenting 1110 to the user, by the controller, the generated one or more metrics for assessing the custom attribute in relation to the entity may be carried out by presenting a graphical user interface that displays the generated one or more metrics. The user may provide feedback on these metrics, allowing for iterative improvements or refinements as necessary, ensuring that the generated metrics effectively assess the custom attribute in relation to the entity.

Utilizing custom attributes enhances the functionality and efficiency of the computing systems and networks supporting the AI model and controller by enabling more targeted data processing and reducing computational overhead. By tailoring analyses to user-defined attributes that are directly relevant to the entity, the system limits the scope of data retrieval, processing, and evaluation to only those parameters that directly impact user needs, minimizing unnecessary data handling. This specificity reduces the load on data processing pipelines and decreases the latency associated with querying vast datasets, which is particularly beneficial in distributed or cloud-based environments where bandwidth and resource management are critical. Additionally, custom attributes allow the AI model to focus on generating insights that are closely aligned with the context provided by the user, thereby reducing the number of iterations or recalibrations needed to produce accurate results. By aligning processing flows with precise, relevant metrics, custom attributes ultimately streamline both the analysis process and resource allocation across the computing systems, resulting in faster response times, reduced computational costs, and improved scalability of the overall AI-driven analysis system.

Figure 12:
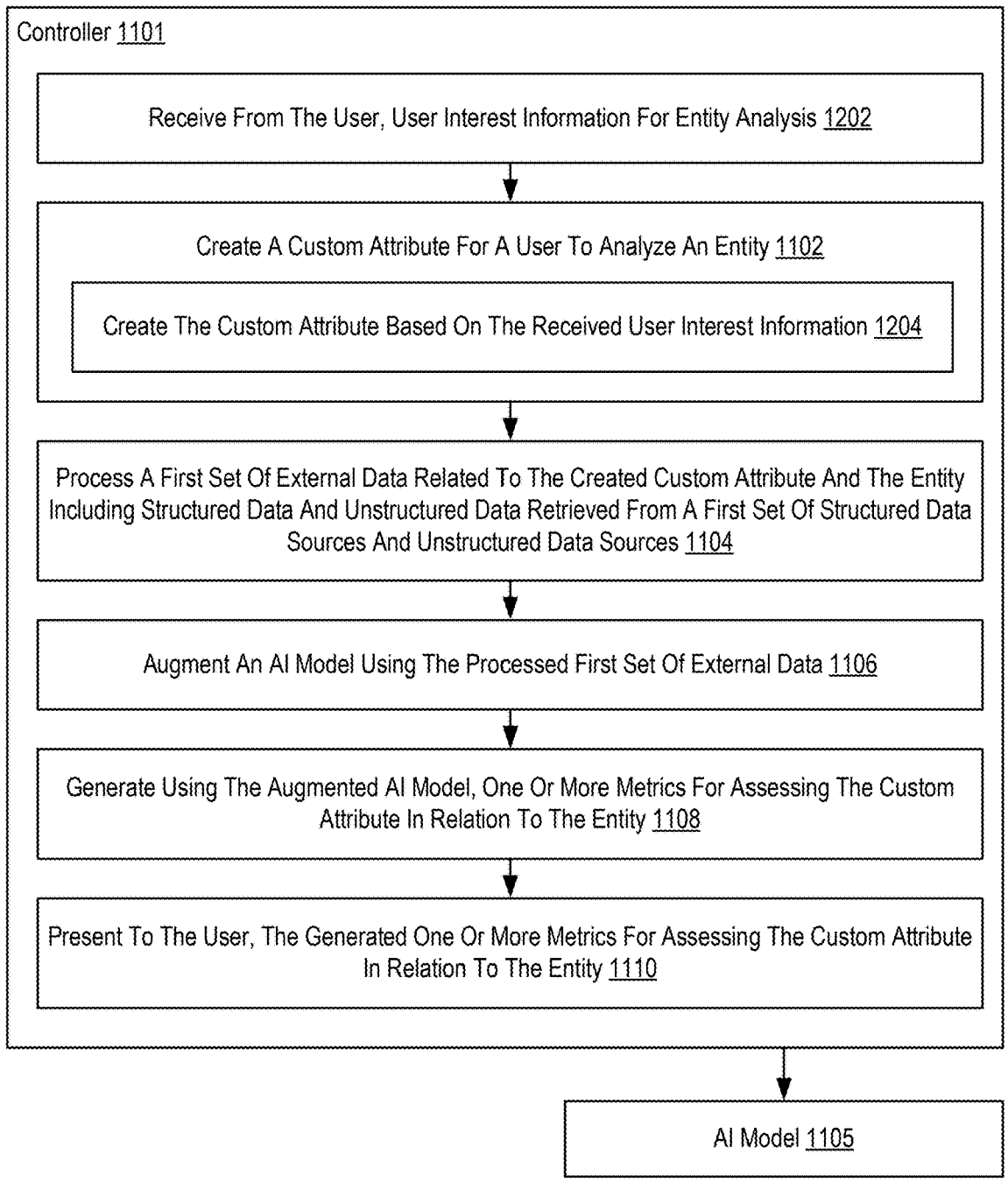
FIG. 12 sets forth a flowchart of another example method of customized integrated entity analysis using an AI model in accordance with the present disclosure.

For further explanation, FIG. 12 sets forth a flow chart of an example method for custom integrated entity analysis using an AI model in accordance with at least one embodiment of the present disclosure. The method of FIG. 12 is similar to the method of FIG. 11 in that the method of FIG. 12 includes the elements of FIG. 11. In the method of FIG. 12, creating 1102 a custom attribute for a user to analyze an entity includes receiving 1202, from the user, by the controller 1101, user interest information for entity analysis. User interest information refers to data or input provided by the user that reflects their specific focus areas, preferences, or objectives in analyzing an entity. This information could include specific interests, factors, or qualities that the user deems important for assessing the entity. For instance, a user analyzing a technology startup may indicate an interest in attributes like "market potential," "innovation level," or "social impact," which go beyond the standard predefined attributes. User interest information helps the system tailor its analysis to align closely with the user's unique requirements, allowing for a more relevant and personalized assessment.

The process of receiving 1202 user interest information from the user, by the controller 1101, can be facilitated through various methods. In one embodiment, users are prompted via a graphical user interface (GUI) to select or input their areas of interest. This interface may provide dropdown menus, checkboxes, or free-text fields, enabling users to specify attributes that are either standard or custom. In other implementations, the controller might employ natural language processing (NLP) to interpret open-ended input from the user, allowing for greater flexibility and nuance in capturing specific interests. Additionally, in cases where users interact with the system over time, the controller can infer user interest information based on historical interaction data or repeated patterns in user behavior, allowing for predictive insights without requiring direct input. By accurately receiving and processing user interest information, the controller is better positioned to adapt the analysis to reflect the user's priorities, ensuring a more targeted and valuable evaluation of the entity.

In the method of FIG. 12, creating 1102 a custom attribute for a user to analyze an entity includes creating 1204 the custom attribute based on the received user interest information. Creating 1204 the custom attribute based on the received user interest information may be carried out by analyzing and translating the user's preferences into specific, measurable attributes that can be integrated into the entity analysis. When a user provides interest information-such as selecting areas like "environmental sustainability" or inputting free-text terms like "carbon footprint impact"—the controller interprets these inputs to define a new custom attribute that aligns with the user's analytical goals.

This process may involve several steps. In one embodiment, the controller uses natural language processing (NLP) to understand and categorize the user's input, identifying key terms or themes that represent potential custom attributes. For instance, if a user indicates an interest in "social impact," the controller might parse this input to determine related factors, such as "community engagement" or "employee diversity." The controller then formalizes these themes into a specific attribute that can be analyzed alongside predefined attributes.

Figure 13:
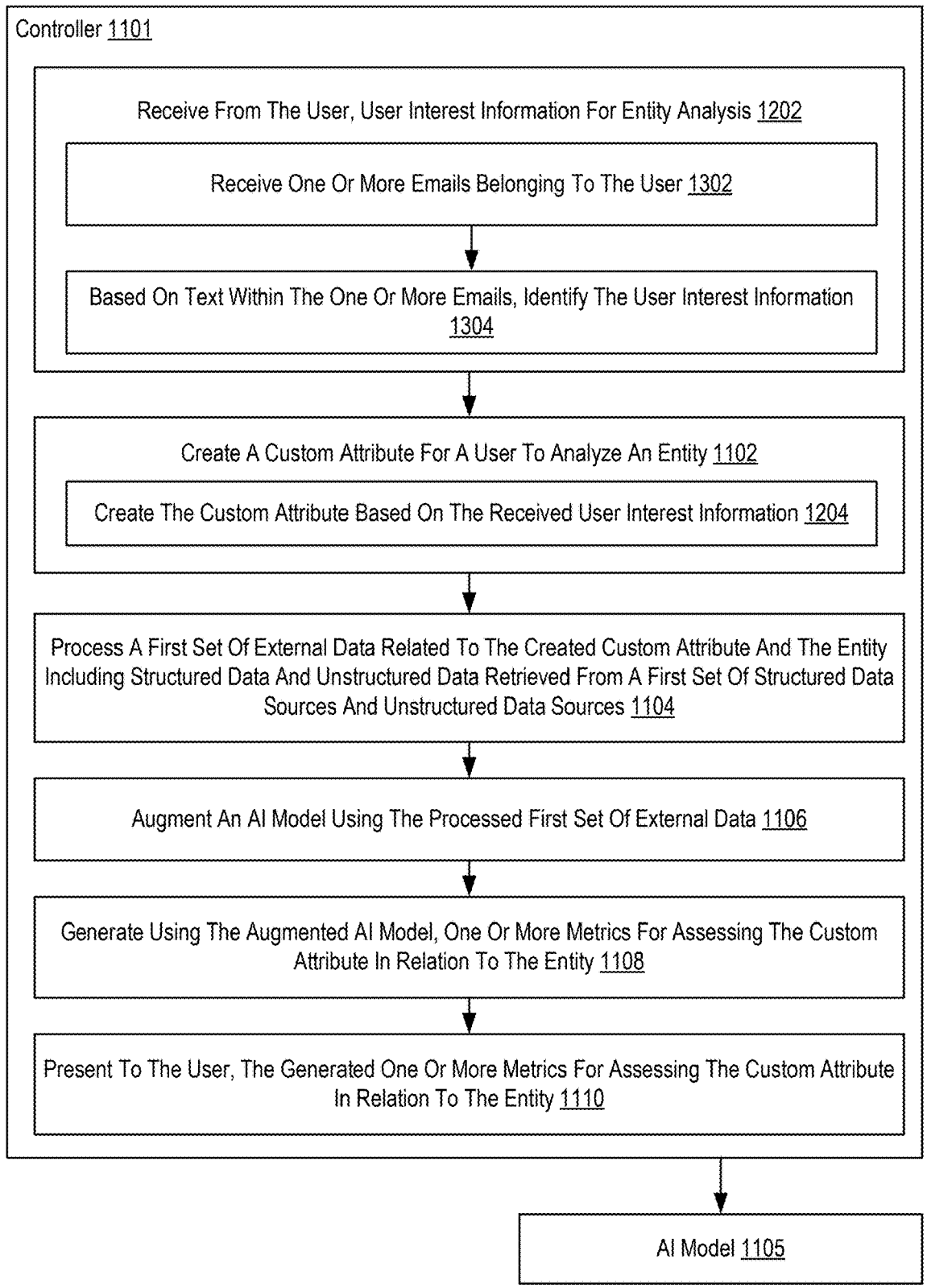
FIG. 13 sets forth a flowchart of another example method of customized integrated entity analysis using an AI model in accordance with the present disclosure.

For further explanation, FIG. 13 sets forth a flow chart of an example method for custom integrated entity analysis using an AI model in accordance with at least one embodiment of the present disclosure. The method of FIG. 13 is similar to the method of FIG. 12 in that the method of FIG. 13 includes the elements of FIG. 12. In the method of FIG. 13, receiving 1202, from the user, by the controller 1101, user interest information for entity analysis also includes receiving 1302, by the controller, one or more emails belonging to the user. Receiving 1302, by the controller, one or more emails belonging to the user may be carried out by implementing a secure and structured process for accessing and retrieving relevant email content while maintaining user privacy and data security.

In one embodiment, the first step involves obtaining explicit authorization and consent from the user to access their emails. This may be done through a secure authentication mechanism, such as OAuth, where the user grants the controller permission to access specific email content. Once authorization is granted, the controller establishes a secure connection to the user's email account, often through APIs provided by email service providers (e.g., Gmail API or Microsoft Graph API). The controller then identifies the scope of emails to retrieve based on user-defined parameters, such as a specific date range, subject keywords, or senders. This step minimizes unnecessary data access by ensuring that only relevant emails are selected for analysis. For example, the user might specify that only emails related to a particular project or timeframe should be analyzed, and the controller filters accordingly. With the scope defined, the controller retrieves the email metadata and content within these parameters. The controller may use email headers (like subject lines and timestamps) to organize and prioritize emails before delving into the body text. Parsing tools help break down email content, stripping out irrelevant sections like signatures, legal footers, or graphics, which ensures that only meaningful text is processed. To further protect user privacy, the controller may anonymize sensitive information within the emails, such as personal identifiers, by using data masking techniques. This approach ensures that the analysis focuses solely on relevant content without exposing private details, preserving user confidentiality while still enabling interest identification.

The method of FIG. 13 also includes based on text within the one or more emails, identifying 1304, by the controller, the user interest information. Identifying 1304, by the controller, the user interest information may be carried out by the controller first processing the email text using NLP, which allows it to understand and analyze human language at scale. NLP techniques such as tokenization (breaking down text into individual words or phrases) and stemming/lemmatization (reducing words to their base form) enable the controller to interpret and categorize content effectively. NLP helps in identifying the main themes within the text by recognizing keywords, phrases, and common topics. The controller then applies entity recognition to identify specific names, places, organizations, or terms within the emails that are relevant to entity analysis. For instance, if an email mentions terms like "sustainability," "market growth," or "product innovation," the controller recognizes these as potential areas of user interest.

Keyword extraction algorithms can also pull out commonly occurring or emphasized words, allowing the system to create a list of themes likely to be significant to the user. The controller may use topic modeling techniques, such as Latent Dirichlet Allocation (LDA), to group related words and phrases into coherent topics, giving it insight into broader themes within the emails. For example, emails discussing "financial performance" and "investor relations" could indicate an interest in the financial stability of entities. Sentiment analysis can also be applied to determine the tone (positive, negative, neutral) surrounding specific topics, further refining the understanding of user preferences. To ensure a nuanced interpretation, the controller may use contextual analysis to understand the surrounding words and phrases that frame each identified term. For example, if an email contains terms like "customer loyalty" and "brand engagement," the controller recognizes that these are related to marketing rather than general customer interactions. Synonym matching allows the controller to interpret varied expressions of the same interest (e.g., "eco-friendly" and "sustainable" both indicating environmental concerns).

After identifying potential topics, the controller prioritizes them by analyzing their frequency and relevance across the emails. Topics that appear consistently or are discussed in detail are marked as higher-priority user interests. This filtering step ensures that the controller focuses on the interests most relevant to the user's analytical goals, disregarding incidental mentions. The controller organizes the identified topics into structured categories or custom attributes that align with the user's analysis objectives. For example, identified topics like "carbon footprint" and "renewable energy" might be grouped under a custom attribute for "Environmental Impact." This structured categorization makes it easier to incorporate user interest information into the AI-driven analysis. In some implementations, the controller can present the identified interests to the user for confirmation or adjustment. This feedback loop allows the system to refine its interpretation of user interests, ensuring that the custom attributes created accurately reflect the user's priorities. Thus, the controller can effectively identify and structure user interest information based on email content, generating valuable insights that enhance the relevance and personalization of the entity analysis. This process transforms unstructured email text into one or more custom attributes that align closely with the user's specific analytical needs.

Figure 14:
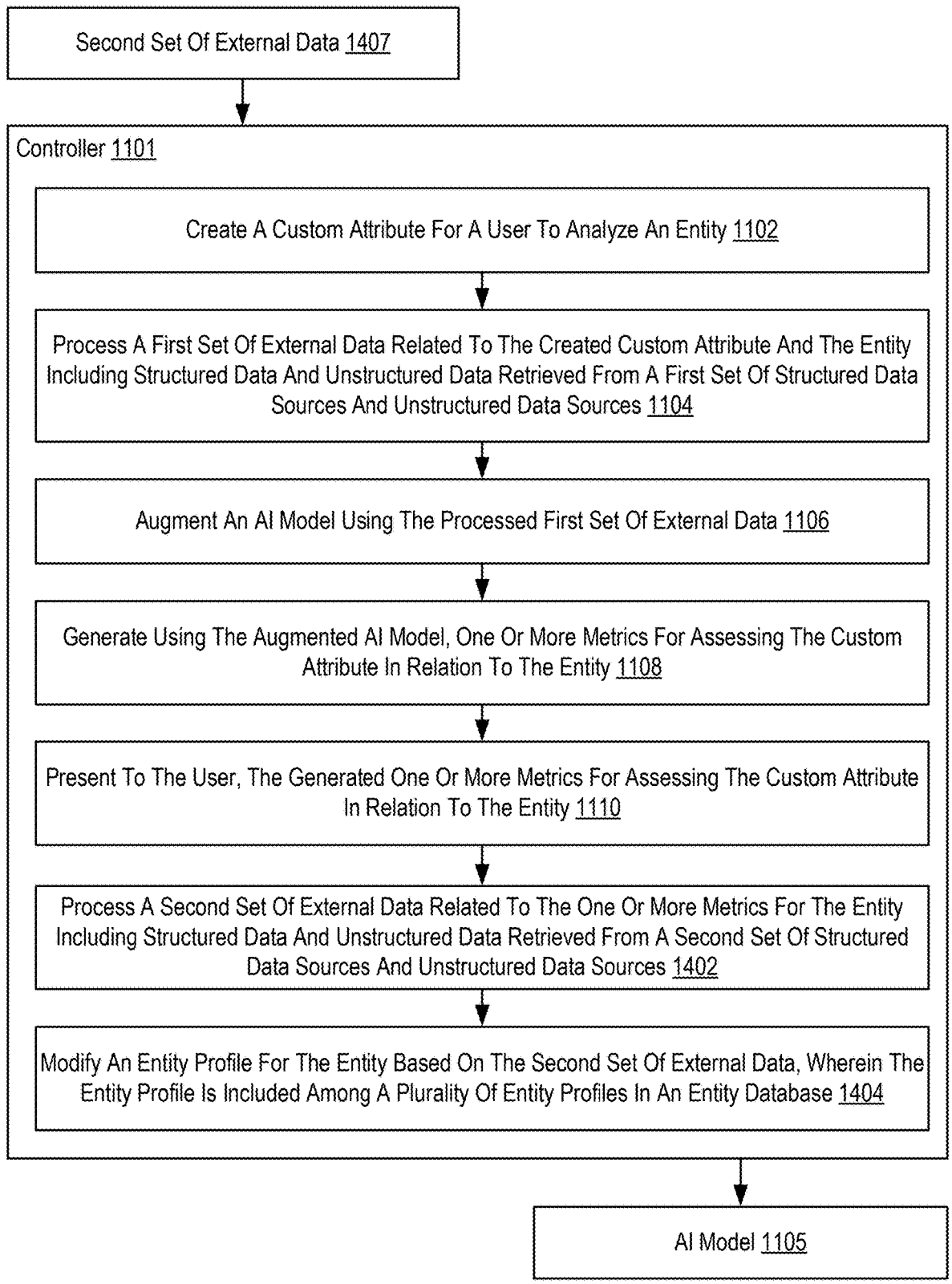
FIG. 14 sets forth a flowchart of another example method of customized integrated entity analysis using an AI model in accordance with the present disclosure.

For further explanation, FIG. 14 sets forth a flow chart of an example method for custom integrated entity analysis using an AI model in accordance with at least one embodiment of the present disclosure. The method of FIG. 14 is similar to the method of FIG. 11 in that the method of FIG. 14 includes the elements of FIG. 11. The method of FIG. 14 also includes processing 1402, by the controller, a second set of external data related to the one or more metrics for the entity including structured data and unstructured data retrieved from a second set of structured data sources and unstructured data sources. In some examples, the controller 1101 retrieves structured and unstructured data as discussed above. For example, the controller 1101 uses structured database queries, database APIs, natural language search strings, and other data retrieval mechanisms to aggregate data about the one or more metrics from databases and web-based content such as web sites, social media platforms, press releases, news articles, and so on. The controller 1101 may employ web-scraping to retrieve the unstructured data. In some examples, the controller 1101 processes 1402 the second set of external data related to the one or more metrics by applying natural language processing as well as context and sentiment analysis, including parsing, classifying, and labeling elements of data, in order to synthesize properties of the entity. Using these properties, the controller 1101 is configured to generate or update an entity profile. In some examples, the controller 1101 transforms the synthesized properties into data that conforms to the structured template for an entity profile. This can include utilizing decision logic to fit the properties into appropriate fields of the structured template.

The method of FIG. 14 also includes modifying 1404, by the controller, an entity profile for the entity based on the second set of external data, wherein the entity profile is included among a plurality of entity profiles in an entity database. The controller 1101 modifies 1404 the entity profile by creating or updating the entity profile to include the structured data derived from the extracted information and the structured data derived from processed structured and unstructured data. The entity profile can be, for example, a table or a collection of tables in a relational database. Fields in the table(s) may correspond to data fields used to label data from the extracted information and the processed external data. The structure for the entity profile can be specific to a type or category of the entity.

Figure 15:
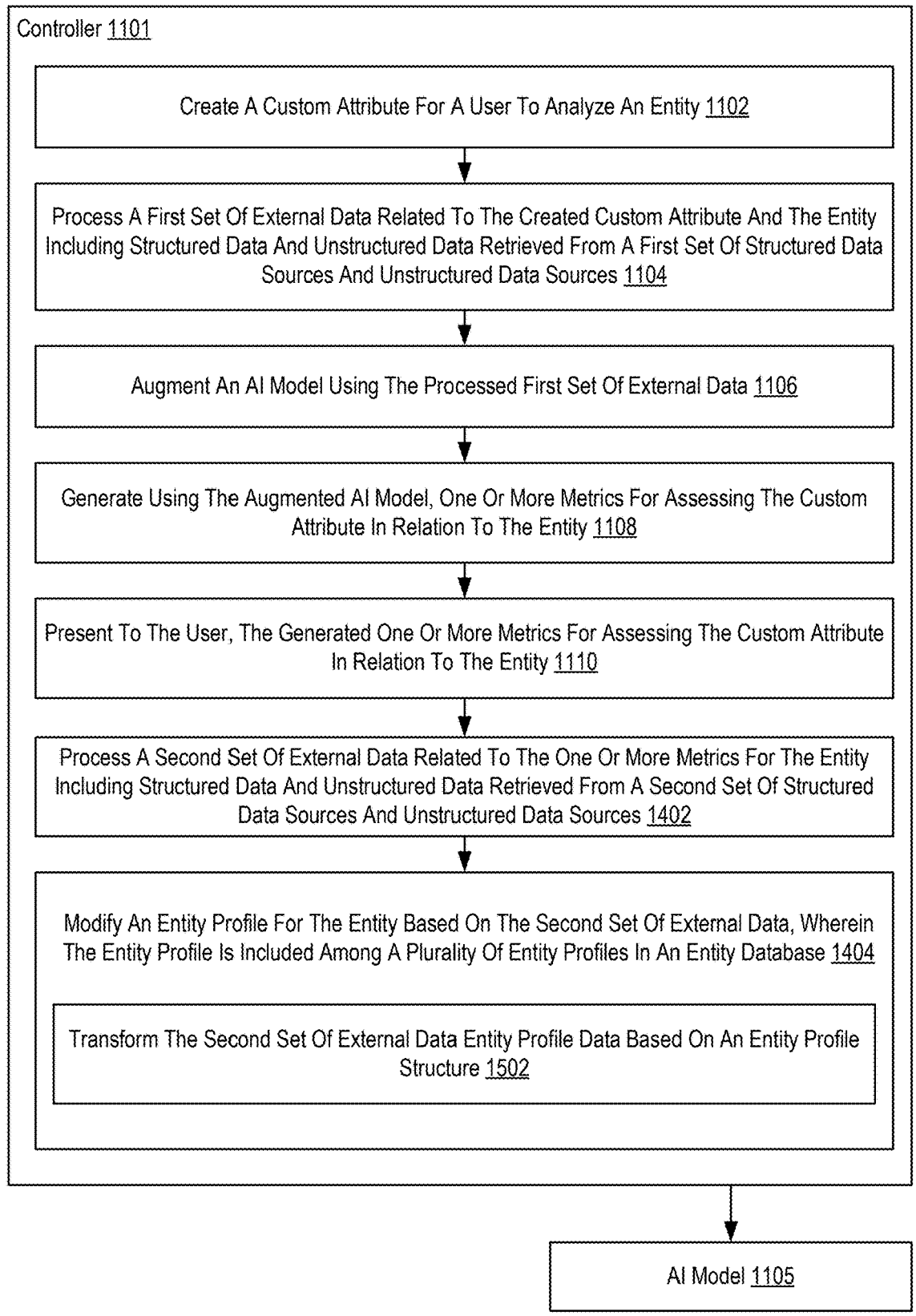
FIG. 15 sets forth a flowchart of another example method of customized integrated entity analysis using an AI model in accordance with the present disclosure.

For further explanation, FIG. 15 sets forth a flow chart of an example method for custom integrated entity analysis using an AI model in accordance with at least one embodiment of the present disclosure. The example method of FIG. 15 extends the method of FIG. 14 in that modifying 1404, by the controller, an entity profile for the entity based on the second set of external data, wherein the entity profile is included among a plurality of entity profiles in an entity database includes transforming 1502 the second set of external data entity profile data based on an entity profile structure. In some examples, the controller 1101 transforms 1502 the extracted information and the processed external data by filtering and parsing the extracted information and the processed external data to label data in accordance with fields of a structured template that defines an entity profile structure. The labeled data can be used to populate fields for the entity profile based on the structured template. In some examples, different types of entities may have different profile templates. As such, the controller 1101 may select a structured template based on the entity type. The fields of a structured template may vary across the different entity types. In some examples, the controller 1101 utilizes the AI model 1105 to classify the external data and processed external data in accordance with the fields of the structured template, where the data classifications correspond to the fields. The returned classified data is then used to populate the fields of the entity profile.

Figure 16:
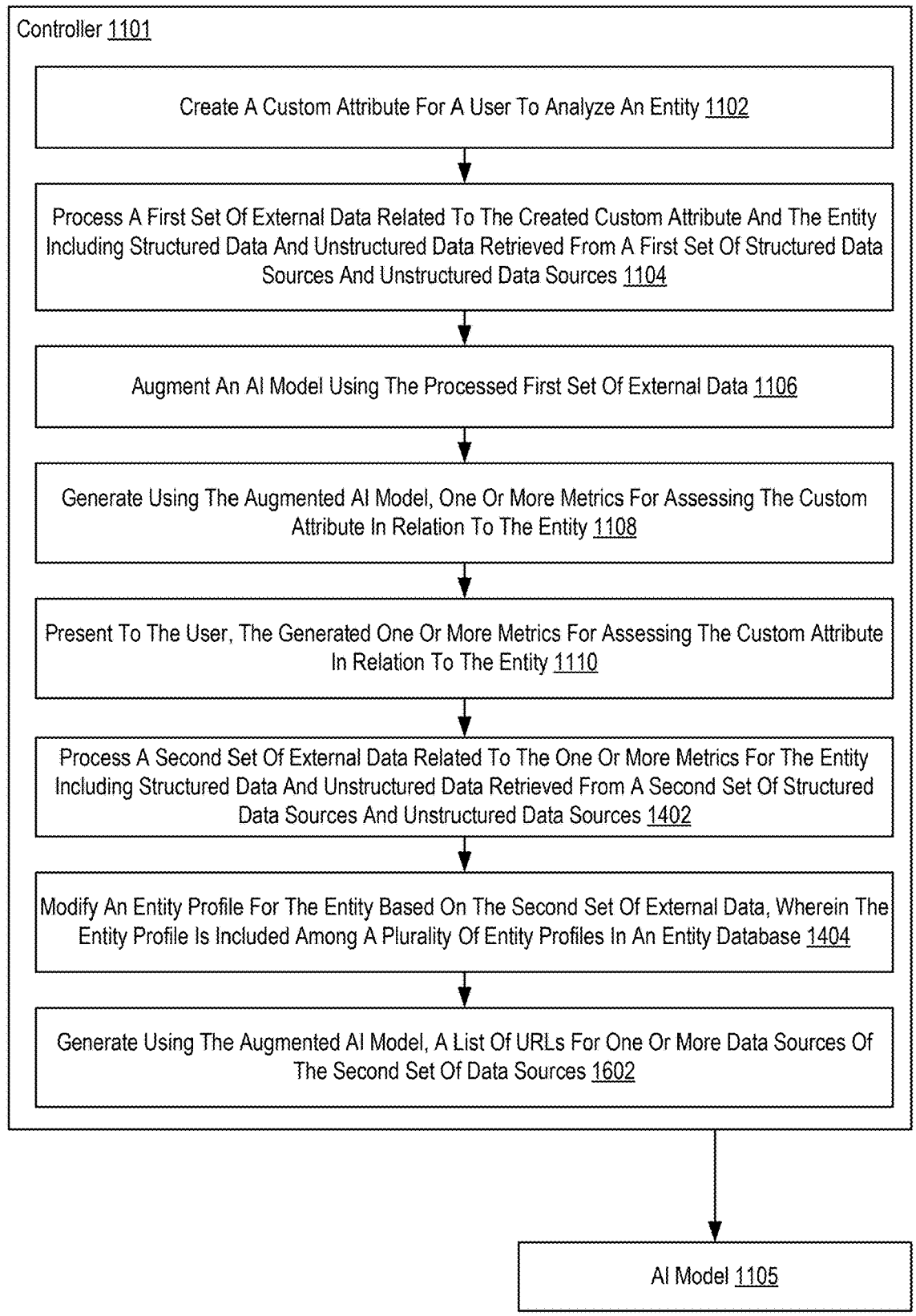
FIG. 16 sets forth a flowchart of an example method of customized integrated entity analysis using an AI model in accordance with the present disclosure.

For further explanation, FIG. 16 sets forth a flow chart of an example method for custom integrated entity analysis using an AI model in accordance with at least one embodiment of the present disclosure. The method of FIG. 16 is similar to the method of FIG. 14 in that the method of FIG. 16 includes the elements of FIG. 14. The method of FIG. 16 also includes generating 1602, by the controller using the augmented AI model, a list of URLs for one or more data sources of the second set of data sources. Generating 1602, by the controller using the augmented AI model, a list of URLs for one or more data sources of the second set of data sources may be carried out by defining topics or keywords related to the entity's metrics. These might include terms like "financial growth," "customer satisfaction," or "market trends," which are derived from the user's interests or the predefined metrics needing further exploration.

The controller uses the augmented AI model to construct highly targeted search queries based on these topics and keywords. The AI model might also use variations of these terms, including synonyms, industry jargon, or even entity-specific phrases, to ensure a broad yet relevant search scope. For instance, if the metric involves "brand sentiment," the model might use related terms like "customer reviews" or "public opinion on [entity name]." Using these queries, the controller then performs a web search or accesses APIs of trusted data aggregators, such as news portals, research databases, or industry directories, to locate relevant URLs. The AI model's advanced search capabilities enable it to perform more nuanced queries that consider the contextual relevance of content, filtering out unrelated sources. Once potential URLs are identified, the AI model may evaluate each source for relevance and quality, scoring URLs based on criteria like the reliability of the domain, recency of the content, and relevance to the metric. For example, an official government site or a reputable news outlet would score higher than less reliable sources. This step ensures that only credible URLs are included in the list.

In a particular embodiment, the controller ensures that the generated list of URLs covers a diverse range of sources to provide a well-rounded view of the topic. For example, for the metric "competitor analysis," the AI model might include URLs from business news sites, industry reports, competitor websites, and customer review platforms to capture a variety of perspectives. In one embodiment, the AI model organizes the list of URLs according to their relevance to specific metrics or data points within the entity profile. For instance, URLs related to "market trends" are grouped under that metric, while URLs relevant to "customer satisfaction" are grouped accordingly. This structure enables efficient data retrieval for targeted analysis of each metric. In at least one embodiment, the controller compiles the filtered and organized URLs into a list that is directly usable by the system or the user. The list may be presented within the user interface, linked to each metric, or used internally by the controller to streamline subsequent data retrieval processes for analysis. By leveraging the augmented AI model in this way, the controller can dynamically generate a high-quality list of URLs tailored to specific metrics. This approach ensures that the entity analysis is based on a foundation of diverse, credible, and up-to-date data sources, ultimately enhancing the accuracy and depth of the insights generated by the system.

Generating a targeted list of URLs for relevant data sources significantly enhances the efficiency of the underlying system by reducing data retrieval workload. By compiling a focused list of URLs that are pre-vetted for relevance, the system minimizes the need to crawl or query unnecessary web pages or databases. This streamlined approach limits the data retrieval workload to only those sources that are directly pertinent to the analysis, reducing processing time and conserving bandwidth, which is especially beneficial in large-scale or distributed environments. This system also allows for more focused and faster data processing. When the system knows in advance which URLs contain relevant data, it can bypass a more extensive and exhaustive search of the internet or multiple databases. This precision means the system can allocate more processing power to analyzing high-quality data, allowing it to deliver insights faster. This focused approach to data retrieval and processing accelerates the analysis pipeline, supporting quicker decision-making.

Generating a list of URLs also reduces computational resources for data filtering. With a pre-filtered list of credible and topic-relevant URLs, the system avoids the additional computational expense of filtering out irrelevant or low-quality sources. This results in fewer resources dedicated to evaluating and discarding unsuitable data, freeing up CPU and memory for more critical analytical tasks and reducing overall system load. Another benefit is enhanced Scalability. By limiting data retrieval and analysis to a curated set of URLs, the system is better positioned to scale efficiently, even as the volume of analyses or the number of users grows. With a smaller, more relevant data set, the system can support multiple users simultaneously, as each user's analysis runs more efficiently without overwhelming network or processing resources.

Generating the list of URLs also improves accuracy in data analysis. The system's accuracy is enhanced when it pulls data from reliable, vetted sources, minimizing the inclusion of inaccurate or irrelevant information. The targeted URL list ensures that data feeding into the AI model for entity evaluation is consistently high-quality, reducing noise in the analysis and leading to more precise insights with fewer recalibrations or corrections required. Furthermore, pre-selecting URLs for analysis helps control the volume of data stored and managed by the system, as it limits the intake to only pertinent information. This streamlined data management strategy reduces storage costs and keeps the system's database optimized, allowing for easier indexing, retrieval, and archival of important data.

By generating and using a focused list of URLs, the system achieves a high degree of operational efficiency, maximizing resource utilization while delivering faster, more accurate, and reliable analyses. This improved efficiency supports a responsive and scalable AI-driven entity analysis solution, capable of handling complex, large-scale analysis tasks effectively.

Figure 17:
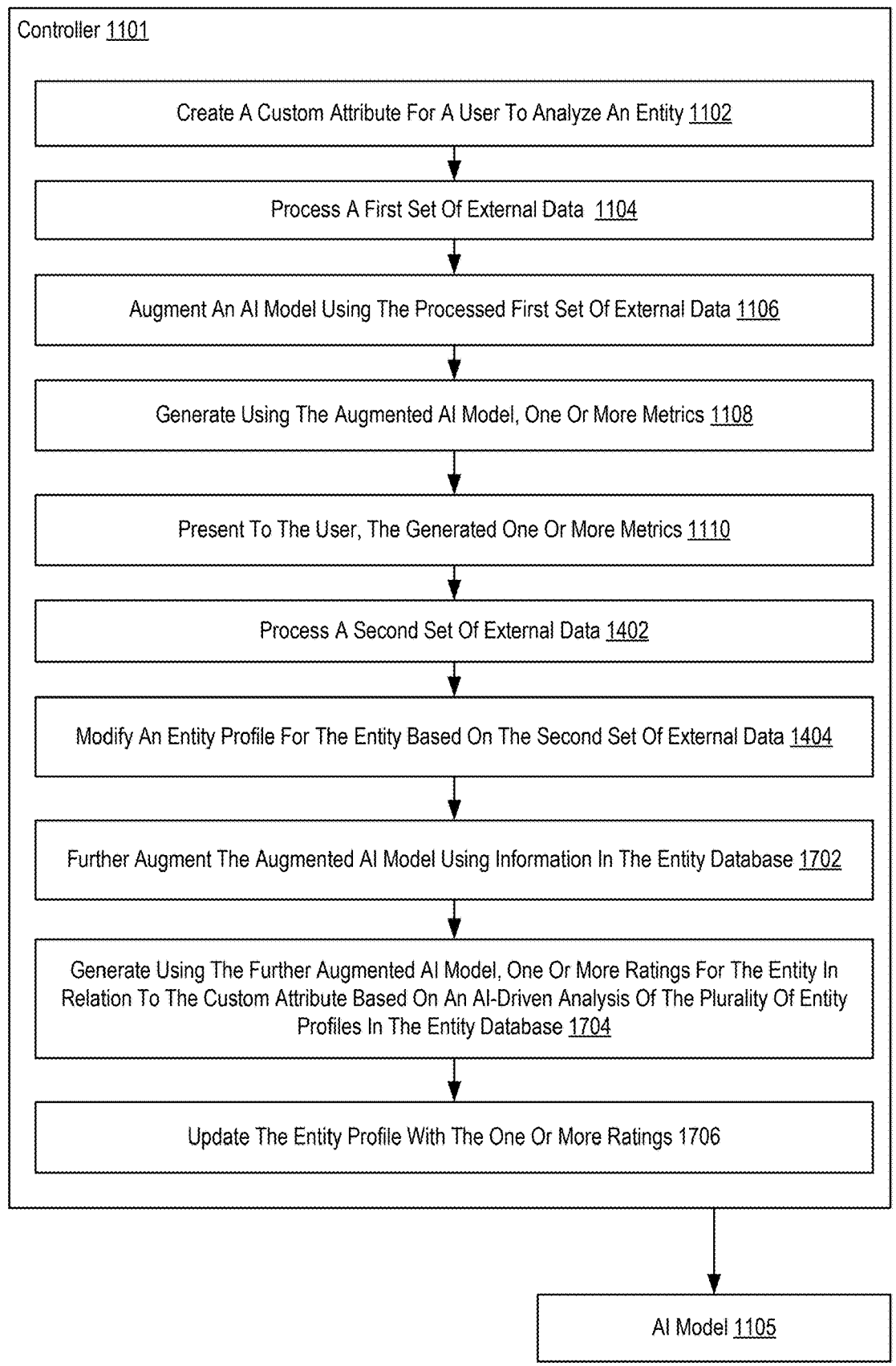
FIG. 17 sets forth a flowchart of another example method of customized integrated entity analysis using an AI model in accordance with the present disclosure.

For further explanation, FIG. 17 sets forth a flow chart of an example method for custom integrated entity analysis using an AI model in accordance with at least one embodiment of the present disclosure. The method of FIG. 17 is similar to the method of FIG. 14 in that the method of FIG. 17 includes the elements of FIG. 14. The method of FIG. 17 also includes further augmenting 1702, by the controller, the augmented AI model using information in the entity database. In some examples, the controller 1101 further augments 1702 the AI model 1105 by configuring the AI model 1105 for retrieval-augmented generation. For example, the controller 1101 can configure the AI model 1105 for retrieval-augmented generation by linking the AI model 1105 to the dataset of entity profiles to provide a context for results generated by the AI model. In one example, entity profiles are converted to vector embeddings. An attribute definition is also converted to a vector embedding. For example, the controller 1101 may generate an attribute definition of a financials attribute as based on revenue, profit, debt, etc. A similarity search can be performed to identify portions of entity profile data that are relevant to the attribute based on the vector embedded data and the vector embedded attribute definition. The relevant profile data is then supplied as a context to the AI model for rating the entity based on the attribute. In another example, a user query is converted to a vector embedding. A similarity search is performed to identify portions of entity profile data that are relevant to the query based on the vector embedded entity profile data and the vector embedded query. The relevant profile data is then supplied as a context to the AI model for responding to the query. In some examples, the controller 1101 augments 1702 the AI model with contextual priming. For example, the controller 1101 can generate a prompt to assign the AI model 1105 a specific role, persona, or expertise upon which it bases its responses.

The method of FIG. 17 also includes generating 1704, by the controller using the further augmented AI model, one or more ratings for the entity in relation to the custom attribute based on an AI-driven analysis of the plurality of entity profiles in the entity database. In some examples, the controller 1101 generates 1704 the one or more ratings for the entity by constructing one or more prompts for the AI model 1105. For example, for a particular attribute, the controller 1101 may map the attribute to a predefined prompt for the attribute. In another example, the controller 1101 may construct a prompt by compiling relevant properties of the entity, such as entity type, to provide a more tailored prompt to the AI model. The controller 1101 submits the prompt to the AI model 1105 via an API to provide a quantitative score or qualitative prediction for the entity based on the attribute. For example, the AI model 505 may predict a 25% chance of bankruptcy in 5 years or a score of '8' on financial health. The controller 1101 utilizes the result of the AI model to determine a rating for the entity. For example, the controller 1101 may provide a series of prompts and synthesize a rating based on an aggregate of the responses. The rating can be, for example, a valuation assessment, a risk assessment, a score in relation to a particular attribute, or an overall quality score.

The method of FIG. 17 also includes updating 1706, by the controller, the entity profile with the one or more ratings. In some examples, the controller 1101 updates 1706 the entity profile to include the rating in an entity profile field for that rating. For example, an entity profile may have a field corresponding to a valuation assessment, a risk assessment, a score in relation to a particular attribute, or an overall quality score.

Figure 18:
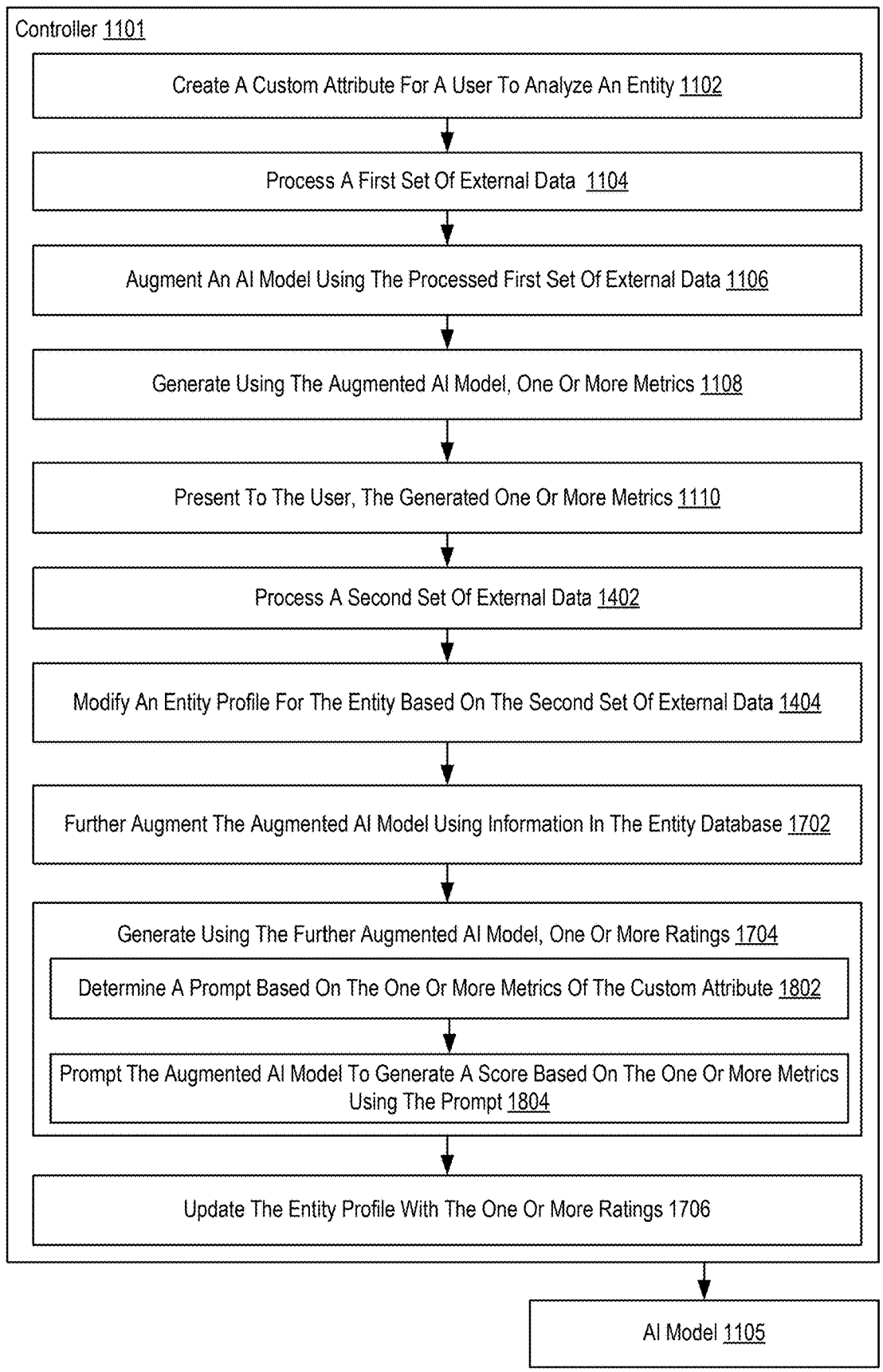
FIG. 18 sets forth a flowchart of another example method of customized integrated entity analysis using an AI model in accordance with the present disclosure.

For further explanation, FIG. 18 sets forth a flow chart of an example method for custom integrated entity analysis using an AI model in accordance with at least one embodiment of the present disclosure. The method of FIG. 18 is similar to the method of FIG. 17 in that the method of FIG. 18 includes the elements of FIG. 17. In the method of FIG. 18, generating 1704, by the controller using the further augmented AI model, one or more ratings for the entity in relation to the custom attribute based on an AI-driven analysis of the plurality of entity profiles in the entity database includes determining 1802 a prompt based on the one or more metrics of the custom attribute. In some implementations, the controller 1101 determines 1802 the prompt by mapping the attribute to a set of metrics. For example, the set of metrics for a particular attribute can be predefined. The set of metrics may vary according to the type of entity being evaluated. In a particular example, a 'financials' attribute is based on a set of metrics that includes revenue, profitability, debt, funding, and other metrics relevant to the financial health of a company. In this example, the controller 1101 constructs a prompt based on these metrics.

In the example of FIG. 18, generating 1704, by the controller using the further augmented AI model, one or more ratings for the entity in relation to the custom attribute based on an AI-driven analysis of the plurality of entity profiles in the entity database includes prompting 1804 the augmented AI model to generate a score based on the one or more metrics using the prompt. In some examples, the controller 1101 prompts 1804 the AI model 1105 by instructing the AI model 1105 to generate a score for the attribute based the metrics.

Figure 19:
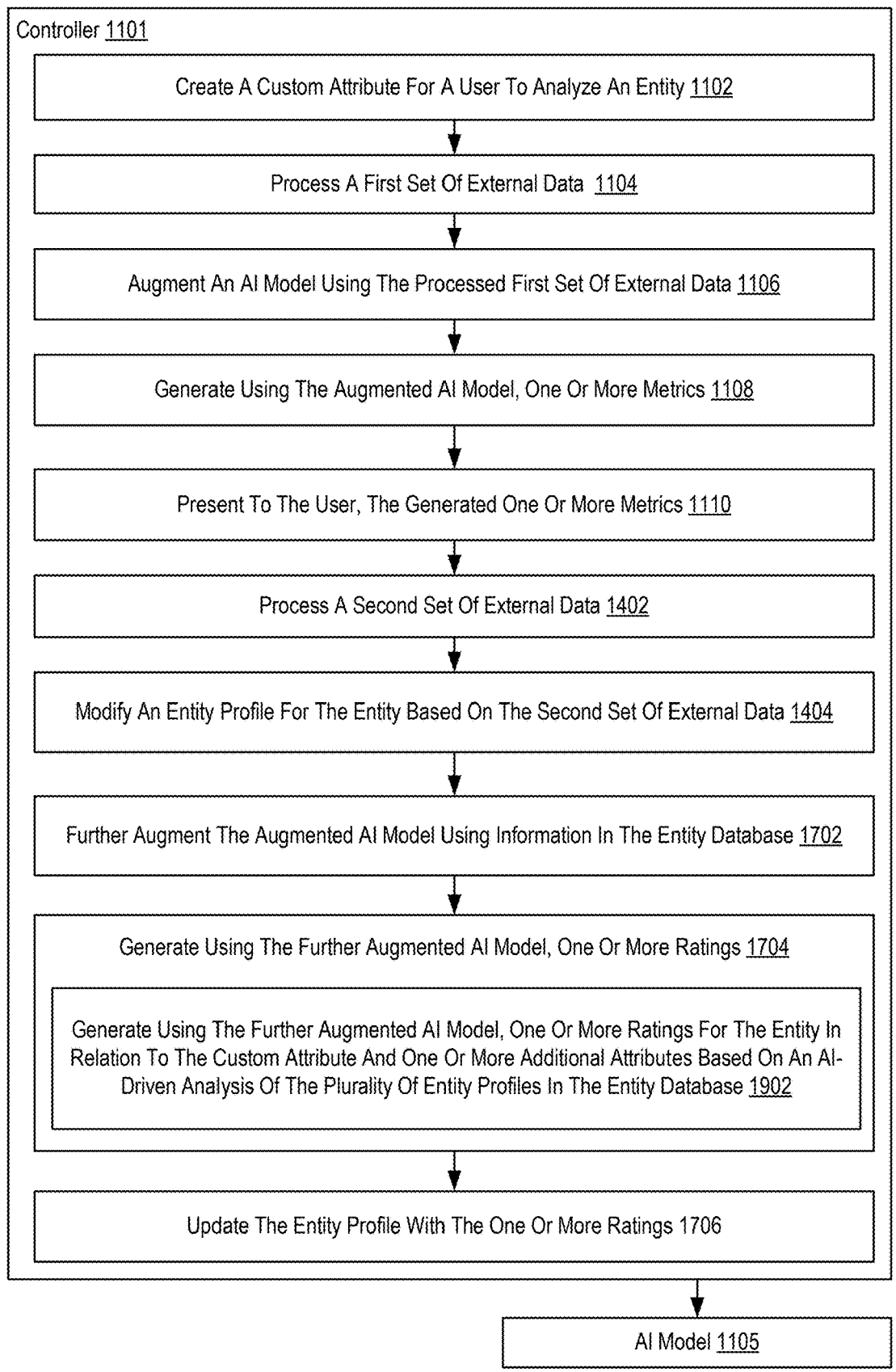
FIG. 19 sets forth a flowchart of another example method of customized integrated entity analysis using an AI model in accordance with the present disclosure.

For further explanation, FIG. 19 sets forth a flow chart of an example method for custom integrated entity analysis using an AI model in accordance with at least one embodiment of the present disclosure. The method of FIG. 19 is similar to the method of FIG. 17 in that the method of FIG. 18 includes the elements of FIG. 17. In the method of FIG. 19, generating 1704, by the controller using the further augmented AI model, one or more ratings for the entity in relation to the custom attribute based on an AI-driven analysis of the plurality of entity profiles in the entity database includes generating 1902, by the controller using the further augmented AI model, one or more ratings for the entity in relation to the custom attribute and one or more additional attributes based on an AI-driven analysis of the plurality of entity profiles in the entity database. In some examples, the controller 1101 generates 1902 the one or more ratings for the entity by constructing one or more prompts for the AI model 1105. For example, for a particular attribute, the controller 1101 may map the attribute to a predefined prompt for the attribute. In another example, the controller 1101 may construct a prompt by compiling relevant properties of the entity, such as entity type, to provide a more tailored prompt to the AI model. The controller 1101 submits the prompt to the AI model 1105 via an API to provide a quantitative score or qualitative prediction for the entity based on the attribute. For example, the AI model 1105 may predict a 25% chance of bankruptcy in 5 years or a score of '8' on financial health. The controller 1101 utilizes the result of the AI model to determine a rating for the entity. For example, the controller 501 may provide a series of prompts and synthesize a rating based on an aggregate of the responses. The rating can be, for example, a valuation assessment, a risk assessment, a score in relation to a particular attribute, or an overall quality score.

Figure 20:
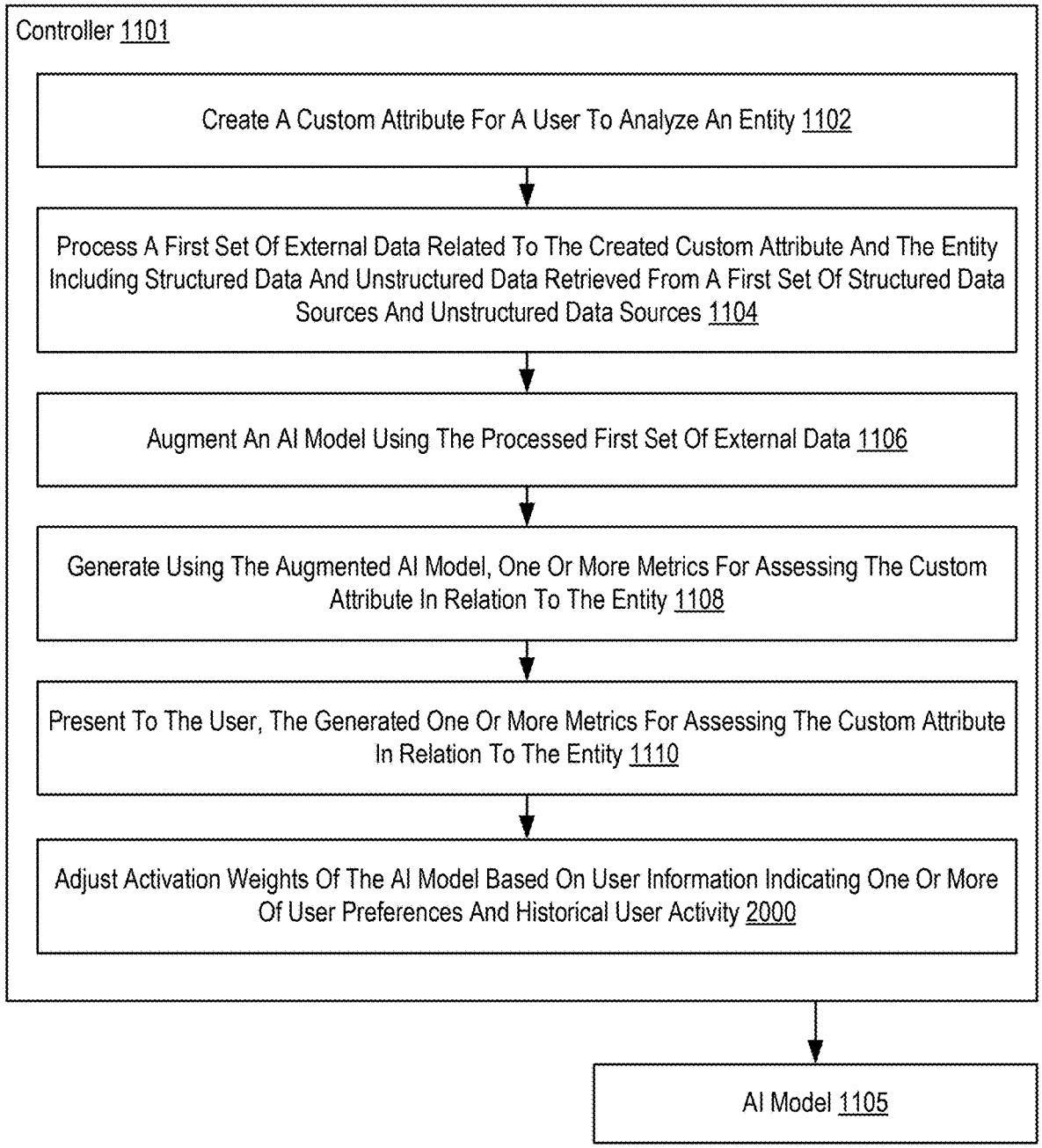
FIG. 20 sets forth a flowchart of another example method of customized integrated entity analysis using an AI model in accordance with the present disclosure.

For further explanation, FIG. 20 sets forth a flow chart of an example method for custom integrated entity analysis using an AI model in accordance with at least one embodiment of the present disclosure. The method of FIG. 20 is similar to the method of FIG. 11 in that the method of FIG. 20 includes the elements of FIG. 11. The method of FIG. 20 also includes adjusting 2000 activation weights of the AI model based on user information indicating one or more of user preferences and historical user activity. In some examples, the controller 1101 adjusts 2000 the activation weights of the AI model 1105 by tuning the model based on historical user behavior. In some examples, the historical user behavior is based on a dataset that indicates proposals that the user has accepted or rejected. The proposals can be, for example, investment opportunities, deals, and so on. Tuning the AI model 1105 can include inputting data indicating the proposals as well as an indication as to whether the user accepted or rejected the proposal. For example, the data indicating the proposal can include a summary of the proposal, entities involved in the proposal, and so on. The activation weights of the AI model are changed based on the data indicating the user behavior.

Figure 21:
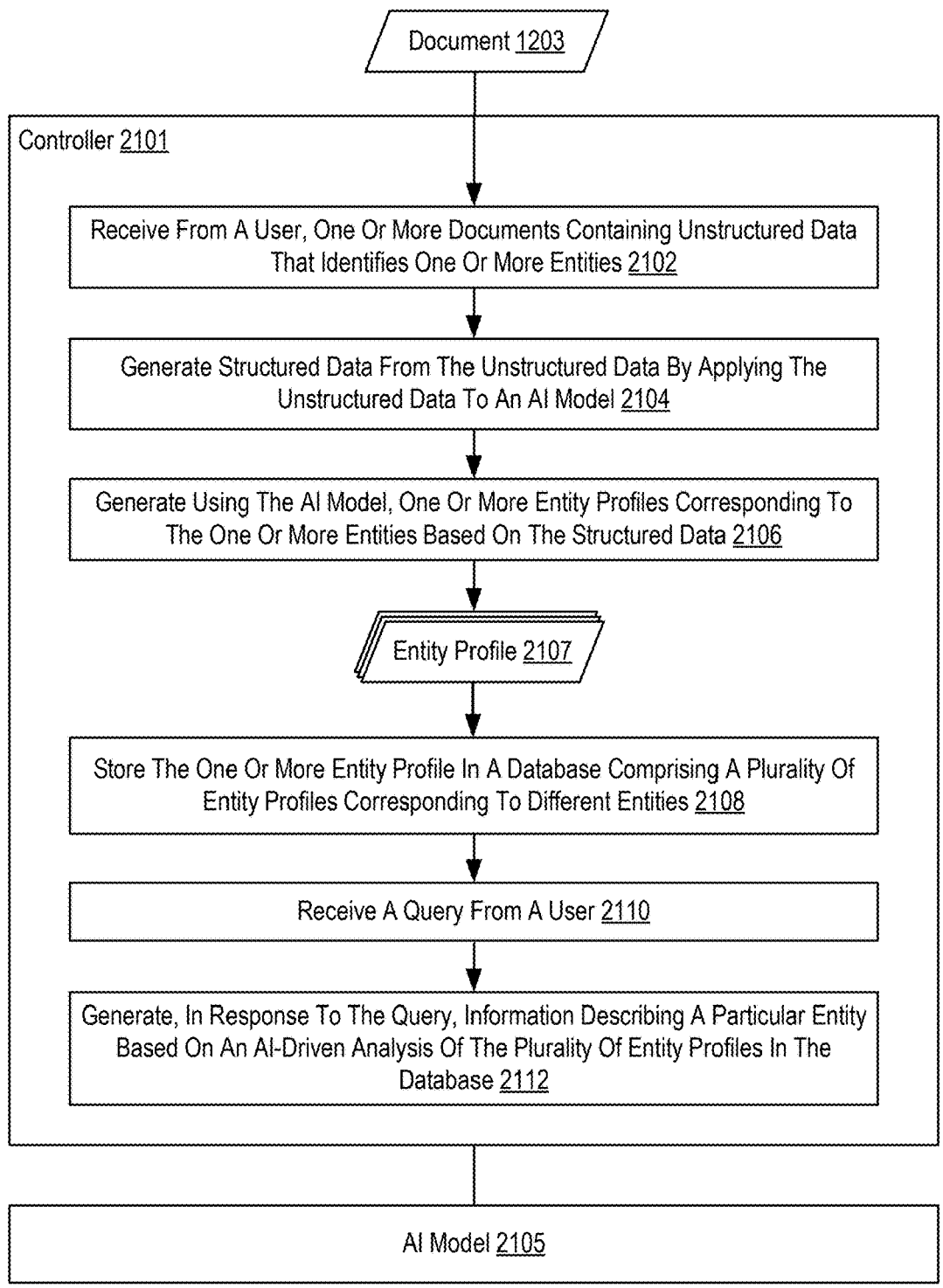
FIG. 21 sets forth a flowchart of an example method of structuralizing unstructured user data for analysis using AI in accordance with at least one embodiment of the present disclosure.

For further explanation, FIG. 21 sets forth a flow chart of an example method for structuralizing unstructured user data for analysis using AI in accordance with at least one embodiment of the present disclosure. The example method of FIG. 21 can be implemented in a data analysis system such as the integrated entity analysis system 100 described with reference to any of FIGS. 1-4. The example method of FIG. 21 includes receiving 2102, by a controller 2101 from a user, one or more documents 2103 containing unstructured data that identifies one or more entities. In some implementations, the controller 2101 is a service adapted to receive an email from a user. For example, the email may include a mention of an entity or a description of an entity, such as a company, fund, deal, and so forth. Additionally, or alternatively, the email can include one or more attached documents that include a description of an entity. In such examples, the controller 2101 extracts the attached documents from the email. For example, an attachment may be a prospectus, presentation, press release, report (e.g., annual or earnings report), another email, and so on. In other examples, the controller 2101 provides a user interface or API that allows a user to upload documents to the controller 2101.

In some examples, the documents 2103 can include the name of a company, person, product, fund, asset, and so on. In some examples, the controller the documents identify multiple entities. For example, where one identified entity is a company, the documents 2103 can also indicate another entity such as an officer or founder of the company. The documents 2103 may describe characteristics of the entity. For example, in the case of a company entity the documents may indicate characteristics such as valuation data, investor records, legal issues, financial data, and intellectual property information. In some cases, the documents 2103 may describe a funding round, a deal, an endorsement, and so on. In some cases, the documents 2103 may include information relating historical user behavior such as previous investments the user has made or previous deals the user has participated in, as well as investment opportunities and deals that the user has rejected.

In some implementations, the controller 2101 a user identifier, such as the sender of the email or a domain of the sender. The identifier can be used to link the user to a particular account, which can be associated with a particular entity dataset or historical user data. The received emails or documents can be stored in a database for further reference or use.

In some implementations, the controller 2101 processes raw unstructured data from the documents 2103 by parsing and/or filtering the raw unstructured data using a natural language processor. In these implementations, parsing and/or filtering the raw unstructured data distills the data to remove non-relevant or extraneous data. The controller 2101 can employ natural language processing techniques to determine the context of the unstructured data and thus its relevance to an entity profile.

The method of FIG. 21 also includes generating 2104, by the controller 2101, structured data from the unstructured data by applying an AI model 2105 to the unstructured data. For example, the AI model 2105 can be the machine learning model 180 of FIGS. 1-4. In some examples, the controller 2101 generates 2104 the structured data from the unstructured data by formulating one or more prompts to the AI model 2105 based on the unstructured data (e.g., the raw or processed unstructured data). For example, the controller 2101 can select a piece of content from the unstructured data and call an API of the AI model 2105 to generate a structure for that content that organizes the data into a set of fields. In such an example, the AI model 2105 can analyze the unstructured data to extract data fields using natural language processing and classification techniques. For example, the AI model 2105 may include a classifier neural network. As an illustrative example, the AI model 2105 may analyze unstructured data describing a company and generate a set of fields that include industry, founder, CEO, etc., for the company. Thus, in some examples, the AI model 2105 returns a property/value pair for data extracted from the unstructured data, where the property is corresponds to the data field and the value is the data corresponding to that the field (e.g., industry: pharmaceutical). Thus, the AI model 2105 generates structuralized data from the unstructured data.

In some implementations, the AI model 2105 generates the fields for the unstructured data based on one or more structured templates. For example, the AI model 2105 may be trained, tuned, or augmented based on the structured templates to identify data corresponding to fields in those templates, as will be explained in more detail below. In other implementations, the AI model 2105 generates the fields dynamically based on data elements that are recognized from the unstructured data, as will be explained in more detail below.

The method of FIG. 21 also includes generating 2106, by the controller 2101 using the AI model 2105, one or more entity profiles 2107 corresponding to the one or more entities based on the structured data. For example, the controller 2101 can generate 2106 an entity profile for each entity identified in the documents 2103. The controller 2101 can generate 2106 an entity profile by either creating an entity profile or updating an existing entity profile. In some examples, the controller 2101 generates 2106 an entity profile 2107 by populating one or more fields of the entity profile with a respective value that is extracted from the retrieved data using the AI model 2105. In some implementations, the controller 2101 populates one or more fields of the entity profile 2107 by mapping one or more fields of the entity profile to one or more fields of the structuralized data derived from the unstructured data. In some examples, a template for the entity profile is selected based on the entity type. Values from the property/value pairs can then be mapped to the entity profile based on a correspondence between the entity profile fields and the property type of the property/value pairs. In other implementations, a specific template is not relied upon and the property fields identified by the AI model 2105 are adopted as the fields of the entity profile. In this case, the entity profile is created or updated using the property/value fields directly. In still other implementations, the template for the entity profile is modified to include additional fields based on property/value fields that do not have a correspondence to a field in the entity profile.

In some cases, after extracting data for the entity profile from the structured data and unstructured data, one or more fields of the entity profile may be unfilled or 'null.' In some cases, the AI model 2105 may return a property/value pair with a null value, in that the AI model 2105 identified a property of the entity but could not identify a value for the property. In some cases, the identification of a property of the entity may spawn additional fields to include in the entity profile. For example, upon identifying that a company is a startup company, there may be additional fields specifically related to a startup company, or there may be a particular template for an entity profile of a startup company. As such, the controller may retrieve additional unstructured data from other external data sources, structuralize the unstructured data, and update the entity profile according to the additional data. For example, the controller 2101 can identify, based on data missing from an existing field or the identification of new or additional fields, that some element of data is missing from the entity profiles and retrieve additional data that is relevant to the missing element.

For purposes of illustration only, consider an example where the controller 2101 receives a document 2103 from the user and identifies the following natural language content: "XYZ Corporation is a market innovator of cybersecurity software. Founder Bill Smith started XYZ Corporation as a CRM service provider before switching the direction to cybersecurity. Having earned $1 million in revenue last year, XYZ corporation now has 50% market share in its sector. A recent funding round valued XYZ Corporation at $300 million. XYZ Corporation has 1000 employees."

In this illustrative example, the controller 2101 determines a structure for the unstructured data by, for example, formulating a prompt to the AI model 2105 that includes the above natural language content. The AI model 2105 may return property/value pairs as follows: "Company Name: XYZ Corporation; Industry: Cyber Security; Founding Date: Null; Founder: Bill Smith; Annual Revenue: $1M; Market Share: 50%; Valuation: $300M; Funding Stage: Null; Location: Null; Number of Employees: 1000; Notable Investors: Null; Growth stage: Null"

In this illustrative example, the controller populates one or more fields of the entity profile 2107 with data from the property/value pairs that was extracted using the AI model 2105. The controller 2101 selects a template for the entity based on the type of entity. For example, there may be a particular template that the system utilizes for a company entity category. The controller 2101 then identifies a correspondence between the fields of this template and the properties of the property/value pairs. Consider, in this example, that there is a correspondence between fields of the entity profile template and all of the properties returned by the AI model 2105 except for 'location' and 'number of employees.' Except for these two properties, the controller 2101 populates the entity profile with the data from the property/value pairs. Further, the controller identifies that there are multiple fields of the entity profile that are populated with null values.

The method of FIG. 21 also includes storing 2108, by the controller 2101, the one or more entity profile 2107 in a database comprising a plurality of entity profiles corresponding to different entities. As discussed above, the entity profile can be stored as one or more records (e.g., tables) in a relational database, or may be stored as a JSON object. The entity profile 2107 is included among multiple entity profiles in an entity dataset. The entity dataset may be associated with a particular user of the system.

The method of FIG. 21 also includes receiving 2110, by the controller 2101, a query from a user. In some examples, the controller 2101 receives 2110 a query from a user by receiving a natural language query through email or a web-based API. In some implementations, the controller 2101 services a graphical user interface presented to the user. In some examples, the controller 2101 utilizes a natural language processor to identify one or more entity names and, in some cases, one or more attributes, metrics, or other information to use when answering the query. The controller 2101 can respond to such queries based on information in the database. For example, in response to a query for an entity, the controller 2101 may return the entity profile, valuation predictions for the entity, deals associated with the entity, products associated with the entity, and so on. In some implementations, the controller 2101 can receive a query that requires correlation of information across multiple entity profiles. For example, a query for a particular entity may require looking at related entities (e.g., related by partnerships, deals, founder, personnel, etc.) or similar entities (e.g., similar by sector, size, growth stage, valuation, etc.).

The query may identify one or more entities and/or one or more attributes. For example, a query may request information about a particular entity (e.g., "tell me about XYZ Corporation"), information about an entity in relation to a specific attribute (e.g., "tell me about the valuation of XYX Corporation"), or information on how one entity compares or relates to another entity (e.g., compare the valuation of XYZ Corporation to YYZ Corporation"). As another example, a query may identify a particular attribute or characteristic and request information on entities based on that characteristic (e.g., "return the top five companies in terms of valuation").

The method of FIG. 21 also includes generating 2112, by the controller 2101 in response to the query, information describing a particular entity based on an AI-driven analysis of the plurality of entity profiles in the database. In some examples, the controller 2101 generates 2112 the information describing the particular entity by formulating one or more prompts to the AI model 2105 to generate a response to the query. In some examples, the controller 2101 augments the AI model 2105 with contextual information for responding to the query, as will be described in more detail below. In some implementations, the controller 2101 provides the response to the query by displaying a response on a user interface o. In some implementations, the controller 2101 provides the response to the query by sending the response to the user via email. The response can include, for example, natural language AI-driven insights about the entity.

Figure 22:
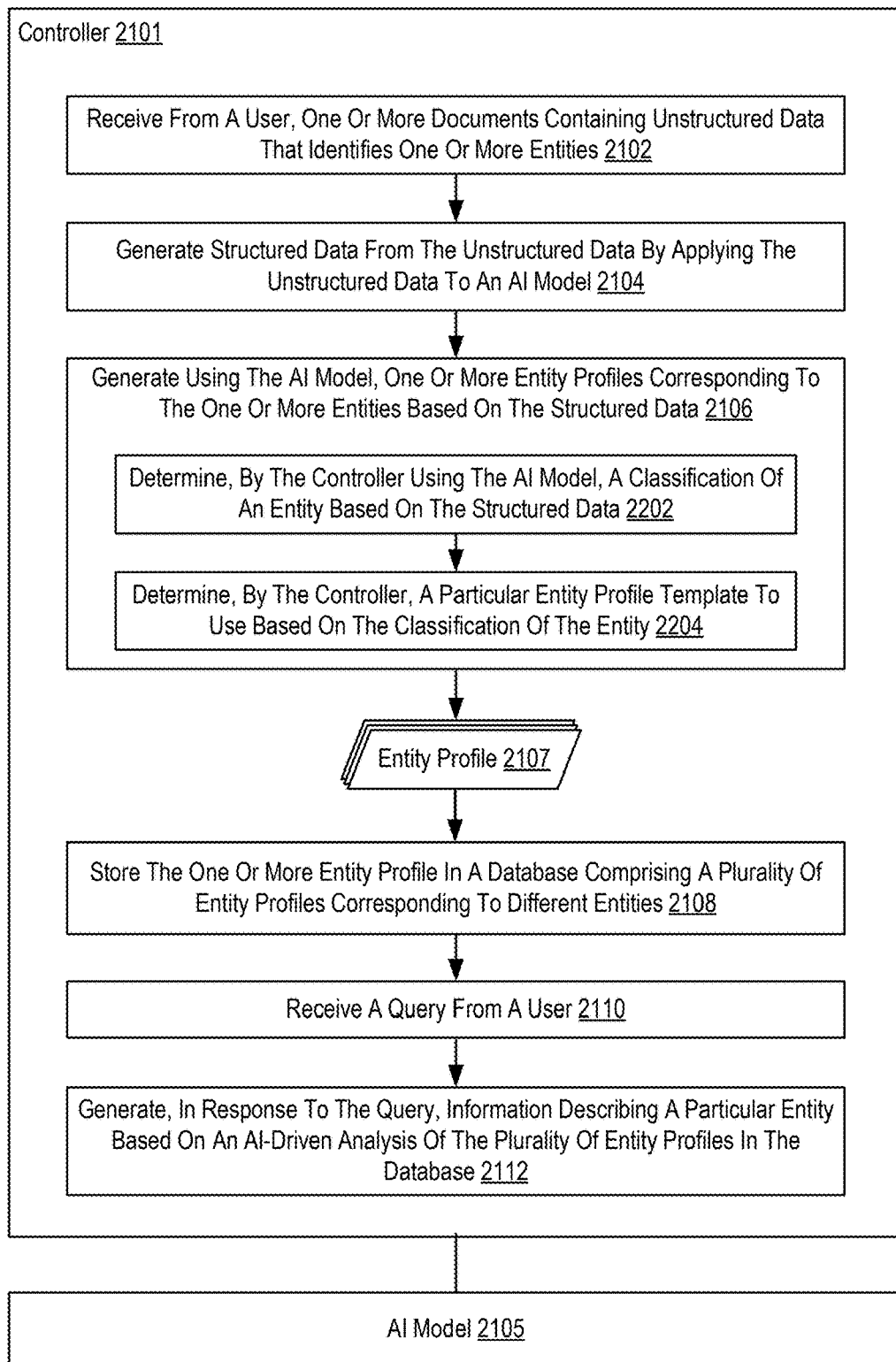
FIG. 22 sets forth a flowchart of another example method of structuralizing unstructured user data for analysis using AI in accordance with at least one embodiment of the present disclosure.

For further explanation, FIG. 22 sets forth another example method of structuralizing unstructured user data for analysis using AI in accordance with at least one embodiment of the present disclosure. The method of FIG. 22 extends the method of FIG. 21 in that generating 2104, by the controller 2101, structured data from the unstructured data by applying the unstructured data to an AI model 2105 includes determining 2202, by the controller 2101 using the AI model 2105, a classification of an entity based on the structured data. In some examples, the controller 2101 determines a classification for the entity by formulating a prompt to the AI model to classify the entity. For example, the controller 2101 may formulate a prompt that includes a natural language description of the entity. As another example, the controller 2101 may formulate a prompt that includes one or more properties of the entity from the entity profile. The AI model 2105 analyzes the input and classifies the entity as a particular entity category and/or entity subtype using a classifier of the AI model 2105.

In the method of FIG. 22, generating 2104, by the controller 2101, structured data from the unstructured data by applying the unstructured data to an AI model 2105 includes also includes determining 2204, by the controller 2101, a particular entity profile template to use based on the classification of the entity. In some examples, various entity profile templates in accordance with various entity categories and/or subtypes are provided in storage accessible to the controller 2101. Based on the category or subtype of the entity, the controller 2101 locates the entity profile template for that entity or subtype. The entity profile template for a particular category or type of entity includes a set of fields specific to that type. An entity profile template for a subtype may inherit the same fields as the parent type and include additional fields. In some implementations, the AI model 2105 is augmented with a dataset of profile templates and/or a dataset of sample entity profiles. Based on an analysis of this dataset and information about the entity, the AI model 2105 can identify the particular entity profile template to use. The controller 2101 then maps the fields of the structured data to the fields of the entity profile template to generate the entity profile.

Figure 23:
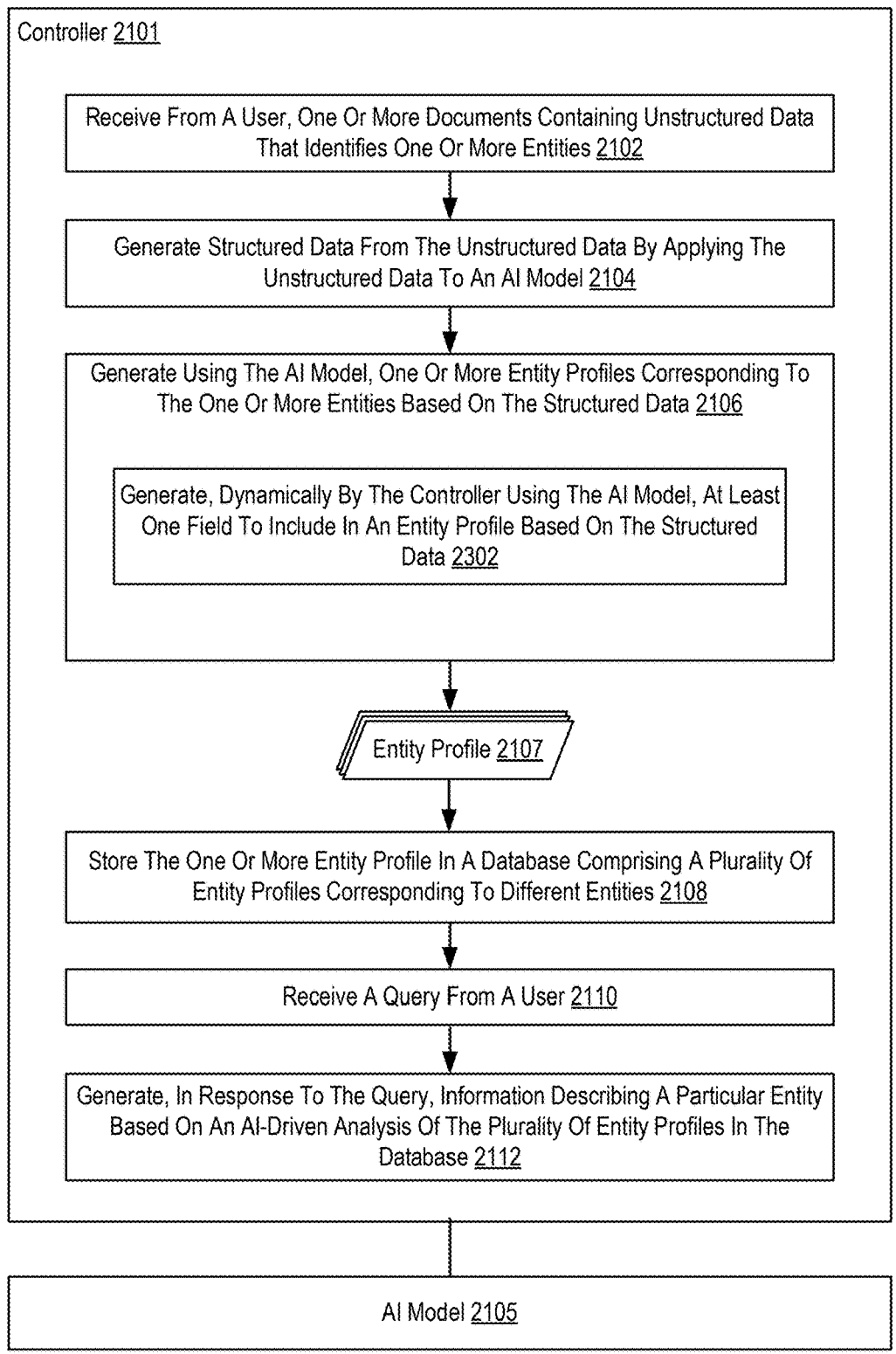
FIG. 23 sets forth a flowchart of another example method of structuralizing unstructured user data for analysis using AI in accordance with at least one embodiment of the present disclosure.

For further explanation, FIG. 23 sets forth another example method of structuralizing unstructured user data for analysis using AI in accordance with at least one embodiment of the present disclosure. The method of FIG. 23 extends the method of FIG. 21 in that generating 2104, by the controller 2101, structured data from the unstructured data by applying the unstructured data to an AI model 2105 includes generating 2302, dynamically by the controller 2101 using the AI model 2105, at least one field to include in an entity profile based on the structured data. In some examples, the controller 2101 identifies a property/value pair from the structuralized data, derived from the unstructured data, that does not correspond to a known field. In some implementations, the controller 2101 dynamically generates a new field for the entity based on this property/value pair. The new field and the corresponding value extracted by the AI model 2105 are then included in the entity profile. To illustrate, consider an example where a template for a 'company'-type entity does not include a field for the number of employees. Upon identifying a property/value pair for the number of employees of the company in the unstructured data, the controller 2101 can modify the entity profile to include a field for the number of employees and populate the new field with the extracted data.

Figure 24:
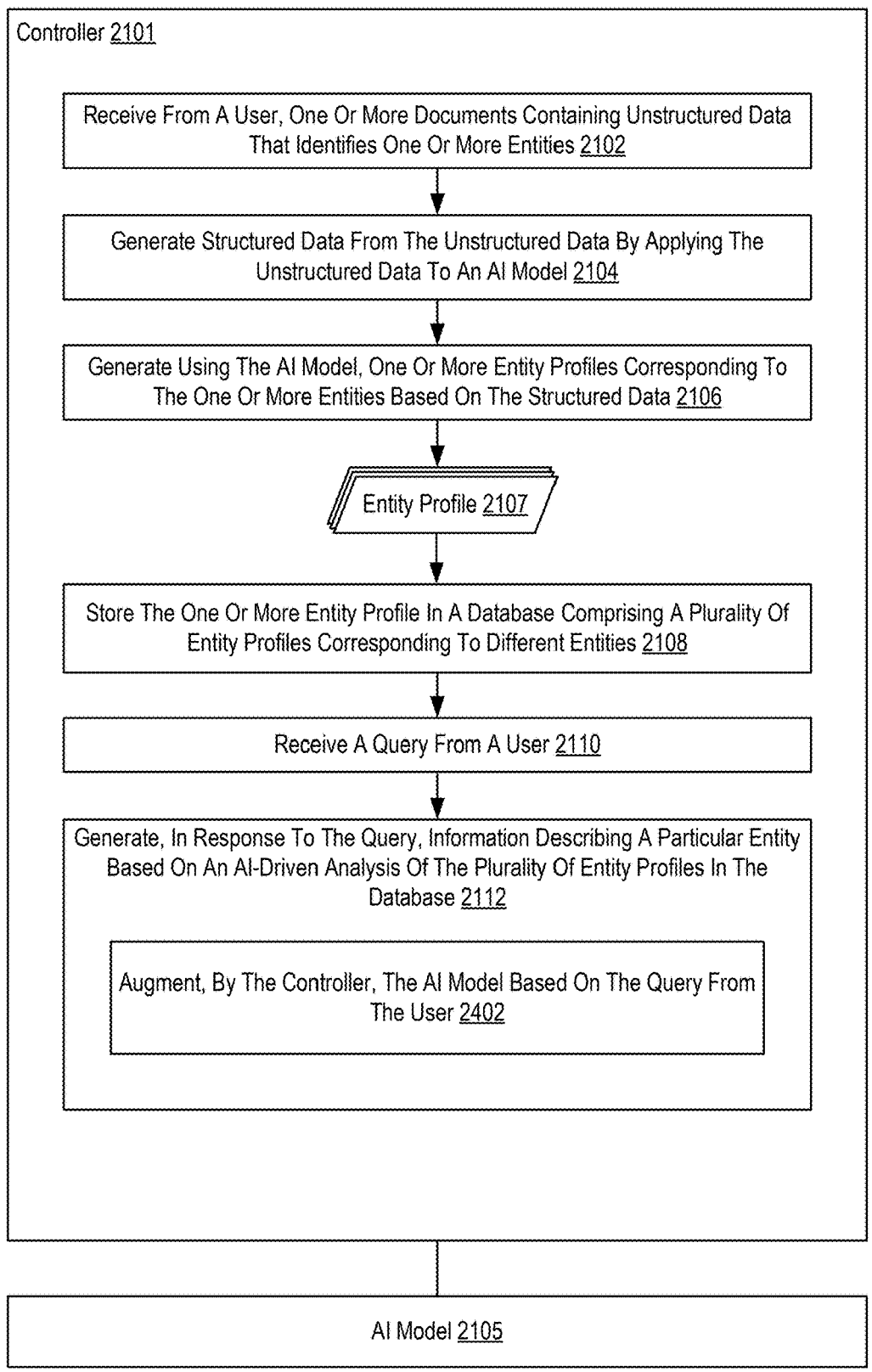
FIG. 24 sets forth a flowchart of another example method of structuralizing unstructured user data for analysis using AI in accordance with at least one embodiment of the present disclosure.

For further explanation, FIG. 24 sets forth another example method of structuralizing unstructured user data for analysis using AI in accordance with at least one embodiment of the present disclosure. The method of FIG. 24 extends the method of FIG. 21 in that generating 2112, by the controller 2101 in response to the query, information describing a particular entity based on an AI-driven analysis of the plurality of entity profiles in the database includes augmenting 2402, by the controller 2101, the AI model 2105 based on the query from the user. In some implementations, the controller 2101 augments 2402 the AI model 2105 by configuring the AI model 2105 for retrieval-augmented generation using information in the query and in the plurality of entity profiles. For example, the controller 2101 can configure the AI model 2105 for retrieval-augmented generation by linking the AI model 2105 to the dataset of entity profiles to provide a context for results generated by the AI model. In one example, entity profiles are converted to vector embeddings. An attribute definition is also converted to a vector embedding. For example, the controller 2101 may generate an attribute definition of a financials attribute as based on revenue, profit, debt, etc. A similarity search can be performed to identify portions of entity profile data that are relevant to the attribute based on the vector embedded data and the vector embedded attribute definition. The relevant profile data is then supplied as a context to the AI model for rating the entity based on the attribute. In another example, a user query is converted to a vector embedding. A similarity search is performed to identify portions of entity profile data that are relevant to the query based on the vector embedded entity profile data and the vector embedded query. The relevant profile data is then supplied as a context to the AI model for responding to the query.

In some examples, the controller 2101 augments 2402 the AI model with contextual priming. For example, the controller 2101 can generate a prompt to assign the AI model 2105 a specific role, persona, or expertise upon which it bases its responses. In some examples, the controller 2101 augments 2402 the AI model 2105 using historical user data, user test data, or hypothetical data.

Figure 25:
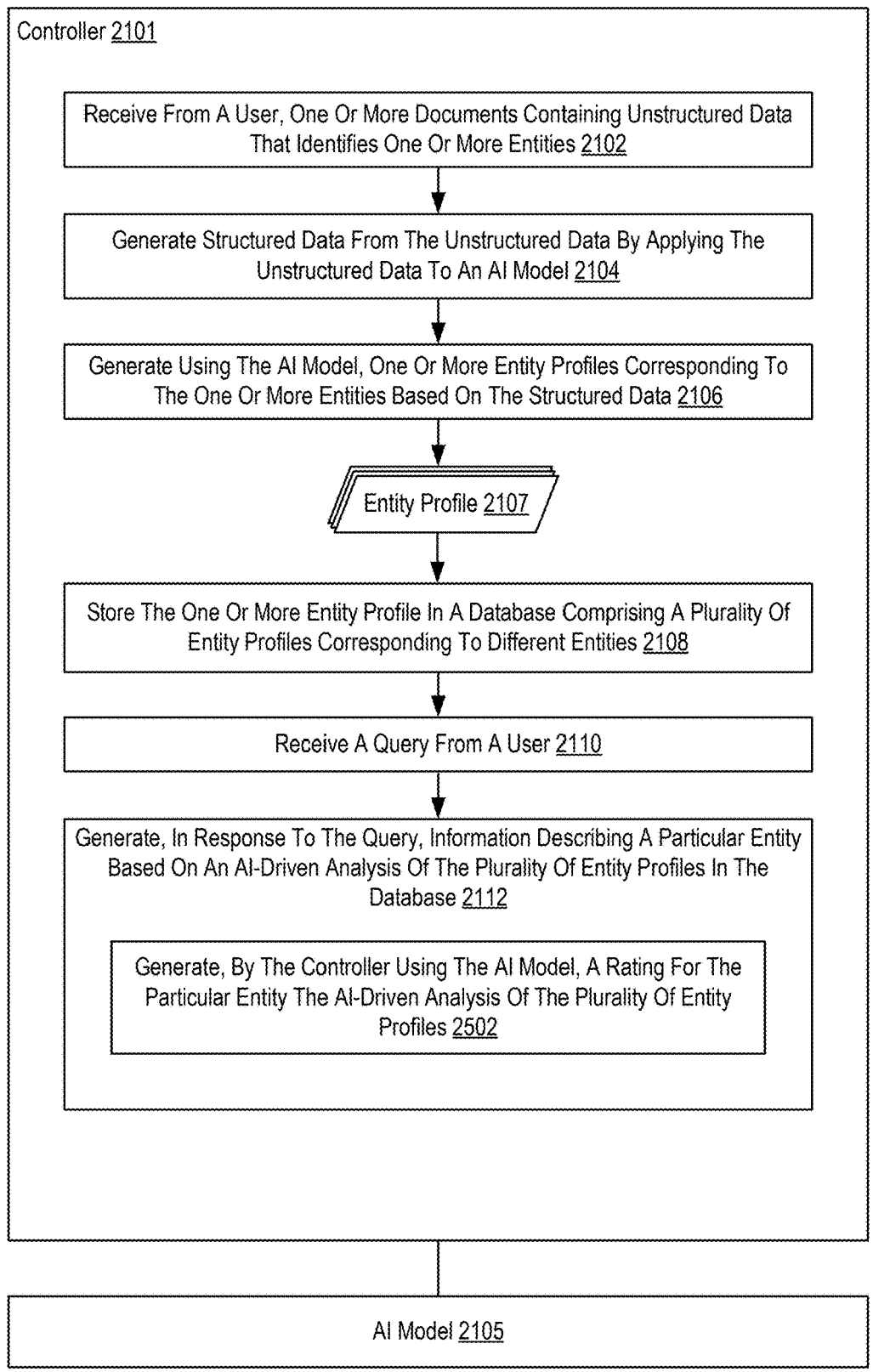
FIG. 25 sets forth a flowchart of another example method of structuralizing unstructured user data for analysis using AI in accordance with at least one embodiment of the present disclosure.

For further explanation, FIG. 25 sets forth another example method of structuralizing unstructured user data for analysis using AI in accordance with at least one embodiment of the present disclosure. The method of FIG. 25 extends the method of FIG. 21 in that generating 2112, by the controller 2101 in response to the query, information describing a particular entity based on an AI-driven analysis of the plurality of entity profiles in the database includes generating 2502, by the controller 2101 using the AI model 2105, a rating for the particular entity the AI-driven analysis of the plurality of entity profiles. In various examples, the rating can be a score or ranking (e.g., in relation to a particular attribute), a valuation assessment, a risk assessment, and so on. In some implementations, the controller 2101 generates 2502 to the rating by formulating one or more prompts to the AI model to evaluate the entity profile. For example, for a particular attribute, the controller 2101 may map the attribute to a predefined prompt for the attribute. In another example, the controller 2101 may construct a prompt by compiling relevant properties of the entity, such as entity type, to provide a more tailored prompt to the AI model. The controller 2101 submits the prompt to the AI model 2105 via an API to provide a quantitative score or qualitative prediction for the entity based on the attribute.

In some implementations, to generate a score for an attribute, the controller 2101 configures the AI model 2105 to generate a score by formulating one or more prompts to the AI model 2105 to generate a score for an attribute by, for example, listing the fields or metrics that are to be used to generate the score for the attribute. For example, for a particular attribute, the controller 2101 may map the attribute to a predefined prompt for the attribute. In another example, the controller 2101 may construct a prompt by compiling relevant properties of the entity, such as entity type, to provide a more tailored prompt to the AI model. In some examples, the controller 2101 submits the prompt to the AI model 2105 via an API to provide a relative quantitative score for the entity based on the attribute. For example, the AI model 2105 may generate a score of '8' on financial health. The controller 2101 may provide a series of prompts and synthesize a score based on an aggregate of the responses.

In other examples, the controller 2101 dynamically generates a set of metrics to use for an attribute. In some implementations, the AI model 2105 assists the controller 2101 in identifying metrics for an attribute. In these implementations, the controller 2101 identifies an attribute from the query and prompts the AI model to identify metrics for the attribute. The attributes may correspond to the fields of the entity profiles with which the AI model 2105 is augmented. For example, the controller 2101 may prompt the AI model 2105 to generate a set of metrics for financial health based on the type of entity, the industry, and/or the growth stage of the company. The controller 2101 can then feed these identified metrics back to the AI model 2105 as part of a prompt to generate the score based on these metrics.

In some illustrative examples, the controller 2101, using the AI model 2105, generates one or more scores indicating a prediction or projection for the entity. For example, the controller 2101 can generate an overall quality ranking of the company; the likelihood of the company growing its valuation; the likelihood of the company achieving a specific valuation; the likelihood of the company achieving a certain rate of return; the likelihood of the company encountering risk events, including bankruptcy and down rounds. The predictions and projections can be based, for example, on an AI-driven analysis of similar entities that are described in the entity database.

Figure 26:
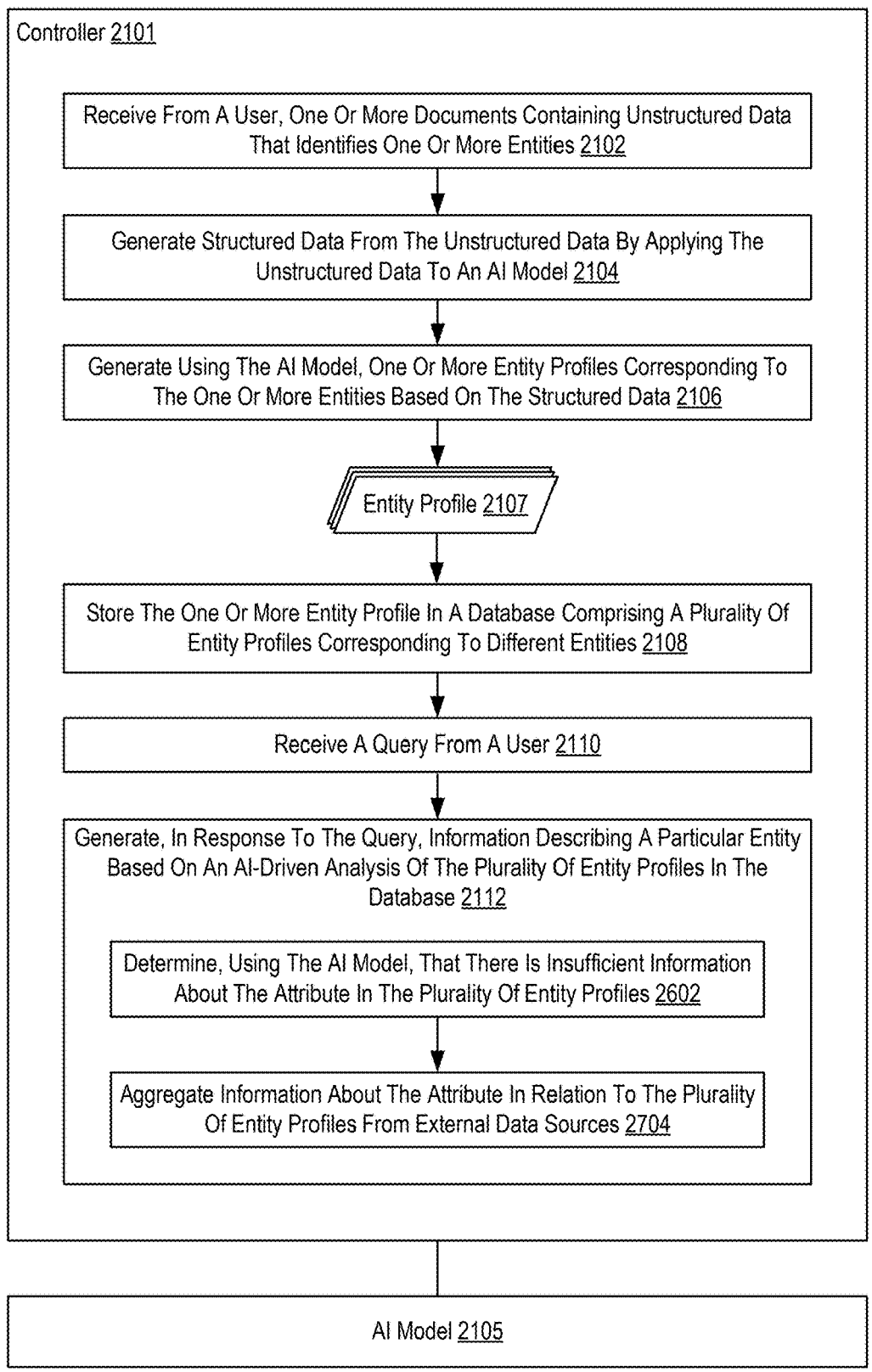
FIG. 26 sets forth a flowchart of another example method of structuralizing unstructured user data for analysis using AI in accordance with at least one embodiment of the present disclosure.

For further explanation, FIG. 26 sets forth another example method of structuralizing unstructured user data for analysis using AI in accordance with at least one embodiment of the present disclosure. The method of FIG. 26 extends the method of FIG. 25 in that generating 2502, by the controller 2101 using the AI model 2105, a rating for the particular entity the AI-driven analysis of the plurality of entity profiles includes determining 2602, using the AI model 2105, that there is insufficient information about the attribute in the plurality of entity profiles. In some examples, the controller 2101 determines 2602 that there is insufficient information about the attribute by determining that the attribute is not associated with any metrics that are present in the fields of the plurality of entity profiles. In some examples, the controller 2101 determines 2602 that there is insufficient information about the attribute by receiving an indication from the AI model 2105 that the AI model 2105 could not identify metrics to use for the attribute.

In the method of FIG. 26, generating 2502, by the controller 2101 using the AI model 2105, a rating for the particular entity the AI-driven analysis of the plurality of entity profiles also includes aggregating 2604 information about the attribute in relation to the plurality of entity profiles from external data sources. In some examples, the controller 2101 aggregates 2604 information about the attribute by searching external data sources for information about the attribute a metrics to use for the attribute. For example, the controller 2101 may use metrics for the attribute that are generated by the AI model 2105 and then search external data sources for those metrics in relation to the entity profiles currently in the database.

For illustration, consider an example where the controller 2101 receives a query to provide a top-five ranking of companies that support green initiatives. The controller 2101 and/or the AI model 2105 may determine that the entity profile structures of the entity profiles do not include any metrics that are indicative of a support for green initiatives. In such an example, the controller 2101 can formulate a prompt to the AI model 2105 to identify metrics that are associated with green initiative. In this example, the AI model 2105 identifies monetary donation to environmental conservation and stewardship organizations as one potential metric for support of green initiatives. The controller 2101 then aggregates data that links entities in the entity profiles to demonstrated monetary donations to environmental conservation and stewardship organizations by, for example, identifying unstructured data from press releases or new articles that describes such donations. The metric is added as a field to the entity profiles, and data relating an entity to the metric is added to that entity's entity profile.

Figure 27:
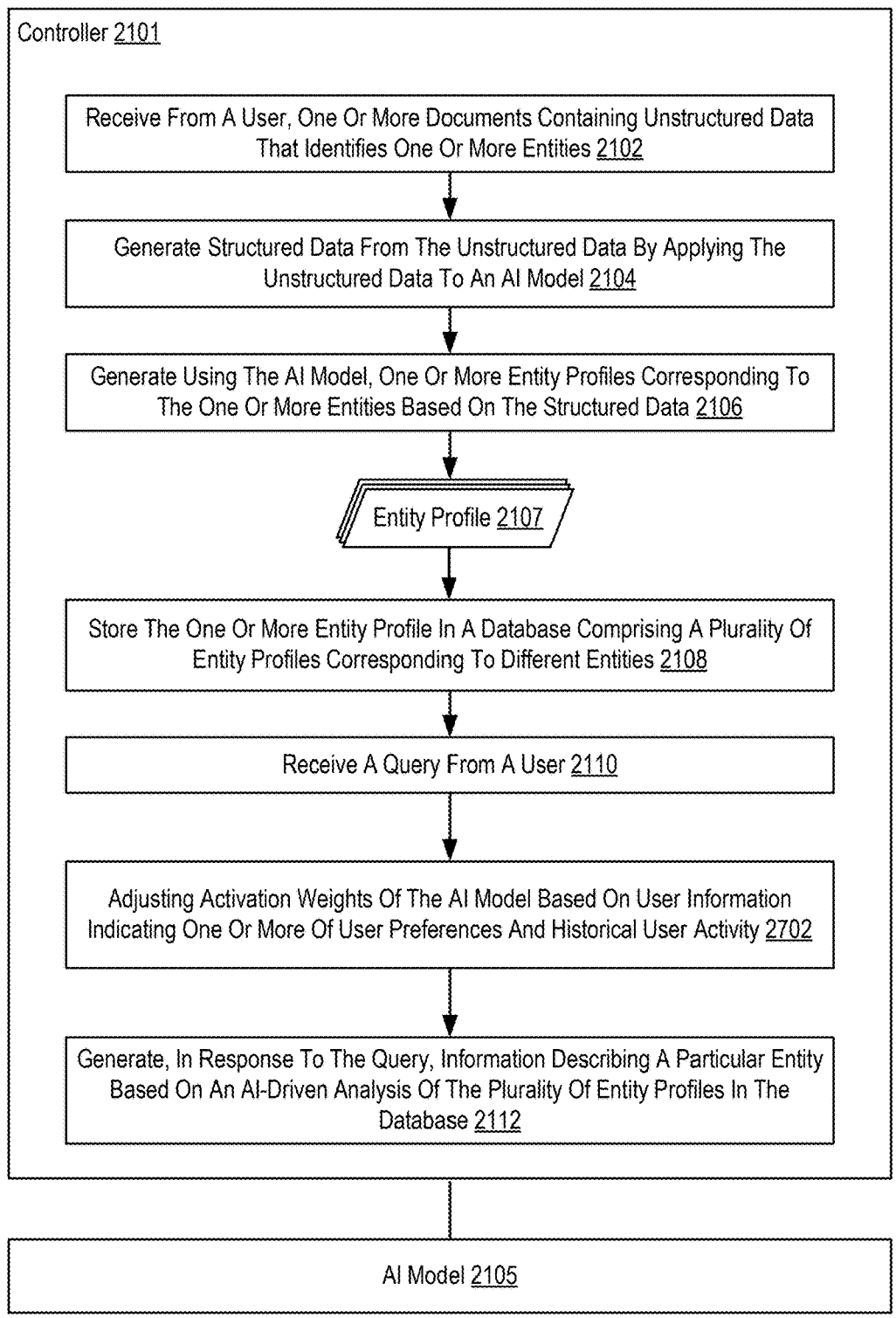
FIG. 27 sets forth a flowchart of another example method of structuralizing unstructured user data for analysis using AI in accordance with at least one embodiment of the present disclosure.

For further explanation, FIG. 27 sets forth another example method of structuralizing unstructured user data for analysis using AI in accordance with at least one embodiment of the present disclosure. The example method of FIG. 27 extends the method of FIG. 21 in that the method of FIG. 27 includes adjusting 2702 activation weights of the AI model 2105 based on user information indicating one or more of user preferences and historical user activity. In some examples, the controller 2101 adjusts 2702 the activation weights of the AI model 2105 by tuning the model based on historical user behavior. In some examples, the historical user behavior is based on a dataset that indicates proposals that the user has accepted or rejected. The proposals can be, for example, investment opportunities, deals, and so on. Tuning the AI model 2105 can include inputting data indicating the proposals as well as an indication as to whether the user accepted or rejected the proposal. For example, the data indicating the proposal can include a summary of the proposal, entities involved in the proposal, and so on. The activation weights of the AI model are changed based on the data indicating the user behavior.

In some implementations, the controller 2101 utilizes the AI model 2105 to identify proposals and sentiments related to those proposals. For example, a dataset of historical user emails can be linked to the AI model 2105 and the AI model 2105 identifies any proposals indicated by the emails, as well as whether the user accepted or rejected the proposal. In some examples, the controller 2101 controls the AI model 2105 to generate a summary of the proposal. These summaries and indications of whether the user accepted or rejected the proposal are fed back to the AI model 2105 to adjust the activation weights of the AI model based on the user behavior.

In some examples, the behavior of a hypothetical user can be used to tune the AI model 2105. For example, a dataset of user behavior for a hypothetical user can include a number of investment events including who made the investment, a macro context for investment, terms of the investment, and/or a micro context for the investment.

In some implementations, tuning the AI model 2105 includes inputting a set of user preferences. For example, a user may provide preferences to the controller 2101, such as preferences for particular types of investments, particular industries or sectors, entities associated with green or sustainability initiatives, and so on. In these implementations, the controller 2101 tunes the AI model 2105 by inputting these preferences to the AI model 2105, which changes the activation weights of the AI model. In some implementations, the controller 2101 tunes the AI model based on contextual priming to assign a specific role, persona, or expertise upon which the AI model 2105 bases its responses.

In view of the foregoing, it will be appreciated that integrated entity analysis using an AI model in accordance with the present disclosure provides a number of improvements to the technical field of data driven analysis and the computing systems that perform data driven analysis. Data driven analysis of abstract entities such as companies, assets, deals, etc. requires an analysis of many different entity characteristics from a multitude of data sources, and correlation of various characteristics to generate accurate predictions or assessments of those entities. This has typically involved manually compiling and integrating various structure and unstructured data. Conventional systems are constrained by the lack of comprehensive and up-to-date entity databases, hindering the ability of mathematical models to generate accurate insights and limiting the accuracy and effectiveness of subsequent analyses. Integrated data analysis using an AI model in accordance with the present disclosure integrates data user-provided data with structured and unstructured data from external sources to create a comprehensive dataset upon which analyses are based. The AI model provides pattern recognition and cross correlation of data to generate assessments and insights that provide a holistic real-time evaluation of the entity, thus improving the results of ratings for the entity that are generated by the integrated data analysis system.

Moreover, computing systems that perform data driven analysis of abstract entities based on algorithmic models consume significant amounts of power and expend significant amounts of heat in solving complex mathematical equations requiring multivariable analysis. Heat generation, in turn, requires energy to cool the processors. By utilizing and augmenting an AI model to facilitate data aggregation and transformation and to generate predictions and analytics based on the aggregated data, integrated data analysis using an AI model in accordance with the present disclosure reduces the processing complexities and thus reduces the amount of energy consumed and heat generated to perform these analyses, thus making the computing system more efficient.

Figure 28:
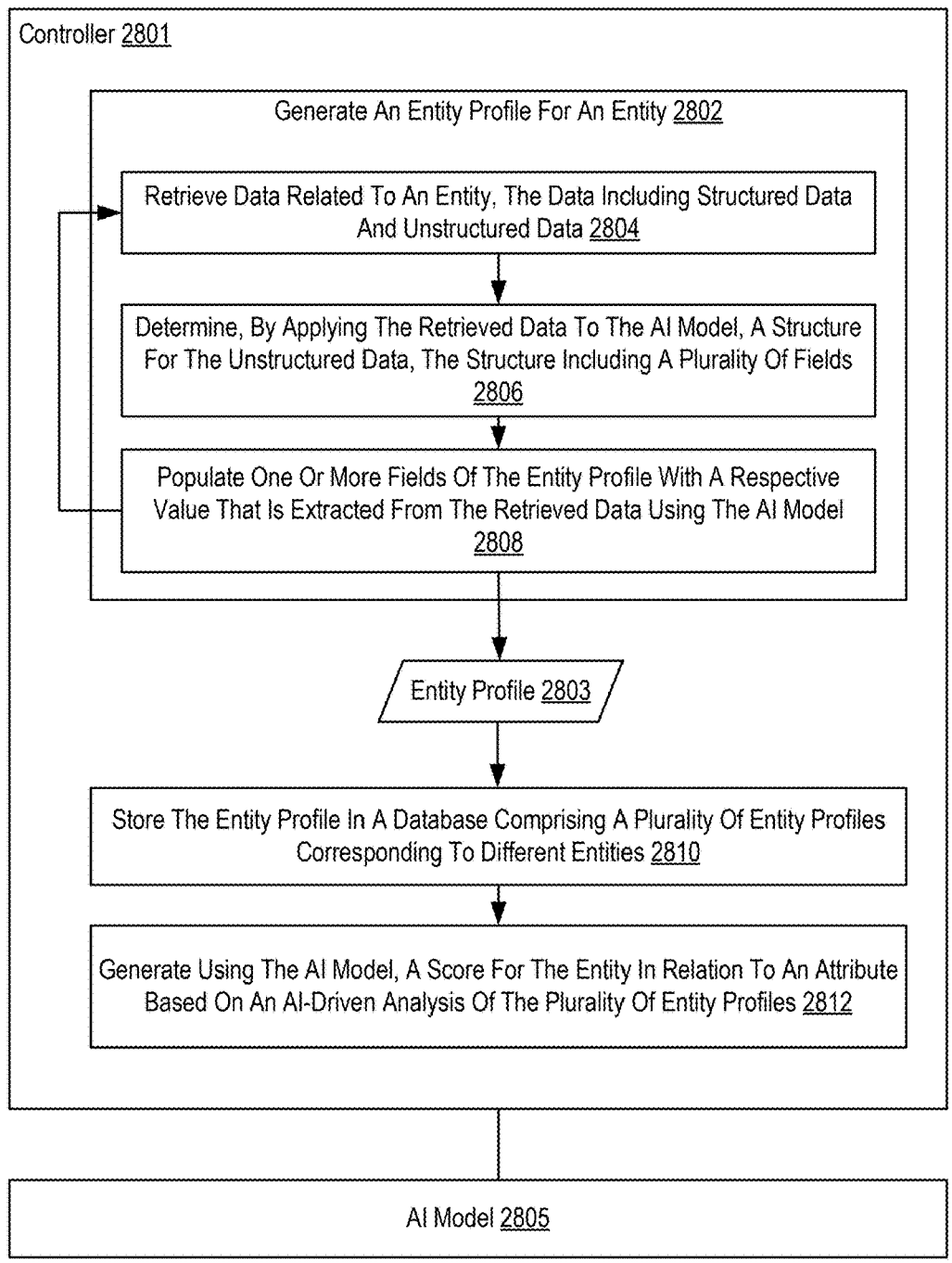
FIG. 28 sets forth a flowchart of an example method of AI-driven data aggregation and analysis for entity scoring and assessment in accordance with at least one embodiment of the present disclosure.

For further explanation, FIG. 28 sets forth a flow chart of an example method for AI-driven data aggregation and analysis for entity scoring and assessment in accordance with at least one embodiment of the present disclosure. The example method of FIG. 28 can be implemented in a data analysis system such as the integrated entity analysis system 100 described with reference to any of FIGS. 1-4. The example method of FIG. 28 includes generating 2802, by a controller 2801, an entity profile 2803 for an entity. In some examples, an entity profile is a database record, such as one or more tables or other types of data structures that include one or more fields, attributes, properties, metrics and so on. In some examples, the database record may be a JSON or other parsable data structure. The fields (or attributes, properties, metrics, etc., collectively referred to as 'fields') correspond to characteristics of the entity, such as the entity properties discussed above. In some examples, the structure of the entity profile depends upon the category of the entity and/or a subtype of a category. Examples of entity categories include a company, a person, a fund, a deal, and an asset, as discussed above, among others that will occur to those of skill in the art. Generating 2102, by a controller 2801, an entity profile 2803 for an entity can include creating a new entity profile or updating an existing entity profile.

In some implementations, generating 2102, by a controller 2801, an entity profile 2803 for an entity is carried out by the controller 2801 through an iterative process. In the example of FIG. 28, the iterative process includes retrieving 2804, by the controller 2801, data related to an entity, the data including structured data and unstructured data. In some examples, the controller 2801 retrieves 2804 data by retrieving structured data from structured data sources. In these examples, the structured data can be retrieved by executing one or more queries, such as a SQL query, on a structured database. For example, the structured database can be a relational database. In other examples, the structured database can be a parsable dataset such as an XML, JSON, or CSV dataset. In these examples, retrieving the structured data can include searching and parsing the structured data in the dataset. The structured database can be a local database, including entity profiles and bulk datasets, or a remote database. In the case of a remote database, the structured data source can be accessed, for example, through a web-based API.

In some examples, the controller 2801 retrieves 2804 data by retrieving unstructured data from unstructured data sources (e.g., Internet data sources). Examples of unstructured data sources include web sites, data feeds, news feeds, social media platforms, review platforms, and the like. In some examples, the controller 2801 searches for unstructured data related to the entity using natural language search strings to identify relevant unstructured sources. This can include, for example, using general purpose Internet search engines, domain-specific or platform integrated search modules, and other techniques. By way of illustration, a search string that identifies the name of a company may return results such as a web site of the company, a social media page for the company, a professional platform page for the company, press releases mentioning the company, news articles mentioning the company, and so on. Upon identifying relevant sources, the controller 2801 extracts unstructured natural language content from the data sources. In some examples, the controller 2801 utilizes web scraping to extract the unstructured information related to the entity. Web scraping is the process of extracting data from websites by using software or scripts to automatically gather information from web pages.

In some implementations, the controller 2801 processes the raw unstructured data by parsing and/or filtering the raw unstructured data using a natural language processor. In these implementations, parsing and/or filtering the raw unstructured data distills the data to remove non-relevant or extraneous data. For example, a posting on a review site from a previous employee of the company may not be relevant to an entity profile for the company; thus, such content may be filtered out. The controller 2801 can employ natural language processing techniques to determine the context of the unstructured data and thus its relevance to an entity profile. In some implementations, the controller 2801 ranks the unstructured data based on its quality or reliability determined from, for example, the source of the unstructured data or a search engine rank. In some examples, the data source can be ranked prior to extracting the unstructured data (e.g., by web scraping) to limit the amount of non-relevant data that is retrieved.

In the example of FIG. 28, the iterative process of generating 2802, by the controller 2801, the entity profile 2803 for the entity also includes determining 2806, by applying the retrieved data to an AI model 2805, a structure for the unstructured data, the structure including a plurality of fields. For example, the AI model 2805 can be the machine learning model 180 of FIGS. 1-4. In some implementations, the controller 2801 applies the unstructured data to the AI model 2805 to determine 2806 the structure for the unstructured data by formulating one or more prompts to the AI model 2805 based on the unstructured data (e.g., the raw or processed unstructured data). For example, the controller 2801 can select a piece of content from the unstructured data and call an API of the AI model 2805 to generate a structure for that content that organizes the data into a set of fields. In such an example, the AI model 2805 can analyze the unstructured data to extract data fields using natural language processing and classification techniques. For example, the AI model 2805 may include a classifier neural network. As an illustrative example, the AI model 2805 may analyze unstructured data describing a company and generate a set of fields that include industry, founder, CEO, etc., for the company. Thus, in some examples, the AI model 2805 returns a property/value pair for data extracted from the unstructured data, where the property is corresponds to the data field and the value is the data corresponding to that the field (e.g., industry: pharmaceutical). Thus, the AI model 2805 generates structuralized data from the unstructured data.

In some implementations, the AI model 2805 generates the fields for the unstructured data based on one or more structured templates. For example, the AI model 2805 may be trained, tuned, or augmented based on the structured templates to identify data corresponding to fields in those templates, as will be explained in more detail below. In other implementations, the AI model 2805 generates the fields dynamically based on data elements that are recognized from the unstructured data, as will be explained in more detail below.

In the example of FIG. 28, the iterative process of generating 2802, by the controller 2801, the entity profile 2803 for the entity also includes populating 2808 one or more fields of the entity profile 2803 with a respective value that is extracted from the retrieved data using the AI model 2805. In some implementations, the controller 2801 populates 2808 one or more fields of the entity profile 2803 with a respective value that is extracted from the retrieved data using the AI model 2805 by mapping one or more fields of the entity profile to one or more fields of the structuralized data derived from the unstructured data. In some examples, a template for the entity profile is selected based on the entity type. Values from the property/value pairs can then be mapped to the entity profile based on a correspondence between the entity profile fields and the property type of the property/value pairs. In other implementations, a specific template is not relied upon and the property fields identified by the AI model 2805 are adopted as the fields of the entity profile. In this case, the entity profile is created or updated using the property/value fields directly. In still other implementations, the template for the entity profile is modified to include additional fields based on property/value fields that do not have a correspondence to a field in the entity profile.

In some cases, after extracting data for the entity profile from the structured data and unstructured data, one or more fields of the entity profile may be unfilled or 'null.' In some cases, the AI model 2805 may return a property/value pair with a null value, in that the AI model 2805 identified a property of the entity but could not identify a value for the property. In some cases, the identification of a property of the entity may spawn additional fields to include in the entity profile. For example, upon identifying that a company is a startup company, there may be additional fields specifically related to a startup company, or there may be a particular template for an entity profile of a startup company. As such, the iterative process of generating 2802, by the controller 2801, the entity profile 2803 for the entity repeats one or more cycles to retrieve additional unstructured data, structuralize the unstructured data, and update the entity profile according to the additional data. For example, the controller 2801 can identify, based on data missing from an existing field or the identification of new or additional fields, that some element of data is missing from the entity profiles and retrieve additional data that is relevant to the missing element.

For purposes of illustration only, consider an example where the controller identifies the name of company, for example, based on some user input. In this example, the name of the company is XYZ Corporation that provides a cybersecurity product. In this illustrative example, the controller 2801 generates 2102 the entity profile by first retrieving 2804 data related to an entity. For example, the controller retrieves unstructured data related to XYZ Corporation from, for example, XYZ Corporation's website, a press release, a news article, etc. The controller 2801 may parse the data to remove extraneous data (e.g., information describing the history of cybersecurity). Based on the processing of the unstructured data, the controller 2801 identifies the following natural language content: "XYZ Corporation is a market innovator of cybersecurity software. Founder Bill Smith started XYZ Corporation as a CRM service provider before switching the direction to cybersecurity. Having earned $1 million in revenue last year, XYZ corporation now has 50% market share in its sector. A recent funding round valued XYZ Corporation at $300 million. XYZ Corporation has 1000 employees."

In this illustrative example, the controller 2801 determines 2806 a structure for the unstructured data by, for example, formulating a prompt to the AI model 2805 that includes the above natural language content. The AI model 2805 may return property/value pairs as follows: "Company Name: XYZ Corporation; Industry: Cyber Security; Founding Date: Null; Founder: Bill Smith; Annual Revenue: $1M;

Market Share: 50%; Valuation: $300M; Funding Stage: Null; Location: Null; Number of Employees: 1000; Notable Investors: Null; Growth stage: Null"

In this illustrative example, the controller populates 2808 one or more fields of the entity profile 2803 with data from the property/value pairs that was extracted using the AI model 2805. The controller 2801 selects a template for the entity based on the type of entity. For example, there may be a particular template that the system utilizes for a company entity category. The controller 2801 then identifies a correspondence between the fields of this template and the properties of the property/value pairs. Consider, in this example, that there is a correspondence between fields of the entity profile template and all of the properties returned by the AI model 2805 except for 'location' and 'number of employees.' Except for these two properties, the controller 2801 populates the entity profile with the data from the property/value pairs. Further, the controller identifies that there are multiple fields of the entity profile that are populated with null values.

The controller 2801 iterates the process of generating 2802 the entity profile by retrieving additional data related to the entity and the properties that have null values, namely, the founding date, funding stage (e.g., series A, series B), notable investors, and growth stage (e.g., startup). The controller 2801 uses the AI model to extract the property/value pairs from this additional data and populates the null fields of the entity profile with values extracted from the unstructured data. In an extension of the example, having identified that XYZ Corporation is a startup company, the controller 2801 may identify additional fields to include in the entity profile, or may identify another template to use for the profile, which may in turn require the retrieval of more data to populate those fields.

In this way, the controller 2801 employs the AI model 2805 to assist the generation of the entity profile such that technology resources are focused on collecting and analyzing the most relevant information while ignoring or not collecting non-relevant information. This improves resource utilization of underlying computing technology, conserves resource costs (e.g., processing time, power consumption), and improves the efficiency and accuracy of analytics derived from these curated entity profiles.

The method of FIG. 28 also includes storing 2810 the entity profile 2803 in a database comprising a plurality of entity profiles corresponding to different entities. As discussed above, the entity profile can be stored as one or more records (e.g., tables) in a relational database, or may be stored as a JSON object. The entity profile 2803 is included among multiple entity profiles in an entity dataset. The entity dataset may be associated with a particular user of the system.

The method of FIG. 28 also includes generating 2812, by the controller 2801 using the AI model 2805, a score for the entity in relation to an attribute based on an AI-driven analysis of the plurality of entity profiles. The score can be an overall quality score and/or a composite score for multiple attributes such as a score for the team behind the company, the company's product(s), the company's financial attributes, the company's marketing metrics, and/or the company's backing investors. Each attribute can be based on a selection of properties of an entity from the entity profiles, which are used to define the attribute. In some examples, the properties that are used to define that attribute may be static, such as fixed set of properties that correspond to a particular entity type. In other examples, the properties that are used to define that attribute are dynamically generated, e.g., based on user input or AI model output.

As one example, the attributes of a 'company' entity type can include team, finances, investors, product, and marketing. In turn, each of these attributes are based on a particular set of entity properties or metrics. For example, the finances attribute can be based on revenue, liquidity, debt, profit, funding, etc. As another example, the team attribute can be based on founders, corporate officers, board of directors, etc. As yet another example, a product attribute can be based on revenue, market share, etc. of a company's product. A marketing attribute can be based on particular marketing properties such as a measure of brand awareness, return on investment, customer acquisition cost, etc. An investor attribute can be based on the set of investors in an entity. To generate a score for the attribute, the metrics of one entity profile are assessed across corresponding metrics of other entity profiles in the entity database. In evaluating the attribute, these various properties can be weighted differently in accordance with a composite analysis to generate an overall score for the company. The AI model 2805 can quantify the attribute by generating a composite score for the attribute based on a cross-correlation with other entity profiles.

In some implementations, to generate a score for an attribute, the controller 2801 configures the AI model 2805 to generate a score by formulating one or more prompts to the AI model 2805 to generate a score for an attribute by, for example, listing the fields or metrics that are to be used to generate the score for the attribute. For example, for a particular attribute, the controller 2801 may map the attribute to a predefined prompt for the attribute. In another example, the controller 2801 may construct a prompt by compiling relevant properties of the entity, such as entity type, to provide a more tailored prompt to the AI model. In some examples, the controller 2801 submits the prompt to the AI model 2805 via an API to provide a relative quantitative score for the entity based on the attribute. For example, the AI model 2805 may generate a score of '8' on financial health. The controller 2801 may provide a series of prompts and synthesize a score based on an aggregate of the responses.

In other examples, the controller 2801 dynamically generates a set of metrics to use for an attribute. In some implementations, the AI model 2805 assists the controller 2801 in identifying metrics for an attribute. For example, the controller 2801 may prompt the AI model 2805 to generate a set of metrics for financial health based on the type of entity, the industry, and/or the growth stage of the company. The controller 2801 can then feed these identified metrics back to the AI model 2805 as part of a prompt to generate the score based on these metrics.

In some illustrative examples, the controller 2801, using the AI model 2805, generates one or more scores indicating a prediction or projection for the entity. For example, the controller 2801 can generate an overall quality ranking of the company; the likelihood of the company growing its valuation; the likelihood of the company achieving a specific valuation; the likelihood of the company achieving a certain rate of return; the likelihood of the company encountering risk events, including bankruptcy and down rounds. The predictions and projections can be based, for example, on an AI-driven analysis of similar entities that are described in the entity database.

Figure 29:
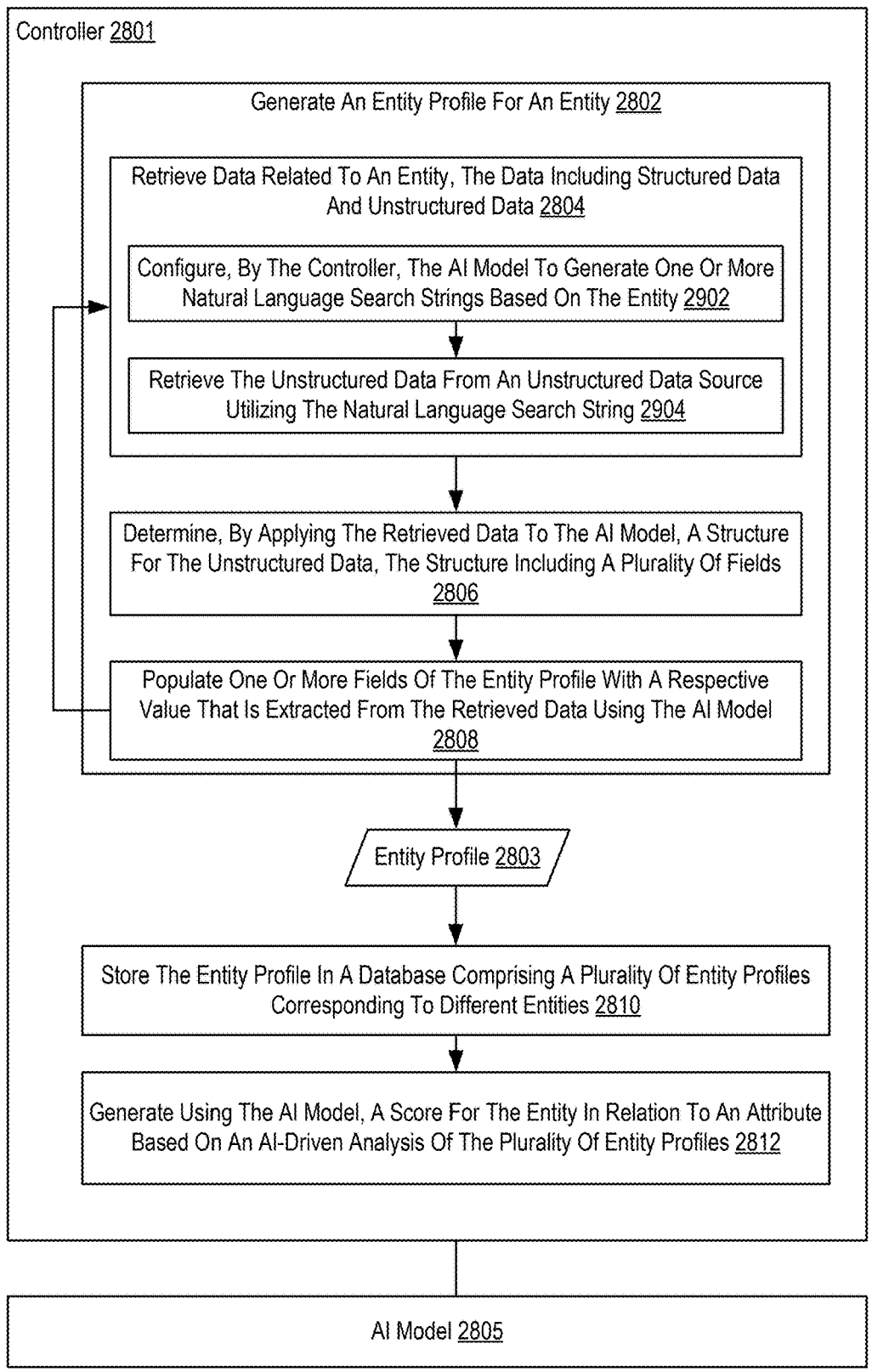
FIG. 29 sets forth a flowchart of another example method of AI-driven data aggregation and analysis for entity scoring and assessment in accordance with at least one embodiment of the present disclosure.

For further explanation, FIG. 29 sets forth another example method of AI-driven data aggregation and analysis for entity scoring and assessment in accordance with at least one embodiment of the present disclosure. The method of FIG. 29 extends the method of FIG. 28 in that retrieving 2804, by the controller 2801, data related to the entity, the data including structured data and unstructured data, includes configuring 2902, by the controller, the AI model 2805 to generate one or more natural language search strings based on the entity. In some examples, the controller 2801 configures 2902 the AI model 2805 to generate search strings by formulating a prompt to the AI model to generate search strings. In some examples, the controller 2801 identifies data missing from entity profiles, and prompts the AI model to generate a natural language query that is optimized to locate the missing data.

In the example of FIG. 29, retrieving 2904, by the controller 2801, data related to the entity, the data including structured data and unstructured data, also includes retrieving 2904 the unstructured data from an unstructured data source utilizing the natural language search string. In some examples, the controller 2801 retrieves 2904 the unstructured data by applying the natural language search string to an Internet search engine or the search facilities of one or more platforms. In some implementations, the unstructured data is retrieved by web scraping these sources.

Figure 30:
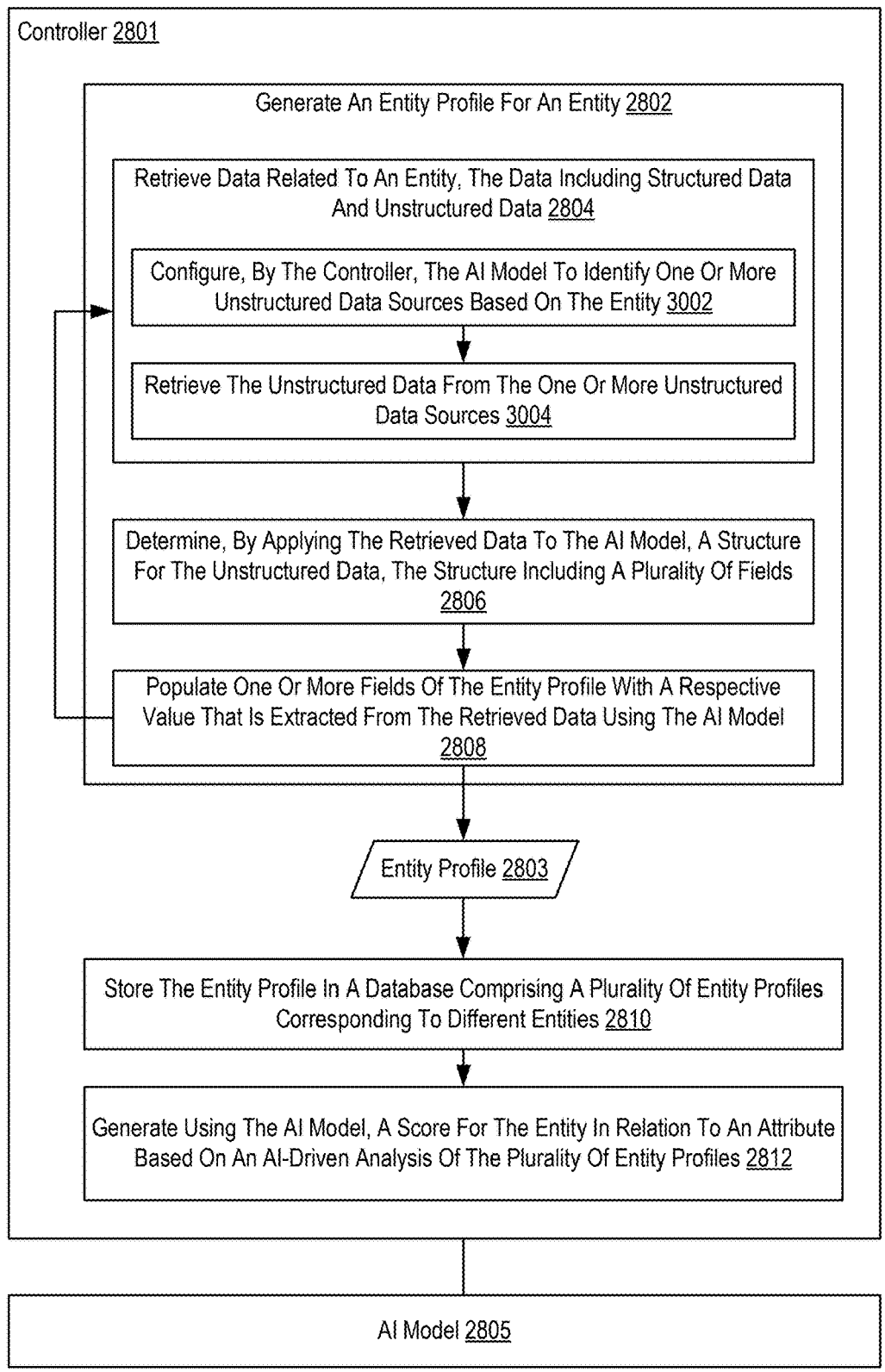
FIG. 30 sets forth a flowchart of another example method of AI-driven data aggregation and analysis for entity scoring and assessment in accordance with at least one embodiment of the present disclosure.

For further explanation, FIG. 30 sets forth another example method of AI-driven data aggregation and analysis for entity scoring and assessment in accordance with at least one embodiment of the present disclosure. The method of FIG. 30 extends the method of FIG. 28 in that retrieving 2804, by the controller 2801, data related to the entity, the data including structured data and unstructured data, includes configuring 3002, by the controller 2801, the AI model 2805 to identify one or more unstructured data sources based on the entity. In some examples, the controller 2801 configures 3002 the AI model 2805 to identify one or more unstructured data sources based on the entity by formulating a prompt to the AI model to identify unstructured data sources. In some examples, the controller 2801 identifies data missing from entity profiles, and prompts the AI model to identify a data source (e.g., a web site or database) that is likely to include the missing data.

In the example of FIG. 30, retrieving 2804, by the controller 2801, data related to the entity, the data including structured data and unstructured data, also includes retrieving 3004 the unstructured data from the one or more unstructured data sources. In some examples, the controller 2801 retrieves 2804 the unstructured data from the identified unstructured data sources by searching and/or web scraping these sources.

Figure 31:
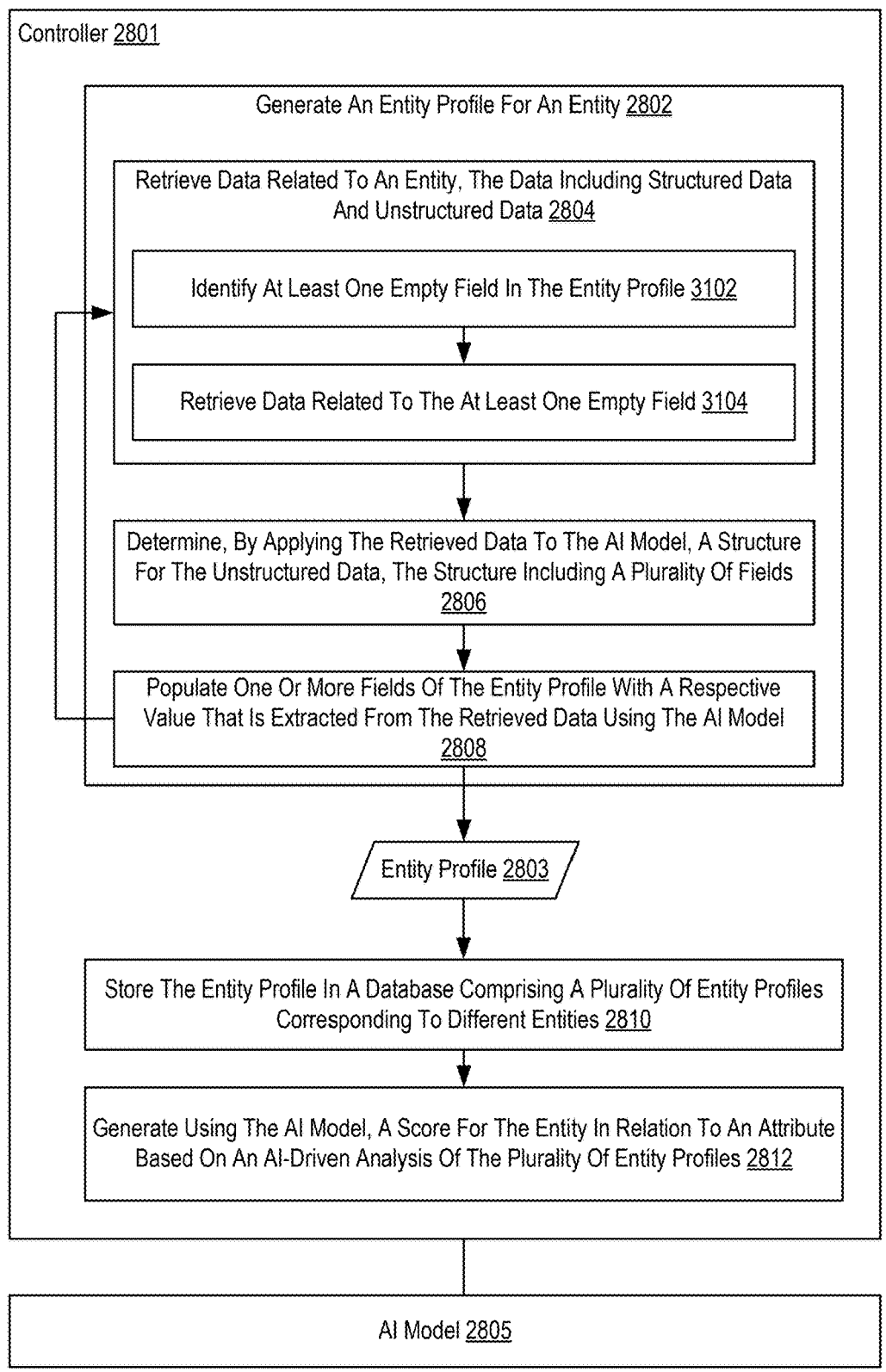
FIG. 31 sets forth a flowchart of another example method of AI-driven data aggregation and analysis for entity scoring and assessment in accordance with at least one embodiment of the present disclosure.

For further explanation, FIG. 31 sets forth another example method of AI-driven data aggregation and analysis for entity scoring and assessment in accordance with at least one embodiment of the present disclosure. The method of FIG. 31 extends the method of FIG. 28 in that retrieving 2804, by the controller 2801, data related to the entity includes identifying 3102 at least one empty field in the entity profile 2803. As previously discussed, as the entity profile is compiled, the controller 2801 may identify data missing from the entity profile, or additional data needed to complete the entity profile. For example, the missing data may be identified based on a template for the entity profile.

In the example of FIG. 31, retrieving 2804, by the controller 2801, data related to the entity also includes retrieving 3104 data related to the at least one empty field. As previously discussed, the controller 2801 may retrieve data in multiple rounds in an attempt to acquire the data for completing the entity profile. For example, the controller 2801 iterates the process of generating 2802 the entity profile by retrieving additional data related to the entity and the properties that have null values in the entity profile. The controller 2801 uses the AI model to extract the property/value pairs from this additional data and populates the null fields of the entity profile with values extracted from the unstructured data. In an extension of the example, the controller 2801 may identify additional fields to include in the entity profile, or may identify another template to use for the profile, which may in turn require the retrieval of more data to populate those fields.

Figure 32:
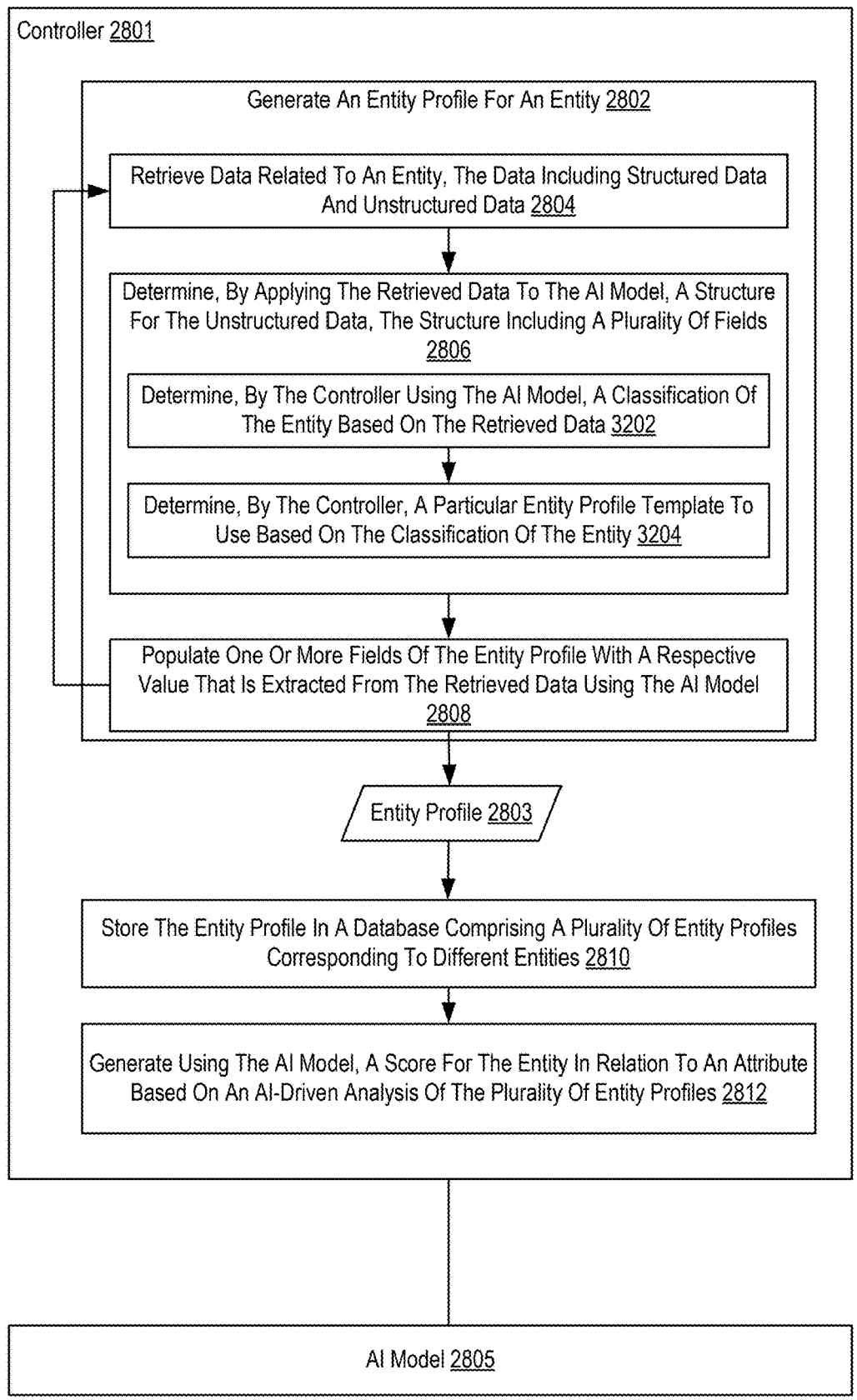
FIG. 32 sets forth a flowchart of another example method of AI-driven data aggregation and analysis for entity scoring and assessment in accordance with at least one embodiment of the present disclosure.

For further explanation, FIG. 32 sets forth another example method of AI-driven data aggregation and analysis for entity scoring and assessment in accordance with at least one embodiment of the present disclosure. The method of FIG. 32 extends the method of FIG. 28 in that determining 2806, by applying the retrieved data to an AI model 2805, a structure for the unstructured data, the structure including a plurality of fields, includes determining 3202, by the controller 2801 using the AI model 2805, a classification of the entity based on the retrieved data. In some examples, the controller 2801 determines a classification for the entity by formulating a prompt to the AI model to classify the entity. For example, the controller 2801 may formulate a prompt that includes a natural language description of the entity. As another example, the controller 2801 may formulate a prompt that includes one or more properties of the entity from the entity profile. The AI model 2805 analyzes the input and classifies the entity as a particular entity category and/or entity subtype using a classifier of the AI model 2805.

In the example of FIG. 32, determining 2806, by applying the retrieved data to an AI model 2805, a structure for the unstructured data, the structure including a plurality of fields, also includes determining 3204, by the controller, a particular entity profile template to use based on the classification of the entity. In some examples, various entity profile templates in accordance with various entity categories and/or subtypes are provided in storage accessible to the controller 2801. Based on the category or subtype of the entity, the controller 2801 locates the entity profile template for that entity or subtype. The entity profile template for a particular category or type of entity includes a set of fields specific to that type. An entity profile template for a subtype may inherit the same fields as the parent type and include additional fields. In some implementations, the AI model 2805 is augmented with a dataset of profile templates and/or a dataset of sample entity profiles. Based on an analysis of this dataset and information about the entity, the AI model 2805 can identify the particular entity profile template to use.

Figure 33:
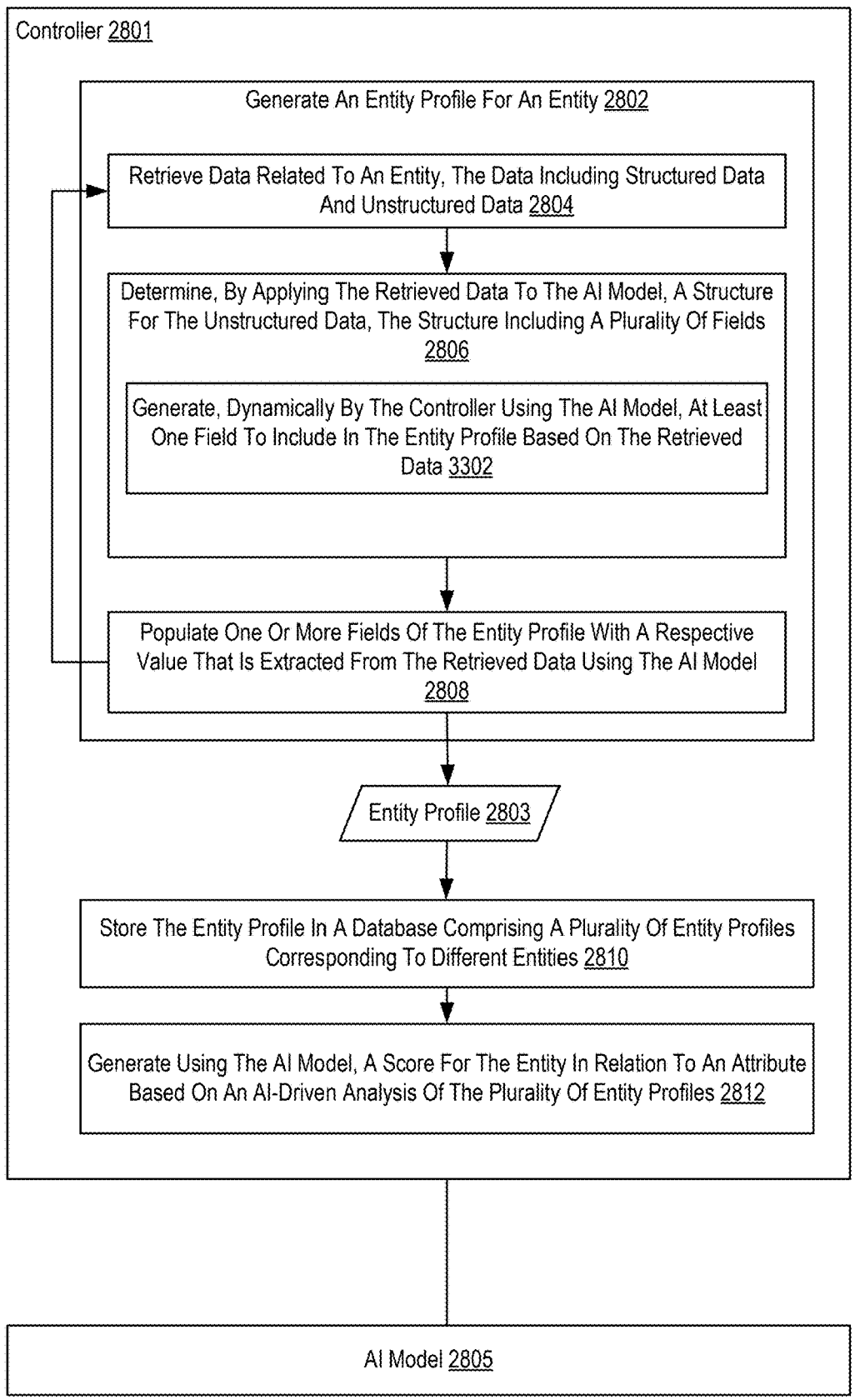
FIG. 33 sets forth a flowchart of another example method of AI-driven data aggregation and analysis for entity scoring and assessment in accordance with at least one embodiment of the present disclosure.

For further explanation, FIG. 33 sets forth another example method of AI-driven data aggregation and analysis for entity scoring and assessment in accordance with at least one embodiment of the present disclosure. The method of FIG. 33 extends the method of FIG. 28 in that determining 2806, by applying the retrieved data to an AI model 2805, a structure for the unstructured data, the structure including a plurality of fields, includes generating 3302, dynamically by the controller 2801 using the AI model 2805, at least one field to include in the entity profile based on the retrieved data. In some examples, the controller 2801 identifies a property/value pair from the structuralized data, derived from the unstructured data, that does not correspond to a field in the entity profile. In some implementations, the controller 2801 dynamically generates 3302 a new field for the entity based on this property/value pair. The new field and the corresponding value extracted by the AI model 2805 are then included in the entity profile. To illustrate, consider an example where a template for a 'company'-type entity does not include a field for the number of employees. Upon identifying a property/value pair for the number of employees of the company in the unstructured data, the controller 2801 can modify the entity profile to include a field for the number of employees and populate the new field with the extracted data.

Figure 34:
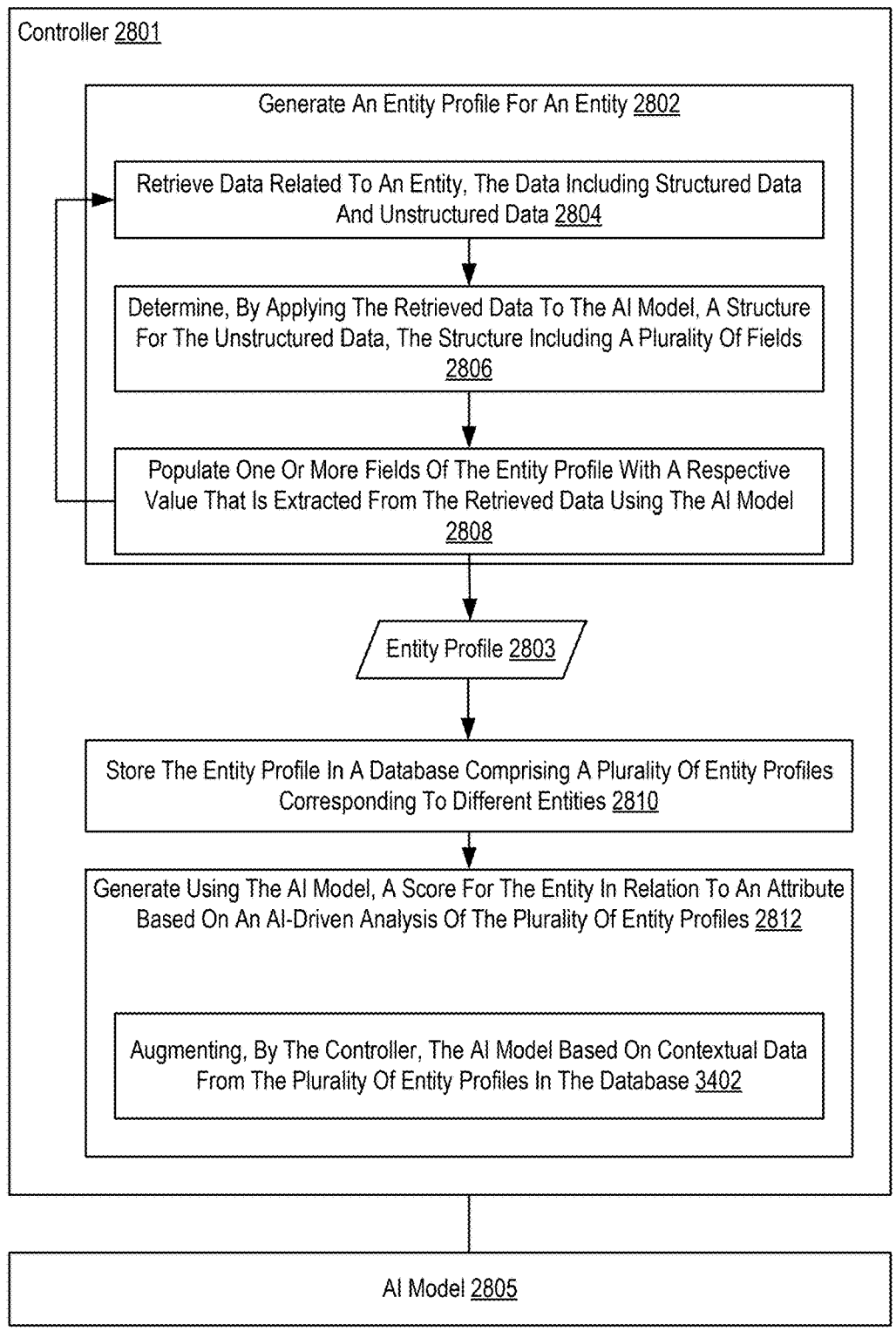
FIG. 34 sets forth a flowchart of another example method of AI-driven data aggregation and analysis for entity scoring and assessment in accordance with at least one embodiment of the present disclosure.

For further explanation, FIG. 34 sets forth another example method of AI-driven data aggregation and analysis for entity scoring and assessment in accordance with at least one embodiment of the present disclosure. The method of FIG. 34 extends the method of FIG. 28 in that generating 2812, by the controller 2801 using the AI model 2805, a score for the entity in relation to an attribute based on an AI-driven analysis of the plurality of entity profiles includes augmenting 3402, by the controller 2801, the AI model 2805 based on contextual data from the plurality of entity profiles in the database. In some examples, the controller 2801 augments 3402 the AI model 2805 based on contextual data from the plurality of entity profiles in the database by configuring the AI model 2805 for retrieval-augmented generation. For example, the controller 2801 can link the AI model 2805 to the dataset of entity profiles to provide a context for results generated by the AI model 2805. In one example, entity profiles are converted to vector embeddings. An attribute definition is also converted to a vector embedding. For example, the controller 2801 may generate an attribute definition of a financials attribute as based on revenue, profit, debt, etc. A similarity search can be performed to identify portions of entity profile data that are relevant to the attribute based on the vector embedded data and the vector embedded attribute definition. The relevant profile data is then supplied as a context to the AI model for scoring the entity based on the attribute. In another example, a query is converted to a vector embedding. A similarity search is performed to identify portions of entity profile data that are relevant to the query based on the vector embedded entity profile data and the vector embedded query. The relevant profile data is then supplied as a context to the AI model 2805 for responding to the query. In some examples, the controller 2801 augments 3402 the AI model utilizing contextual priming. For example, the controller 2801 can generate a prompt to assign the AI model 2805 a specific role, persona, or expertise upon which it bases its responses.

Figure 35:
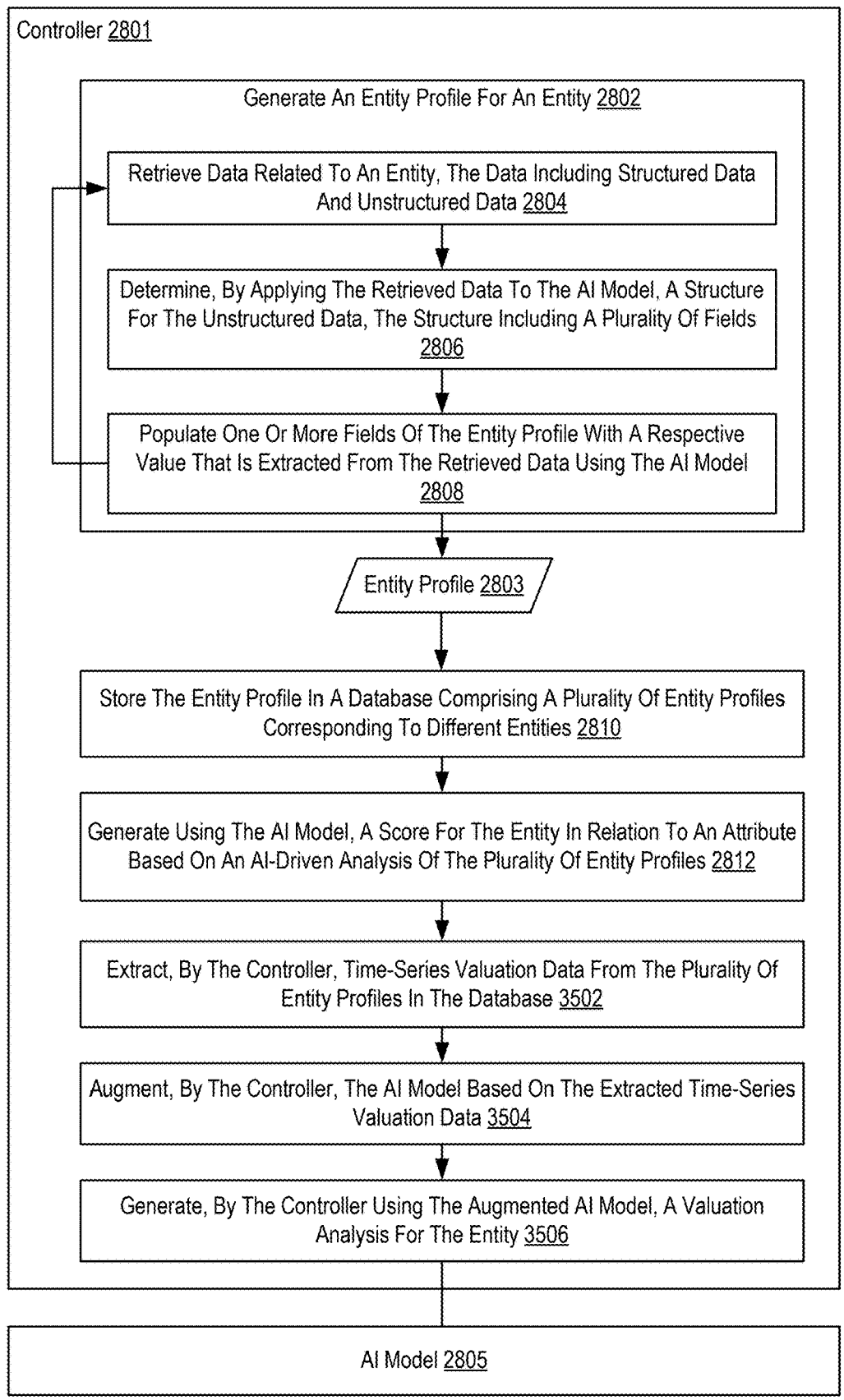
FIG. 35 sets forth a flowchart of another example method of AI-driven data aggregation and analysis for entity scoring and assessment in accordance with at least one embodiment of the present disclosure.

For further explanation, FIG. 35 sets forth another example method of AI-driven data aggregation and analysis for entity scoring and assessment in accordance with at least one embodiment of the present disclosure. The method of FIG. 35 extends the method of FIG. 28 in that the method of FIG. 35 includes extracting 3502 time-series valuation data from the plurality of entity profiles in the database. In some implementations, the controller 2801 extracts time-series valuation data including various valuation properties, such as revenues, losses, profitability, market share growth, funding valuations, and so on. For example, a time-series dataset may include a revenue for each quarter over a period of years. The controller 2801 can extract the dataset by querying the entity database and aggregating the results of the queries in a data structure such as a spreadsheet. The controller 2801 can then store the dataset in the entity database.

The method of FIG. 35 also includes augmenting 3504, by the controller 2801, the AI model 2805 based on the extracted time-series valuation data. In some implementations, the controller 2801 augments 3504 the AI model 2805 by configuring the AI model 2805 for retrieval-augmented generation using the time-series datasets of valuation data for multiple entities in the entity database. For example, the controller 2801 can configure the AI model 2805 by inputting these time-series datasets of valuation data as a context for generating responses to prompts to the AI model 2805. Techniques for configuring the AI model 2805 for retrieval-based generation are described above.

The method of FIG. 35 also includes generating 3506, by the controller 2801 using the augmented AI model 2805, a valuation analysis for the entity. The valuation analysis can include, for example, a natural language valuation analysis based on a cross-correlation of valuation data for the entity with valuation data of other entities. For example, the valuation analysis can provide a descriptive comparison of the valuation of the entity with those of similar entities. The valuation analysis can also include a score, ranking, other qualitative metric for the valuation of the entity. In some implementations, the controller 2801 generates 3506 the valuation analysis by formulating one or more prompts to the AI model 2805. For example, the controller 2801 can map a predefined prompt for a valuation analysis, where the prompt identifies multiple metrics and attributes for rating the valuation of the company. In another example, the controller 2801 can construct a prompt by determining a set of properties (e.g., revenue, profitability, etc.) that the AI model 2805 should use for a valuation analysis. The AI model 2805 generates, based on the controller prompts, a valuation analysis using the time-series valuation datasets and provides the result to the controller 2801.

In some examples, the AI model 2805 generates a valuation analysis based on other entity profiles in the database. For example, where a startup company and a growth stage company have similar valuation trajectories and similar entity characteristics (e.g., similar technology areas, similar products, similar founders, etc.), the valuation trajectory of the growth stage company can indicate a valuation trajectory for the startup company. The entity profile can be compared to other entity profiles to identify a set of similar entities. For each entity in the set of similar entities, time-series valuation data is extrapolated using one or more of the above-mentioned valuation factors. The AI model 2805 analyzes the time-series valuation data of the entity and the time-series valuation data of other entities in the set of similar entities using retrieval-augmented generation. The AI model 2805, based on this analysis, may generate a qualitative insight regarding the valuation of the entity. For example, if entity A is similar to entity B, entity A may be predicted to experience a similar valuation expansion that was experienced by entity B at an earlier stage. Conversely, if entity B is in bankruptcy, entity A may be predicted to face a higher likelihood of bankruptcy.

Figure 36:
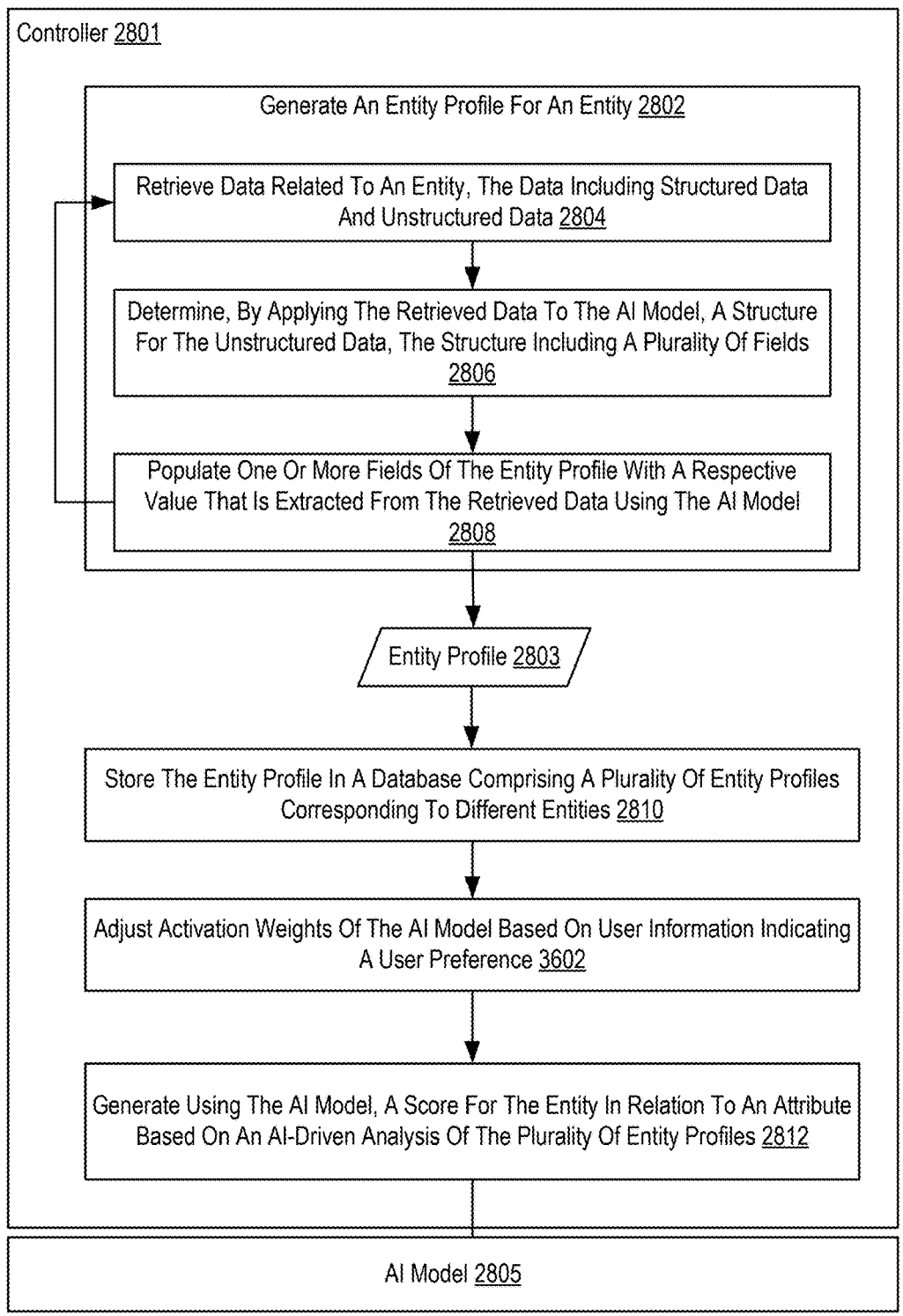
FIG. 36 sets forth a flowchart of another example method of AI-driven data aggregation and analysis for entity scoring and assessment in accordance with at least one embodiment of the present disclosure.

For further explanation, FIG. 36 sets forth another example method of AI-driven data aggregation and analysis for entity scoring and assessment in accordance with at least one embodiment of the present disclosure. The method of FIG. 36 extends the method of FIG. 28 in that the method of FIG. 36 includes adjusting 3602 activation weights of the AI model 2805 based on user information indicating a user preference. In some implementations, the controller 2801 tunes the AI model 2805 based on user feedback or user data indicating that a particular property, field, characteristic, or attribute that is more important than others. This tuning based on particular properties or characteristics changes the activation weights in the neural networks of the AI model 2805, thus optimizing the output of the AI model 2805 for a particular score analysis.

In view of the foregoing, it will be appreciated that integrated entity analysis using an AI model in accordance with the present disclosure provides a number of improvements to the technical field of data driven analysis and the computing systems that perform data driven analysis. Data driven analysis of abstract entities such as companies, assets, deals, etc. requires an analysis of many different entity characteristics from a multitude of data sources, and correlation of various characteristics to generate accurate predictions or assessments of those entities. This has typically involved manually compiling and integrating various structure and unstructured data. Conventional systems are constrained by the lack of comprehensive and up-to-date entity databases, hindering the ability of mathematical models to generate accurate insights and limiting the accuracy and effectiveness of subsequent analyses. Integrated data analysis using an AI model in accordance with the present disclosure integrates data user-provided data with structured and unstructured data from external sources to create a comprehensive dataset upon which analyses are based. The AI model provides pattern recognition and cross correlation of data to generate assessments and insights that provide a holistic real-time evaluation of the entity, thus improving the results of ratings for the entity that are generated by the integrated data analysis system.

Moreover, computing systems that perform data driven analysis of abstract entities based on algorithmic models consume significant amounts of power and expend significant amounts of heat in solving complex mathematical equations requiring multivariable analysis. Heat generation, in turn, requires energy to cool the processors. By utilizing and augmenting an AI model to facilitate data aggregation and transformation and to generate predictions and analytics based on the aggregated data, integrated data analysis using an AI model in accordance with the present disclosure reduces the processing complexities and thus reduces the amount of energy consumed and heat generated to perform these analyses, thus making the computing system more efficient. By augmenting the AI model and effectively reducing the size of the AI model by the augmentation, the execution load of the AI model is reduced, thus reducing the amount of power and processing resources needed to carry out a data driven analysis.

As described above, AI-driven data aggregation and analysis for entity scoring and assessment employs the AI model to assist the generation of the entity profile such that technology resources are focused on collecting and analyzing the most relevant information while ignoring or not collecting non-relevant information. This improves resource utilization of underlying computing technology, conserves resource costs (e.g., processing time, power consumption), and improves the efficiency and accuracy of analytics derived from these curated entity profiles.

Figure 37:
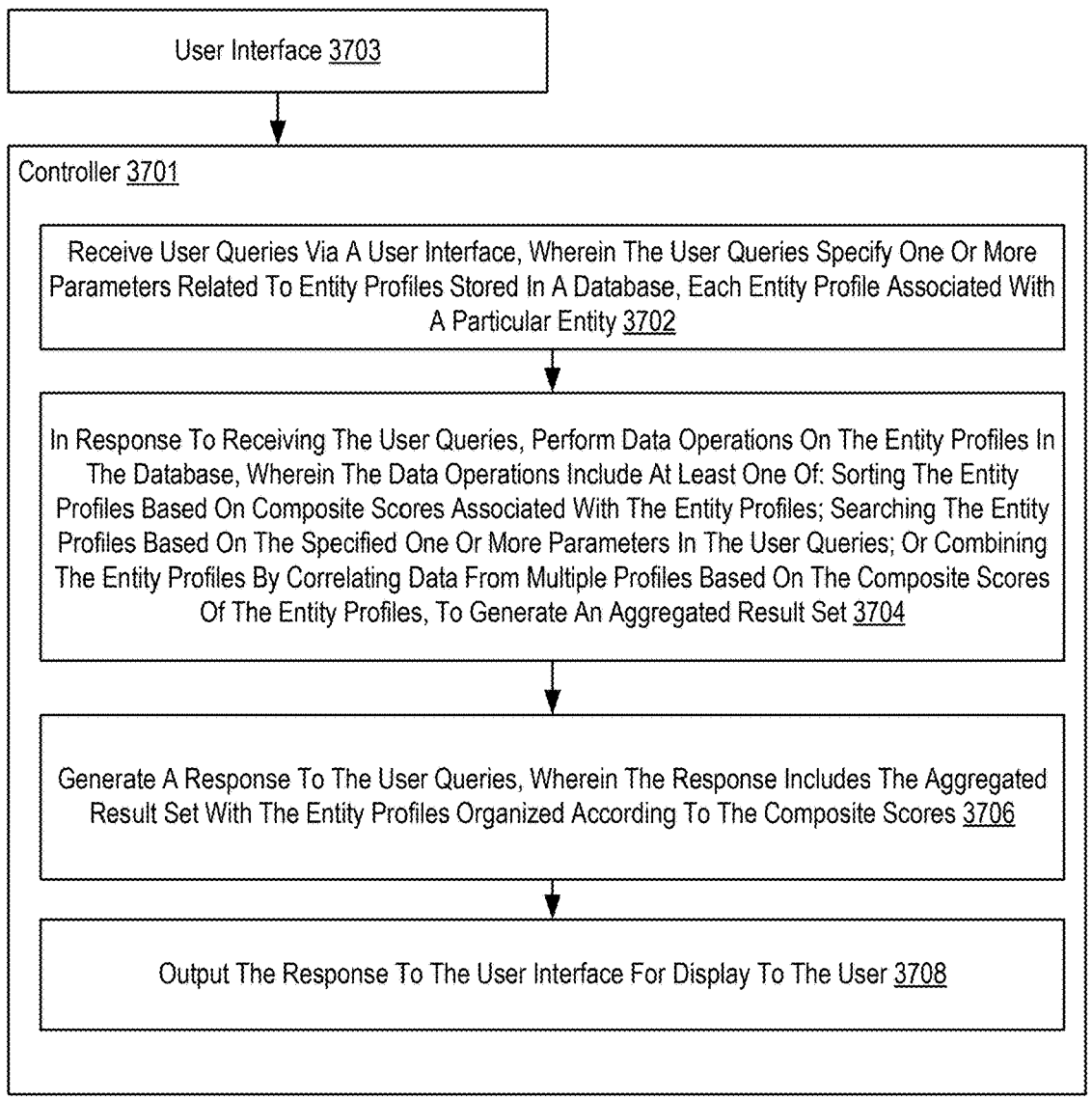
FIG. 37 sets forth a flowchart of an example method of user interaction within a data analysis system in accordance with at least one embodiment of the present disclosure.

For further explanation, FIG. 37 sets forth a flowchart of an example method of user interaction within a data analysis system in accordance with at least one embodiment of the present disclosure. The method of FIG. 37 includes receiving 3702, by a controller 3701, user queries via a user interface 3703. In a particular embodiment, user queries specify one or more parameters related to entity profiles stored in a database where each entity profile is associated with a particular entity. In a particular embodiment, a user interacts with a user interface 3703, such as a web page, mobile app, or specialized application, to enter their queries. These queries may include natural language questions, keyword searches, or requests for specific information regarding an entity or data set. In this embodiment, the controller manages the flow of user requests, monitors and collects the inputs received through the user interface. In a particular embodiment, the controller is integrated with a query module that specializes in handling and interpreting queries, and it may utilize natural language processing (NLP) tools to parse and understand the user's request.

The method of FIG. 37 also includes in response to receiving the user queries, performing 3704, by the controller, data operations on the entity profiles in the database where the data operations include at least one of sorting the entity profiles based on composite scores associated with the entity profiles; searching the entity profiles based on the specified one or more parameters in the user queries; or combining the entity profiles by correlating data from multiple profiles based on the composite scores of the entity profiles, to generate an aggregated result set. Sorting entity profiles based on composite scores allows a user to view entities ranked by a score. Searching the entity profiles based on the specified one or more parameters in the user queries may be carried out by interpreting the specified parameters in the user query, performing a database search across the entity profiles; filtering profiles that match these parameters; and narrowing down the profiles to those meeting all specified criteria, the controller generates a filtered result set and returns it to the user. Combining the entity profiles by correlating data from multiple profiles based on the composite scores of the entity profiles, to generate an aggregated result set may be carried out by recognizes that the query involves aggregation and data correlation and applying correlation techniques to examine relationships among profiles. For instance, the controller may search for entities with similar composite scores or shared attributes (e.g., sector, growth stage). The controller may use the composite scores to weigh and aggregate data, generating an overview or combined result set that reflects these correlations. The final aggregated result may include summary insights, averages, or a combined profile overview showing commonalities and differences across entities.

The method of FIG. 37 includes generating 3706, by the controller 3701, a response to the user queries, wherein the response includes the aggregated result set with the entity profiles organized according to the composite scores. Generating a response to the user queries may be carried out by the controller first organizing the entity profiles within the aggregated result set according to each profile's composite score. The controller may then rank or order the profiles based on this score, ensuring that entities with higher relevance or value appear at the top, according to the user's criteria.

The method of FIG. 37 also includes outputting 3708, by the controller 3701, the response to the user interface for display to the user. Outputting 3708, by the controller 3701, the response to the user interface for display to the user may be carried out by formatting this organized result set into a user-friendly response and delivers it back through the user interface, enabling the user to review the profiles in a sorted, prioritized manner. In a particular embodiment, outputting 3708 the response to the user interface includes generating visualizations, such as interactive charts or graphs to enhance user engagement and understanding. For example, the user interface may display a dynamic scorecard offering an overview of the composite score. In the one embodiment, the user interface displays the response as a radar chart that illustrates the company's performance across multiple attributes. In this embodiment, the user may interact with the chart by hovering over attributes to view exact scores. The user interface may also support comparing a chart of one entity profile with charts of one or more other profiles. Another example of a visualization is a heatmap, which highlights scores across various metrics for multiple companies or time periods. In this example, users can filter by category, sort rows or columns to highlight trends, and click on individual cells to explore details of the score. A stacked bar chart is another visualization option, showing the composition of an overall score, with each bar divided into components (e.g., attributes or metrics). In this example, users can click on a component to reveal contributing details. Interactions features may also include a time slider to observe score evolution over time or side-by-side comparisons of stacked bards for multiple entities. Another example is a bubble chart, which allows evaluation of entities by plotting scores for different attributes on distinct axes. Additional visualization options may include gauge charts; line charts with annotations; a choropleth map; a treemap; and a sunburst chart. These interactive visualizations empower users to interact with the data, drill into specific details, and derive insights from the AI-generated composite analysis.

This method enhances the functioning and efficiency of computers and networks operating the user interface by optimizing data retrieval, processing, and display in response to complex user queries. By sorting, filtering, and correlating entity profiles before they reach the user interface, the system reduces the computational load and network latency associated with retrieving large data sets in real time. The pre-processing and structured organization of data, such as ranking by composite scores, allow for faster, more efficient rendering of results, minimizing delays and enhancing user experience. Additionally, streamlined data operations and aggregation processes decrease repetitive database queries and network calls, improving overall system responsiveness and reducing resource consumption on both the server and client sides.

Figure 38:
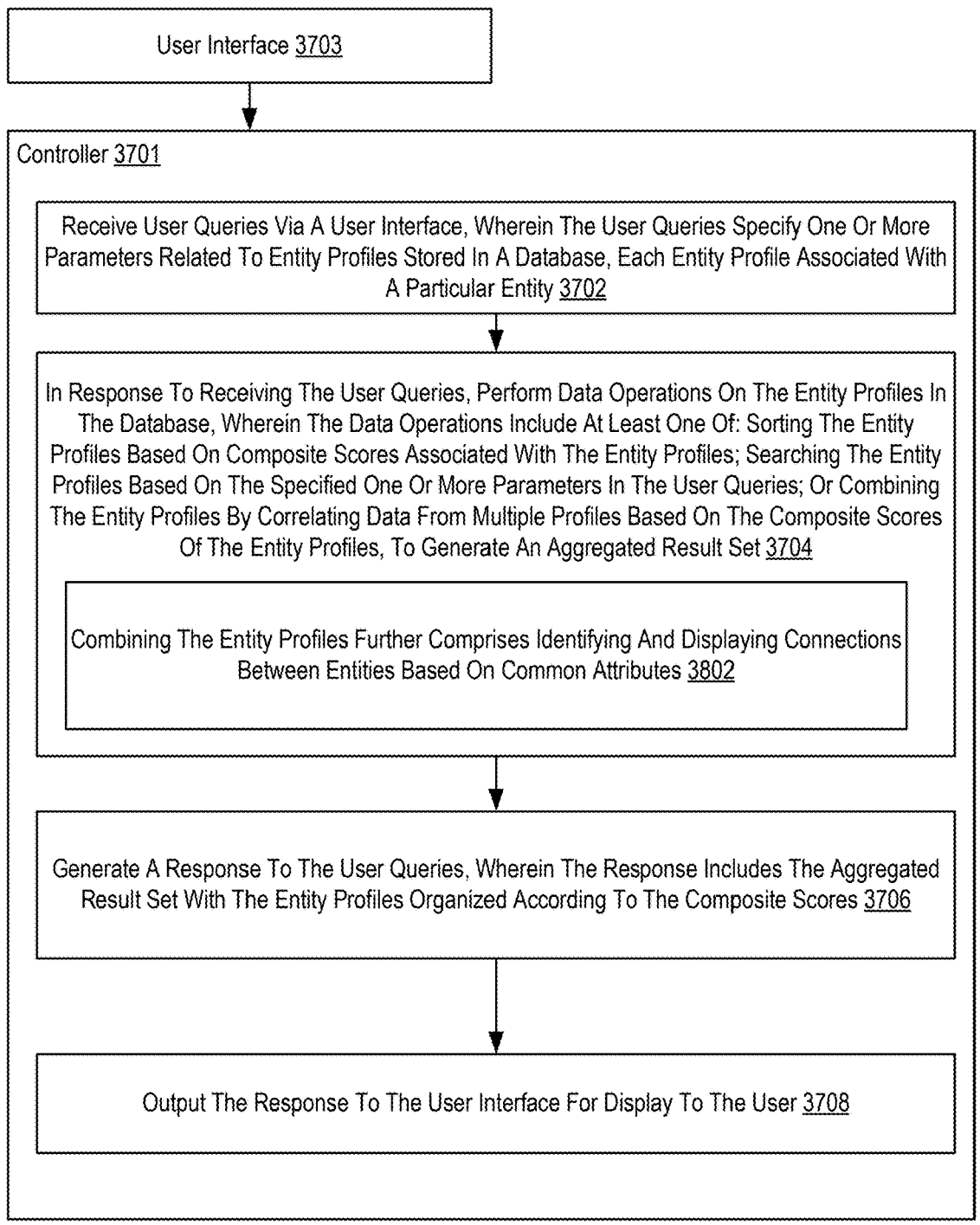
FIG. 38 sets forth a flowchart of another example method of user interaction within a data analysis system in accordance with at least one embodiment of the present disclosure.

For further explanation, FIG. 38 sets forth a flowchart of another example method of user interaction within a data analysis system in accordance with at least one embodiment of the present disclosure. The method of FIG. 38 is similar to the method of FIG. 37 in that the method of FIG. 38 includes the elements of FIG. 37. In the method of FIG. 38, combining the entity profiles further comprises identifying 3802 connections between entities based on common attributes. Identifying 3802 connections between entities based on common attributes may be carried out by identifying connections between entity profiles by scanning for common attributes, such as industry, location, or shared personnel, across the profiles. The controller may then analyze these shared attributes to establish links or relationships between entities, such as partnerships or sectoral similarities.

Figure 39:
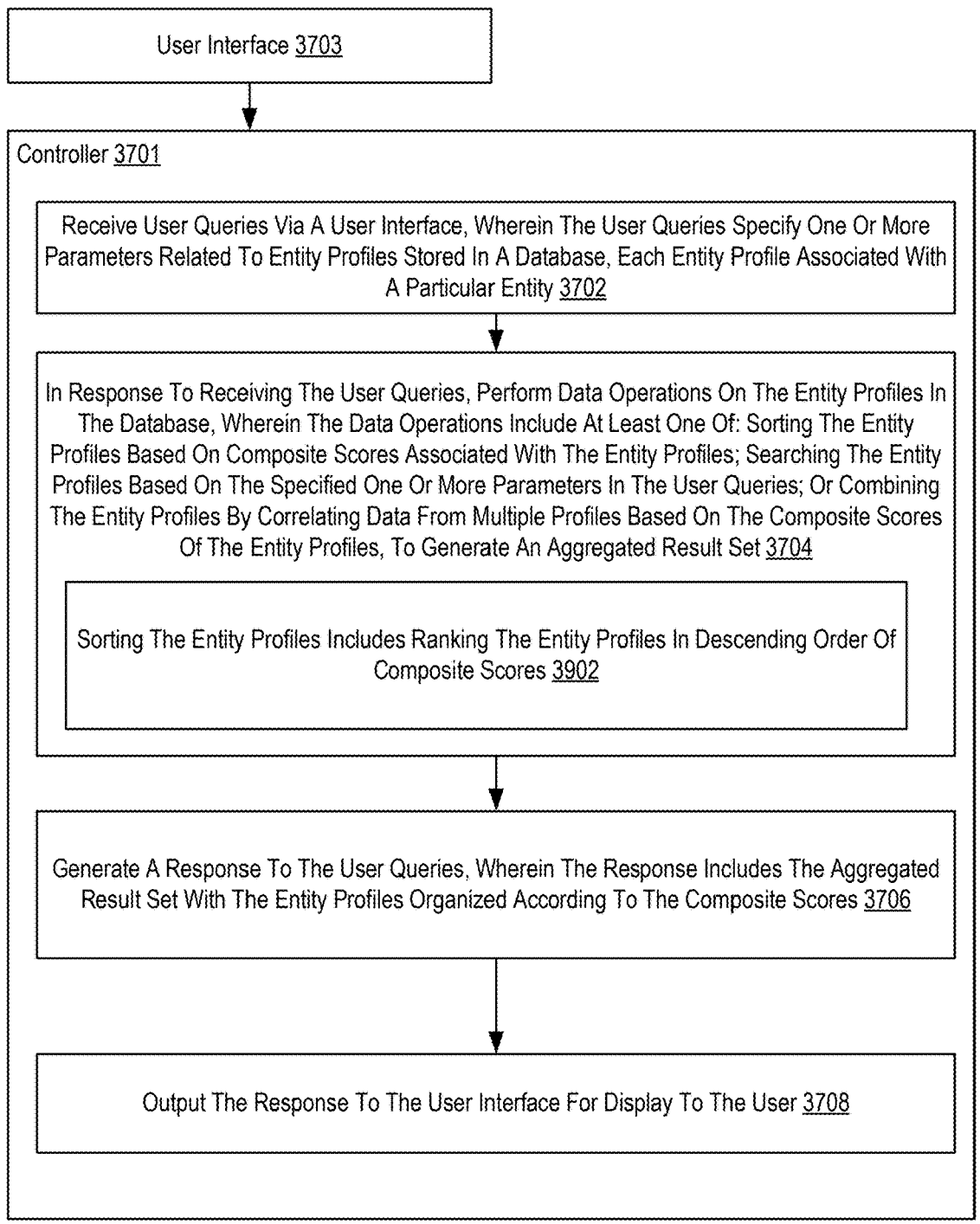
FIG. 39 sets forth a flowchart of another example method of user interaction within a data analysis system in accordance with at least one embodiment of the present disclosure.

For further explanation, FIG. 39 sets forth a flowchart of another example method of user interaction within a data analysis system in accordance with at least one embodiment of the present disclosure. The method of FIG. 39 is similar to the method of FIG. 37 in that the method of FIG. 39 includes the elements of FIG. 37. In the method of FIG. 39, sorting the entity profiles includes ranking 3902 the entity profiles in descending order of composite scores may be carried out by ranking the entity profiles by accessing their composite scores and arranging them in descending order, placing the highest-scoring entities at the top of the list. The controller performs this sorting operation by comparing scores across profiles and ordering them from highest to lowest based on the calculated or assigned composite scores. Once ranked, the controller may include the ordered profiles in the response, allowing users to quickly identify the most relevant or high-performing entities.

Figure 40:
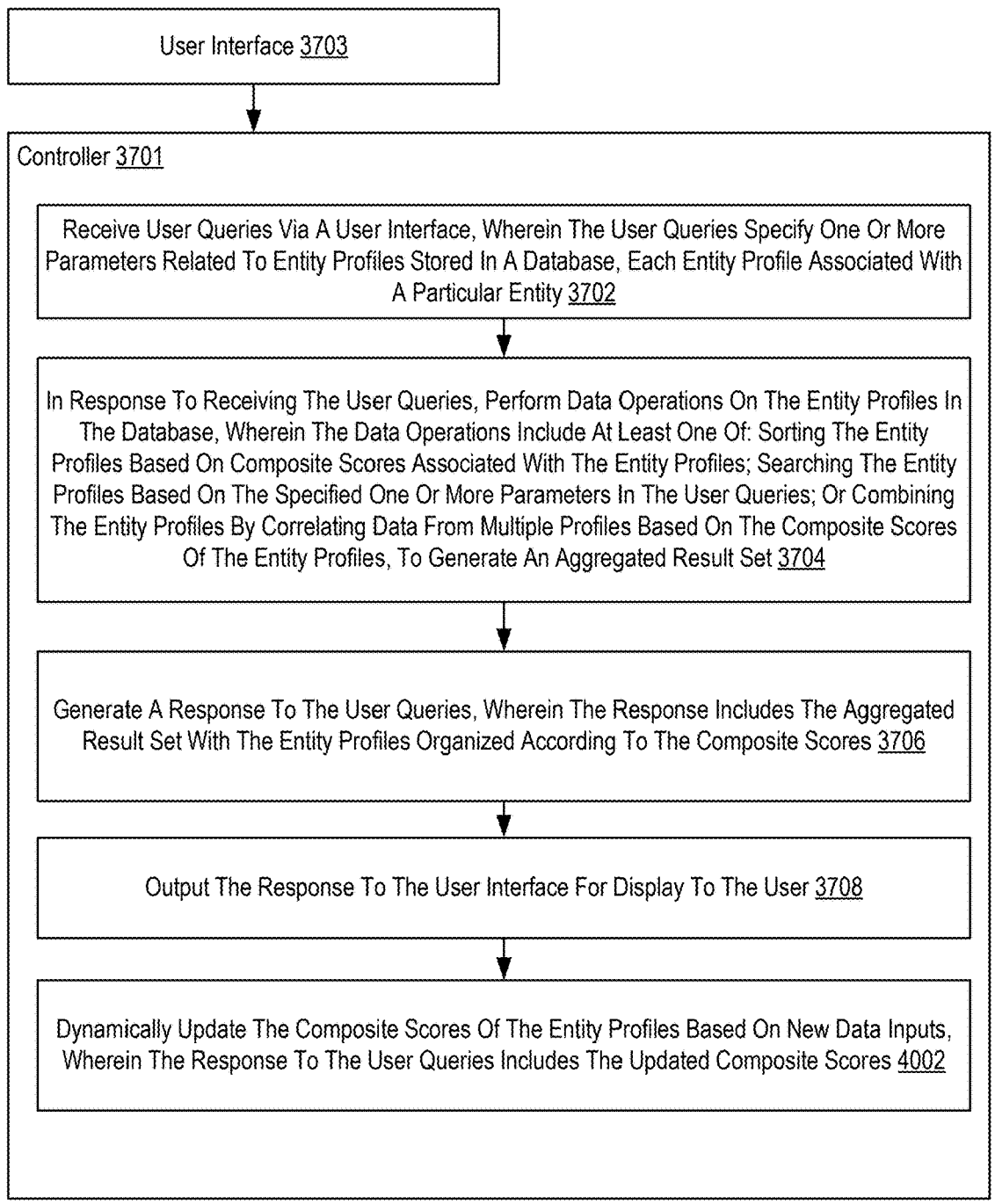
FIG. 40 sets forth a flowchart of another example method of user interaction within a data analysis system in accordance with at least one embodiment of the present disclosure.

For further explanation, FIG. 40 sets forth a flowchart of another example method of user interaction within a data analysis system in accordance with at least one embodiment of the present disclosure. The method of FIG. 40 is similar to the method of FIG. 37 in that the method of FIG. 40 includes the elements of FIG. 37. The method of FIG. 40 also includes dynamically updating 4002, by the controller 3701, the composite scores of the entity profiles based on new data inputs, wherein the response to the user queries includes the updated composite scores may be carried out by integrating new data inputs, such as new attributes, performance metrics, properties into the scoring model. The controller may recalculate the composite scores based on this new data, ensuring that each profile reflects the most current and relevant information. These updated scores may then incorporated into the response provided to the user, allowing the user to view entity profiles that are ranked according to the latest, data-driven insights.

Figure 41:
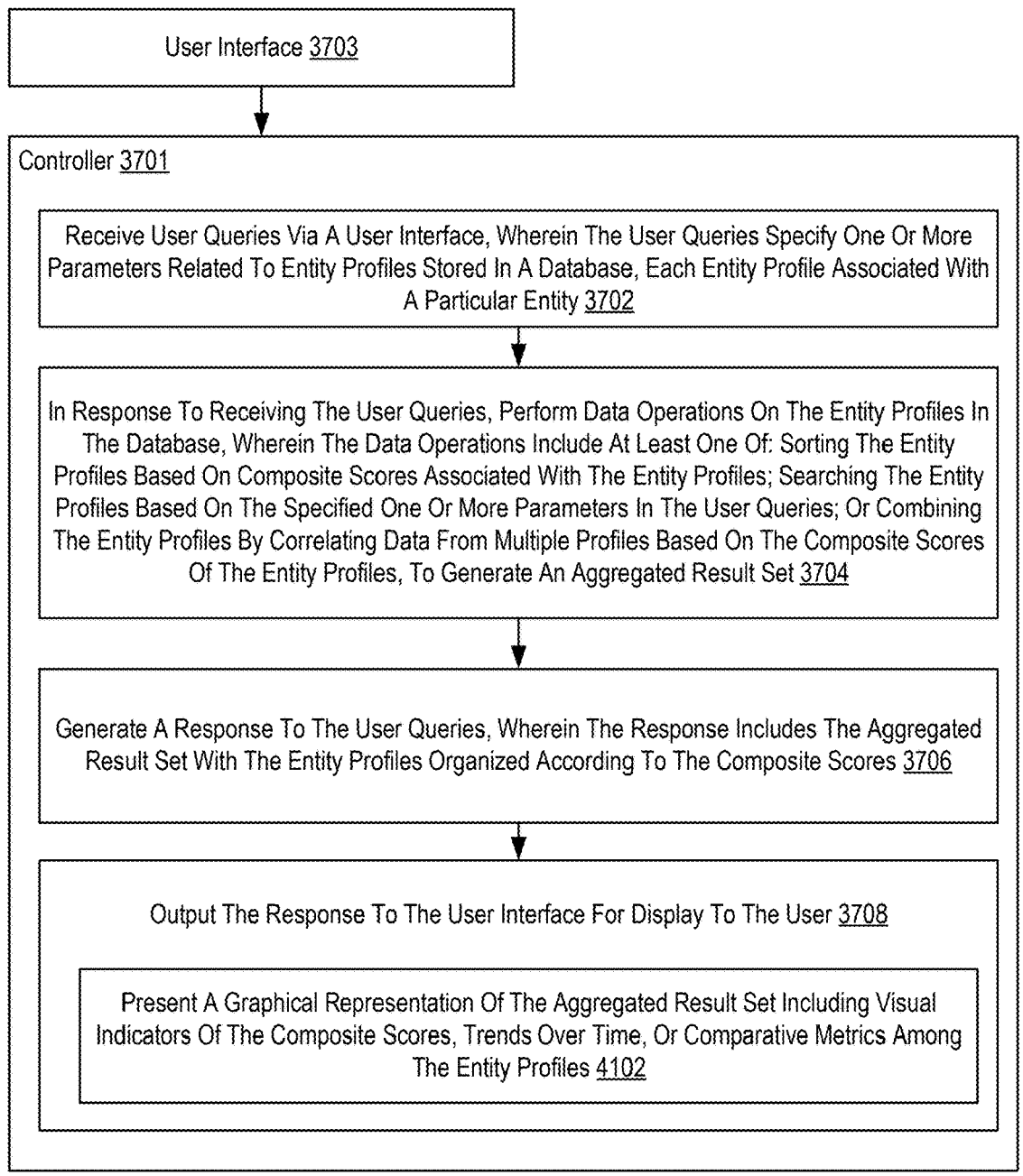
FIG. 41 sets forth a flowchart of another example method of user interaction within a data analysis system in accordance with at least one embodiment of the present disclosure.

For further explanation, FIG. 41 sets forth a flowchart of another example method of user interaction within a data analysis system in accordance with at least one embodiment of the present disclosure. The method of FIG. 41 is similar to the method of FIG. 37 in that the method of FIG. 41 includes the elements of FIG. 37. In the method of FIG. 41, outputting 3708, by the controller 3701, the response to the user interface for display to the user includes presenting 4102 a graphical representation of the aggregated result set including visual indicators of the composite scores, trends over time, or comparative metrics among the entity profiles. In this embodiment, the controller may generate charts or graphs that visually display composite scores, trends, and comparisons among entity profiles. Visual indicators such as bar charts, line graphs, or heat maps may illustrate each profile's score, highlight changes over time, and show comparative metrics to emphasize relative strengths or weaknesses across entities. This visual format is then delivered through the user interface, enabling users to quickly interpret complex data patterns and insights at a glance.

Figure 42:
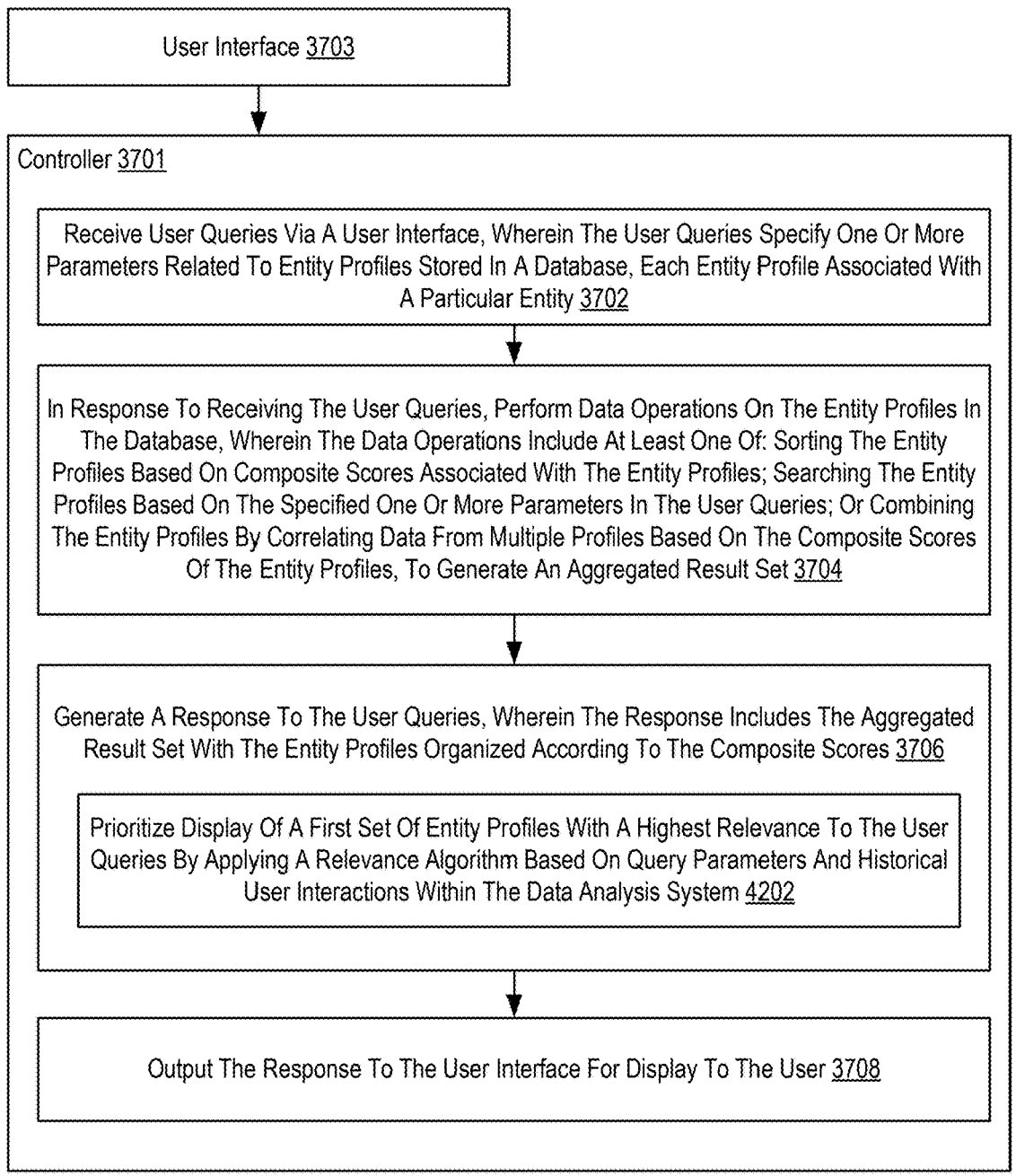
FIG. 42 sets forth a flowchart of another example method of user interaction within a data analysis system in accordance with at least one embodiment of the present disclosure.

For further explanation, FIG. 42 sets forth a flowchart of another example method of user interaction within a data analysis system in accordance with at least one embodiment of the present disclosure. The method of FIG. 42 is similar to the method of FIG. 37 in that the method of FIG. 42 includes the elements of FIG. 37. In the method of FIG. 42, generating 3706, by the controller 3701, a response to the user queries includes prioritizing 4202 display of a first set of entity profiles with a highest relevance to the user queries by applying a relevance algorithm based on query parameters and historical user interactions within the data analysis system. In this example, the controller utilizes an algorithm that scores each entity profile for relevance by weighing factors like alignment with the query's specific keywords, entity attributes, and patterns in the user's past behavior. Profiles with the highest relevance scores may then be displayed first in the response, allowing users to see the most pertinent results quickly and efficiently.

Figure 43:
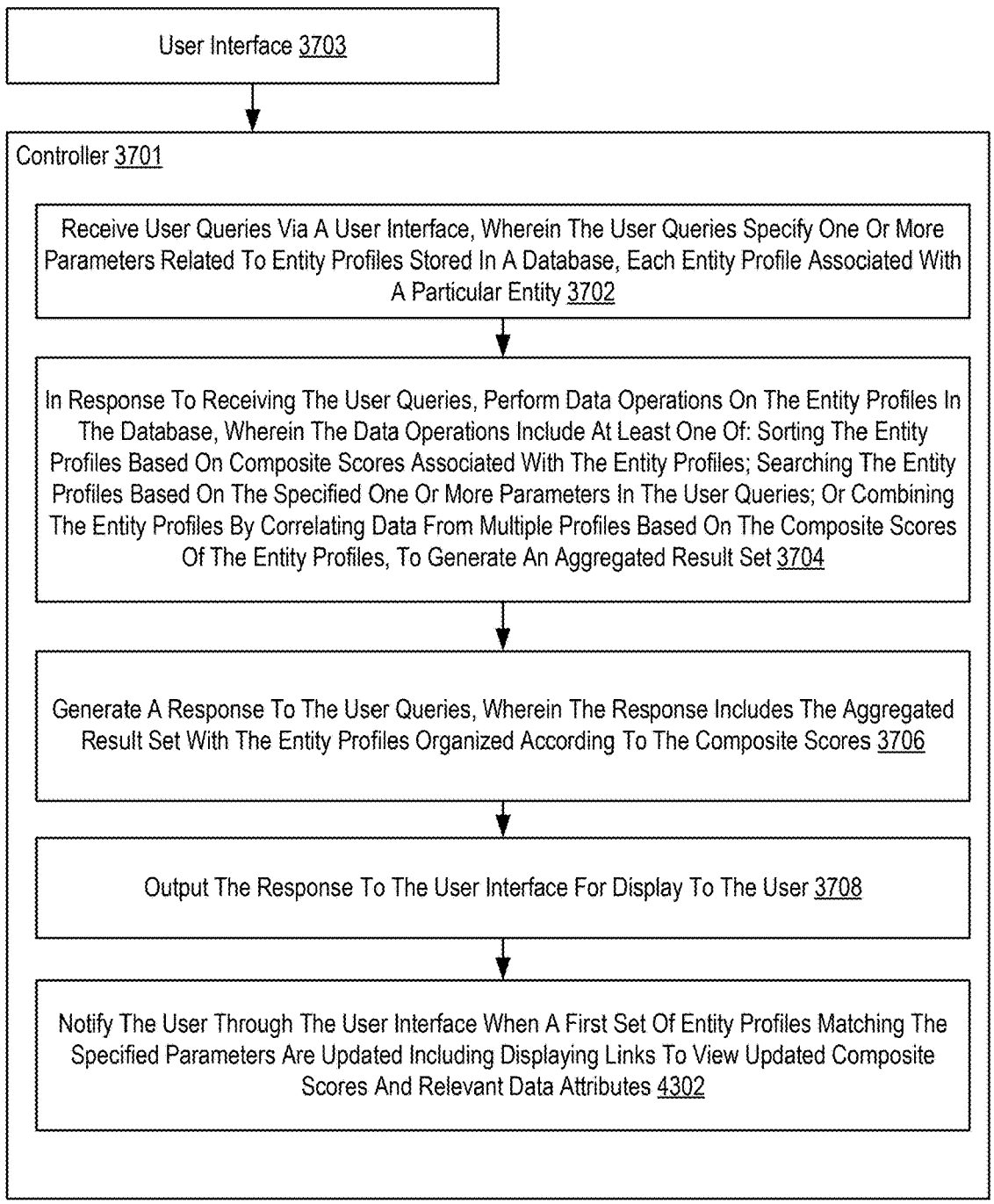
FIG. 43 sets forth a flowchart of another example method of user interaction within a data analysis system in accordance with at least one embodiment of the present disclosure.

For further explanation, FIG. 43 sets forth a flowchart of another example method of user interaction within a data analysis system in accordance with at least one embodiment of the present disclosure. The method of FIG. 43 is similar to the method of FIG. 37 in that the method of FIG. 43 includes the elements of FIG. 37. The method of FIG. 43 includes notifying 4302, by the controller 3701, the user through the user interface when a first set of entity profiles matching the specified parameters are updated including displaying links to view updated composite scores and relevant data attributes.

Figure 44:
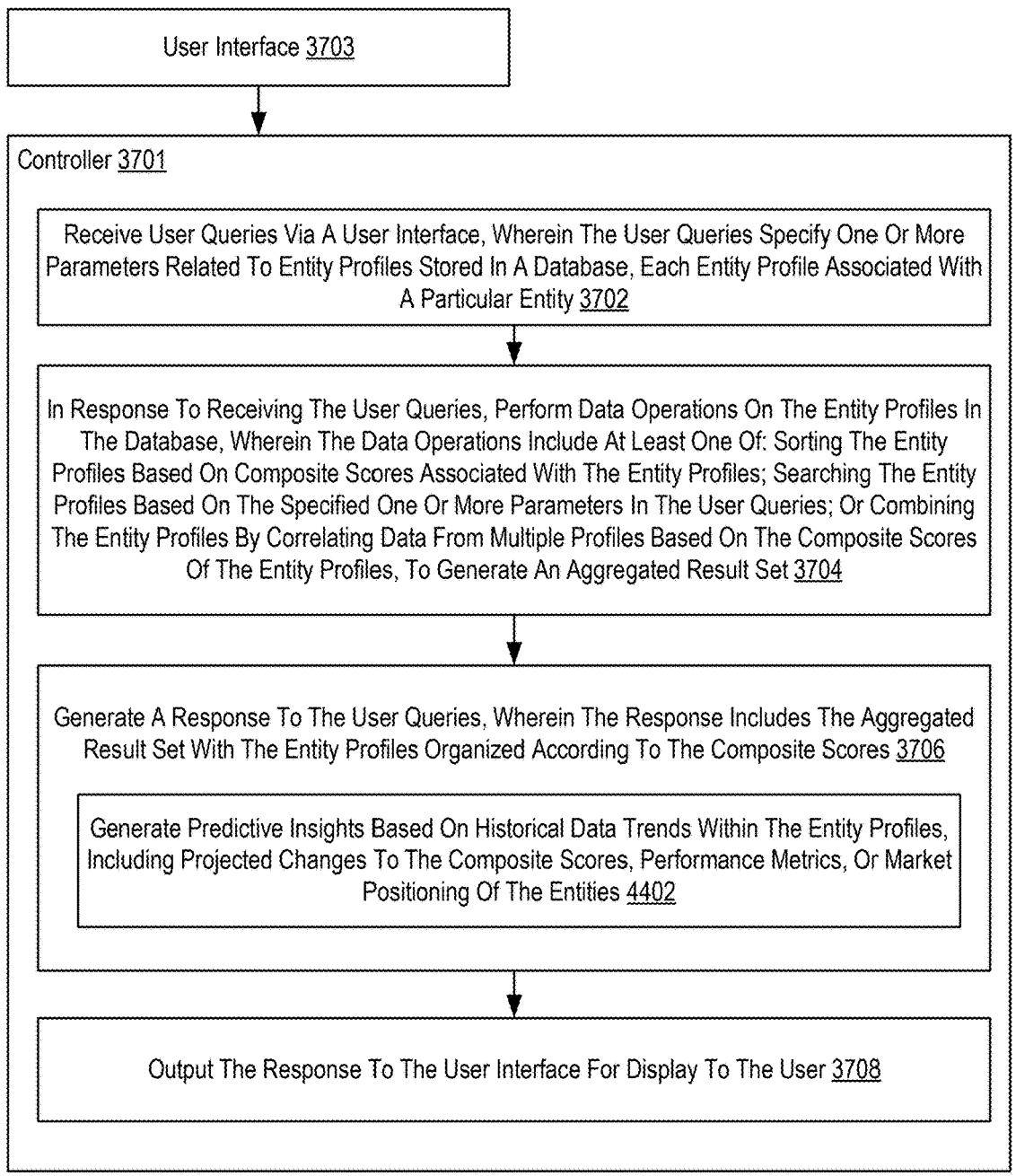
FIG. 44 sets forth a flowchart of another example method of user interaction within a data analysis system in accordance with at least one embodiment of the present disclosure.
Figure 45:
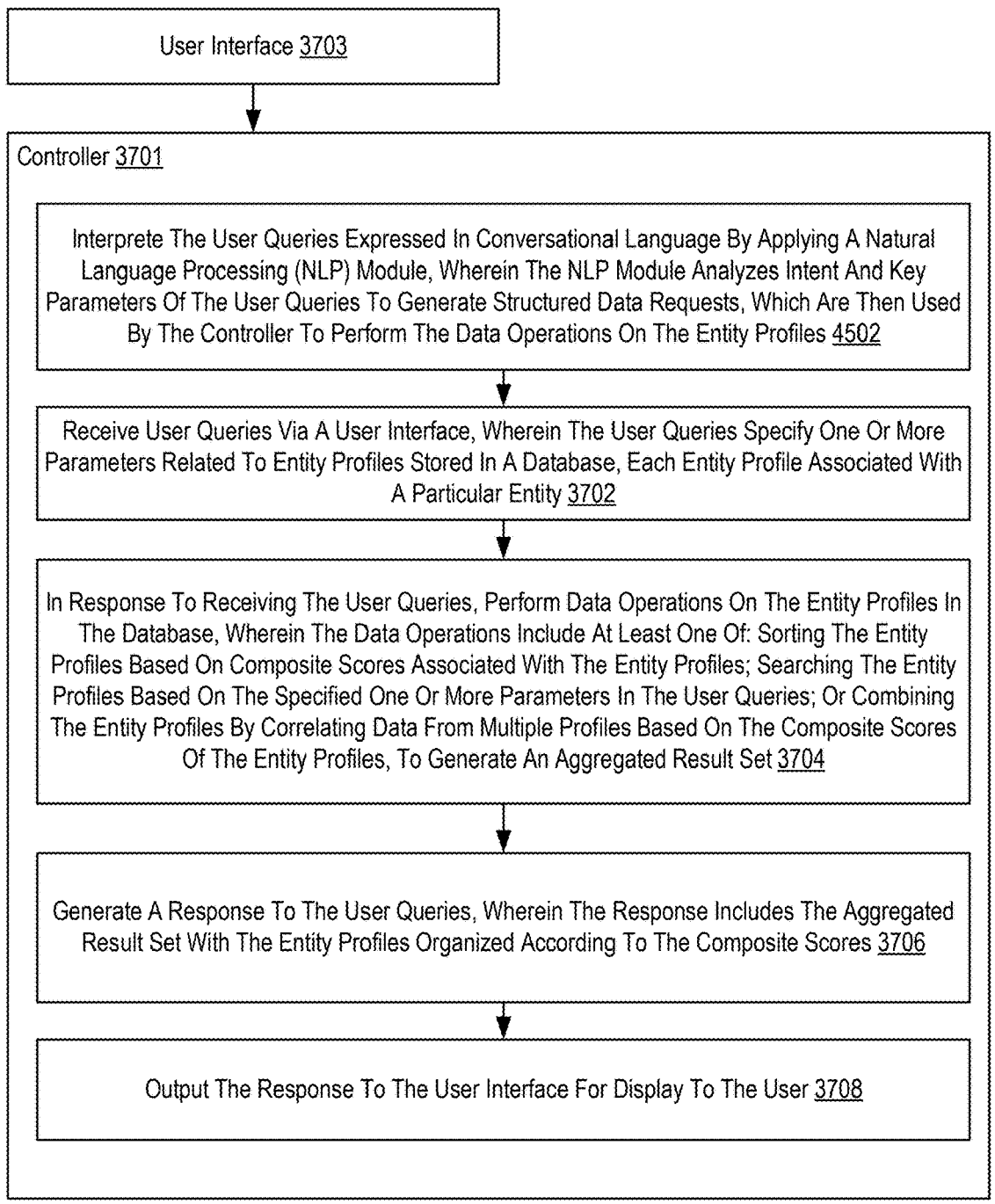
FIG. 45 sets forth a flowchart of another example method of user interaction within a data analysis system in accordance with at least one embodiment of the present disclosure.

For further explanation, FIG. 44 sets forth a flowchart of another example method of user interaction within a data analysis system in accordance with at least one embodiment of the present disclosure. The method of FIG. 44 is similar to the method of FIG. 37 in that the method of FIG. 44 includes the elements of FIG. 37. In the method of FIG. 44, generating 3706, by the controller 3701, a response to the user queries includes generating 4402 predictive insights based on historical data trends within the entity profiles including projected changes to the composite scores, performance metrics, or market positioning of the entities. Generating 4402 predictive insights based on historical data trends within the entity profiles including projected changes to the composite scores, performance metrics, or market positioning of the entities may be carried out by generating an alert or message when an update occurs in a first set of entity profiles that match the specified parameters, indicating that new information is available. This notification includes direct links to the updated profiles, allowing the user to quickly access the latest composite scores and any modified or newly relevant data attributes. In a particular embodiment, by clicking the links, a user can view the refreshed entity profiles with all recent changes highlighted, making it easy to stay informed on the latest develop For further explanation, FIG. 45 sets forth a flowchart of another example method of user interaction within a data analysis system in accordance with at least one embodiment of the present disclosure. The method of FIG. 45 is similar to the method of FIG. 37 in that the method of FIG. 45 includes the elements of FIG. 37. The method of FIG. 45 includes interpreting 4502, by the controller 3701, the user queries expressed in conversational language by applying a natural language processing (NLP) module, wherein the NLP module analyzes intent and key parameters of the user queries to generate structured data requests, which are then used by the controller to perform the data operations on the entity profiles. In this embodiment, the NLP module may break down the query into key components, identifying intent (e.g., finding top-ranked profiles, comparing entities) and extracting specific parameters like entity names, attributes, or desired metrics. Based on this analysis, the NLP module may translate the conversational query into structured data requests, which the controller then uses to execute precise data operations on the entity profiles, ensuring that the response aligns closely with the user's intended inquiry.

Figure 46:
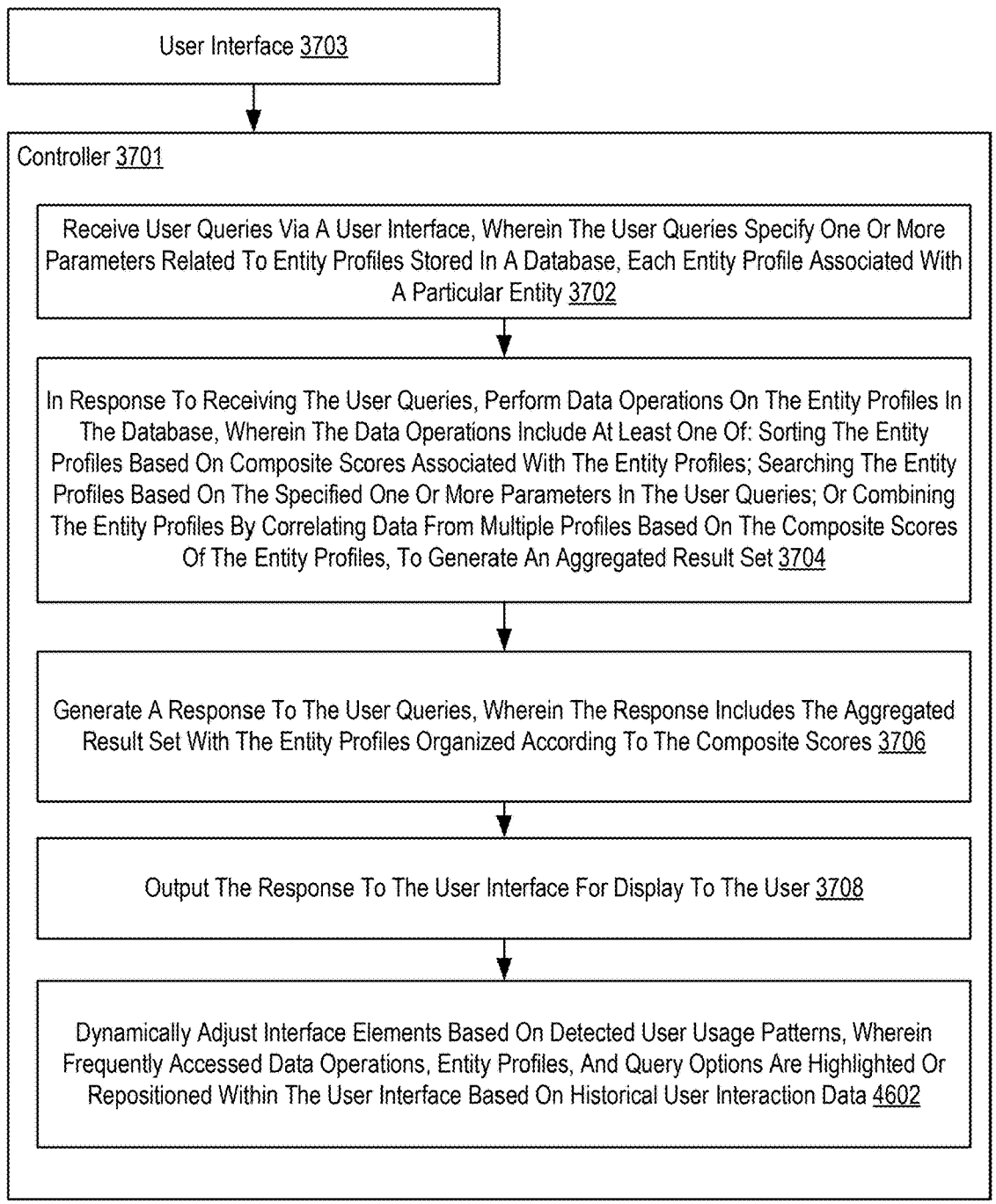
FIG. 46 sets forth a flowchart of another example method of user interaction within a data analysis system in accordance with at least one embodiment of the present disclosure.

For further explanation, FIG. 46 sets forth a flowchart of another example method of user interaction within a data analysis system in accordance with at least one embodiment of the present disclosure. The method of FIG. 46 is similar to the method of FIG. 37 in that the method of FIG. 46 includes the elements of FIG. 37. The method of FIG. 46 also includes dynamically adjusting 4601, by the controller 3701, interface elements based on detected user usage patterns, wherein frequently accessed data operations, entity profiles, and query options are highlighted or repositioned within the user interface based on historical user interaction data. Dynamically adjusting 4601, by the controller 3701, interface elements based on detected user usage patterns, wherein frequently accessed data operations, entity profiles, and query options are highlighted or repositioned within the user interface based on historical user interaction data may be carried out by analyzing historical user interaction data to detect frequently accessed data operations, entity profiles, and query options. Based on these usage patterns, the controller may reorganize the interface, highlighting or repositioning elements like frequently viewed profiles, commonly used filters, or preferred query settings to enhance accessibility and efficiency. This adaptive adjustment allows the interface to prioritize and present the most relevant tools and information, creating a personalized and streamlined user experience tailored to each user's habits and preferences.

Figure 47:
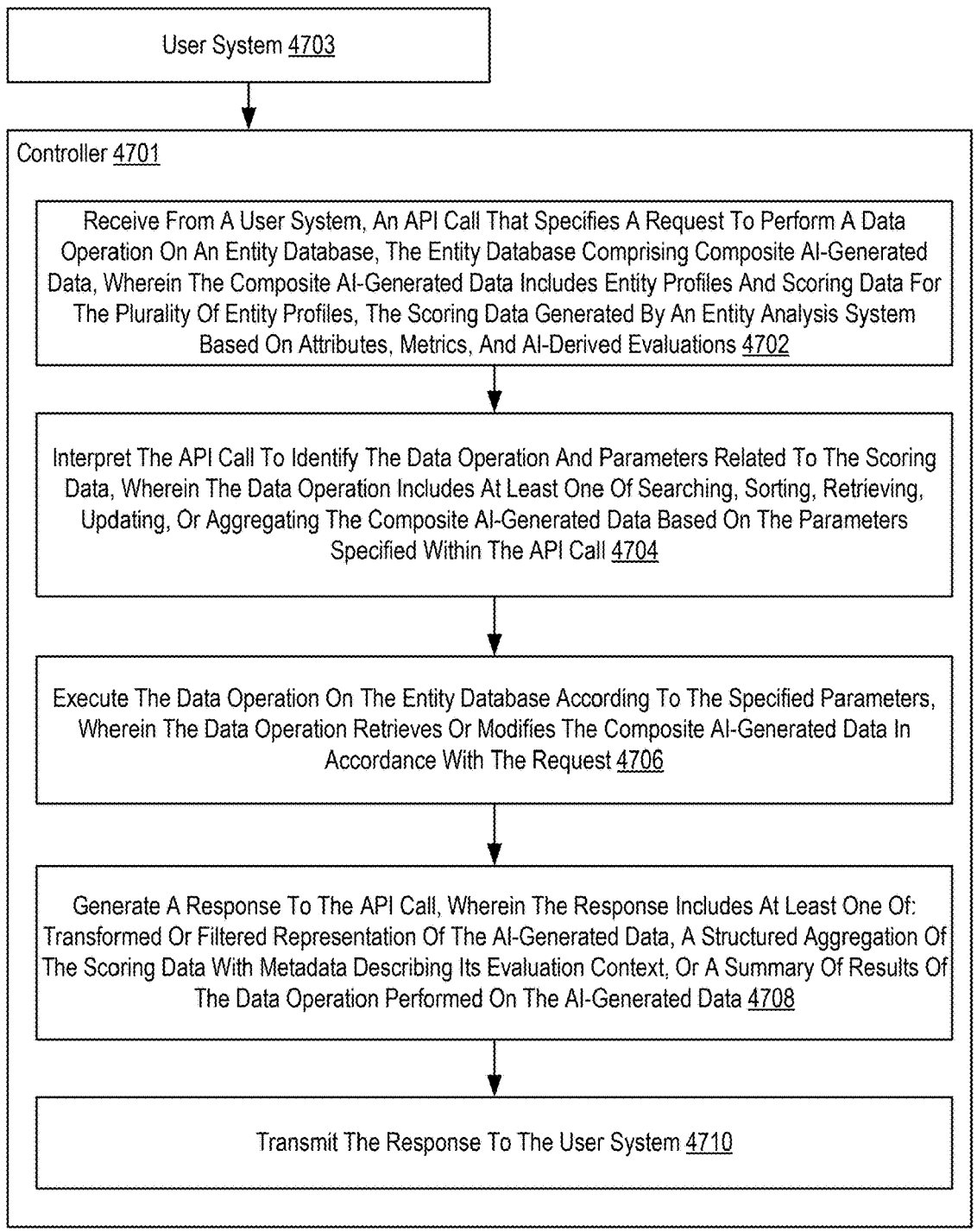
FIG. 47 sets forth a flowchart of an example method of providing access to composite AI-generated data in accordance with at least one embodiment of the present disclosure.

For further explanation, FIG. 47 sets forth a flowchart of an example method of providing access to composite AI-generated data in accordance with at least one embodiment of the present disclosure. The method of FIG. 47 includes receiving 4702 from a user system 4703, by a controller 4701 of an API server, an API call that specifies a request to perform a data operation on an entity database, the entity database comprising composite AI-generated data, wherein the composite AI-generated data includes entity profiles and scoring data for the plurality of entity profiles, the scoring data generated by an entity analysis system based on attributes, metrics, and AI-derived evaluations. For example, the controller may receive an API call as a structured request sent from a user system over a network to the API server hosting the controller. In one embodiment, the API call arrives as an HTTP request (e.g., GET, POST) that includes specific parameters or payload data indicating the type of data operation requested, such as retrieving or updating information on certain entity profiles in the database. The controller may be configured to listen for incoming API calls, interprets the included parameters, validates the request, and then processes the call by initiating the requested data operation on the entity database, enabling seamless data interaction between the user system and the backend.

The method of FIG. 47 also includes interpreting 4704, by the controller 4701, the API call to identify the data operation and parameters related to the scoring data, wherein the data operation includes at least one of searching, sorting, retrieving, updating, or aggregating the composite AI-generated data based on the parameters specified within the API call. The controller may interpret the API call by examining its structure and content to identify the specific data operation requested, such as searching, sorting, retrieving, updating, or aggregating data within the entity database. For example, the data operation may include comparing one or more entity profile scores. In one embodiment, the controller analyzes the parameters specified in the call-such as keywords, filters, sorting criteria, or entity identifiers—to understand the user's intended operation. In a particular embodiment, the parameters indicate user preferences, such as evaluating custom attributes or attributing more weight in scoring to particular attributes or metrics. Based on this interpretation, the controller determines the precise actions to perform on the composite AI-generated data, efficiently executing the operation according to the requested parameters to deliver targeted results back to the user system.

In addition, the method of FIG. 47 also includes executing 4706, by the controller 4701, the data operation on the entity database according to the specified parameters, wherein the data operation retrieves or modifies the composite AI-generated data in accordance with the request. In one embodiment, the controller 4701 executes the data operation on the entity database by using the parameters specified in the API call to either retrieve or modify the composite AI-generated data as requested. For retrieval operations, in one example, the controller applies filters, search criteria, or sorting rules to extract relevant entity profiles or scores that match the user's requirements. In a modification operation, in one example, the controller updates the existing data—such as revising scores, adding new data points, or adjusting profile information—ensuring that the database accurately reflects the requested changes.

The method of FIG. 47 includes generating 4708, by the controller 4701, a response to the API call, wherein the response includes at least one of: transformed or filtered representation of the AI-generated data, a structured aggregation of the scoring data with metadata describing its evaluation context, or a summary of results of the data operation performed on the AI-generated data. Generating 4708, by the controller 4701, a response to the API call may be carried out by compiling the output based on the data operation's results, formatted according to the user's request. If the operation was a retrieval, the response includes a structured set of composite AI-generated data—such as a list of entity profiles or scores—that directly matches the specified parameters. For modification operations, the response may instead contain a confirmation or status message indicating the successful completion of the requested updates, additions, or deletions, providing clear feedback on the outcome of the operation to the user system.

The method of FIG. 47 includes transmitting 4710, by the controller 4701, the response to the user system. Transmitting the response to the user system may be carried out by packaging the response data—whether it includes retrieved composite AI-generated data or a status message—into a standardized format, typically JSON or XML, which is compatible with API communication. This formatted response is then sent back over the network to the user system 4703 via the API endpoint, ensuring secure and efficient delivery. In one example, upon receipt, the user system can parse and display the data or confirmation message, allowing the user to review the results of their requested data operation immediately.

By interpreting API requests precisely and executing only the specified operations on the relevant data subsets, the controller reduces unnecessary data processing and minimizes the volume of data transmitted over the network. Additionally, structured responses tailored to specific user queries decrease network bandwidth usage and speed up response times, enabling more efficient use of server resources and delivering faster, more responsive interactions to users across distributed systems.

Figure 48:
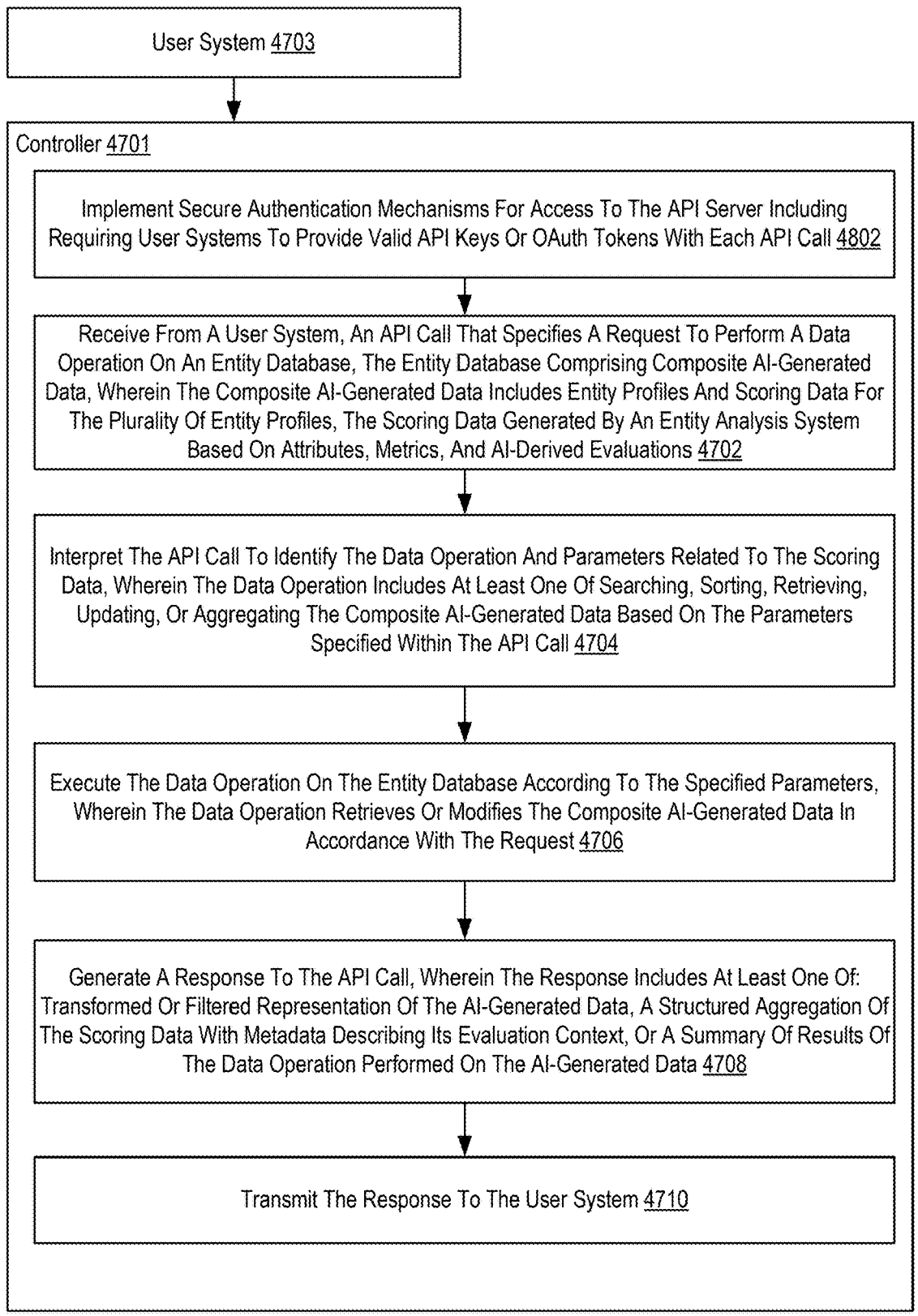
FIG. 48 sets forth a flowchart of another example method of providing access to composite AI-generated data in accordance with at least one embodiment of the present disclosure.

For further explanation, FIG. 48 sets forth a flowchart of another example method of providing access to composite AI-generated data in accordance with at least one embodiment of the present disclosure. The method of FIG. 48 is similar to the method of FIG. 47 in that the method of FIG. 48 includes the elements of FIG. 47. The method of FIG. 48 also includes implementing 4802, by the controller 4701, secure authentication mechanisms for access to the API server including requiring user systems to provide valid API keys or OAuth tokens with each API call.

Figure 49:
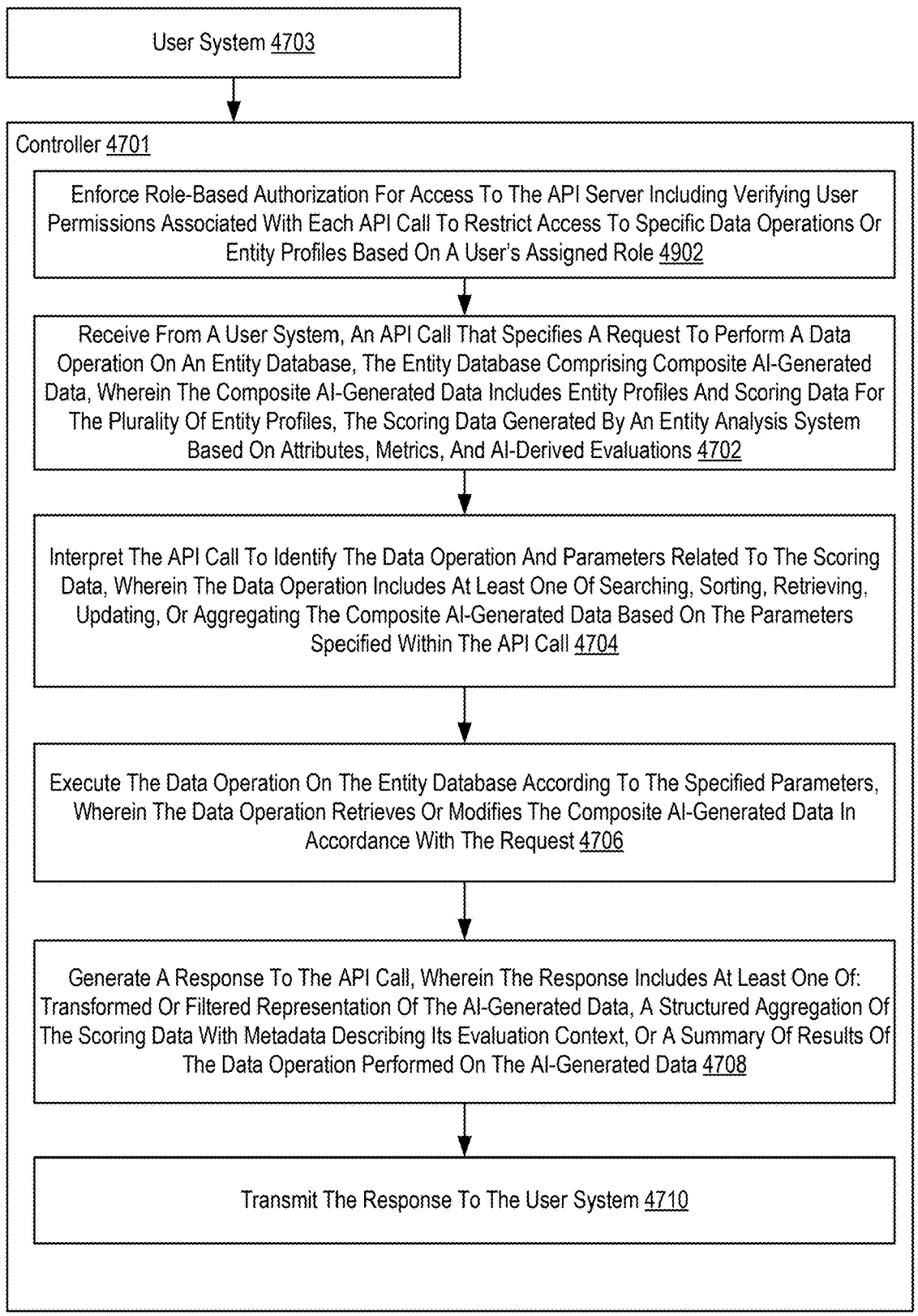
FIG. 49 sets forth a flowchart of another example method of providing access to composite AI-generated data in accordance with at least one embodiment of the present disclosure.

For further explanation, FIG. 49 sets forth a flowchart of another example method of providing access to composite AI-generated data in accordance with at least one embodiment of the present disclosure. The method of FIG. 49 is similar to the method of FIG. 47 in that the method of FIG. 49 includes the elements of FIG. 47. The method of FIG. 49 also includes enforcing 4902, by the controller 4701, role-based authorization for access to the API server including verifying user permissions associated with each API call to restrict access to specific data operations or entity profiles based on a user's assigned role. Enforcing 4902, by the controller 4701, role-based authorization for access to the API server may be carried out by requiring user systems to include valid credentials—such as API keys or OAuth tokens—with each API call made to the server. In a particular embodiment, when an API call is received, the controller verifies these credentials against a secure database of authorized users, ensuring that only authenticated and permitted users can access the composite AI-generated data or perform data operations. This authentication process protects the API server from unauthorized access, enhancing the security of sensitive data while maintaining trust and compliance across the system for all authorized user interactions.

Figure 50:
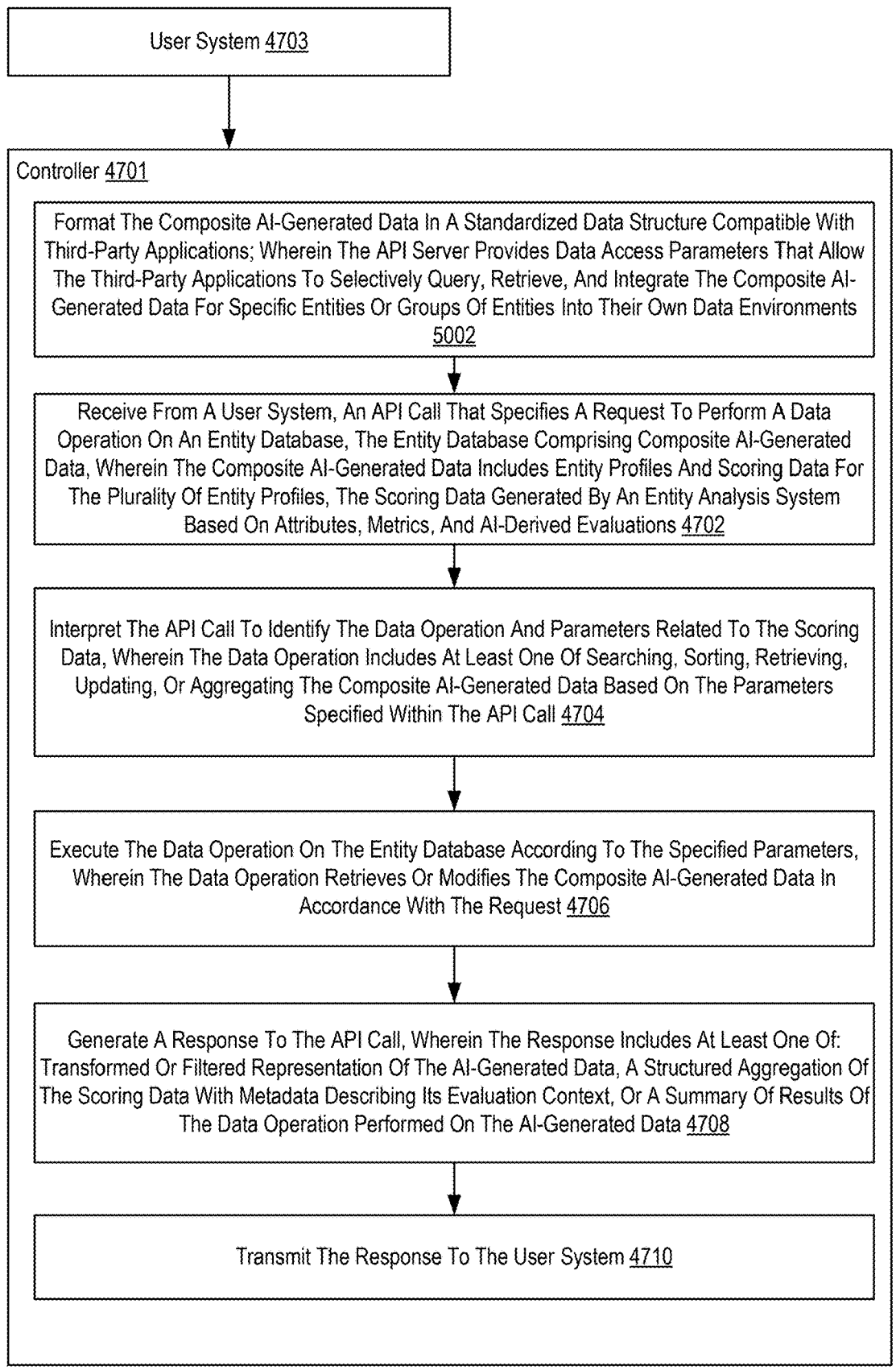
FIG. 50 sets forth a flowchart of another example method of providing access to composite AI-generated data in accordance with at least one embodiment of the present disclosure.

For further explanation, FIG. 50 sets forth a flowchart of another example method of providing access to composite AI-generated data in accordance with at least one embodiment of the present disclosure. The method of FIG. 50 is similar to the method of FIG. 47 in that the method of FIG. 50 includes the elements of FIG. 47. The method of FIG. 50 also includes formatting 5002, by the controller 4701, the composite AI-generated data in a standardized data structure compatible with third-party applications. In the example of FIG. 50, the API server provides data access parameters that allow the third-party applications to selectively query, retrieve, and integrate the composite AI-generated data for specific entities or groups of entities into their own data environments. Formatting 5002, by the controller 4701, the composite AI-generated data in a standardized data structure compatible with third-party applications may be carried out by formatting the composite AI-generated data into a standardized data structure, such as JSON, XML, or CSV, to ensure compatibility with third-party applications and systems. During this process, the controller organizes and labels data elements according to widely accepted conventions, making it straightforward for external applications to parse, process, and integrate the data. This standardization allows seamless data exchange and interoperability across various platforms, enabling users to easily import and utilize the AI-generated insights within their preferred tools and workflows.

Figure 51:
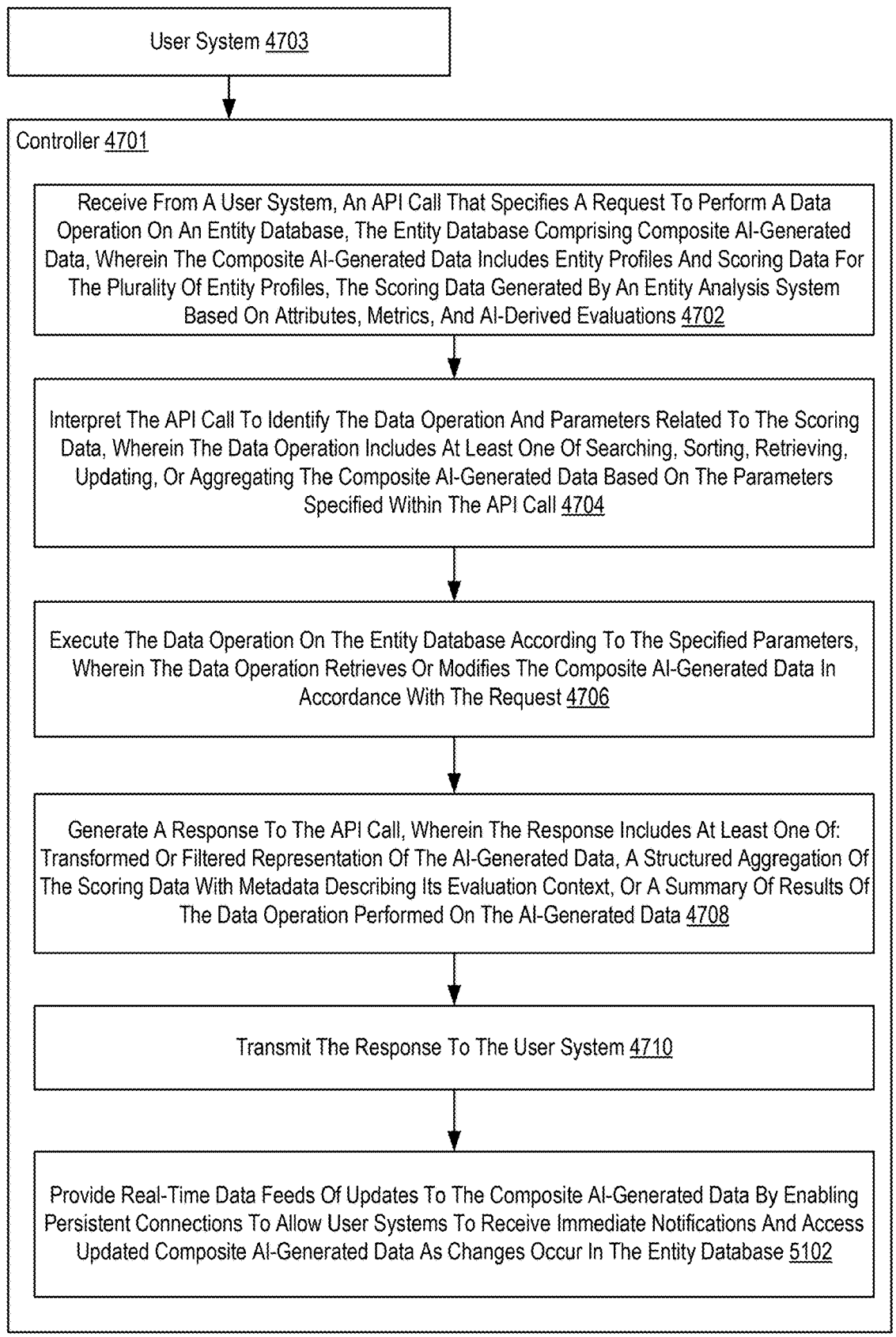
FIG. 51 sets forth a flowchart of another example method of providing access to composite AI-generated data in accordance with at least one embodiment of the present disclosure.

For further explanation, FIG. 51 sets forth a flowchart of another example method of providing access to composite AI-generated data in accordance with at least one embodiment of the present disclosure. The method of FIG. 51 is similar to the method of FIG. 47 in that the method of FIG. 51 includes the elements of FIG. 47. The method of FIG. 51 also includes providing 5102, by the controller 4701, real-time data feeds of updates to the composite AI-generated data by enabling persistent connections to allow user systems to receive immediate notifications and access updated composite AI-generated data as changes occur in the entity database. In a particular embodiment, the controller 4701 provides real-time data feeds by establishing persistent connections, such as WebSockets or Server-Sent Events (SSE), allowing user systems to stay continuously connected and receive immediate notifications of updates to the composite AI-generated data. For example, as changes occur within the entity database, the controller instantly transmits these updates through the open connection, ensuring that user systems are promptly informed of new data or modifications. This real-time access enables users to monitor the latest information without repeatedly querying the API, enhancing data timeliness and responsiveness across connected applications.

Figure 52:
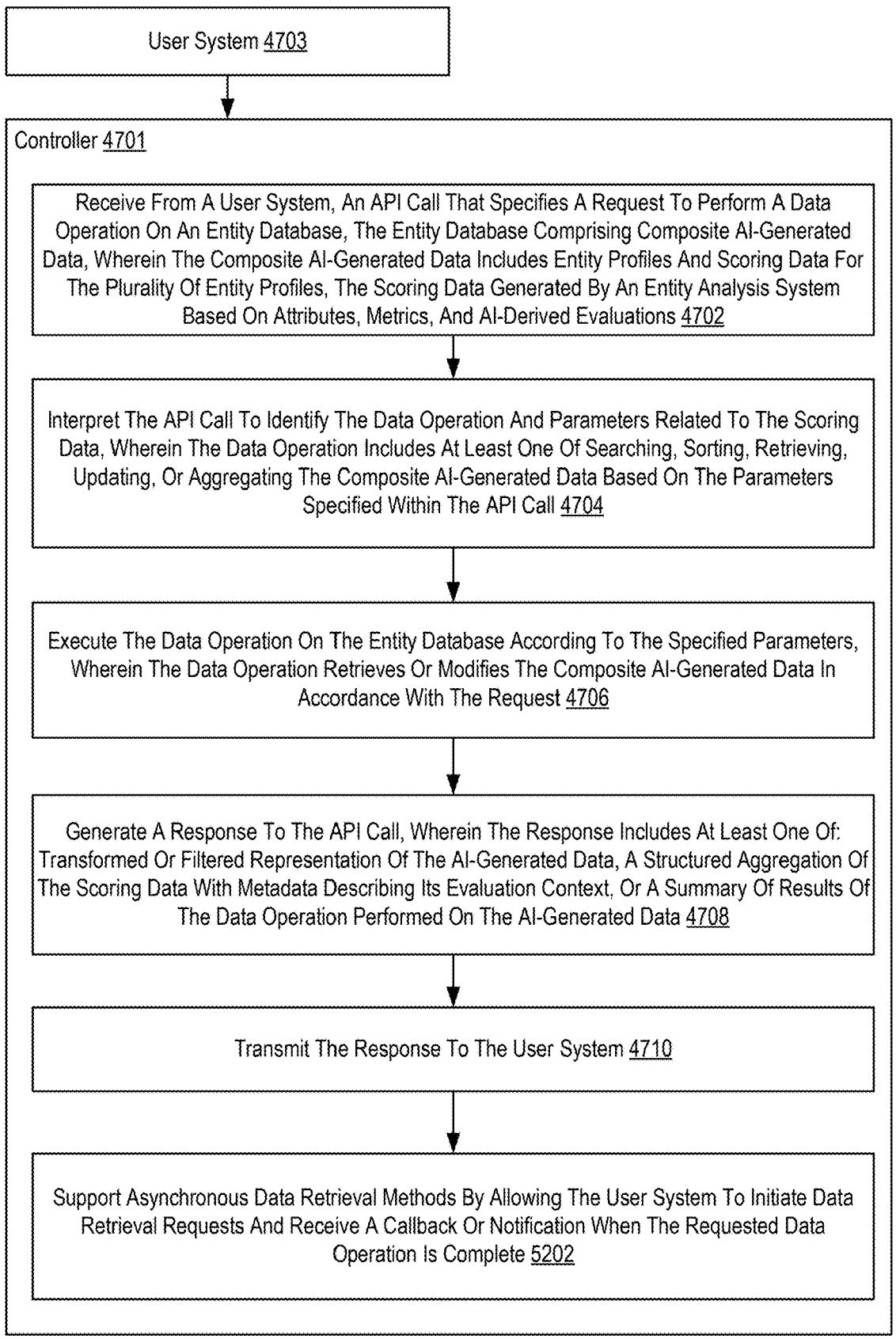
FIG. 52 sets forth a flowchart of another example method of providing access to composite AI-generated data in accordance with at least one embodiment of the present disclosure.

For further explanation, FIG. 52 sets forth a flowchart of another example method of providing access to composite AI-generated data in accordance with at least one embodiment of the present disclosure. The method of FIG. 52 is similar to the method of FIG. 47 in that the method of FIG. 52 includes the elements of FIG. 47. The method of FIG. 52 also includes supporting 5202, by the controller, asynchronous data retrieval methods by allowing the user system to initiate data retrieval requests and receive a callback or notification when the requested data operation is complete. For example, the controller 4701 supports asynchronous data retrieval by allowing the user system to initiate data requests that do not require an immediate response. Upon receiving such a request, the controller processes the data operation in the background and, once complete, sends a callback or notification to the user system, indicating that the requested data is ready. This asynchronous method enables users to perform other tasks while waiting for results, reducing idle time and improving the efficiency of both the user system and the API server by handling longer or more complex operations without blocking resources.

Figure 53:
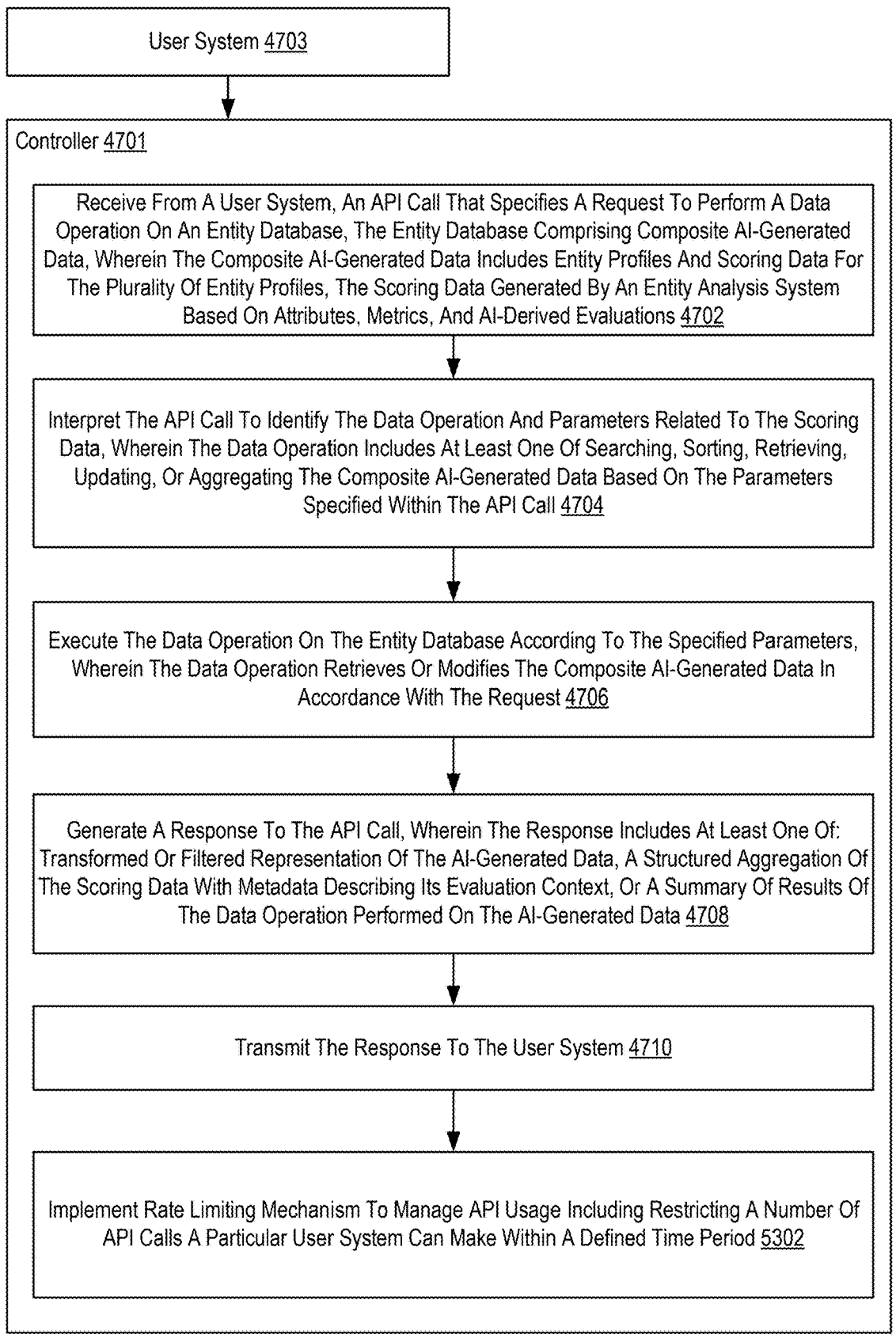
FIG. 53 sets forth a flowchart of another example method of providing access to composite AI-generated data in accordance with at least one embodiment of the present disclosure.

For further explanation, FIG. 53 sets forth a flowchart of another example method of providing access to composite AI-generated data in accordance with at least one embodiment of the present disclosure. The method of FIG. 53 is similar to the method of FIG. 47 in that the method of FIG. 53 includes the elements of FIG. 47. The method of FIG. 53 also includes implementing 5302, by the controller 4701, rate limiting mechanism to manage API usage including restricting the number of API calls a particular user system can make within a defined time period. In one embodiment, the controller 4701 enforces a rate limiting policy that restricts the number of API calls a particular user system can make within a defined time period (e.g., per minute, hour, or day). For example, the controller may track each user's API usage and apply thresholds that, once exceeded, temporarily block further requests from that user. Rate limiting prevents server overload, maintains fair access among users, and protects system performance and stability by ensuring that no single user consumes an excessive amount of resources.

For further explanation, FIG. 54 sets forth a flowchart of another example method of providing access to composite AI-generated data in accordance with at least one embodiment of the present disclosure. The method of FIG. 54 is similar to the method of FIG. 47 in that the method of FIG. 54 includes the elements of FIG. 47. The method of FIG. 54 also includes utilizing 5402, by the controller 4701, monitoring tools to track at least one of API usage patterns, response times, and or error rates related to usage of the API server by user systems. In one embodiment, the controller 4701 utilizes monitoring tools to track critical metrics, such as API usage patterns, response times, and error rates, related to how user systems interact with the API server. By continuously collecting and analyzing these metrics, the controller can detect usage trends, identify performance bottlenecks, and pinpoint areas where errors frequently occur. This real-time monitoring enables proactive maintenance, optimization of server resources, and rapid troubleshooting, ultimately ensuring a more reliable and efficient API service for all users.

The method of FIG. 54 also includes proactively adjusting 5404, by the controller 4701, system capacity to maintain consistent performance under varying usage conditions. Adjusting 5404, by the controller 4701, system capacity to maintain consistent performance under varying usage conditions may be carried out by scaling resources, such as server instances or processing power, in response to fluctuating API usage to maintain consistent performance. Through real-time monitoring of demand patterns, the controller can automatically increase capacity during peak usage to prevent slowdowns or allocate fewer resources during off-peak times to optimize efficiency. This dynamic scaling ensures stable performance and responsiveness for all users, regardless of sudden increases in demand, while also optimizing resource usage and cost.

Figure 55:
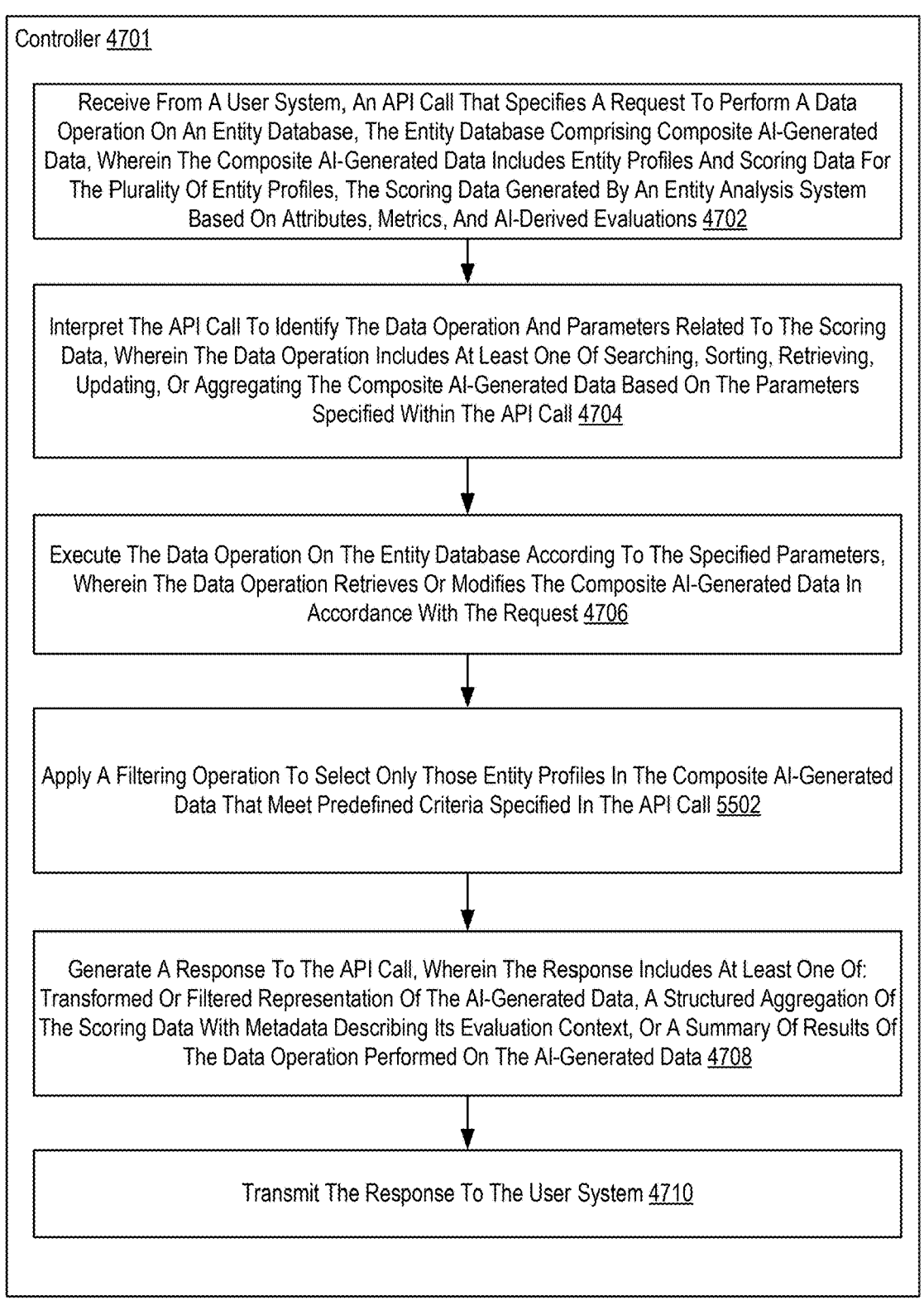
FIG. 55 sets forth a flowchart of another example method of providing access to composite AI-generated data in accordance with at least one embodiment of the present disclosure.
Figure 56:
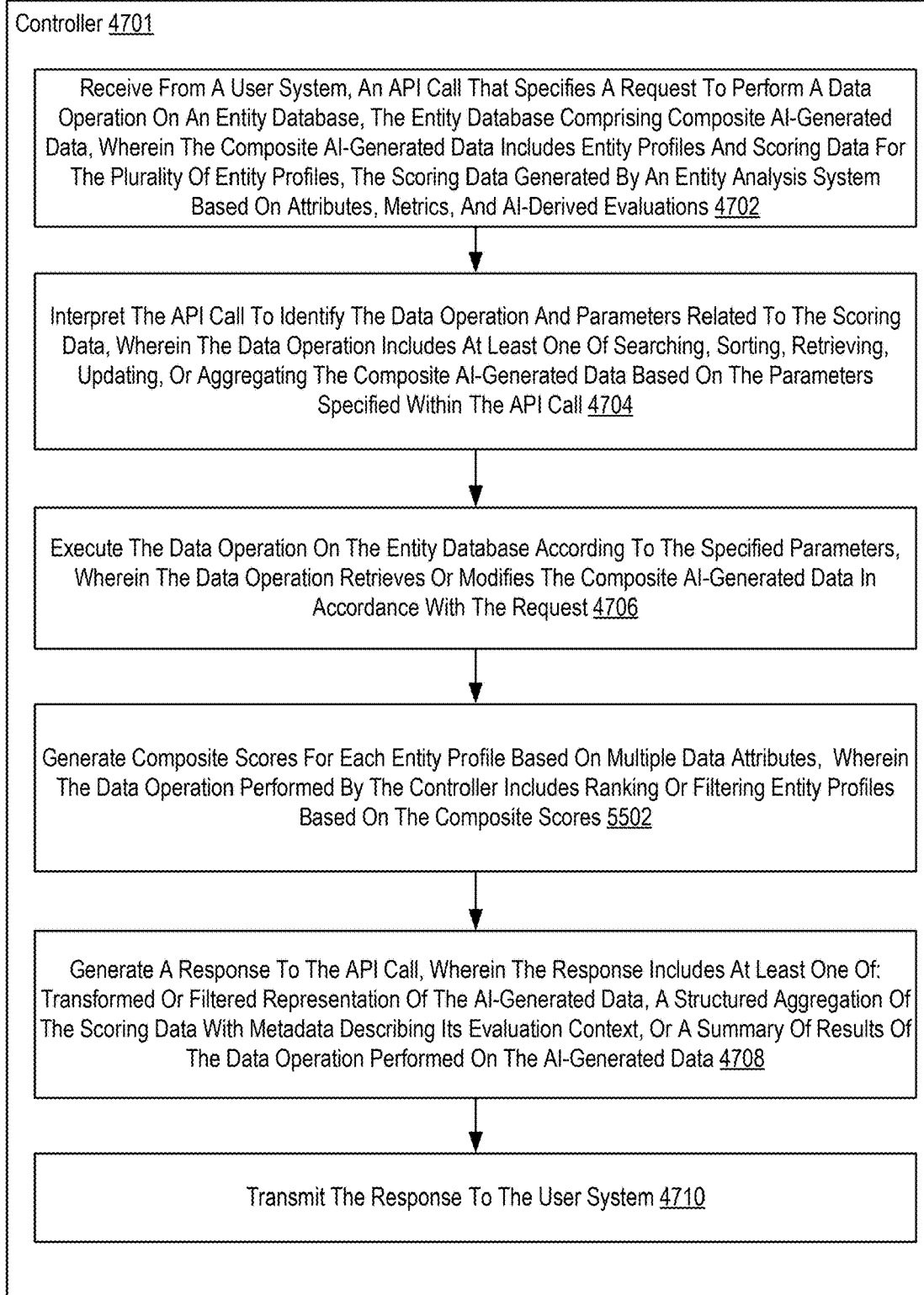
FIG. 56 sets forth a flowchart of another example method of providing access to composite AI-generated data in accordance with at least one embodiment of the present disclosure.

For further explanation, FIG. 55 sets forth a flowchart of another example method of providing access to composite AI-generated data in accordance with at least one embodiment of the present disclosure. The method of FIG. 55 is similar to the method of FIG. 47 in that the method of FIG. 55 includes the elements of FIG. 47. In the example of FIG. 55, the data operation specified in the API call includes a sorting operation. In the method of FIG. 55, generating 4708, by the controller 4701, a response to the API call includes arranging 5502 a listing of a first set of entity profiles from the composite AI-generated data in the response based on a ranking of one or more attributes associated with each entity profile. Arranging 5502 a listing of a first set of entity profiles may be carried out by sorting and organizing the profiles based on specific criteria to create an ordered list that meets user requirements. The controller prioritizes profiles according to parameters set in the user query, which might include filtering entities by industry, performance metrics, or other attributes relevant to the query. This structured arrangement allows users to quickly and easily review the most pertinent profiles in a clear and accessible format, enhancing usability and data For further explanation, FIG. 56 sets forth a flowchart of another example method of providing access to composite AI-generated data in accordance with at least one embodiment of the present disclosure. The method of FIG. 56 is similar to the method of FIG. 47 in that the method of FIG. 56 includes the elements of FIG. 47. The method of FIG. 56 also includes applying 5602, by the controller 4701, a filtering operation to select only those entity profiles in the composite AI-generated data that meet predefined criteria specified in the API call. In a particular embodiment, he controller (4701) applies a filtering operation to refine the composite AI-generated data by selecting only those entity profiles that meet the specific criteria defined in the API call. This involves parsing the criteria parameters—such as industry, risk level, geographic location, or composite score thresholds—and using them to exclude profiles that do not match these requirements. By narrowing down the data set to only the most relevant profiles, the controller delivers a tailored response that aligns with the user's precise needs, optimizing both response relevance and processing efficiency.

Digitally traded assets can include digital stocks and securities, such as tokenized stocks, bonds, and other financial instruments representing traditional assets but issued and traded in digital form. Digitally traded assets can also include cryptocurrencies or other digital currencies that are decentralized and sold on cryptocurrency exchanges. Digitally traded assets can include non-fungible tokens (NFTs) representing ownership of specific items such as digital art, music, or collectibles, which are typically traded on NFT marketplaces. Digitally traded assets can also include other forms of digital property, such as digital tickets or tokenized virtual property. In a particular example, a digitally traded asset is a tokenized security instrument that represents an investment in one or more entities such as companies, funds, or traditional assets.

Digital stocks and securities work by representing traditional financial assets—such as company stocks, bonds, or other equity or debt instruments—in a digital form, often using blockchain technology or secure digital platforms to facilitate their issuance, transfer, and trade. This digital form is typically referred to as a token or coin. Tokenization can occur on blockchain platforms, where each token represents a fraction or whole ownership of the underlying asset. This process breaks down large assets, like company shares or real estate, into smaller parts that can be traded easily, providing investors with more liquidity and flexibility. Digital securities are issued and traded on online platforms, known as security token exchanges or alternative trading systems (ATS), that facilitate peer-to-peer transactions. The blockchain technology underlying many of these platforms provides transparency, security, and efficiency in transferring ownership, making the trading process faster and often more cost-effective than traditional exchanges. Many digital securities utilize smart contracts, which are self-executing contracts that automate aspects of the security's behavior, such as dividend payments, voting rights, and compliance with regulations. Smart contracts ensure that rules are embedded directly into the security token, reducing the need for intermediaries and enhancing transparency.

In some cases, traditional assets are "tokenized," meaning a digital token is created to represent ownership of the asset. In some cases, traditional investment funds are tokenized, meaning a digital token is created to represent ownership in the fund. For example, a fund may hold multiple financial assets such as stocks, bonds, equity ownership, and so on. Each asset held by the amounts to a certain share of the fund. When the fund is tokenized, that digital asset can be traded among investors, where one token represents a fraction of the share of the financial assets held by the fund. In this sense, a token is said to be backed by the entities in which the fund holds a financial stake. Consider an example where 25% of a fund is invested in company A and 75% is invested in company B. Each token minted for the fund is then backed 25% by company A and 75% by company B, and can therefore be valued based on these apportionments and the values of those entities.

However, where a token is backed by many entities (e.g., companies or assets), the value of such a token can change as the value of the investment in these entities changes. Tracking and analyzing changes in the valuations of many entities is difficult and stale or incomplete data may lead to inaccurate characterizations of the token's value. For example, investment funds often hold a mix of asset classes, including stocks, bonds, real estate, private equity, and so on. Each asset type requires a different valuation approach: stocks may rely on market prices, real estate on appraisals, and private equity on cash flows. The varying methods and periodic changes in these valuations can complicate establishing a unified token value. Moreover, some assets, early-stage venture investments, may experience high volatility that causes frequent fluctuations in the fund's total value.

In accordance with embodiments of the present disclosure, utilization of an AI model for data aggregation and analysis improves the quality of the source data used for determining a valuation of a digitally traded asset. Technology resources for such data-driven analyses are focused on collecting and analyzing the most relevant information and not wasting processing resources on analyzing non-relevant information. This improves resource utilization of the underlying computing technology, reduces cost (e.g., processing time, computational resources, energy costs), and improves the efficiency and accuracy of results.

Figure 57:
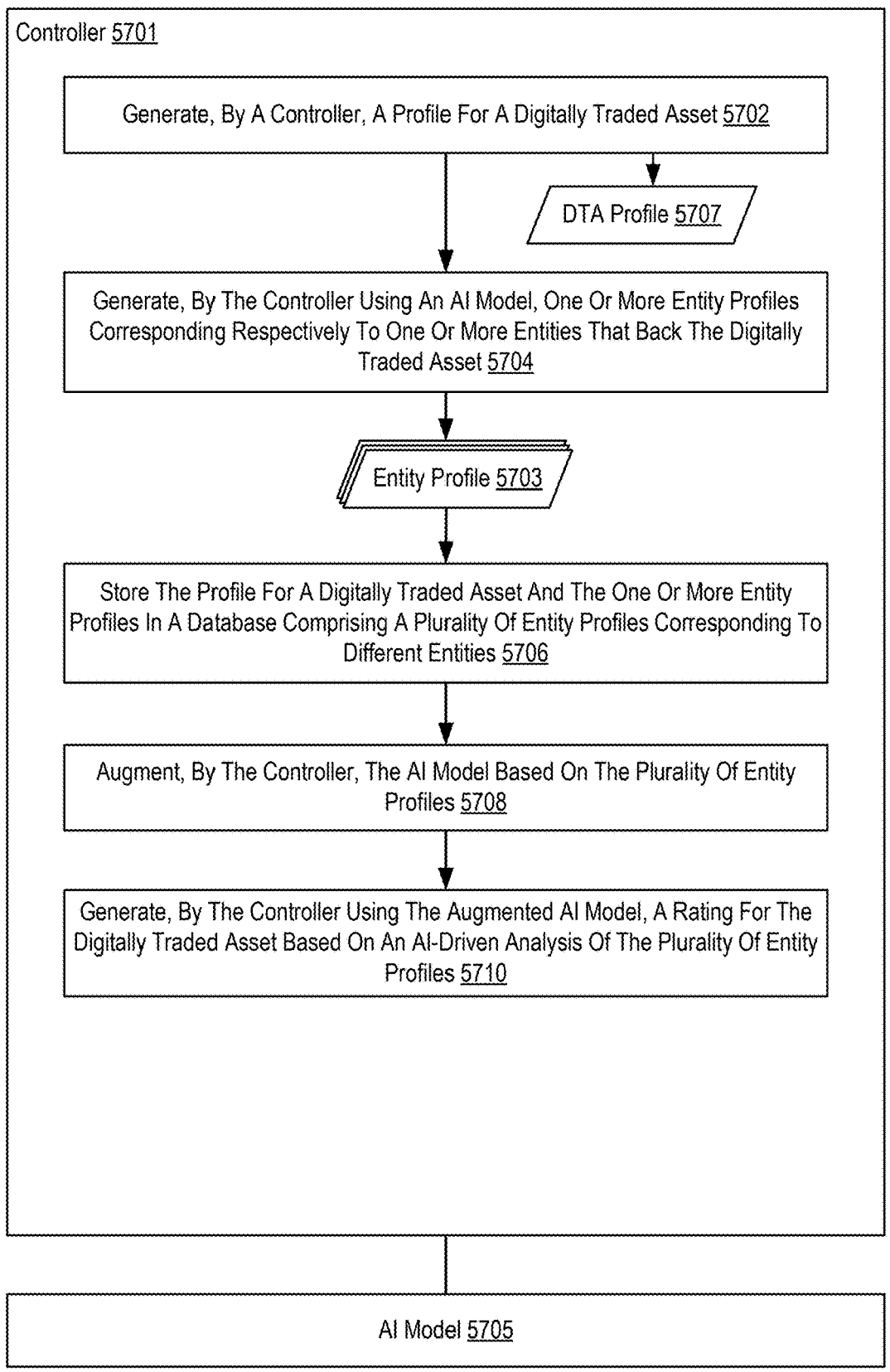
FIG. 57 sets forth a flowchart of another example method of evaluating tokenized entities using an AI model in accordance with at least one embodiment of the present disclosure.

For further explanation, FIG. 57 sets forth a flow chart of an example method for evaluating tokenized entities using an AI model in accordance with at least one embodiment of the present disclosure. The example method of FIG. 57 can be implemented in a data analysis system such as the integrated entity analysis system 100 described with reference to any of FIG. 1 to FIG. 4. The example method of FIG. 57 includes generating 5702, by a controller 5701, a profile 5707 for a digitally traded asset. The profile 5707 includes a number of fields that correspond to characteristics of a digitally traded asset. These fields may be based on a structured template that is used for a digitally traded asset. Example fields can include current value of the digitally traded asset, entities backing the digitally traded asset, ratings of those entities, the fraction by which those entities back the digitally traded asset, market capitalization, number of tokens minted, and so on.

In some examples, the controller 5701 generates 5702 the profile 5707 of the digitally traded asset by extracting information about the digitally traded asset from unstructured data sources, such as documents provided by a user or web-based data sources (e.g., by scraping web pages). The controller 5701 structuralizes the unstructured data and uses the unstructured data to populate fields of the digitally traded asset profile, for example, in the manner discussed above relating to extracting entity characteristics from unstructured data. For example, a user may provide a document that includes a description of the digitally traded asset. Data representing characteristics of the digitally traded asset is extracted from the unstructured data. For example, the unstructured data may describe the digitally traded asset in terms of entities backing the digitally traded asset and the fraction by which those entities back the digitally traded asset. The unstructured data may include current financial data for those entities, such as valuation data or market capitalization. The description may include token information such as the number of outstanding tokens, minting date, and so on. Other types of characteristics of a digitally traded asset may be apparent to those of skill in the art. The unstructured data may be a natural language description.

In some examples, the controller generates 5702 the profile 5707 for the digitally traded asset by processing the structured and unstructured data and transforming this data into a structure used for a database record or data structure object. In some examples, a digitally traded asset profile is a database record, such as one or more tables or other types of data structures that include one or more fields, attributes, properties, metrics and so on. In some examples, the database record may be a JSON or other parsable data structure. The fields (or attributes, properties, metrics, etc., collectively referred to as 'fields') correspond to characteristics of the digitally traded asset, such as the entity properties discussed above.

The method of FIG. 57 also includes generating 5704, by the controller using an AI model 5705, one or more entity profiles 5703 corresponding respectively to one or more entities that back the digitally traded asset. Generating 5704, by the controller using an AI model 5705, one or more entity profiles 5703 corresponding respectively to one or more entities that back the digitally traded asset can include creating a new entity profile or updating an existing entity profile for each entity that backs the digitally traded asset. In some examples, the controller generates 5704 the entity profiles 5703 by aggregating and processing structured and unstructured data from external data sources and transforming this data into a structure used for an entity profile, as will be explained in more detail below. In some examples, an entity profile is a database record, such as one or more tables or other types of data structures that include one or more fields, attributes, properties, metrics and so on. In some examples, the database record may be a JSON or other parsable data structure. The fields (or attributes, properties, metrics, etc., collectively referred to as 'fields') correspond to characteristics of the entity, such as the entity properties discussed above. In some examples, the structure of the entity profile depends upon the category of the entity and/or a subtype of a category. Examples of entity categories include a company, a person, a fund, a deal, and an asset, among others that will occur to those of skill in the art.

The method of FIG. 57 also includes storing 5706 the profile for a digitally traded asset and the one or more entity profiles in a database comprising a plurality of entity profiles corresponding to different entities. As discussed above, the entity profile can be stored as one or more records (e.g., tables) in a relational database, or may be stored as a JSON object. The entity profile 5703 is included among multiple entity profiles in an entity dataset. The entity dataset may be associated with a particular user of the system.

The method of FIG. 57 also includes augmenting 5708, by the controller 5701, an AI model 5705 based on the plurality of entity profiles. For example, the AI model 5705 can be the machine learning model 180 of FIG. 1 to FIG. 4 or any of the AI models discussed above. In some examples, the controller 5701 augments 5708 the AI model 5705 by configuring the AI model 5705 for retrieval-augmented generation. For example, the controller 5701 can configure the AI model 5705 for retrieval-augmented generation by linking the AI model 5705 to the dataset of entity profiles to provide a context for results generated by the AI model 5705. In one example, entity profiles are converted to vector embeddings. An attribute definition (e.g., valuation metric, risk metric, etc.) is also converted to a vector embedding. For example, the controller 5701 may generate an attribute definition of a financials attribute as based on revenue, profit, debt, etc. A similarity search can be performed to identify portions of entity profile data that are relevant to the attribute based on the vector embedded data and the vector embedded attribute definition. The relevant profile data is then supplied as a context to the AI model for rating the entity based on the attribute. In some examples, the controller 5701 augments 5708 the AI model 5705 with contextual priming. For example, the controller 5701 can generate a prompt to assign the AI model 5705 a specific role, persona, or expertise upon which it bases its responses.

The method of FIG. 57 also includes generating 5710, by the controller using the AI model, a rating for the digitally traded asset based on an AI-driven analysis of the plurality of entity profiles. The rating can be, for example, a valuation analysis, risk assessment, score, or rank. In some examples, the rating is based on ratings of entities that back the digitally traded asset. The rating of entities that back the digitally traded assets may be weighted based on the fraction of the digital assets that is backed by a particular entity. Thus, where a rating represents a risk assessment, the risk assessment of the digitally traded asset may be a weighted average of the risk scores of the entities backing the digitally traded asset. The controller 5701 uses the AI model 5705 to assist in generating these ratings.

In some examples, in generating 5710 the rating, the controller 5701 configures the AI model 5705 to perform a valuation analysis by, for example, formulating one or more prompts to the AI model 5705 to perform a valuation analysis based on the profile of the digitally traded asset, the entity profiles of entities backing the digitally traded asset, and other entity profiles in the database. In some implementations, the controller 5701 optimizes the AI model 5705 to generate a valuation analysis by orchestrating retrieval-augmented generation in the AI model 5705, thus enhancing the output of the AI model 5705 for assessing a valuation for the digitally traded asset. For example, the controller 5701 may configure the retrieval-augmented generation based on valuation data in the profiles in the database. In some examples, the controller formulates a prompt for a valuation analysis based on one or more metrics. The metrics may correspond to fields in the profile of the digitally traded asset and/or fields of the entity profiles of the entities backing the digitally traded asset, where those fields include data useful in generating a valuation analysis. Valuation data can be extracted from entity profiles as discussed previously. Thus, in a particular example, valuation data extracted from entity profiles of entities that back the digitally traded asset can, in turn, be used as valuation data to generate a valuation analysis of the digitally traded asset.

In some examples, in generating 5710 the rating, the controller 5701 configures the AI model 5705 to generate a score for the digitally traded asset by, for example, formulating one or more prompts to the AI model 5705 to generate a score based on the profile of the digitally traded asset, the entity profiles of entities backing the digitally traded asset, and other entity profiles in the database. In some implementations, the controller 5701 optimizes the AI model 5705 to generate a score by orchestrating retrieval-augmented generation in the AI model 5705, thus enhancing the output of the AI model 5705 for determining a score for the digitally traded asset. For example, the controller 5701 may configure the retrieval-augmented generation based on profile data in the profiles in the database that relate to particular metrics for determining a score. The metrics for determining a score may be predefined. In some examples, the controller formulates a prompt to generate a score based on one or more metrics. The metrics may correspond to fields in the profile of the digitally traded asset and/or fields of the entity profiles of the entities backing the digitally traded asset, where those fields include data useful in generating a score. Thus, in a particular example, a score generated for a particular entity or entities that back the digitally traded asset can in turn be used to generate a score for the digitally traded asset.

In some examples, in generating 5710 the rating, the controller 5701 configures the AI model 5705 to perform a risk analysis by, for example, formulating one or more prompts to the AI model 5705 to perform a risk analysis based on the profile of the digitally traded asset, the entity profiles of entities backing the digitally traded asset, and other entity profiles in the database. In some implementations, the controller 5701 optimizes the AI model 5705 to generate a risk assessment by orchestrating retrieval-augmented generation in the AI model 5705, thus enhancing the output of the AI model 5705 for assessing a risk associated with the entity. For example, the controller 5701 can generate commands to link content of entity profiles to the AI model 5705. Based on that data, the AI model 5705 can correlate various properties associated with risk across the corpus of entity profiles in the dataset to return a risk assessment for the digitally traded asset.

In some implementations, the rating for the digitally traded asset is updated any time an entity profile of an entity backing the digitally traded asset is updated. In some implementations, the rating for the digitally traded asset is updated any time any entity profile in the database is updated. These updates are carried out by the controller in response to updating entity profile data. In some implementations, data retrieval for updating entity profiles is carried out on a periodic basis to ensure that profile data in the entity profiles is up-to-date.

Figure 58:
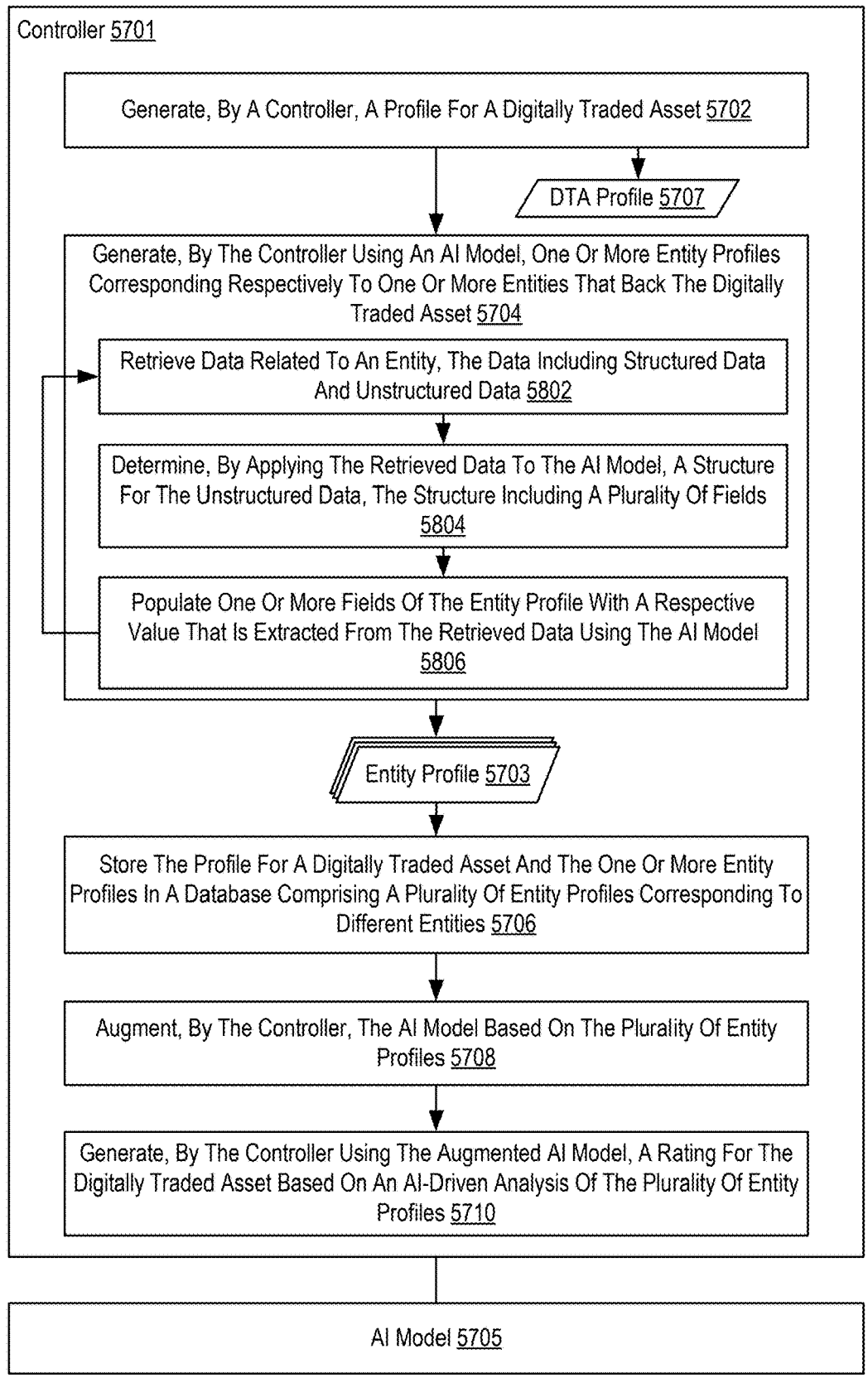
FIG. 58 sets forth a flowchart of another example method of evaluating tokenized entities using an AI model in accordance with at least one embodiment of the present disclosure.

For further explanation FIG. 58 sets forth another example method of evaluating tokenized entities using an AI model in accordance with at least one embodiment of the present disclosure. The method of FIG. 58 extends the method of FIG. 57 in that generating 5704, by the controller using an AI model 5705, one or more entity profiles 5703 corresponding respectively to one or more entities that back the digitally traded asset includes an iterative process that includes retrieving 5802, by the controller 5701, data related to an entity, the data including structured data and unstructured data. In some examples, the controller 5701 retrieves 5802 data by retrieving structured data from structured data sources. In these examples, the structured data can be retrieved by executing one or more queries, such as a SQL query, on a structured database. For example, the structured database can be a relational database. In other examples, the structured database can be a parsable dataset such as an XML, JSON, or CSV dataset. In these examples, retrieving the structured data can include searching and parsing the structured data in the dataset. The structured database can be a local database, including entity profiles and bulk datasets, or a remote database. In the case of a remote database, the structured data source can be accessed, for example, through a web-based API.

In some examples, the controller 5701 retrieves 5802 data by retrieving unstructured data from unstructured data sources (e.g., Internet data sources). Examples of unstructured data sources include web sites, data feeds, news feeds, social media platforms, review platforms, and the like. In some examples, the controller 5701 searches for unstructured data related to the entity using natural language search strings to identify relevant unstructured sources. This can include, for example, using general purpose Internet search engines, domain-specific or platform integrated search modules, and other techniques. By way of illustration, a search string that identifies the name of a company may return results such as a web site of the company, a social media page for the company, a professional platform page for the company, press releases mentioning the company, news articles mentioning the company, and so on. Upon identifying relevant sources, the controller 5701 extracts unstructured natural language content from the data sources. In some examples, the controller 5701 utilizes web scraping to extract the unstructured information related to the entity. Web scraping is the process of extracting data from websites by using software or scripts to automatically gather information from web pages.

In some implementations, the controller 5701 processes the raw unstructured data by parsing and/or filtering the raw unstructured data using a natural language processor. In these implementations, parsing and/or filtering the raw unstructured data distills the data to remove non-relevant or extraneous data. For example, a posting on a review site from a previous employee of the company may not be relevant to an entity profile for the company; thus, such content may be filtered out. The controller 5701 can employ natural language processing techniques to determine the context of the unstructured data and thus its relevance to an entity profile. In some implementations, the controller 5701 ranks the unstructured data based on its quality or reliability determined from, for example, the source of the unstructured data or a search engine rank. In some examples, the data source can be ranked prior to extracting the unstructured data (e.g., by web scraping) to limit the amount of non-relevant data that is retrieved.

In the example of FIG. 58, the iterative process of generating 5704, by the controller using an AI model 5705, one or more entity profiles 5703 corresponding respectively to one or more entities that back the digitally traded asset also includes determining 5804, by applying the retrieved data to an AI model 5705, a structure for the unstructured data, the structure including a plurality of fields. In some implementations, the controller 5701 applies the unstructured data to the AI model 5705 to determine 5804 the structure for the unstructured data by formulating one or more prompts to the AI model 5705 based on the unstructured data (e.g., the raw or processed unstructured data). For example, the controller 5701 can select a piece of content from the unstructured data and call an API of the AI model 5705 to generate a structure for that content that organizes the data into a set of fields. In such an example, the AI model 5705 can analyze the unstructured data to extract data fields using natural language processing and classification techniques. For example, the AI model 5705 may include a classifier neural network. As an illustrative example, the AI model 5705 may analyze unstructured data describing a company and generate a set of fields that include industry, founder, CEO, etc., for the company. Thus, in some examples, the AI model 5705 returns a property/value pair for data extracted from the unstructured data, where the property is corresponds to the data field and the value is the data corresponding to that the field (e.g., industry: pharmaceutical). Thus, the AI model 5705 generates structuralized data from the unstructured data.

In some implementations, the AI model 5705 generates the fields for the unstructured data based on one or more structured templates. For example, the AI model 5705 may be trained, tuned, or augmented based on the structured templates to identify data corresponding to fields in those templates, as will be explained in more detail below. In other implementations, the AI model 5705 generates the fields dynamically based on data elements that are recognized from the unstructured data, as will be explained in more detail below.

In the example of FIG. 58, the iterative process of generating 5704, by the controller using an AI model 5705, one or more entity profiles 5703 corresponding respectively to one or more entities that back the digitally traded asset also includes populating 5806 one or more fields of the entity profile 5703 with a respective value that is extracted from the retrieved data using the AI model 5705. In some implementations, the controller 5701 populates 5806 one or more fields of the entity profile 5703 with a respective value that is extracted from the retrieved data using the AI model 5705 by mapping one or more fields of the entity profile to one or more fields of the structuralized data derived from the unstructured data. In some examples, a template for the entity profile is selected based on the entity type. Values from the property/value pairs can then be mapped to the entity profile based on a correspondence between the entity profile fields and the property type of the property/value pairs. In other implementations, a specific template is not relied upon and the property fields identified by the AI model 5705 are adopted as the fields of the entity profile. In this case, the entity profile is created or updated using the property/value fields directly. In still other implementations, the template for the entity profile is modified to include additional fields based on property/value fields that do not have a correspondence to a field in the entity profile.

In some cases, after extracting data for the entity profile from the structured data and unstructured data, one or more fields of the entity profile may be unfilled or 'null.' In some cases, the AI model 5705 may return a property/value pair with a null value, in that the AI model 5705 identified a property of the entity but could not identify a value for the property. In some cases, the identification of a property of the entity may spawn additional fields to include in the entity profile. For example, upon identifying that a company is a startup company, there may be additional fields specifically related to a startup company, or there may be a particular template for an entity profile of a startup company. As such, the iterative process of generating 5704, by the controller using an AI model 5705, one or more entity profiles 5703 corresponding respectively to one or more entities that back the digitally traded asset repeats one or more cycles to retrieve additional unstructured data, structuralize the unstructured data, and update the entity profile according to the additional data. For example, the controller 5701 can identify, based on data missing from an existing field or the identification of new or additional fields, that some element of data is missing from the entity profiles and retrieve additional data that is relevant to the missing element.

In this way, the controller 5701 employs the AI model 5705 to assist the generation of the entity profile such that technology resources are focused on collecting and analyzing the most relevant information while ignoring or not collecting non-relevant information. This improves resource utilization of underlying computing technology, conserves resource costs (e.g., processing time, power consumption), and improves the efficiency and accuracy of analytics derived from these curated entity profiles.

Figure 59:
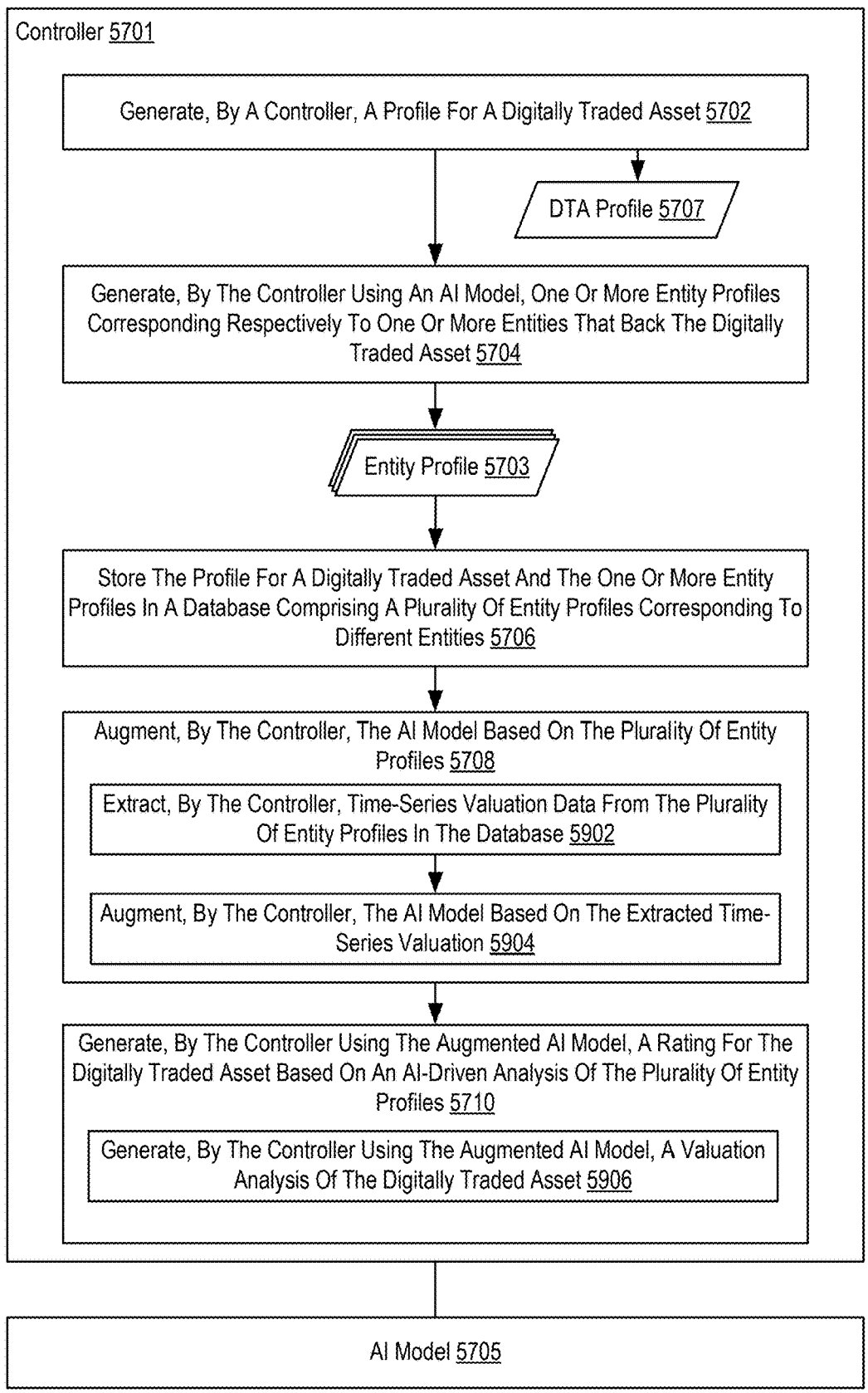
FIG. 59 sets forth a flowchart of another example method of evaluating tokenized entities using an AI model in accordance with at least one embodiment of the present disclosure.

For further explanation, FIG. 59 sets forth another example method of evaluating tokenized entities using an AI model in accordance with at least one embodiment of the present disclosure. The method of FIG. 59 extends the method of FIG. 57 in that augmenting 5708, by the controller 5701, the AI model 5705 based on the plurality of entity profiles includes extracting 5902 time-series valuation data from the plurality of entity profiles in the database. In some implementations, the controller 5701 extracts time-series valuation data including various valuation characteristics of the entities backing the digitally traded asset, such as revenues, losses, profitability, market share growth, funding valuations, and so on. For example, a time-series dataset may include a revenue for each quarter over a period of years. In some implementations, the controller 5701 extracts time-series valuation data for the digitally traded asset, as well as for other digitally traded assets for which there is a profile in the database. The controller 5701 can extract the dataset by querying the entity database and aggregating the results of the queries in a data structure such as a spreadsheet.

In the method of FIG. 59, augmenting 5708, by the controller 5701, the AI model 5705 based on the plurality of entity profiles also includes augmenting 5904, by the controller 5701, the AI model 5705 based on the extracted time-series valuation data. In some implementations, the controller 5701 augments 5904 the AI model 5705 by configuring the AI model 5705 for retrieval-augmented generation using the time-series datasets of valuation data for multiple entities in the entity database. For example, the controller 5701 can configure the AI model 5705 by linking these time-series datasets of valuation data as a context for generating responses to prompts to the AI model 5705.

In the method of FIG. 59, generating 5710, by the controller using the AI model, a rating for the digitally traded asset based on an AI-driven analysis of the plurality of entity profiles also includes generating 5906, by the controller using the augmented AI model, a valuation analysis of the digitally traded asset. In some examples, the controller 5701 generates 5906 the valuation analysis by comparing the digitally traded asset to other similar digitally traded assets. A similar digitally traded asset may be one that is backed by an overlapping set of entities or by similar entities (e.g., in the same sector or industry). The values of these similar digitally traded assets may be reflected in pricing on token exchanges. Factors for comparison can include market capitalization, price-per-token, outstanding tokens, and so on. This data can be retrieved from external sources as discussed above.

In some examples, the controller 5701 generates 5906 the valuation analysis by comparing the valuations of the entities backing the digitally traded asset to other entities in the database based on the time series datasets. Whether a particular entity backing the digitally traded asset is under or overvalued compared to other entities impacts the value of the digitally traded asset. The valuation analysis can include, for example, a natural language valuation analysis based on a cross-correlation of valuation data for the entities that back the digitally traded asset with valuation data of other entities. For example, the valuation analysis can provide a descriptive analysis of the valuation of the digitally traded asset. The valuation analysis can also include a score, ranking, other qualitative metric for the valuation of the digitally traded asset.

In some examples, the controller 5701 generates 5906 the valuation analysis by formulating one or more prompts to the AI model 5705. For example, the controller 5701 may map a predefined prompt for a valuation analysis. In another example, the controller 5701 may construct a prompt by determining a set of properties that the AI model 5705 should use to generate a valuation analysis. The AI model 5705 generates a comparative valuation analysis using the time series valuation datasets and provides the result to the controller 5701.

Figure 60:
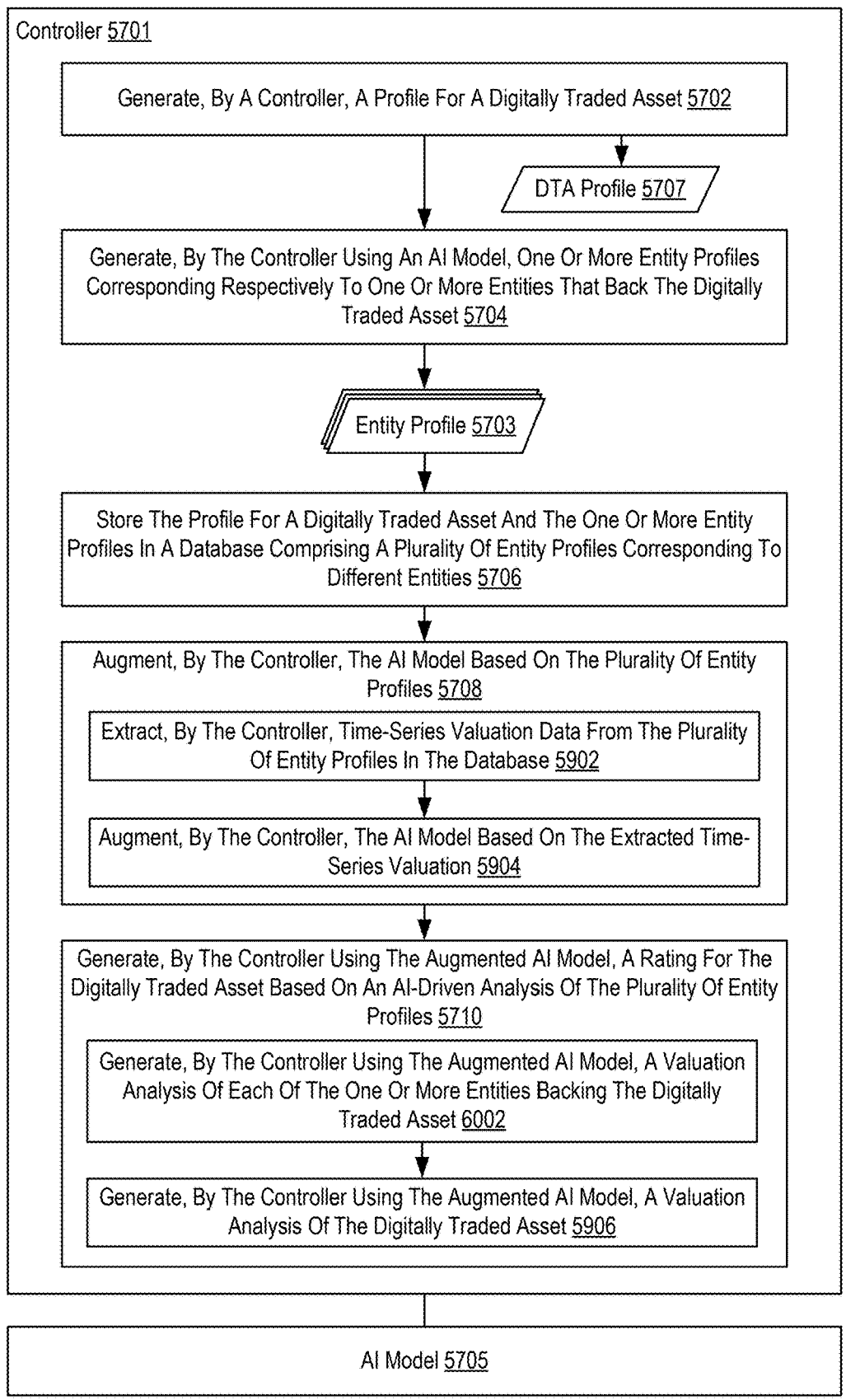
FIG. 60 sets forth a flowchart of another example method of evaluating tokenized entities using an AI model in accordance with at least one embodiment of the present disclosure.

For further explanation, FIG. 60 sets forth another example method of evaluating tokenized entities using an AI model in accordance with at least one embodiment of the present disclosure. The method of FIG. 60 extends the method of FIG. 59 in that generating 5906, by the controller using the augmented AI model, a valuation analysis of the digitally traded asset also includes generating 6002, by the controller using the augmented AI model, a valuation analysis of each of the one or more entities backing the digitally traded asset. The valuation analysis can include, for example, a natural language valuation analysis based on a cross-correlation of valuation data for the entities that back the digitally traded asset with valuation data of other entities. For example, the valuation analysis can provide a descriptive comparison of the valuation of the entity with those of similar entities. The valuation analysis can also include a score, ranking, other qualitative metric for the valuation of the entity.

In some implementations, the controller 5701 generates 6002 the valuation analysis of each of the one or more entities backing the digitally traded asset by formulating one or more prompts to the AI model 5705. For example, the controller 5701 can map a predefined prompt for a valuation analysis, where the prompt identifies multiple metrics and attributes for rating the valuation of the entity. In another example, the controller 5701 can construct a prompt by determining a set of properties (e.g., revenue, profitability, etc.) that the AI model 5705 should use for a valuation analysis. The AI model 5705 generates, based on the controller prompts, a valuation analysis using the time-series valuation datasets and provides the result to the controller 5701.

In some examples, the AI model 5705 generates 6002 a valuation analysis of each of the one or more entities backing the digitally traded asset based on other entity profiles in the database. For example, where a startup company and a growth stage company have similar valuation trajectories and similar entity characteristics (e.g., similar technology areas, similar products, similar founders, etc.), the valuation trajectory of the growth stage company can indicate a valuation trajectory for the startup company. The entity profile can be compared to other entity profiles to identify a set of similar entities. For each entity in the set of similar entities, time-series valuation data is extrapolated using one or more of the above-mentioned valuation factors. The AI model 5705 analyzes the time-series valuation data of the entity and the time-series valuation data of other entities in the set of similar entities using retrieval-augmented generation. The AI model 5705, based on this analysis, may generate a qualitative insight regarding the valuation of the entity. For example, if entity A is similar to entity B, entity A may be predicted to experience a similar valuation expansion that was experienced by entity B at an earlier stage. Conversely, if entity B is in bankruptcy, entity A may be predicted to face a higher likelihood of bankruptcy.

Figure 61:
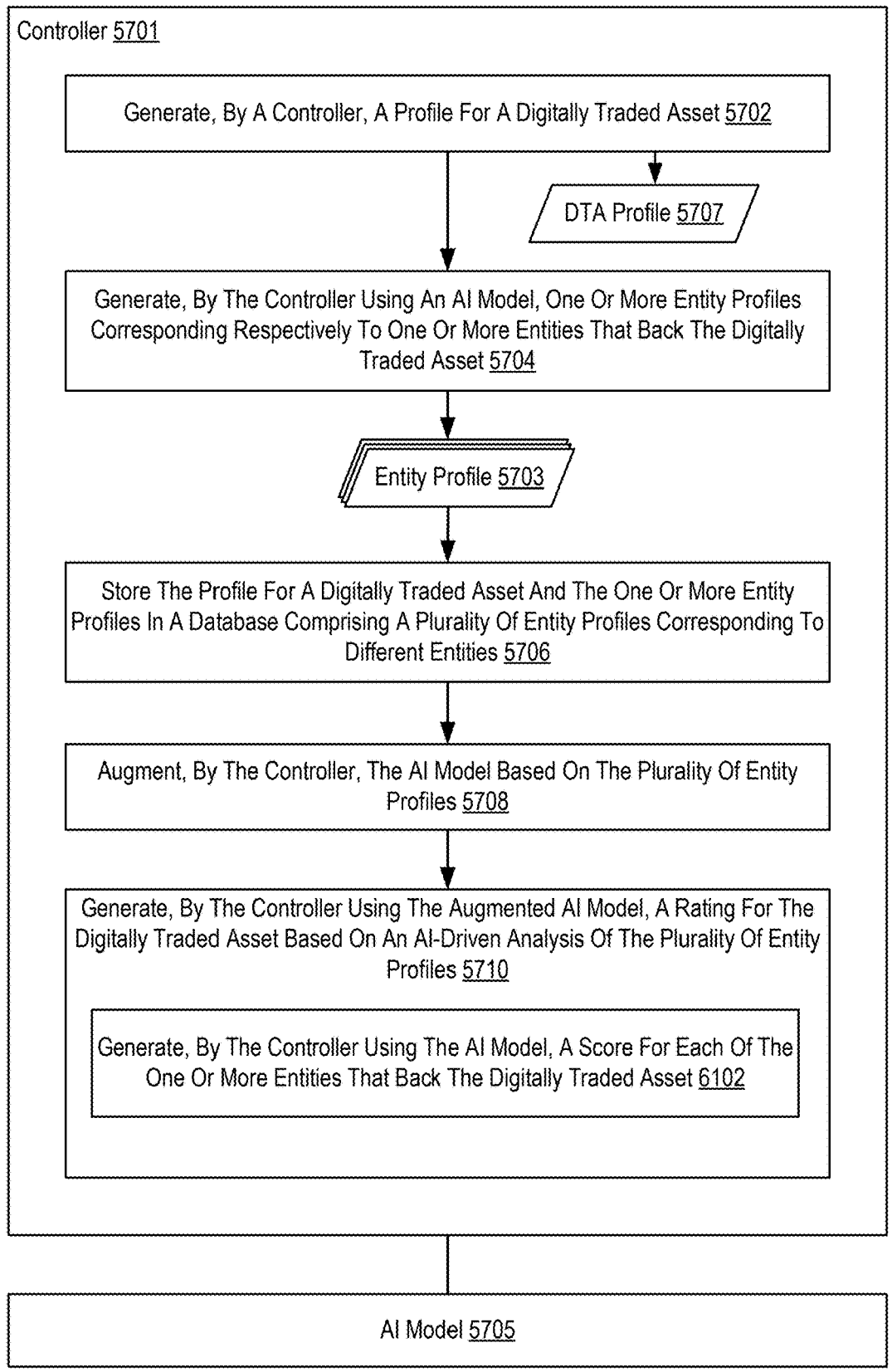
FIG. 61 sets forth a flowchart of another example method of evaluating tokenized entities using an AI model in accordance with at least one embodiment of the present disclosure.

For further explanation, FIG. 61 sets forth another example method of evaluating tokenized entities using an AI model in accordance with at least one embodiment of the present disclosure. The method of FIG. 61 extends the method of FIG. 57 in that, generating 5710, by the controller using the AI model, a rating for the digitally traded asset based on an AI-driven analysis of the plurality of entity profiles also includes generating 6102, by the controller 5701 using the AI model 5705, a score for each of the one or more entities that back the digitally traded asset. The score for each entity backing the digitally traded asset can be used to generate a score for the digitally traded asset. The score for each entity may be an overall quality score and/or a composite score for multiple attributes such as a score for the team behind the company, the company's product(s), the company's financial attributes, the company's marketing metrics, and/or the company's backing investors. Each attribute can be based on a selection of properties of an entity from the entity profiles, which are used to define the attribute. In some examples, the properties that are used to define that attribute may be static, such as fixed set of properties that correspond to a particular entity type. In other examples, the properties that are used to define that attribute are dynamically generated, e.g., based on user input or AI model output.

As one example, the attributes of a 'company' entity type can include team, finances, investors, product, and marketing. In turn, each of these attributes are based on a particular set of entity properties or metrics. For example, the finances attribute can be based on revenue, liquidity, debt, profit, funding, etc. As another example, the team attribute can be based on founders, corporate officers, board of directors, etc. As yet another example, a product attribute can be based on revenue, market share, etc. of a company's product. A marketing attribute can be based on particular marketing properties such as a measure of brand awareness, return on investment, customer acquisition cost, etc. An investor attribute can be based on the set of investors in an entity. To generate a score for the attribute, the metrics of one entity profile are assessed across corresponding metrics of other entity profiles in the entity database. In evaluating the attribute, these various properties can be weighted differently in accordance with a composite analysis to generate an overall score for the company. The AI model 5705 can quantify the attribute by generating a composite score for the attribute based on a cross-correlation with other entity profiles.

In some implementations, to generate a score for an attribute, the controller 5701 configures the AI model 5705 to generate a score by formulating one or more prompts to the AI model 5705 to generate a score for an attribute by, for example, listing the fields or metrics that are to be used to generate the score for the attribute. For example, for a particular attribute, the controller 5701 may map the attribute to a predefined prompt for the attribute. In another example, the controller 5701 may construct a prompt by compiling relevant properties of the entity, such as entity type, to provide a more tailored prompt to the AI model. In some examples, the controller 5701 submits the prompt to the AI model 5705 via an API to provide a relative quantitative score for the entity based on the attribute. For example, the AI model 5705 may generate a score of '8' on financial health. The controller 5701 may provide a series of prompts and synthesize a score based on an aggregate of the responses.

In other examples, the controller 5701 dynamically generates a set of metrics to use for an attribute. In some implementations, the AI model 5705 assists the controller 5701 in identifying metrics for an attribute. For example, the controller 5701 may prompt the AI model 5705 to generate a set of metrics for financial health based on the type of entity, the industry, and/or the growth stage of the company. The controller 5701 can then feed these identified metrics back to the AI model 5705 as part of a prompt to generate the score based on these metrics.

Figure 62:
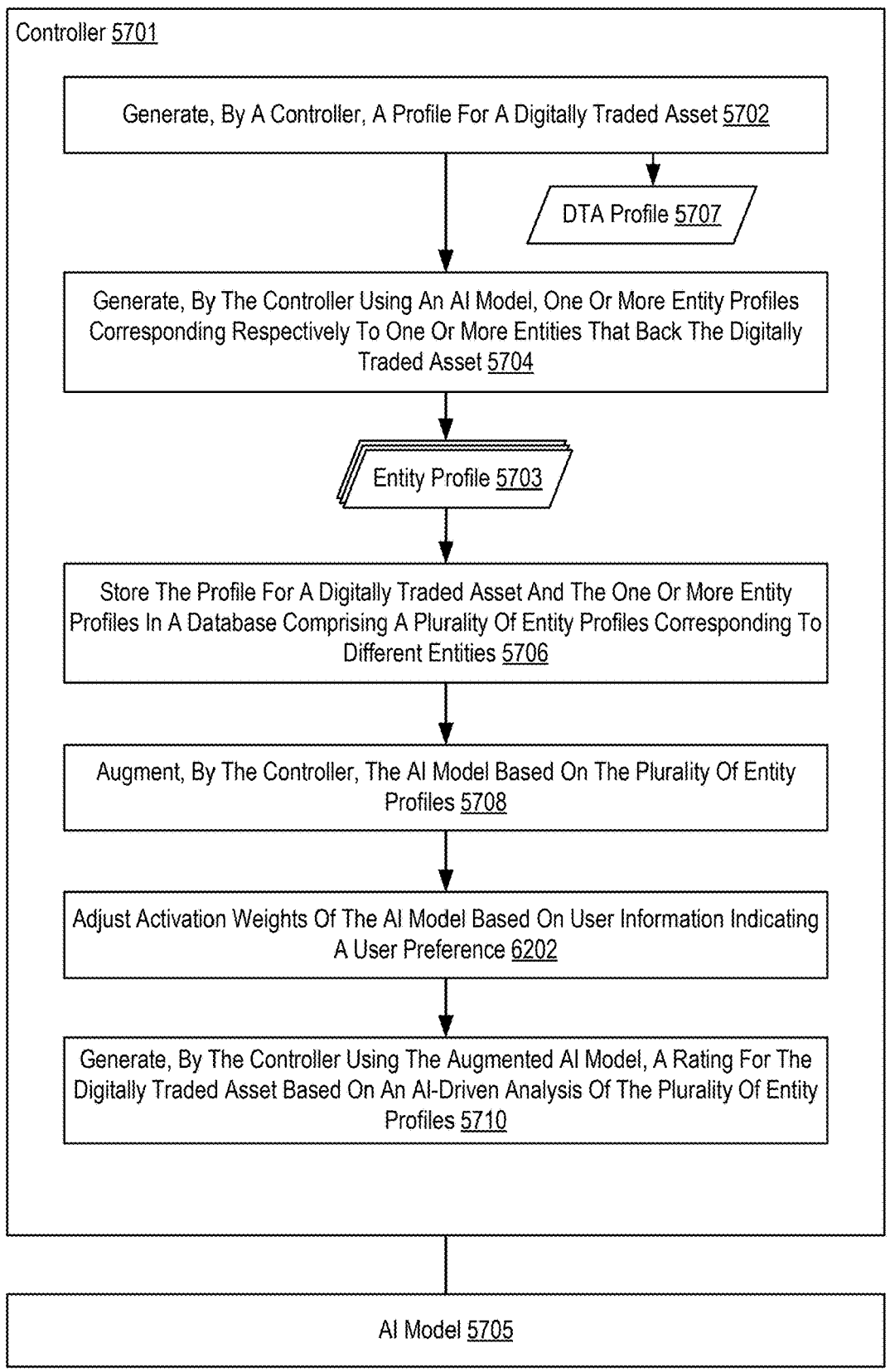
FIG. 62 sets forth a flowchart of another example method of evaluating tokenized entities using an AI model in accordance with at least one embodiment of the present disclosure.

For further explanation, FIG. 62 sets forth another example method of evaluating tokenized entities using an AI model in accordance with at least one embodiment of the present disclosure. The method of FIG. 62 extends the method of FIG. 57 in that the method of FIG. 62 includes adjusting 6202 activation weights of the AI model 5705 based on user information indicating a user preference. In some implementations, the controller 5701 tunes the AI model 5705 based on user feedback or user data indicating that a particular property, field, characteristic, or attribute that is more important than others. This tuning based on particular properties or characteristics changes the activation weights in the neural networks of the AI model 5705, thus optimizing the output of the AI model 5705 for a particular score analysis.

Figure 63:
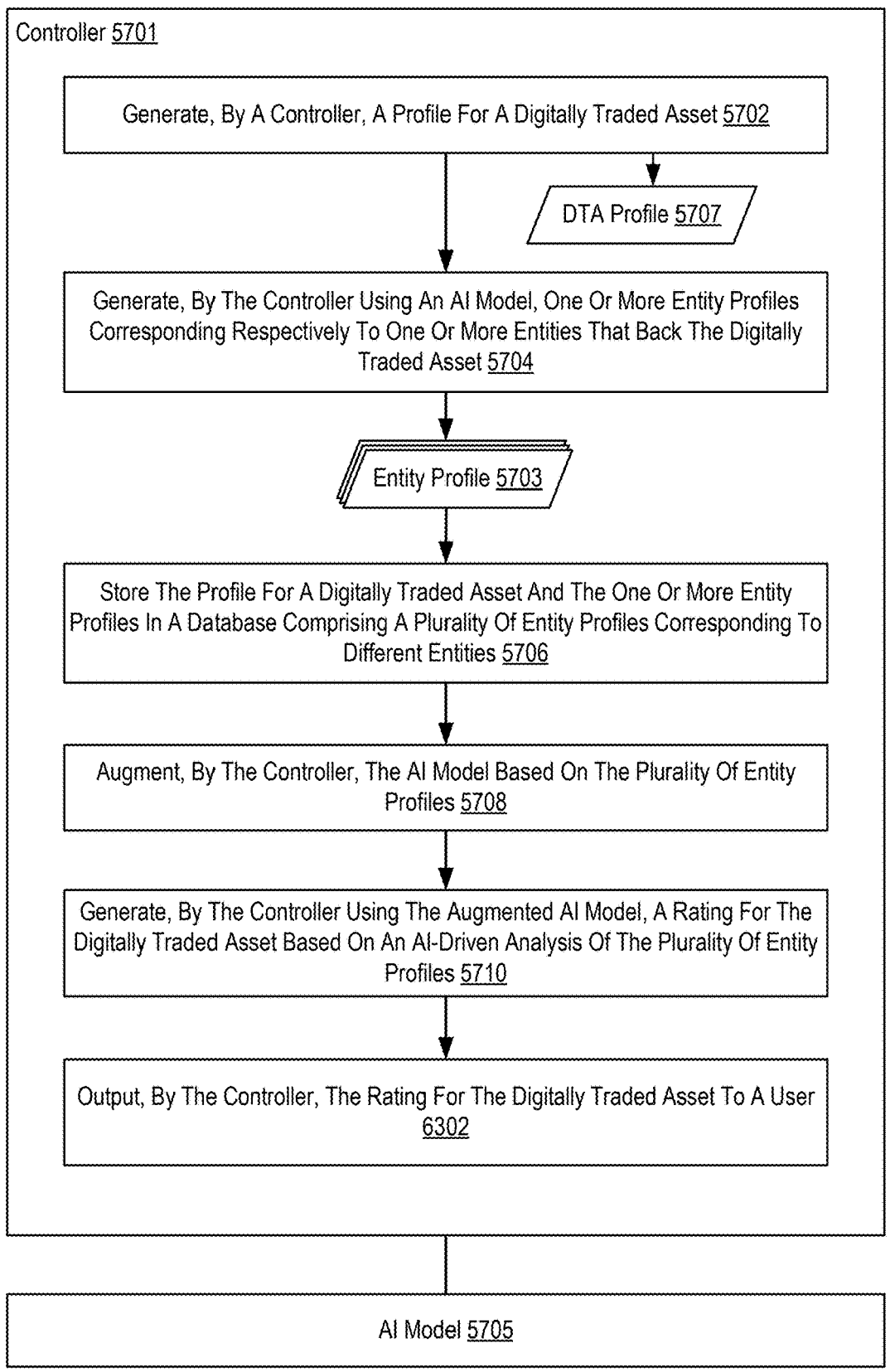
FIG. 63 sets forth a flowchart of another example method of evaluating tokenized entities using an AI model in accordance with at least one embodiment of the present disclosure.

For further explanation, FIG. 63 sets forth another example method of evaluating tokenized entities using an AI model in accordance with at least one embodiment of the present disclosure. The method of FIG. 63 extends the method of FIG. 57 in that the method of FIG. 63 includes outputting 6302, by the controller, the rating for the digitally traded asset to a user. In some implementations, the controller 5701 outputs 6302 the rating by autogenerating an email to the user's email address. In some implementations, the controller 5701 outputs 6302 the rating by autogenerating a text to the user's mobile account. In some implementations, the controller 5701 outputs 6302 the rating by displaying the rating in a user interface such as a web page or other graphical user interface. The controller 5701 may output the rating each time a change in the rating is detected. As discussed above, the rating may be updated each time an entity profile is updated.

In view of the foregoing, it will be appreciated that evaluating tokenized entities using an AI model in accordance with the present disclosure provides a number of improvements to the technical field of data driven analysis and the computing systems that perform data driven analysis. Data driven analysis of abstract entities such as companies, assets, deals, etc. requires an analysis of many different entity characteristics from a multitude of data sources, and correlation of various characteristics to generate accurate predictions or assessments of those entities. This has typically involved manually compiling and integrating various structure and unstructured data. Conventional systems are constrained by the lack of comprehensive and up-to-date entity databases, hindering the ability of mathematical models to generate accurate insights and limiting the accuracy and effectiveness of subsequent analyses. Integrated data analysis using an AI model in accordance with the present disclosure integrates data user-provided data with structured and unstructured data from external sources to create a comprehensive dataset upon which analyses are based. The AI model provides pattern recognition and cross correlation of data to generate assessments and insights that provide a holistic real-time evaluation of the entity, thus improving the results of ratings for the entity that are generated by the integrated data analysis system.

Moreover, computing systems that perform data driven analysis of abstract entities based on algorithmic models consume significant amounts of power and expend significant amounts of heat in solving complex mathematical equations requiring multivariable analysis. Heat generation, in turn, requires energy to cool the processors. By utilizing and augmenting an AI model to facilitate data aggregation and transformation and to generate predictions and analytics based on the aggregated data, integrated data analysis using an AI model in accordance with the present disclosure reduces the processing complexities and thus reduces the amount of energy consumed and heat generated to perform these analyses, thus making the computing system more efficient. By augmenting the AI model and effectively reducing the size of the AI model by the augmentation, the execution load of the AI model is reduced, thus reducing the amount of power and processing resources needed to carry out a data driven analysis.

As described above, evaluating tokenized entities using an AI model employs the AI model to assist the generation of the entity profile such that technology resources are focused on collecting and analyzing the most relevant information while ignoring or not collecting non-relevant information. This improves resource utilization of underlying computing technology, conserves resource costs (e.g., processing time, power consumption), and improves the efficiency and accuracy of analytics derived from these curated entity profiles.

Figure 64:
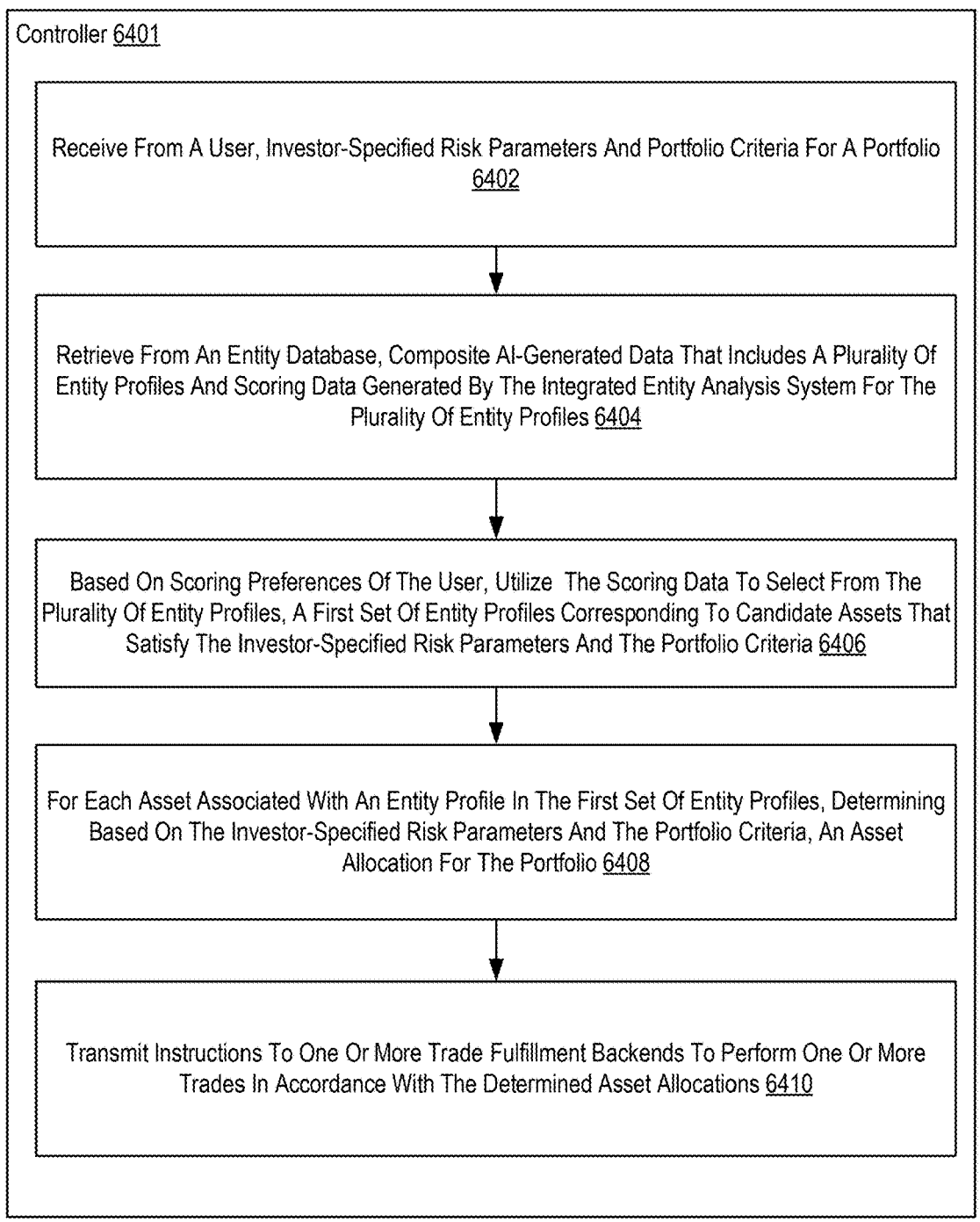
FIG. 64 sets forth a flowchart of an example method of automating asset trading based on composite AI-generated data in accordance with at least one embodiment of the present disclosure.

For further explanation, FIG. 64 sets forth a flowchart of an example method of automating asset trading based on composite AI-generated data in accordance with at least one embodiment of the present disclosure. The method of FIG. 64 includes receiving 6402 from a user, by a controller 6401 of an integrated entity analysis system, investor-specified risk parameters and portfolio criteria for a portfolio. In a particular embodiment, the controller 6401 of an integrated entity analysis system receives 6402 investor-specified risk parameters and portfolio criteria as input from a user to tailor an automated trading strategy for the investor's portfolio. Investors often specify risk parameters when evaluating private companies to tailor their decisions based on risk tolerance, strategic goals, and market preferences. In one embodiment, investor-specified risk parameters include one or more financial risk parameters; market risk parameters; operational risk parameters; industry-specific risk parameters; geographic risk parameters; growth/valuation risk parameters; ESG (Environmental, Social, and Governance) risk parameters; liquidity and capital structure risk parameters; legal and compliance risk parameters; and business model risk parameters.

Examples of financial risk parameters include but are not limited to revenue volatility parameters that specify limits on acceptable fluctuations in a company's revenue (e.g., no more than +/−20% year-over-year revenue variance); debt-equity ratio risk parameters specifying a maximum leverage level (e.g., a debt-to-equity ratio not exceeding 2:1); profit margin thresholds that require minimum profit margins (e.g., gross margin of at least 40%); and cash flow stability requirements mandating consistent positive operating cash flows over a defined period (e.g., three consecutive years). Examples of market risk parameters include but are not limited to market size parameters specifying the minimum market size in which a company operates (e.g., addressable market greater than $1 billion); competitor intensity parameters requiring companies to have a limited number of direct competitors; and regulatory risk parameters that avoid companies in heavily regulated industries (e.g., pharmaceuticals or financial services). Examples of operational risk parameters include but are not limited to: management team experience parameters requiring executives to have a minimum number of years in the industry (e.g., at least 10 years for the CEO); parameters limiting dependence on key individuals, avoiding companies overly reliant on a single founder or executive; and operational efficiency benchmarks specifying industry-standard metrics such as inventory turnover or customer acquisition costs.

Examples of industry-specific risk parameters include but are not limited to: sector exposure parameters focusing on preferred industries (e.g., technology or healthcare) or avoiding others (e.g., oil and gas); innovation dependency parameters ensuring a strong R&D pipeline or defensible intellectual property; and cyclicality parameters avoiding investments in highly cyclical industries (e.g., luxury goods or construction). Examples of geographic risk parameters include but are not limited to: political stability parameters favoring companies operating in low-risk regions; currency risk parameters avoiding businesses with significant exposure to foreign currency fluctuations; and economic indicator benchmarks specifying regions with stable economic growth rates and low unemployment.

Examples of growth/valuation risk parameters include but are not limited to: revenue growth thresholds requiring companies to demonstrate a minimum annual growth rate (e.g., at least 15% CAGR over three years); valuation multiple thresholds ensuring reasonable price-to-earnings (P/E) or enterprise-value-to-revenue (EV/Revenue) ratios; and exit strategy parameters specifying clear opportunities for liquidity events (e.g., IPO or acquisition) within a set timeframe. Examples of ESG (Environmental, Social, and Governance) risk parameters include but are not limited to: environmental impact parameters avoiding companies with a high carbon footprint or poor sustainability practices; social impact parameters ensuring adherence to ethical labor practices and social responsibility; and governance parameters requiring strong governance frameworks, such as board diversity and transparent policies.

Examples of liquidity and capital structure risk parameters include but are not limited to: ownership dilution thresholds limiting future equity dilution (e.g., no more than 15% dilution in the next funding round); and exit liquidity parameters requiring the presence of secondary markets or potential buyers for equity stakes. Examples of legal and compliance risk parameters include but are not limited to: parameters avoiding companies with pending litigation above a specific financial threshold; and regulatory compliance parameters ensuring adherence to industry standards (e.g., GDPR for tech companies or FDA compliance for healthcare).

Examples of business model risk parameters include but are not limited to: customer concentration thresholds limiting revenue reliance on a single customer (e.g., no more than 30% of revenue from one client); recurring revenue parameters requiring subscription-based or recurring revenue streams; and product diversification benchmarks avoiding over-reliance on a single product or service. By specifying these risk parameters, investors can systematically evaluate private companies, ensuring alignment with their risk tolerance and strategic investment goals. At least one embodiment of the present disclosure includes the controller receiving a set of risk parameters that include one or more of the above examples of risk parameters.

For example, an investor might specify the following investor-risk parameters for evaluating private companies: financial risk parameters requiring profit margin ≥20% and debt-to-equity≤1.5; market risk parameters requiring market size ≥$500 million; Geographic risk parameters that specify operating in the US and Europe only; ESG parameters requiring score 80+ in ESG ratings; and customer diversification parameters that specify no single customer contributes more than 25% of revenue.

Portfolio criteria for a portfolio guide the construction and ongoing management of the portfolio to align with the investor's goals, preferences, and constraints. Examples of portfolio criteria for creating a portfolio of investments in private companies include: industry diversification values requirements that specify the proportion of investments allocated across different industries to reduce sector-specific risks (e.g., 30% technology, 25% healthcare, 15% renewable energy); geographic allocation requirements that define the geographic regions or markets for investment to balance exposure (e.g., 50% in North America, 30% in Europe, 20% in Asia); and stage of company development rules that require companies be at specific stages, such as early-stage startups, growth-stage companies, or mature private enterprises nearing an IPO. Other examples of portfolio criteria include: revenue range mandates that require companies in the portfolio to have a specific annual revenue range to ensure a desired scale (e.g., $5 million to $50 million in annual revenue); valuation parameters that set limits on acceptable valuations for portfolio companies (e.g., no investments in companies valued above $100 million); and ownership targets that establish criteria for the equity stake required in each investment (e.g., 5%-15% ownership in each company).

Other examples of portfolio criteria include investment size per company that specify the amount allocated to each investment to manage portfolio concentration (e.g., no more than 10% of the total portfolio in a single company); risk-return balance that indicates a balance between high-risk, high-reward opportunities and stable, lower-risk investments (e.g., 40% high-growth startups, 60% stable growth companies); an exit timeline that define the desired timeframe for achieving liquidity events, such as IPOs or acquisitions (e.g., 5-7 years for most investments). Other examples of portfolio criteria include capital efficiency indications that prioritize companies with efficient use of capital, as demonstrated by metrics like return on investment (ROI) or customer acquisition cost (CAC); ESG Compliance that requires companies in the portfolio to meet environmental, social, and governance (ESG) standards (e.g., companies with a minimum ESG score of 75%); and customer base Diversification: Invest in companies with a diverse customer base, avoiding overreliance on a single client (e.g., no single customer contributing more than 20% of revenue).

Other examples of portfolio criteria include revenue model criteria that require companies to have recurring or predictable revenue streams, such as subscription models or long-term contracts; growth potential that specifies target companies with a minimum compound annual growth rate (CAGR) (e.g., at least 20% growth over the past three years); competitive position requirements that require companies to have a competitive edge (e.g., market leadership, unique technology, or strong brand recognition) rated above a threshold; and leverage limits that specify avoid companies with excessive leverage by setting limits on debt-to-equity ratios (e.g., no higher than 1.5:1). These criteria provide a structured approach to portfolio construction, helping ensure alignment with the investor's strategic goals, risk tolerance, and desired outcomes. Readers of skill in the art will realize that some of the investor-risk parameters may overlap or be represented in the portfolio criteria and vice-versa. At least one embodiment of the present disclosure includes the controller receiving a set of portfolio criteria that include one or more of the above examples of portfolio criteria.

By gathering these customized parameters, the controller configures trading algorithms and portfolio management actions to align precisely with the investor's defined goals and constraints, ensuring that any asset selections and trades adhere to the investor's unique preferences.

For example, an investor might specify the portfolio criteria for that specifies an industry diversification of 40% in technology; 30% in healthcare, 20% in renewable energy, and 10% in consumer goods; a geographic allocation of 50% in North America, 30% in Europe, and 20% in Asia-Pacific; a revenue range of $10 million to $100 million in annual revenue; an ownership target of acquiring a 10%-20% equity stake in each company; and a revenue model of focusing on business with recurring revenue streams.

The method of FIG. 64 also includes retrieving 6404 from an entity database, by the controller 6401, composite AI-generated data that includes a plurality of entity profiles and scoring data generated by the integrated entity analysis system for the plurality of entity profiles. In a particular embodiment, each entity profile within this data includes AI-derived data, such as metrics and properties, which provide a quantitative and qualitative evaluation of each entity.

In addition, the method of FIG. 64 also includes based on scoring preferences of the user, utilizing 6406, by the controller 6401, the scoring data to select from the plurality of entity profiles, a first set of entity profiles corresponding to candidate assets that satisfy the investor-specified risk parameters and the portfolio criteria. By comparing the AI-generated scores within each profile to the investor's specified risk parameters and portfolio criteria, the controller filters out entities that do not meet these standards. This results in a refined list of candidate assets—those profiles that meet the investor's exact specifications-ready for potential inclusion in the investor's portfolio based on their suitability and alignment with the investor's goals.

The method of FIG. 64 also includes for each asset associated with an entity profile in the first set of entity profiles, determining 6408 based on the investor-specified risk parameters and the portfolio criteria, by the controller 6401, an asset allocation for the portfolio. In a particular embodiment, for each asset linked to an entity profile within the selected set, the controller 6401 determines an appropriate asset allocation for the investor's portfolio by aligning the allocation with the investor-specified risk parameters and the portfolio criteria. This involves assessing each asset's characteristics against the investor's requirements for risk and the requirements of the portfolio criteria. Based on this alignment, the controller calculates an allocation proportion for each asset, ensuring that the overall portfolio structure meets the investor's preferences, such as maintaining the desired balance across asset classes, sectors, or geographic regions while adhering to risk constraints.

The method of FIG. 64 also includes transmitting 6410, by the controller 6401, instructions to one or more trade fulfillment backends to perform one or more trades in accordance with the determined asset allocations. Examples of trade fulfillment backends include but are not limited to Trade fulfillment solutions and platforms that specialize in handling transactions for private companies (e.g., Carta; Forge Trust; Nasdaq Private Market); Brokerage Platforms; Crypto Exchanges; Forex Trading Platforms (e.g., systems like OANDA and FXCM specialize in foreign exchange (Forex) trading, allowing trades across various currency pairs in global markets); Robo-Advisors which offer automated investment management and trading within a specified strategy; Institutional Trading Desks; and Clearinghouses and Custodians.

Figure 65:
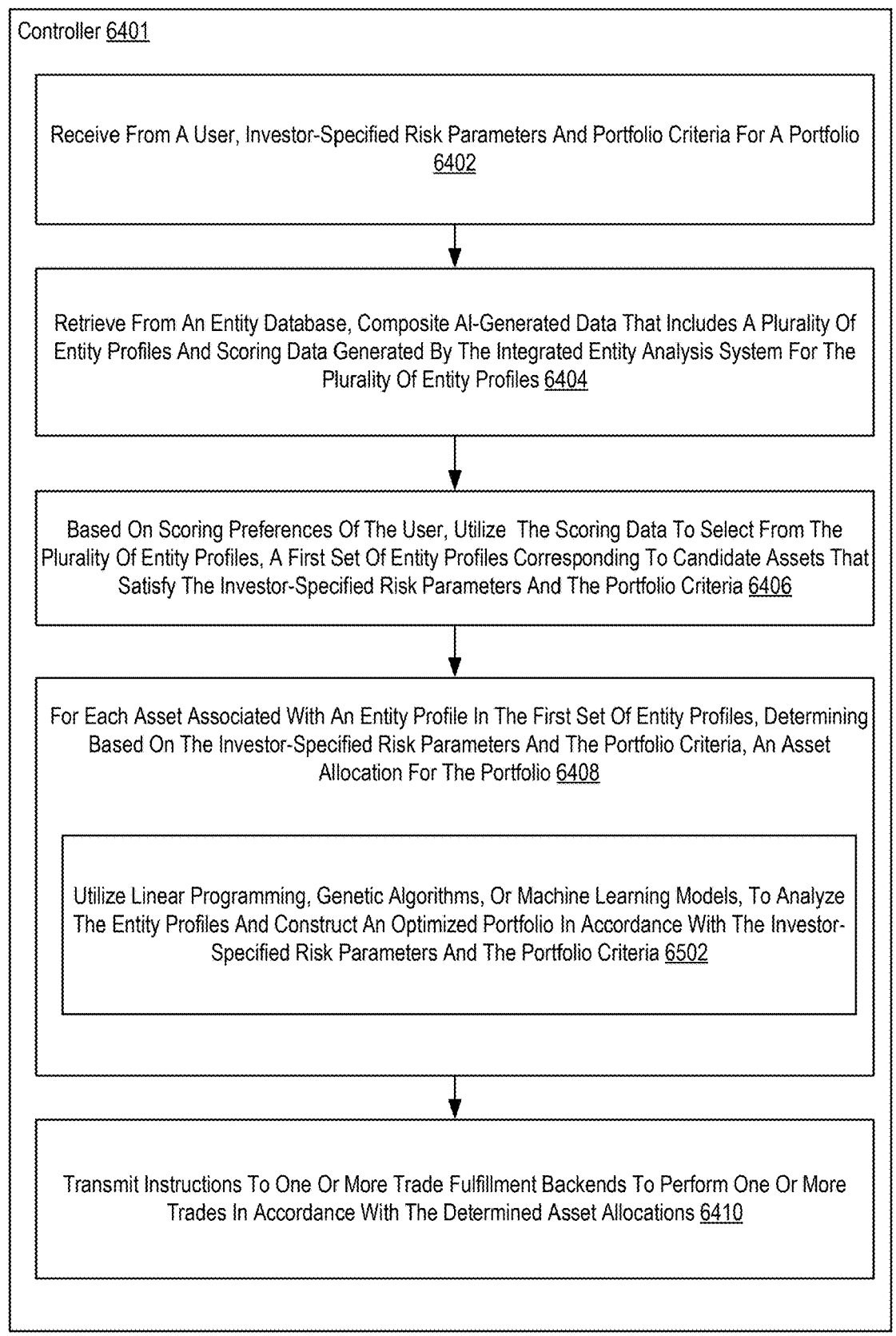
FIG. 65 sets forth a flowchart of another example method of automating asset trading based on composite AI-generated data in accordance with at least one embodiment of the present disclosure.

In one embodiment, the controller 6401 transmits trade instructions to one or more trade fulfillment backends, specifying the exact trades to be executed based on the previously determined asset allocations. These instructions include details such as the asset types, quantities, and target prices for each trade, aligning with the investor's risk parameters and the portfolio criteria. The controller ensures that each instruction is accurately formatted and routed to the appropriate backend, which could include brokerages or trading platforms equipped to handle the transactions. Once received, the trade fulfillment backends execute the trades in real-time or according to preset conditions, such as market open or limit prices, ensuring compliance with the investor's guidelines. In one embodiment, the controller monitors the fulfillment process, verifying that each trade is completed successfully and updating the investor's portfolio accordingly to reflect the new asset allocations For further explanation, FIG. 65 sets forth a flowchart of another example method of automating asset trading based on composite AI-generated data in accordance with at least one embodiment of the present disclosure. The method of FIG. 65 is similar to the method of FIG. 64 in that the method of FIG. 65 includes the elements of FIG. 64. In the method of FIG. 65, determining 6408 based on the investor-specified risk parameters and the portfolio criteria, by the controller 6401, an asset allocation for the portfolio includes utilizing 6502 linear programming, genetic algorithms, or machine learning models, to analyze the entity profiles and construct an optimized portfolio in accordance with the investor-specified risk parameters and the portfolio criteria.

Figure 66:
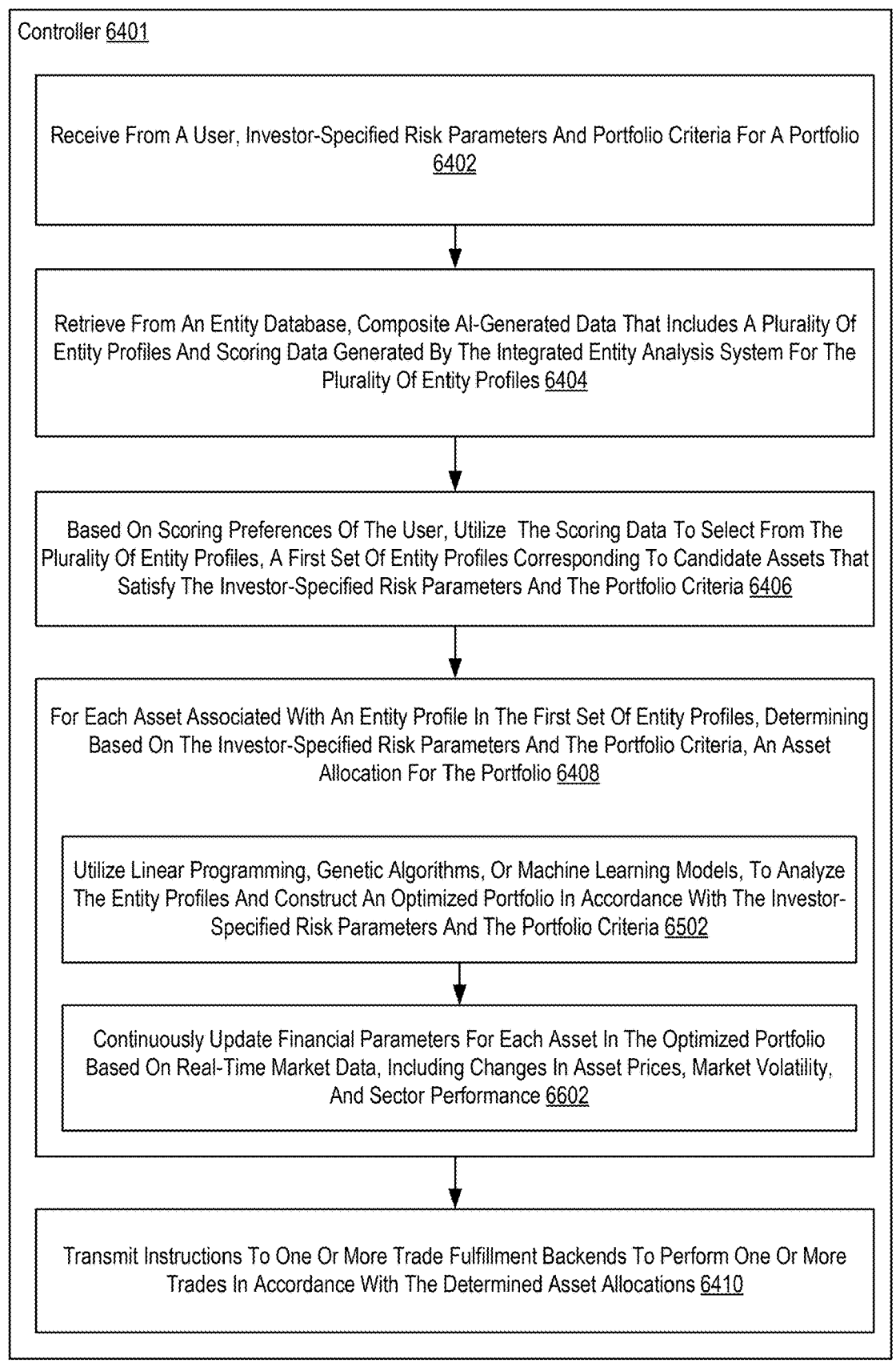
FIG. 66 sets forth a flowchart of another example method of automating asset trading based on composite AI-generated data in accordance with at least one embodiment of the present disclosure.

For further explanation, FIG. 66 sets forth a flowchart of another example method of automating asset trading based on composite AI-generated data in accordance with at least one embodiment of the present disclosure. The method of FIG. 66 is similar to the method of FIG. 65 in that the method of FIG. 66 includes the elements of FIG. 65. The method of FIG. 66 also includes continuously updating 6602, by the controller 6401, financial parameters for each asset in the optimized portfolio based on real-time market data. Financial parameters may be any information relevant to the finances of the asset. Examples of financial parameters for an asset may include asset prices of the asset or other assets in the asset class or industry, revenue of the asset, earnings of the asset, market volatility, and sector performance. Continuously updating 6602, by the controller 6401, financial parameters for each asset in the optimized portfolio based on real-time market data, may be carried out by integrating real-time market data streams that reflect ongoing changes in asset prices, market volatility, and sector performance.

By tracking fluctuations in asset prices, the controller recalculates parameters, ensuring that portfolio values remain accurate. Additionally, the controller may monitor market volatility indicators, adjusting risk metrics and exposure levels to help align with the investor's risk tolerance. Sector performance data is also analyzed, allowing the controller to assess how assets are performing within their respective industries and make adjustments if a particular sector becomes over- or under-weighted. These real-time updates keep the portfolio dynamically aligned with market conditions and the investor's financial objectives, enabling timely and informed decision-making.

For further explanation, FIG. 67 sets forth a flowchart of another example method of automating asset trading based on composite AI-generated data in accordance with at least one embodiment of the present disclosure. The method of FIG. 67 is similar to the method of FIG. 66 in that the method of FIG. 67 includes the elements of FIG. 66. The method of FIG. 67 also includes dynamically adjusting 6702, by the controller, the asset allocations in the optimized portfolio in response to updated financial parameters. In one embodiment, the controller dynamically adjusts asset allocations in the optimized portfolio by analyzing updated financial parameters, such as shifts in asset prices, increased market volatility, or sector performance changes. When these updates indicate that the current allocations may no longer align with the investor's risk parameters or performance goals, the controller recalculates ideal allocation weights for each asset. This adjustment may involve increasing allocations to assets performing strongly or reducing exposure to assets with heightened risk or declining returns. In this example, the controller then rebalances the portfolio by issuing new trade instructions to align it with the optimized allocation model, maintaining adherence to the investor's preferences. This dynamic reallocation process ensures the portfolio continuously adapts to evolving market conditions and the investor's investment strategy.

Figure 68:
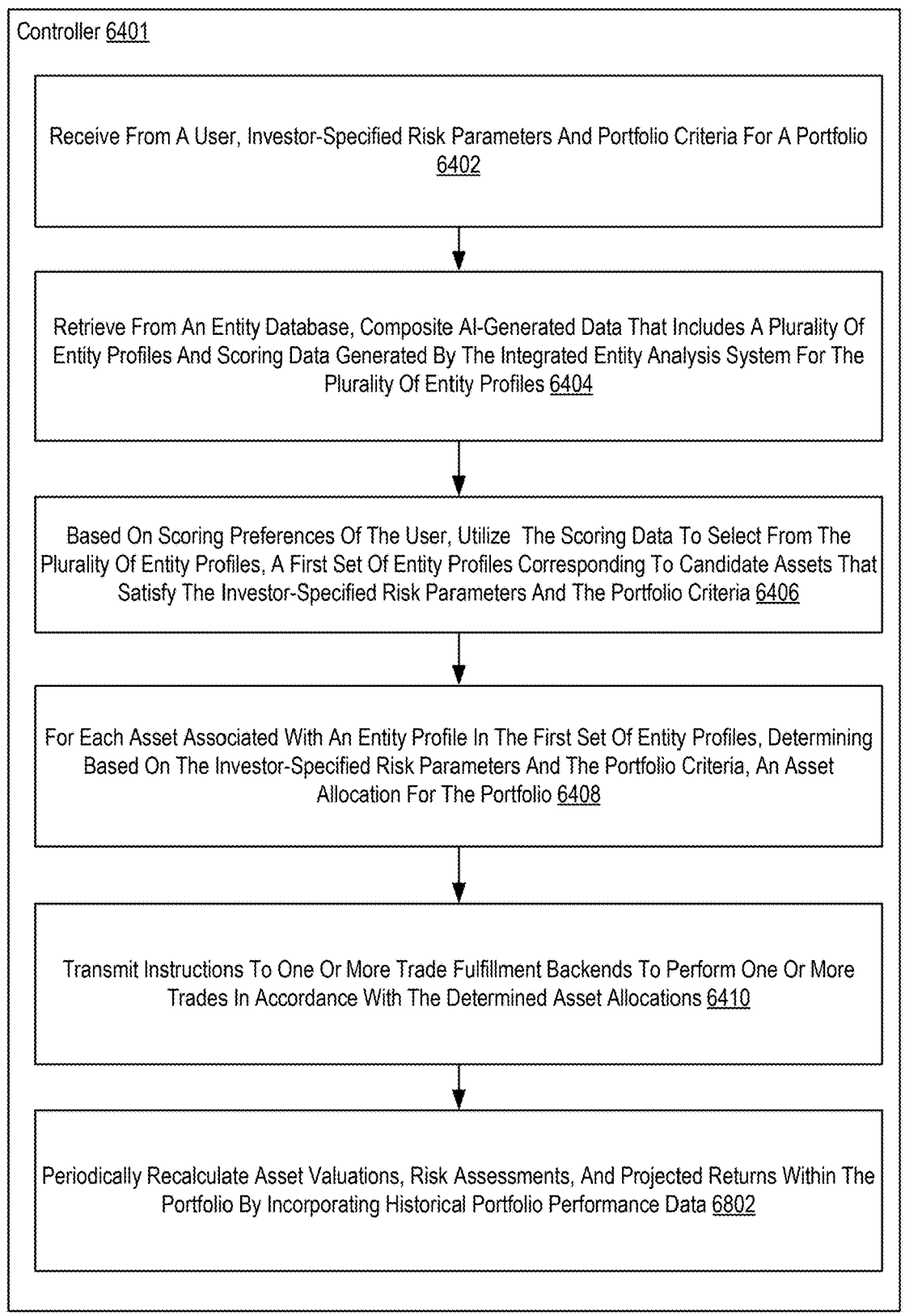
FIG. 68 sets forth a flowchart of another example method of automating asset trading based on composite AI-generated data in accordance with at least one embodiment of the present disclosure.

For further explanation, FIG. 68 sets forth a flowchart of another example method of automating asset trading based on composite AI-generated data in accordance with at least one embodiment of the present disclosure. The method of FIG. 68 is similar to the method of FIG. 64 in that the method of FIG. 68 includes the elements of FIG. 64. The method of FIG. 68 also includes periodically recalculating 6802, by the controller 6401, asset valuations, risk assessments, and projected returns within the portfolio by incorporating historical portfolio performance data. In one example, the controller 6401 periodically recalculates asset valuations, risk assessments, and projected returns within the portfolio by incorporating historical performance data to refine and enhance future projections. By analyzing past asset behavior, including price trends, volatility, and returns over various time frames, the controller can adjust current valuations and assess how each asset's historical performance impacts overall portfolio stability. This historical data also informs risk assessments, allowing the controller to account for patterns like seasonal fluctuations or responsiveness to market events, which may impact future risk levels. Projected returns may be recalculated based on both recent performance metrics and long-term historical averages, helping to provide a realistic forecast that considers both past and present conditions. These recalculated metrics ensure that the portfolio remains aligned with the investor's goals and accurately reflects any changes in asset outlooks over time.

Figure 69:
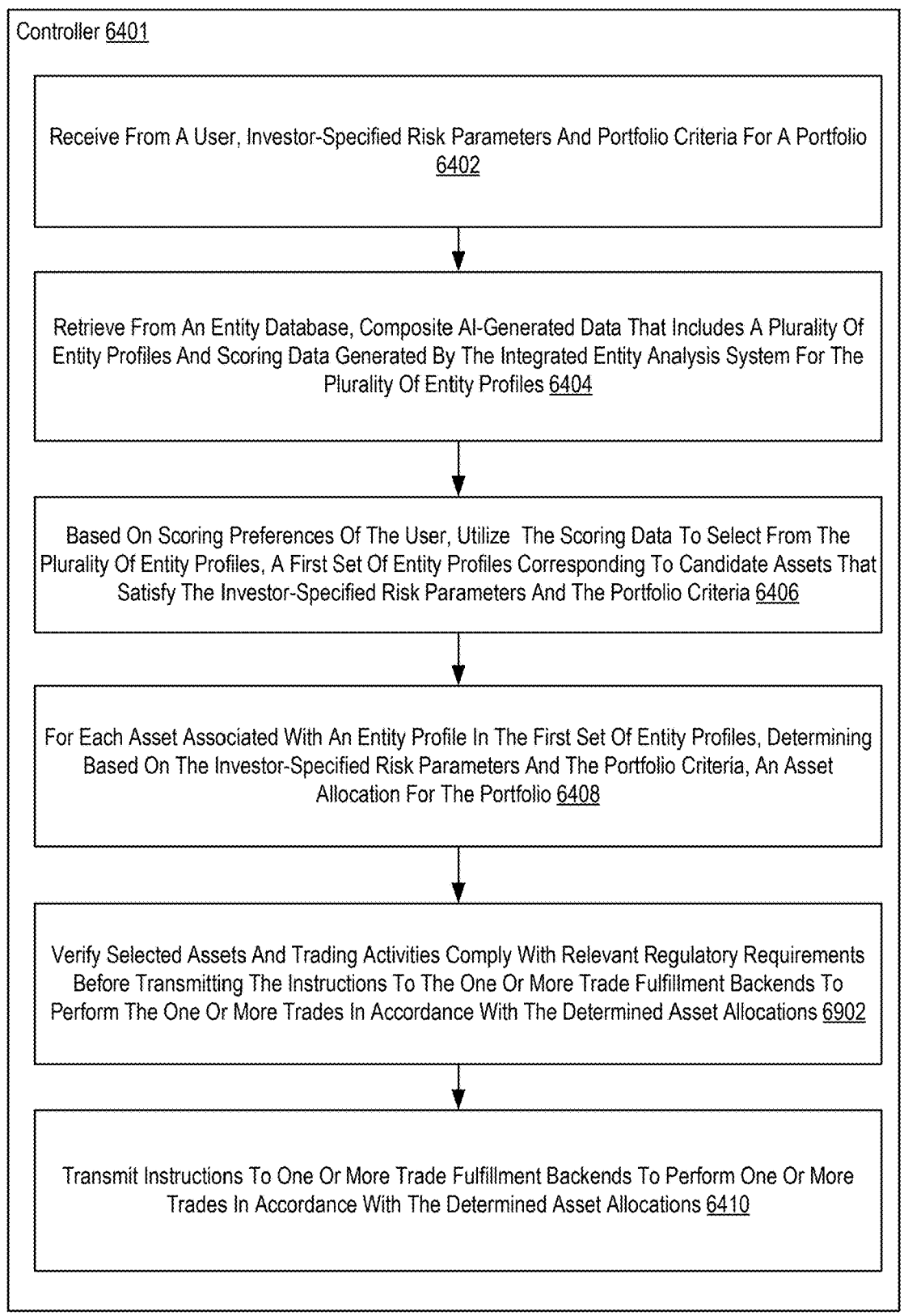
FIG. 69 sets forth a flowchart of another example method of automating asset trading based on composite AI-generated data in accordance with at least one embodiment of the present disclosure.

For further explanation, FIG. 69 sets forth a flowchart of another example method of automating asset trading based on composite AI-generated data in accordance with at least one embodiment of the present disclosure. The method of FIG. 69 is similar to the method of FIG. 64 in that the method of FIG. 69 includes the elements of FIG. 64. The method of FIG. 69 also includes verifying 6902, by the controller 6401, selected assets and trading activities comply with relevant regulatory requirements before transmitting the instructions to the one or more trade fulfillment backends to perform the one or more trades in accordance with the determined asset allocations. Verifying that all selected assets and trading activities comply with relevant regulatory requirements, such as securities laws, anti-money laundering (AML) policies, and industry-specific guidelines, before transmitting instructions to trade fulfillment backends may be carried out by checking each asset against regulatory lists and criteria, confirming that trades align with legal restrictions, investor eligibility, and market-specific regulations, such as those from the SEC, FINRA, or equivalent regulatory bodies. In one embodiment, the controller also ensures that trading activities do not exceed any imposed limits or violate portfolio restrictions, like diversification mandates or risk thresholds for certain asset classes. By conducting this regulatory compliance check, the controller mitigates legal risk, ensuring that all trading actions adhere to compliance standards before finalizing trade execution instructions. This process safeguards both the investor and the trading platform, ensuring that all transactions are legally sound and compliant.

Figure 70:
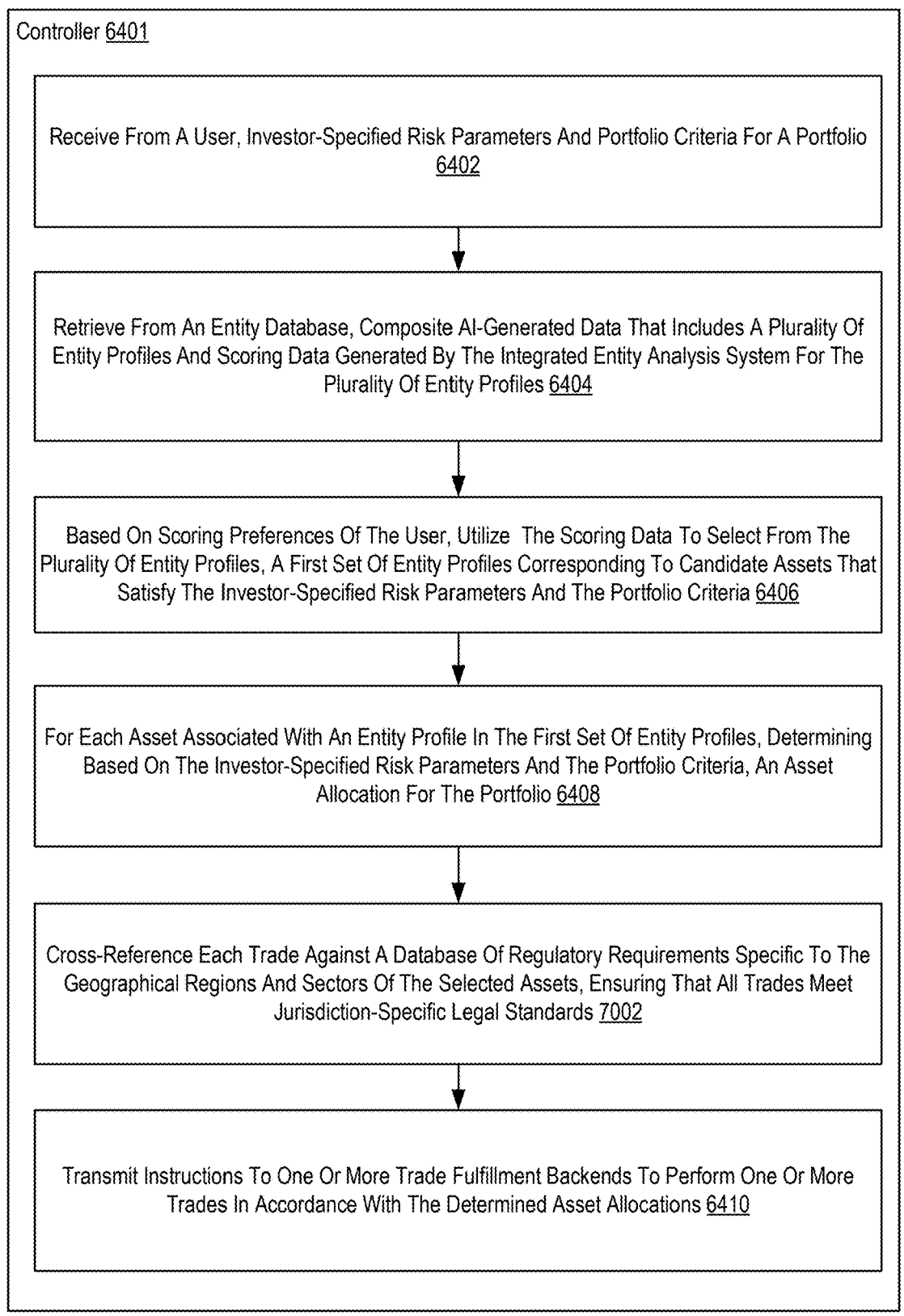
FIG. 70 sets forth a flowchart of another example method of automating asset trading based on composite AI-generated data in accordance with at least one embodiment of the present disclosure.

For further explanation, FIG. 70 sets forth a flowchart of another example method of automating asset trading based on composite AI-generated data in accordance with at least one embodiment of the present disclosure. The method of FIG. 70 is similar to the method of FIG. 64 in that the method of FIG. 70 includes the elements of FIG. 64. The method of FIG. 70 also includes cross-referencing 7002, by the controller 6401, each trade against a database of regulatory requirements specific to the geographical regions and sectors of the selected assets, ensuring that all trades meet jurisdiction-specific legal standards. In one embodiment, the controller 6401 cross-references each trade against a regulatory database containing legal requirements specific to the geographical regions and sectors associated with the selected assets. This involves verifying that each trade complies with jurisdiction-specific standards, such as local securities laws, tax regulations, and sector-specific restrictions (e.g., limitations on foreign ownership or environmental compliance). For example, assets in certain regions may require additional disclosures, while sectors like finance or energy may have unique regulatory constraints. By systematically checking each trade against these detailed criteria, the controller ensures that all transactions conform to relevant legal standards, thereby minimizing compliance risks and aligning with international and sector-specific regulations.

Figure 71:
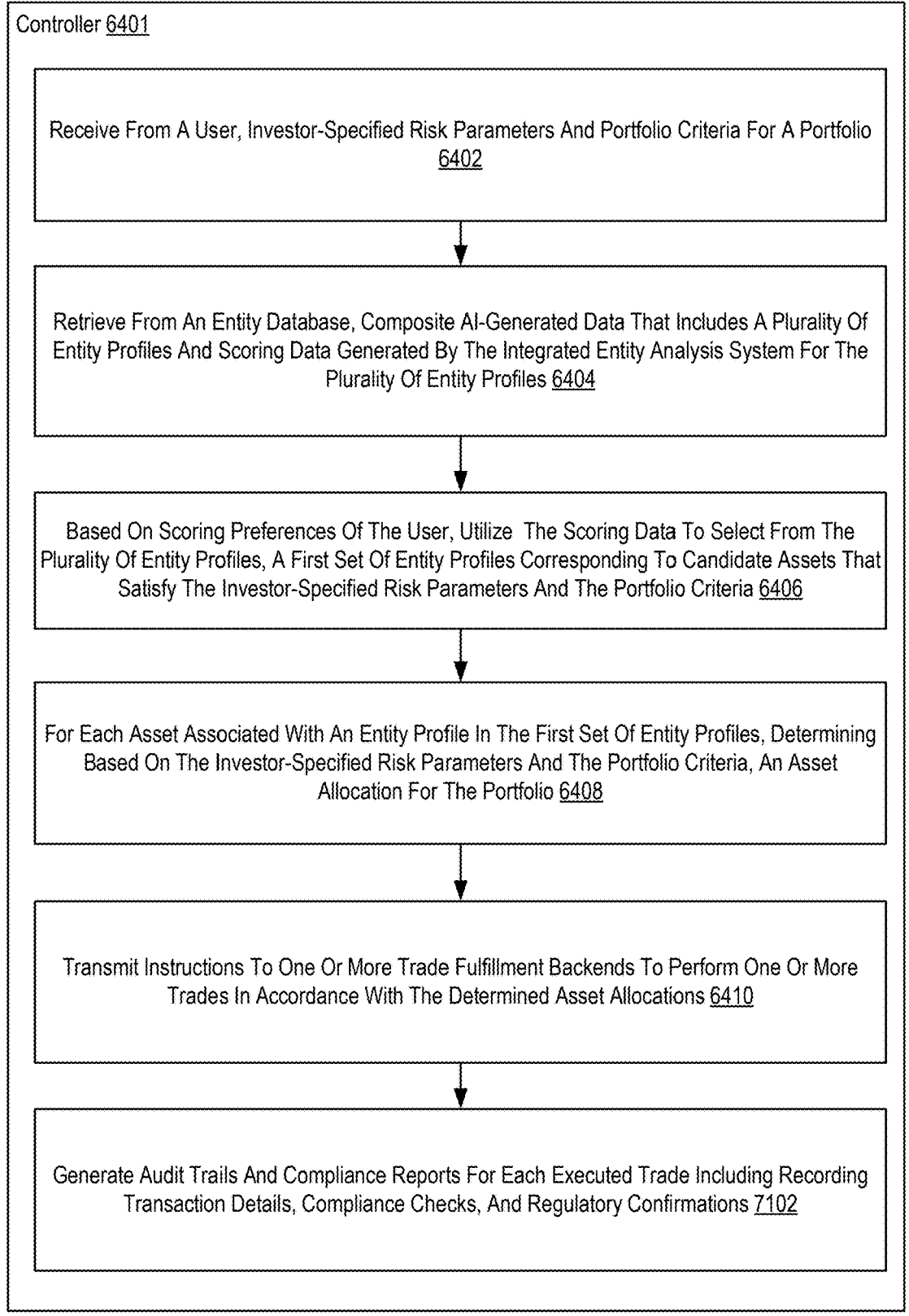
FIG. 71 sets forth a flowchart of another example method of automating asset trading based on composite AI-generated data in accordance with at least one embodiment of the present disclosure.

For further explanation, FIG. 71 sets forth a flowchart of another example method of automating asset trading based on composite AI-generated data in accordance with at least one embodiment of the present disclosure. The method of FIG. 71 is similar to the method of FIG. 64 in that the method of FIG. 71 includes the elements of FIG. 64. The method of FIG. 71 also includes generating 7102, by the controller 6401, audit trails and compliance reports for each executed trade including recording transaction details, compliance checks, and regulatory confirmations. In one embodiment, for each trade, the controller documents the outcomes of compliance checks, including verification of regulatory requirements and any confirmations of adherence to jurisdictional and sector-specific standards. These records form a comprehensive audit trail that not only tracks the specifics of the transaction but also substantiates that all necessary regulatory checks were completed and passed. Compliance reports are then compiled from these records, creating a transparent and verifiable log for review by internal teams or regulatory bodies, thereby ensuring accountability and regulatory alignment for each trade.

Figure 72:
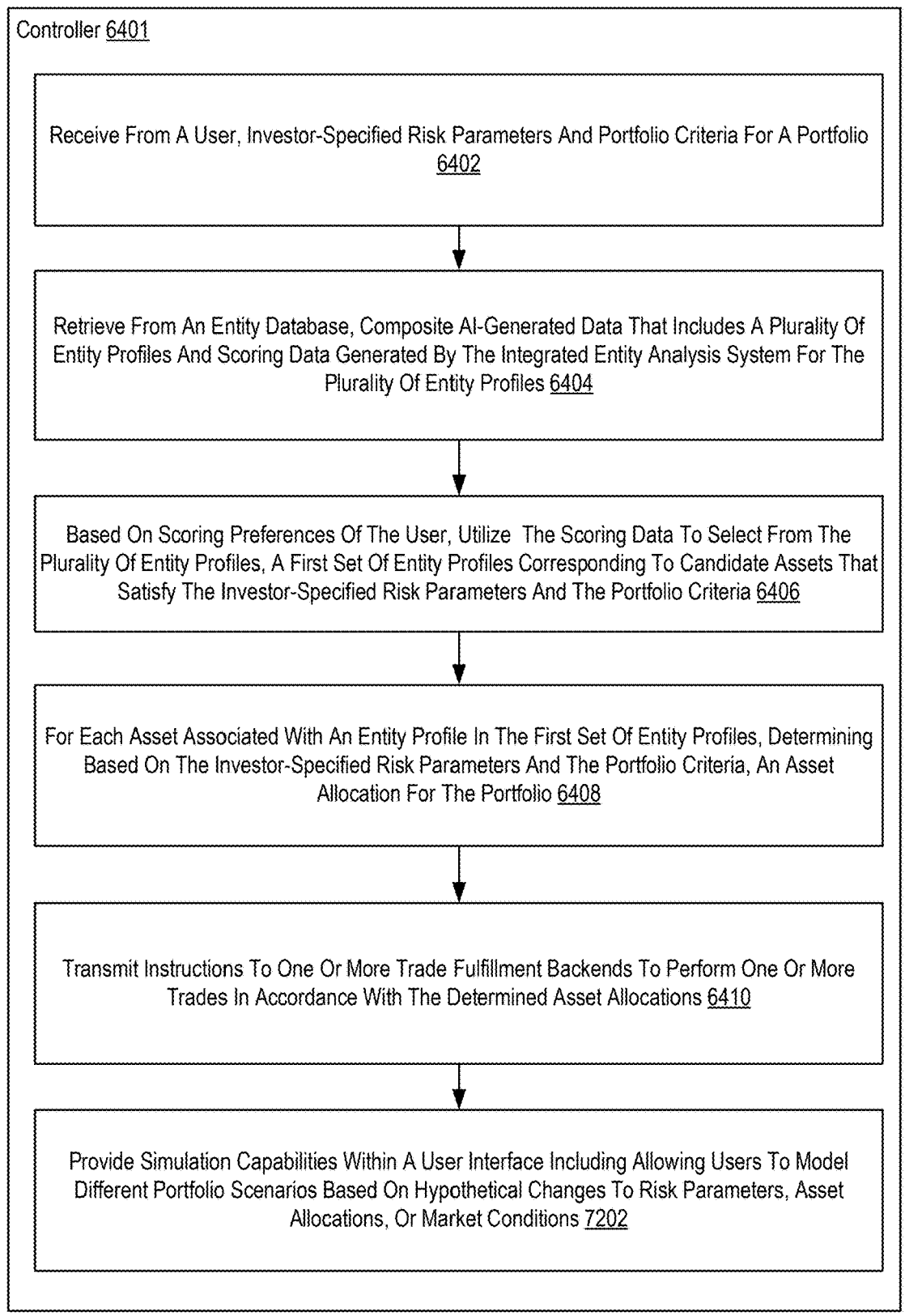
FIG. 72 sets forth a flowchart of another example method of automating asset trading based on composite AI-generated data in accordance with at least one embodiment of the present disclosure.

For further explanation, FIG. 72 sets forth a flowchart of another example method of automating asset trading based on composite AI-generated data in accordance with at least one embodiment of the present disclosure. The method of FIG. 72 is similar to the method of FIG. 64 in that the method of FIG. 72 includes the elements of FIG. 64. The method of FIG. 72 also includes providing 7201, by the controller 6401, simulation capabilities within a user interface including allowing users to model different portfolio scenarios based on hypothetical changes to risk parameters, asset allocations, or market conditions. Providing 7201, by the controller 6401, simulation capabilities within a user interface including allowing users to model different portfolio scenarios based on hypothetical changes to risk parameters, asset allocations, or market conditions may be carried out by adjusting hypothetical risk parameters, asset allocations, or market conditions. Through this interactive interface, users can simulate changes—such as increasing risk tolerance, reallocating assets, or simulating market volatility—and observe potential impacts on portfolio performance, projected returns, and risk exposure. These simulations leverage historical data and predictive modeling to generate realistic projections, allowing users to assess different investment strategies before committing to actual changes. By visualizing these hypothetical outcomes, users can make more informed decisions, optimizing their portfolio based on different potential scenarios and aligning with their investment goals and preferences.

Figure 73:
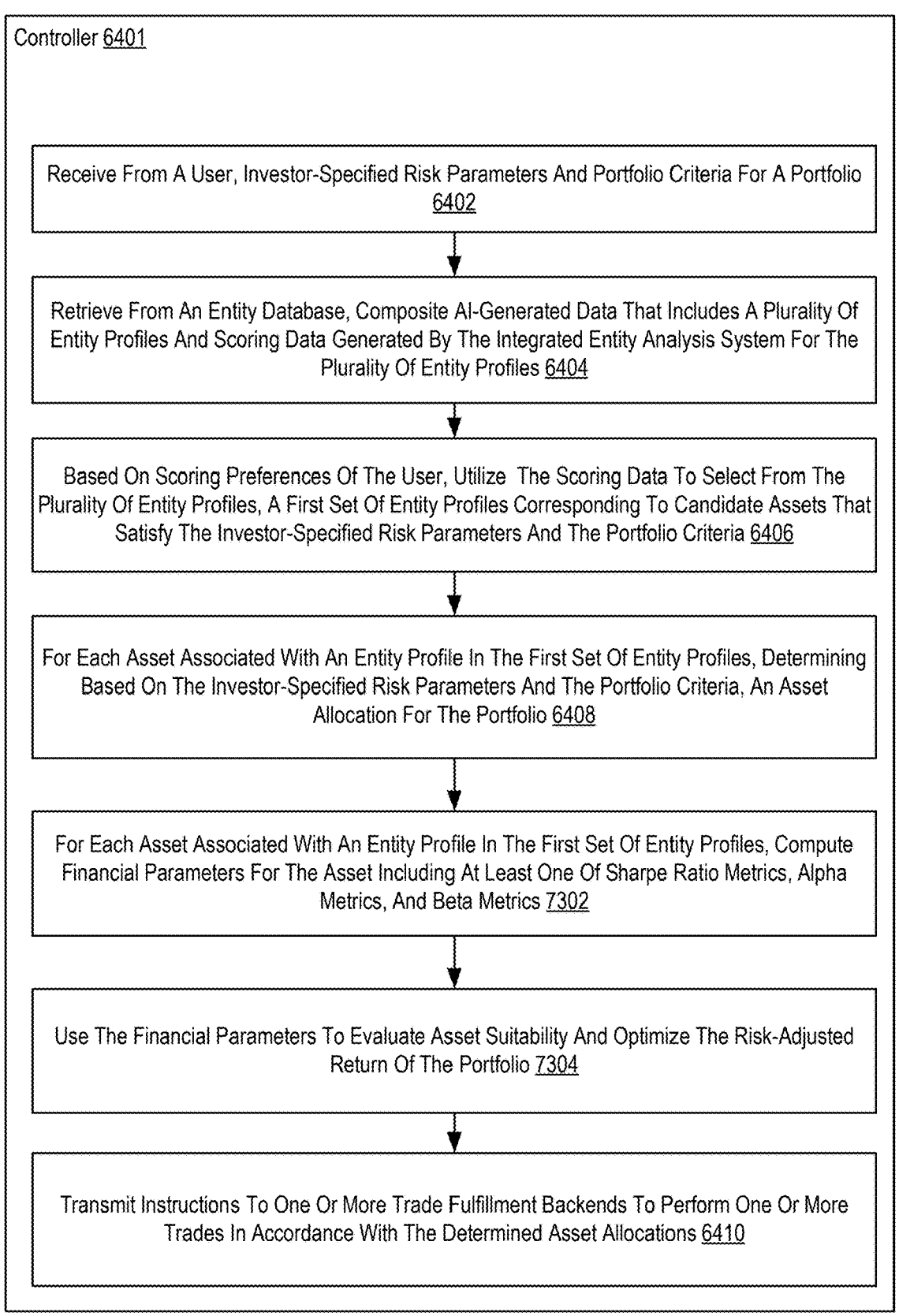
FIG. 73 sets forth a flowchart of another example method of automating asset trading based on composite AI-generated data in accordance with at least one embodiment of the present disclosure.

For further explanation, FIG. 73 sets forth a flowchart of another example method of automating asset trading based on composite AI-generated data in accordance with at least one embodiment of the present disclosure. The method of FIG. 73 is similar to the method of FIG. 64 in that the method of FIG. 73 includes the elements of FIG. 64. The method of FIG. 73 also includes for each asset associated with an entity profile in the first set of entity profiles, computing 7302, by the controller 6401, financial parameters for the asset including at least one of Sharpe ratio metrics, alpha metrics, and beta metrics. For each asset linked to an entity profile in the selected set, the controller (6401) computes key financial parameters, such as the Sharpe ratio, alpha, and beta metrics, to provide insights into the asset's performance, risk, and market correlation. The Sharpe ratio is calculated to assess the asset's risk-adjusted return by comparing excess returns over a risk-free rate to the asset's volatility, indicating the efficiency of returns relative to risk. The alpha metric measures the asset's performance against a benchmark index, helping determine whether the asset is adding value beyond what is expected based on market movements. The beta metric evaluates the asset's sensitivity to market fluctuations by comparing its price movements to those of a broader market index, indicating how much the asset's price is likely to move in response to market changes. By computing these metrics, the controller provides a deeper understanding of each asset's risk and performance characteristics, aiding in portfolio optimization and alignment with investor preferences.

The method of FIG. 73 also includes using 7304, by the controller 6401, the financial parameters to evaluate asset suitability and optimize the risk-adjusted return of the portfolio. By analyzing these metrics, the controller can identify assets that offer favorable returns relative to their risk (high Sharpe ratio), outperform their benchmarks (positive alpha), and have desired levels of market sensitivity (beta values that align with the portfolio's risk tolerance). The controller prioritizes assets with optimal risk-return profiles, strategically adjusting allocations to enhance the portfolio's overall stability and performance. This approach helps balance risk and reward within the portfolio, aligning it with the investor's objectives for maximizing returns while managing exposure to market volatility.

Exemplary embodiments of the present invention are described largely in the context of a fully functional computer system for integrated entity analysis using an AI model. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or Verilog), or a PLD programming language. Hardware logic may also be generated by a non-transitory computer readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described can be shared in part or in total among one or more components. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing access to composite AI-generated data, the method comprising:
    receiving from a user system, by a controller of an API server, an API call that specifies a request to perform a data operation on an entity database, the entity database comprising composite AI-generated data, wherein the composite AI-generated data includes entity profiles, and scoring data for the entity profiles, the scoring data generated by an entity analysis system based on attributes metrics, and AI-derived evaluations;
    interpreting, by the controller, the API call to identify the data operation and parameters related to the scoring data, wherein the data operation includes at least one of searching, sorting, retrieving, updating, or aggregating the composite AI-generated data based on the parameters specified within the API call;
    executing, by the controller, the data operation on the entity database according to the specified parameters, wherein the data operation retrieves or modifies the plurality of entity profiles and the scoring data in accordance with the request; wherein each entity profile comprising a structured collection of entity-specific properties corresponding to a defined entity type, the properties including values extracted from both structured and unstructured data sources and arranged in accordance with a predefined template for the entity type;
    and the scoring data comprising one or more scores for respective attributes of an entity, each attribute defined as a grouping of related properties in the entity profile, wherein the scores are generated by an entity analysis system using machine learning techniques to evaluate the attribute in comparison to corresponding attributes in a plurality of other entity profiles;
    generating, by the controller, a response to the API call, wherein the response includes at least one of: transformed or filtered representation of the AI-generated data, a structured aggregation of the scoring data with metadata describing its evaluation context, or a summary of results of the data operation performed on the AI-generated data; and
    transmitting, by the controller, the response to the user system.

2. The method of claim 1, wherein the API server implements a RESTful communication protocol for encapsulating API calls which allows the user system to access the composite AI-generated data through stateless HTTP requests.

3. The method of claim 1, wherein the API server supports multiple communication protocols including SOAP and XML-RPC.

4. The method of claim 1 further comprising implementing, by the controller, secure authentication mechanisms for access to the API server including requiring user systems to provide valid API keys or OAuth tokens with each API call.

5. The method of claim 1 further comprising enforcing, by the controller, role-based authorization for access to the API server including verifying user permissions associated with each API call to restrict access to specific data operations or entity profiles based on a user's assigned role.

6. The method of claim 1 wherein the API server includes a plurality of endpoints enabling third-party applications to retrieve the composite AI-generated data for integration into their own systems.

7. The method of claim 1 further comprising formatting, by the controller, the composite AI-generated data in a standardized data structure compatible with third-party applications; wherein the API server provides data access parameters that allow the third-party applications to selectively query, retrieve, and integrate the composite AI-generated data for specific entities or groups of entities into their own data environments.

8. The method of claim 1 further comprising providing, by the controller, real-time data feeds of updates to the composite AI-generated data by enabling persistent connections to allow user systems to receive immediate notifications and access updated composite AI-generated data as changes occur in the entity database.

9. The method of claim 1 further comprising supporting, by the controller, asynchronous data retrieval methods by allowing the user system to initiate data retrieval requests and receive a callback or notification when the requested data operation is complete.

10. The method of claim 1 further comprising implementing, by the controller, rate limiting mechanism to manage API usage including restricting the number of API calls a particular user system can make within a defined time period.

11. The method of claim 1 further comprising:
utilizing, by the controller, monitoring tools to track at least one of API usage patterns, response times, and or error rates related to usage of the API server by user systems; and
proactively adjusting, by the controller, system capacity to maintain consistent performance under varying usage conditions.

12. The method of claim 1, wherein the data operation specified in the API call includes a sorting operation; and wherein generating the response includes arranging a listing of a first set of entity profiles from the composite AI-generated data in the response based on a ranking of one or more attributes associated with each entity profile.

13. The method of claim 1 further comprising applying, by the controller, a filtering operation to select only those entity profiles in the composite AI-generated data that meet predefined criteria specified in the API call.

14. The method of claim 1, wherein the API call specifies a historical time range; and wherein executing the data operation includes retrieving entity profile data from the entity database that reflects changes or trends over the specified historical time range.

15. An apparatus for providing access to composite AI-generated data, the apparatus comprising:
a processor;
one or more computer-readable storage media coupled to the processor; and
program instructions stored on the one or more storage media to cause the processor to perform operations comprising:
receiving from a user system, by a controller of an API server, an API call that specifies a request to perform a data operation on an entity database, the entity database comprising composite AI-generated data, wherein the composite AI-generated data includes entity profiles and scoring data for the entity profiles, the scoring data generated by an entity analysis system based on attributes, metrics, and AI-derived evaluations;
interpreting, by the controller, the API call to identify the data operation and parameters related to the scoring data, wherein the data operation includes at least one of searching, sorting, retrieving, updating, or aggregating the composite AI-generated data based on the parameters specified within the API call;
executing, by the controller, the data operation on the entity database according to the specified parameters, wherein the data operation retrieves or modifies the plurality of entity profiles and the scoring data in accordance with the request; wherein each entity profile comprising a structured collection of entity-specific properties corresponding to a defined entity type, the properties including values extracted from both structured and unstructured data sources and arranged in accordance with a predefined template for the entity type; and the scoring data comprising one or more scores for respective attributes of an entity, each attribute defined as a grouping of related properties in the entity profile, wherein the scores are generated by an entity analysis system using machine learning techniques to evaluate the attribute in comparison to corresponding attributes in a plurality of other entity profiles;
generating, by the controller, a response to the API call, wherein the response includes at least one of: transformed or filtered representation of the AI-generated data, a structured aggregation of the scoring data with metadata describing its evaluation context, or a summary of results of the data operation performed on the AI-generated data; and
transmitting, by the controller, the response to the user system.

16. The apparatus of claim 15, wherein the API server implements a RESTful communication protocol for encapsulating API calls which allows the user system to access the composite AI-generated data through stateless HTTP requests.

17. The apparatus of claim 15, wherein the API server supports multiple communication protocols including SOAP and XML-RPC.

18. The apparatus of claim 15 further comprising program instructions stored on the one or more storage media to cause the processor to perform operations comprising:
implementing, by the controller, secure authentication mechanisms for access to the API server including requiring user systems to provide valid API keys or OAuth tokens with each API call.

19. The apparatus of claim 15 further comprising program instructions stored on the one or more storage media to cause the processor to perform operations comprising:
enforcing, by the controller, role-based authorization for access to the API server including verifying user permissions associated with each API call to restrict access to specific data operations or entity profiles based on a user's assigned role.

20. A computer program product for providing access to composite AI-generated data, the computer program product comprising:
a set of one or more computer readable storage media; and
computer program instructions, collectively stored in the set of one or more storage media, that when executed, cause a processor to perform computer operations comprising:
receiving from a user system, by a controller of an API server, an API call that specifies a request to perform a data operation on an entity database, the entity database comprising composite AI-generated data, wherein the composite AI-generated data includes entity profiles and scoring data for the entity profiles, the scoring data generated by an entity analysis system based on attributes, metrics, and AI-derived evaluations;
interpreting, by the controller, the API call to identify the data operation and parameters related to the scoring data, wherein the data operation includes at least one of searching, sorting, retrieving, updating, or aggregating the composite AI-generated data based on the parameters specified within the API call;

executing, by the controller, the data operation on the entity database according to the specified parameters, wherein the data operation retrieves or modifies the plurality of entity profiles and the scoring data in accordance with the request; wherein each entity profile comprising a structured collection of entity-specific properties corresponding to a defined entity type, the properties including values extracted from both structured and unstructured data sources and arranged in accordance with a predefined template for the entity type; and the scoring data comprising one or more scores for respective attributes of an entity, each attribute defined as a grouping of related properties in the entity profile, wherein the scores are generated by an entity analysis system using machine learning techniques to evaluate the attribute in comparison to corresponding attributes in a plurality of other entity profiles;

generating, by the controller, a response to the API call, wherein the response includes at least one of: transformed or filtered representation of the AI-generated data, a structured aggregation of the scoring data with metadata describing its evaluation context, or a summary of results of the data operation performed on the AI-generated data; and transmitting, by the controller, the response to the user system.

* * * * *